(12) United States Patent
O'Malley

(10) Patent No.: US 9,710,836 B1
(45) Date of Patent: Jul. 18, 2017

(54) SENSOR, WEAPON, ACTOR, AND REGISTRATION MONITORING, EVALUATING, AND RELATIONSHIPS

(71) Applicant: Matthew Carl O'Malley, Lake Balboa, CA (US)

(72) Inventor: Matthew Carl O'Malley, Lake Balboa, CA (US)

( * ) Notice: Subject to any disclaimer, the term of this patent is extended or adjusted under 35 U.S.C. 154(b) by 492 days.

(21) Appl. No.: 14/250,378

(22) Filed: Apr. 11, 2014

Related U.S. Application Data

(60) Provisional application No. 61/810,713, filed on Apr. 11, 2013.

(51) Int. Cl.
*G06F 19/00* (2011.01)
*G06Q 30/06* (2012.01)
*G01C 22/00* (2006.01)

(52) U.S. Cl.
CPC ......... *G06Q 30/0607* (2013.01); *G01C 22/00* (2013.01)

(58) Field of Classification Search
CPC ... G06G 7/32; G06G 7/80; G06G 7/22; G05B 19/00; G01C 3/00; F41A 27/28; F42C 17/00; F41J 5/06; F41G 11/00; F41G 3/06; F41G 5/08; F41G 5/00
USPC ....... 235/404, 400, 407, 405, 408, 410, 411, 235/412, 414, 415, 416, 417
See application file for complete search history.

(56) References Cited

U.S. PATENT DOCUMENTS

2016/0069643 A1* 3/2016 Lyren ................ F41G 1/35
345/589
2016/0187094 A1* 6/2016 Bockmon ............ F41A 27/30
42/111

* cited by examiner

*Primary Examiner* — Karl D Frech

(57) ABSTRACT

A system and method for tracking a weapon, wherein a server computing system tracks, analyzes, evaluates, and resources data, statistics, perceptions, and relationships for weapon transactions, storage, transporting, practice, training, holding, aiming, firing, cleaning, and/or the like.

20 Claims, 41 Drawing Sheets

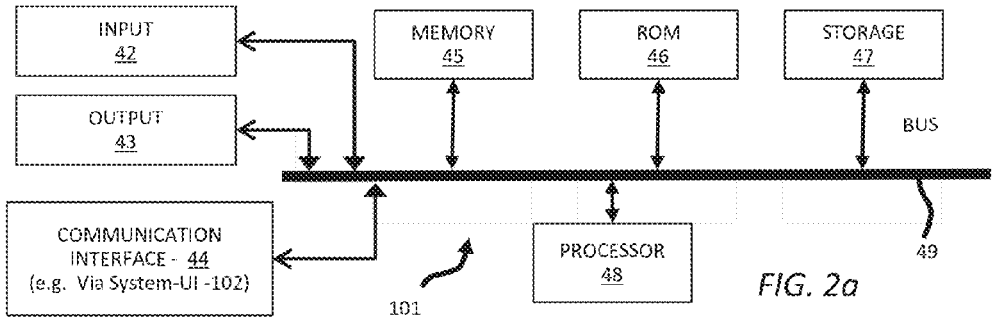
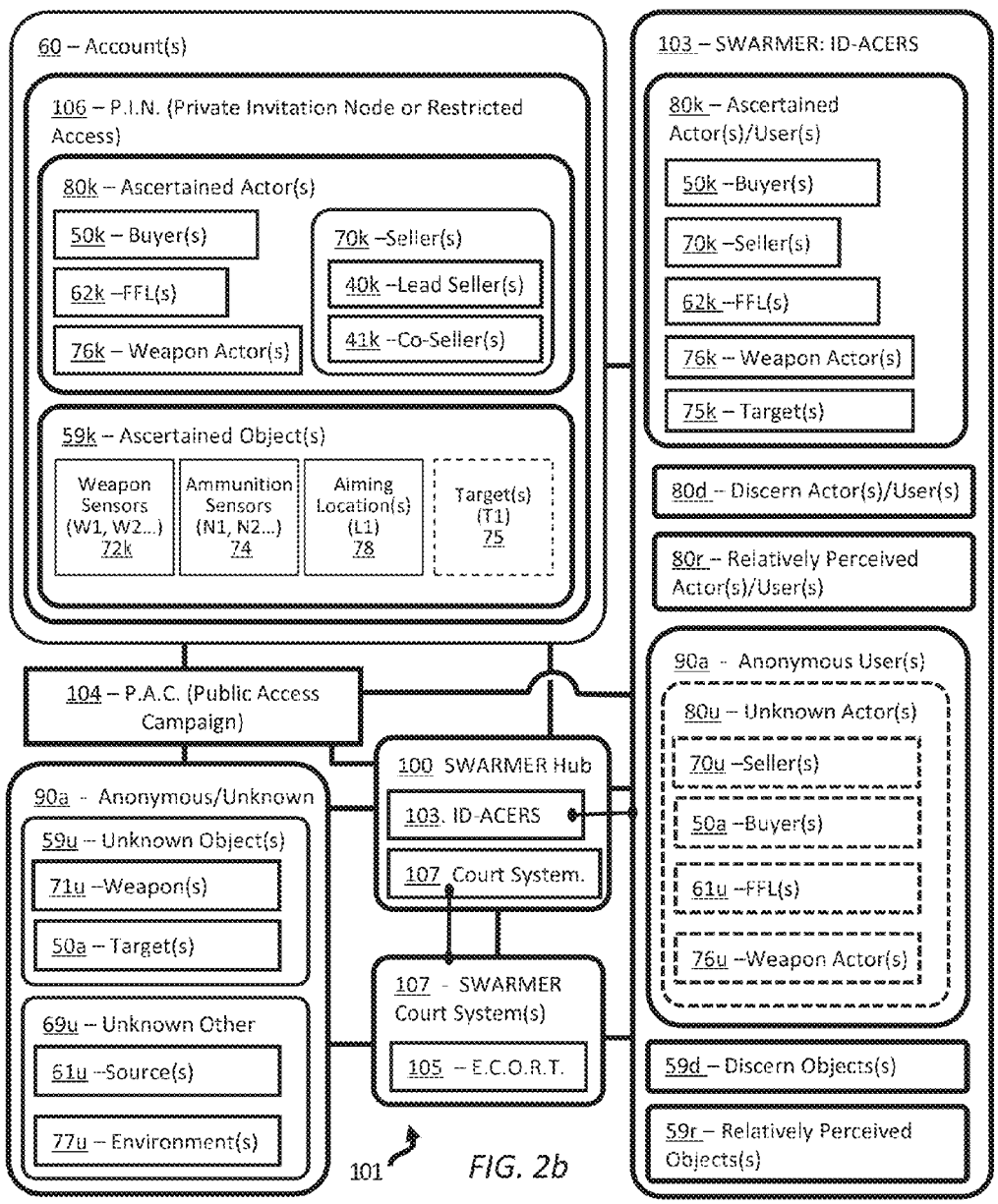

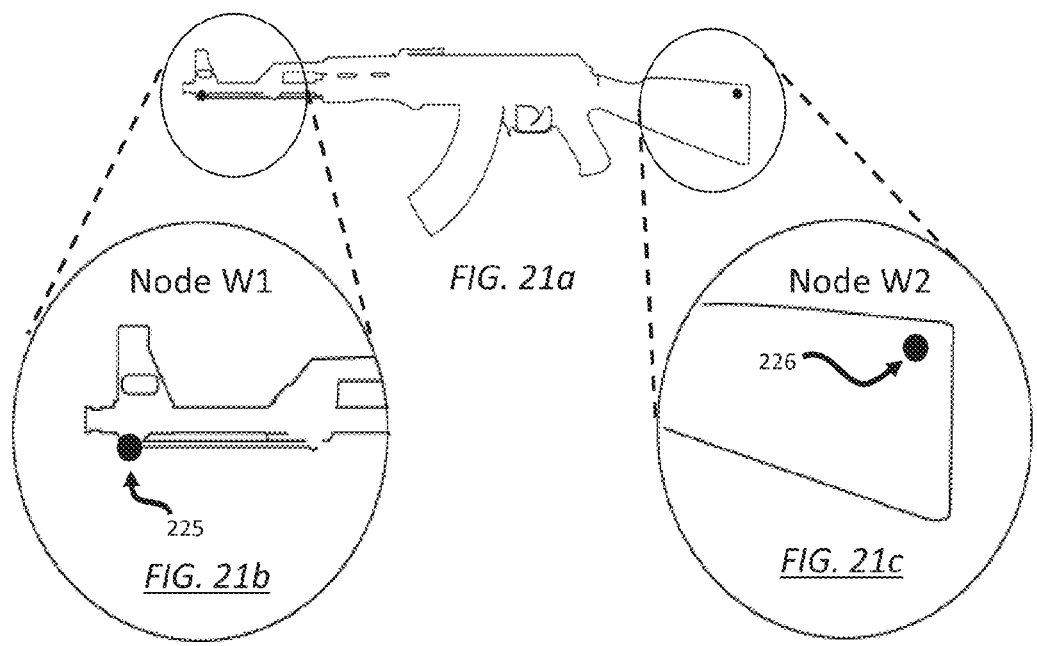
FIG. 21a
FIG. 21b
FIG. 21c
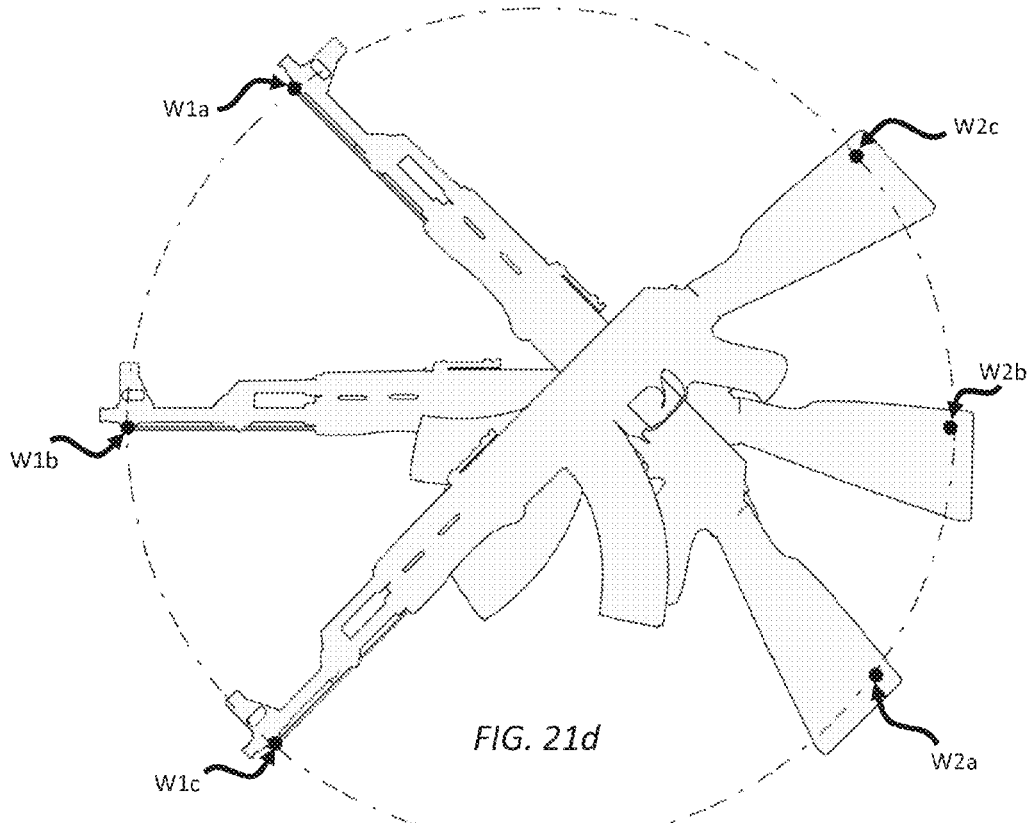
FIG. 21d

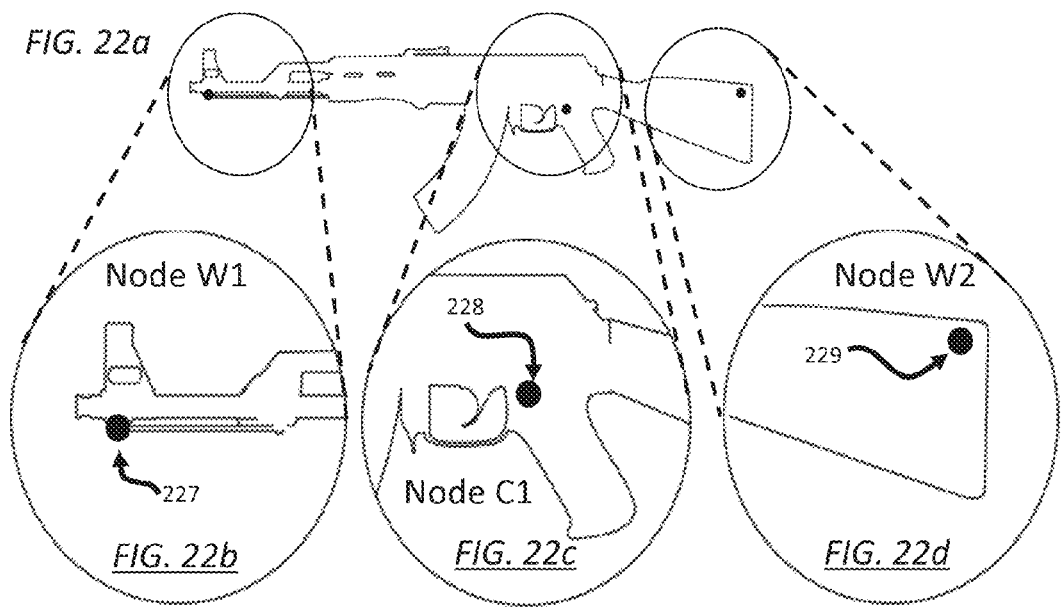
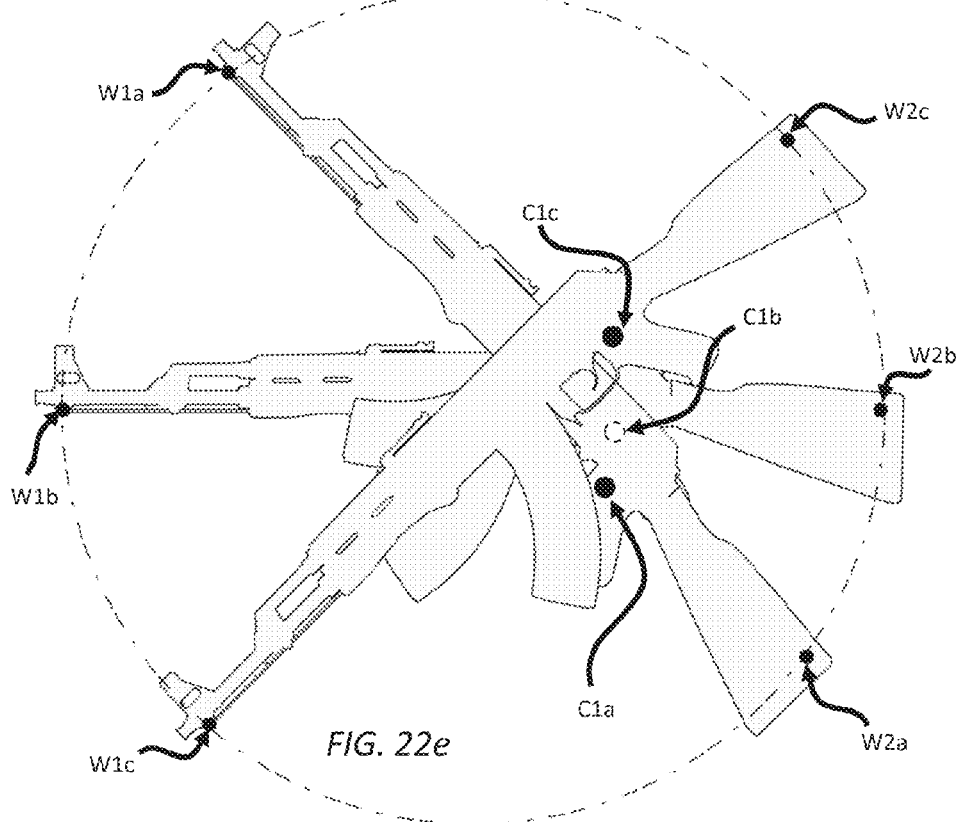

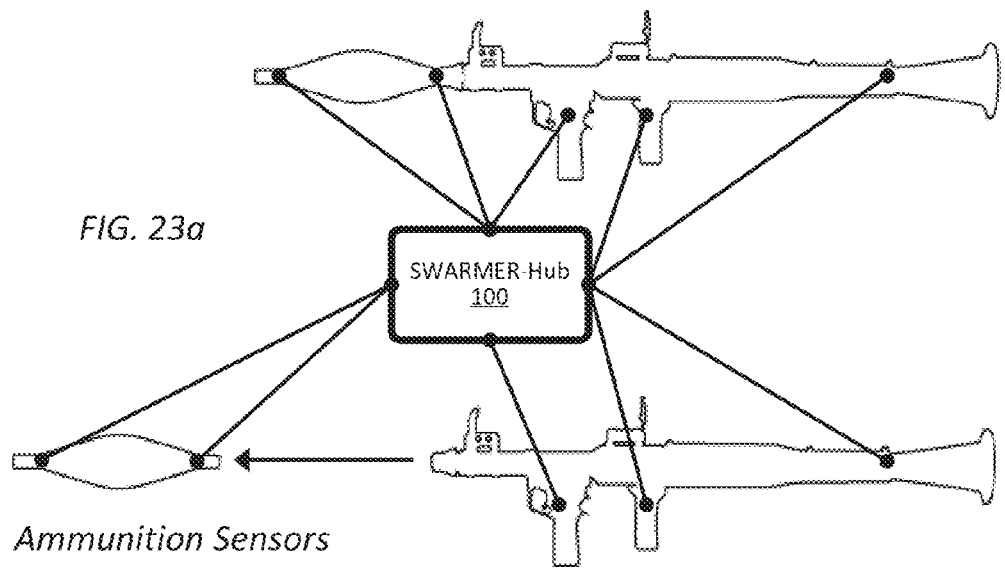
FIG. 23a
Ammunition Sensors
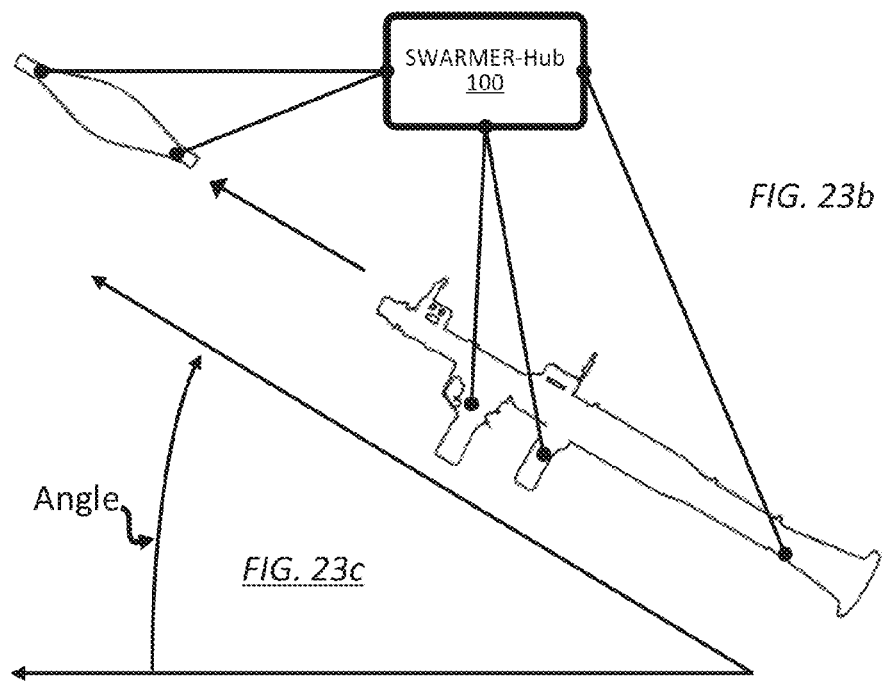
FIG. 23b
Angle
FIG. 23c
Field Calibration, Orientation & Aiming Adjustment

Node G1

| Date | time | Current / Absolute | | | Relative to previous | | |
|---|---|---|---|---|---|---|---|
| | | X | Y | Z | X | Y | Z |
| | | | | | | | |
| | | | | | | | |
| | | | | | | | |

FIG. 24a

Node W1

| Date | time | Current / Absolute | | | Relative to previous | | |
|---|---|---|---|---|---|---|---|
| | | X | Y | Z | X | Y | Z |
| | | | | | | | |
| | | | | | | | |
| | | | | | | | |

FIG. 24b

Target Node T1

| | | Current / Absolute (e.g. with Assumptions & Adjustments) | | | Relative to previous (e.g. with Assumptions & Adjustments) | | | Actual Hit | | | | |
|---|---|---|---|---|---|---|---|---|---|---|---|---|
| Assumption Per Input | | | | | | | | Last Fired | | | Relative to target | |
| Date | time | X | Y | Z | X | Y | Z | X | Y | Z | X | Y | Z |
| | | | | | | | | | | | | |

FIG. 24c

Node C1 (Trigger)

| | | History (e.g. Hit/Miss per Fire or Non-Fire) | | | | | | Node C1 (Trigger) | | | | |
|---|---|---|---|---|---|---|---|---|---|---|---|---|
| | | Current / Absolute | | | Relative to previous | | | Last Fired | | | Last Non-Fire (e.g. span) | |
| Date | time | X | Y | Z | X | Y | Z | X | Y | Z | X1-X2 | Y1-Y2 | Z1-Z2 |
| | | | | | | | | | | | | | |

FIG. 24d

Weapon Node(s) (e.g. G1, G2...) Weapon Sensor Nodes (e.g. W1, W2...)

| Time & Date | Node ID | Assumptions (e.g. Per Input/Node) | Additional Factors (e.g. weather) | Adjustment (e.g. Per Input/Node) | Current / Absolute (e.g. with Assumptions & Adjustments) | | | Relative to previous (e.g. with Assumptions & Adjustments) | | | Weapon Last Used or Fired Position (e.g. Collective Node Value (CNR)) | | | Result (e.g. Relative Event) |
|---|---|---|---|---|---|---|---|---|---|---|---|---|---|---|
| | | | | | X | Y | Z | X | Y | Z | X | Y | Z | |
| | | | | | | | | | | | | | | |
| | | | | | | | | | | | | | | |

FIG. 25a

Weapon Trigger Node(s) (e.g. C1, C2...)

| Time & Date | Target ID | Weapon Last Used/Fired Position (e.g. Node E &/or Collective Node Value) | | | Roll | Pitch | Yaw | Last Non-Fire (Non-Usage) Span | | | Duration Since Last Firing | Weapon Last Used or Fired Position (e.g. Collective Node Value) | | | Result (e.g. Relative Event) |
|---|---|---|---|---|---|---|---|---|---|---|---|---|---|---|---|
| | | X | Y | Z | | | | X1-X2 | Y1-Y2 | Z1-Z2 | | X | Y | Z | |
| | | | | | | | | | | | | | | | |
| | | | | | | | | | | | | | | | |

FIG. 25b

Target Node(s) (e.g. T1, T2...)

| Time & Date | Target ID | Assumptions (e.g. Per Input/History) | Additional Factors (e.g. weather) | Adjustment (e.g. Per Input/Node) | Current / Absolute (e.g. with Assumptions & Adjustments) | | | Relative to previous (e.g. with Assumptions & Adjustments) | | | Weapon Last Used or Fired Position (e.g. CNV) | | | Result (e.g. Relative Success) |
|---|---|---|---|---|---|---|---|---|---|---|---|---|---|---|
| | | | | | X | Y | Z | X | Y | Z | X | Y | Z | |
| | | | | | | | | | | | | | | |
| | | | | | | | | | | | | | | |

FIG. 25c

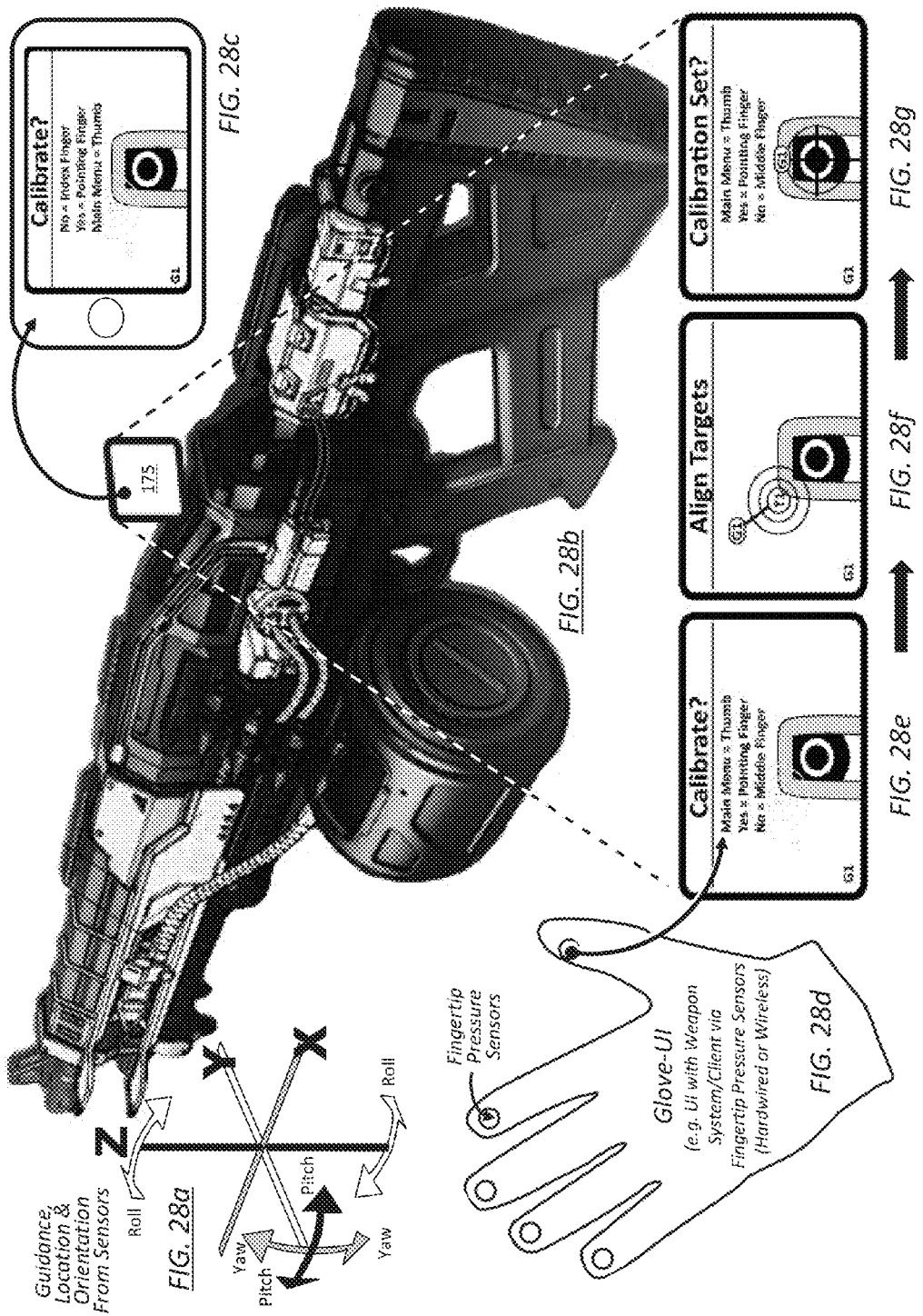

(E.g. below alert sent to UI/App on smartphone, previously setup by gun owner to receive alerts regarding a weapon (G1) left at home while out)

Additional Weapon (G) Systems with Inputs/Metrics/Guidance
(e.g. via one or more than one sensor (e.g. W, T, etc. sensors/inputs) &/or one or more than one sensor placement location in, on, &/or in association with the weapon)

SENSOR, WEAPON, ACTOR, AND REGISTRATION MONITORING, EVALUATING, AND RELATIONSHIPS

CLAIM FOR PRIORITY AND CROSS REFERENCE TO RELATED APPLICATION

This application claims the priority benefit of U.S. Provisional Patent Application Ser. No. 61/810,713, which was filed on Apr. 10, 2013, the disclosure of which is specifically incorporated in its entirety herein by reference.

BACKGROUND

Field

The present disclosure is generally related to firearm transactions and, even more particularly, to systems and methods for monitoring, analyzing, evaluation, scoring, and interrogating weapon and ammunition transactions, buyers, sellers, FFLs, actors/users, along with trends, storage, transporting, training, targeting, firing and usage patterns.

BRIEF DESCRIPTION OF THE FIGURES

FIG. 2a is an exemplary diagram of a client 99a or server 185a. Client/server 99a/185a may include a bus 49, the processor 48, a main memory 45, a read only memory (ROM) 46, a storage device 47, an input device 42, an output device 43, and a communication interface 44. Bus 49 may include conductors that permit communication among the components of client/server 99a/185a.

FIG. 2b depicts an embodiment of the "Client-server network" 220, here preferably as an "Operating Environment," 101 (sometimes referred as a "SWARMER Operating Environment" 101).

FIG. 17 is a flowchart depicting an embodiment and example of the initial powering of a Weapon System on a Weapon Client or similar.

FIGS. 21a-21d are illustrative examples of sensor placements and encasements in/on a weapon, here with two sensors and the ability to track and guidance in 3D space, in an embodiment.

FIGS. 22a-22e are illustrative examples of sensor placements and encasements in/on a weapon, here with three sensors, a third for the trigger, and the ability to track and guidance in 3D space, in an embodiment.

FIGS. 23a-23c are another set of illustrative examples of sensor placements and encasements in/on a weapon and here with two sensors on the ammunition for additional tracking and guidance in 3D space, in an embodiment.

FIGS. 24a-24d are illustrative examples of database schema/table for collecting, parsing, indexing, and analyzing data retrieved from specific sensors, in an embodiment.

FIGS. 25a-25c are additional illustrative examples of database schema/table for collecting, parsing, indexing, and analyzing data retrieved from specific sensors, in an embodiment.

FIG. 28a depicts the range of motion trackable by the magnetometer sensors in three 3D space for the Weapon client in FIG. 28b, in an embodiment.

FIG. 28c depicts a smartphone with UI which may be synchronized with the Weapon System to operate/interact independently, in parallel, made interchangeable, replaceable, swappable, and/or mountable on the weapon itself, in an embodiment.

FIG. 28d is an illustrative depiction of a Glove-UI that may also be synchronized with the Weapon System to operate/interact independently, in parallel, and/or the like, in an embodiment.

FIGS. 28e-28g is a series of breakaway isolated illustration of the weapon UI/Display 175 during a user/actor calibration sequence, in an embodiment.

FIG. 38 is a flowchart that depicts a non-limiting embodiment and example of the SWARMER system, and associated computer-implemented method for Computer-Processor-based analysis, interrogation, extraction, evaluation and/or the like of I/O/PC, data/content with/for any mission components, elements, links, relations, concerns, collaboration, issues, conflicts, legal ramifications, overlap, scoring, verifications, prompts, and/or the like.

FIG. 40 is a flowchart that depicts a non-limiting embodiment and example of the SWARMER system, and associated computer-implemented method for determination of a Go/No Go Decision for a particular Mission and/or Target with collaborative Actors and determining which Actor(s) have the best target knowledge, angle, perspective, data, capacity, rank, authority, support, creditability, and/or the like.

DETAILED DESCRIPTION

Figure 1A:
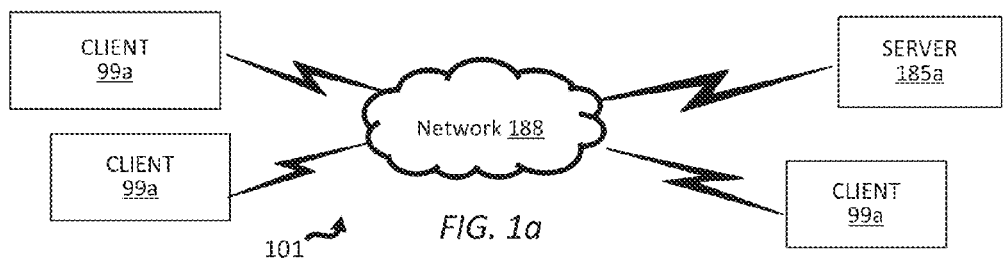
FIG. 1a is an exemplary diagram of an Operating Environment 101 in which concepts consistent with the principles of the disclosed system and methods may be implemented.

There are several aspects to the present disclosure with three (3) core aspects. A first core aspect surrounds a system and associated methods (sometimes referred to as a "Strategic Weapon, Ammunition, & Reconnaissance Monitor, Evaluator & Researcher" System" (SWARMER) System) for improved tracking, assessing, and predicting of firearm sales and trends. A second core aspect surrounds the SWARMER System for monitoring, analyzing, and evaluating actual weapon and ammunition usage, say while in training, sport/competition, hunting, protection, combat, police work and/or the like. And third core aspect for monitoring, analyzing, evaluating, and scoring the relative reliability and relationships of data that is input/out with the system, where a continuum comprises labels with criteria/threshold regarding the relative data reliability by the SWARMER system, such as a continuum with the s series of labels comprising: "ascertained, discerned, relatively discerned/perceived, actor-stated with SWARMER discount, and unknown."

Core Aspect One (1) for Improved Tracking, Assessing, and Predicting of Firearm Sales and Trends.

Gun ownership involves a number of federal, state and local regulations. For example, the United States Bureau of Alcohol and Tobacco (BATF), imposes legal requirements on the purchase and sale of firearms. There are two general rules that apply to the majority of gun transactions. The first rule is that an instant background check must be performed on the purchaser before a gun is sold. This is done to assure that the purchaser is not a "restricted person," who, for any number of legal reasons, has lost his rights to purchase or possess a gun. The second rule is that no gun may be transported across a state boundary during the sale of the gun unless the gun is transferred through a "Federally Licensed Firearms Dealer" (FFL) on both ends of the transaction. As of early 2013, there were estimated to be about 124,000 FFLs in the US. Regulations also require the careful collection, storage, and reporting of all records associated with gun sales.

In general, the BATF will approve an application for the Federal Firearms License (FFL), if the applicant is 21 years or older, who is not prohibited from handling or possessing firearms or ammunition, has not violated the Gun Control Act or its regulations, has not failed to disclose information or facts in connection with his/her application, and has premises for conducting business or collecting. Further, the applicant must also certify that the business to be conducted under the license is not prohibited by State or local law in the place where the licensed premise is located including Local (City & County) Zoning Ordinances and not prohibited by the Home Owners Association (HOA) if any; certify that within 30 days after the application is approved the business will comply with the requirements of State and local law applicable to the conduct of the business, certify the business will not be conducted under the license until the requirements of State and local law applicable to the business have been met; certify that the applicant has sent or delivered a form to the chief law enforcement officer where the premises are located notifying the officer that the applicant intends to apply for a license; and certify that there is suitable/secure gun storage and safety devices will be available at any place in which firearms are sold under the license to persons who are not licensees.

For certain specialty firearms, even more restrictive regulations apply, including requirements for special occupation tax status, tax stamps, and, in some cases, outright bans of transactions except to qualified law enforcement personnel. A limited number of exceptions have existed of the foregoing federal regulations. For example an exception, which is frequently termed the gun show loophole, has/had allowed a firearm to be sold between two private parties who are not generally engaged in the business of selling firearms when the sale occurs within states boundaries and does not require an instant background check or the involvement of an FFL in the transaction. This may soon change under new legislation efforts.

In addition to federal regulations, each state also has its own unique set of state-level firearm regulations. State regulations vary widely, from essentially no restrictions, such as in Alaska, to significant restrictions, such as in California. Local rules enacted by townships or cities, such as those enacted by New York City, Washington, D.C., and Chicago, can further complicate this issue.

In an article on BloombergBusinessWeek:
[In] October [2012], Google joined other big online marketplaces including EBay, Craigslist, and Amazon.com in banning weapons listings on its revamped shopping site. The move, which the company said was in keeping with its advertising policy, predated the Newtown (Conn.) school massacre (on Dec. 14, 2012) by about two months. Yet there is no evidence that Google's action has curbed online gun sales.

That's because sellers, incensed by the prohibition on gun listings, are finding new outlets for their wares. Cory Brown, a sporting goods merchant who runs several e-commerce sites in Rockville, Md., estimates that Google once helped drive 80 percent of the roughly $5 million in annual sales of ammunition, shooting accessories, and outdoor equipment at one of his online stores. Rather than just complain to the search giant, he launched FreeGunShow.com in December, an online classified ad service for guns and other gear. "I was like, look, I'm tired of these companies, whatever [their] motivations, prohibiting the sale of things that are legal," Brown says. "When Google pulled the plug on this kind of stuff, I knew something bad was happening." Another firearms marketplace, GunCycle.com, based in Princeton, Kan., is scheduled to launch on Mar. 1, 2013

In 2000, when the U.S. Department of Justice last did an official tally, there were about 80 online firearm auction sites and approximately 4,000 other sites offering guns for sale in the U.S. Today, as the national gun control debate intensifies in the wake of the Newtown tragedy, it's a safe bet that gun buyers have even more online options. Bureau of Alcohol, Tobacco, Firearms and Explosives spokeswoman Ginger Colbrun says the federal agency is aware that there's been a boom in gun buying sites. Federal gun safety proposals circulating in Washington that would tighten background checks might take a bite out of sales if passed by Congress. Yet none are intended to put these digital weapons bazaars out of business.

New sites like Brown's and older ones such as GunBroker.com and Armslist function as marketplaces for buyers and sellers and make money through advertising or transaction charges. GunBroker.com, which bills itself as the world's largest gun auction site, has brokered more than $2 billion in sales since its founding in 1999, according to the site.

Online sales anger gun control advocates because shoppers can use them to exploit a long-standing loophole in federal law that allows unlicensed private gun sellers to skip background checks on prospective buyers in their home state. Also, while it's a felony to sell a firearm knowingly to an individual who would not pass a background check because of a criminal record or history of mental illness, many private sellers flout that rule.

Bob Ralph shuttered Express Police Supply, a brick-and-mortar store in Lenexa, Kan., that sold Smith & Wesson's M&P 15 semiautomatic rifles and Glock's 22 handguns in 2011. Now he's gearing up to launch GunCycle.com. Ralph acknowledges that a private collector who auctioned a gun through his site could meet the buyer in a parking lot and hand over the weapon without a background check. "There would be no way for me to stop that or preclude that," he says. "And it would be legal for them to do it that way."

An undercover investigation by New York City of private firearms sales online in 2011 showed 62 percent of sellers agreed to sell a firearm to investigators posing as buyers who indicated they probably couldn't pass a background check. "Buyers can buy and sellers can sell in almost complete anonymity. So if you're looking to avoid being seen a paper trail or legal scrutiny you're going to turn [to Internet sites] first," says Mark Glaze, director of Mayors Against Illegal Guns. The group, which includes more than 850 U.S. mayors, was co-founded by New York City Mayor Michael Bloomberg, who owns Bloomberg LP, the publisher of this magazine.

Gun control advocates are trying to halt the proliferation of online marketplaces for firearms. Two days before the Dec. 14, 2012 Connecticut school shooting, Armslist was sued by relatives of a woman who was murdered in suburban Chicago in 2011 by a man who shot her with a weapon advertised on the site. The wrongful death lawsuit, the first against an online weapons seller, was launched by the Brady Center to Prevent Gun Violence on behalf of Jitka Vesel's family. Oklahoma-based Armslist didn't respond to requests for comment sent via its website; a telephone number wasn't available.

Others in the same line of business have not been cowed. "This lawsuit will die. You cannot sue a third party in this case. Been proven over and over in case law," Cory Brown wrote in an e-mail. He says his two-month-old site has more than 1,000 registered users and would be doing even better if he had more merchandise.

"A lot of our sellers own stores and inventory right now is real hard to get," he wrote in another e-mail. "Anytime we see an in-demand gun come up, it doesn't last long."

Existing online firearms auction suppliers fail to provide a sufficiently safe, secure, and legal consumer environment for performing online firearms transactions in such a way as to adequately address the complexities of existing regulations. In particular, there is no provision for legally obtaining a firearm. There is no validation of identity, instant background check, or requirement for using licensed FFL dealers for interstate transactions.

Additionally, existing online auction suppliers also fail to provide any means for actually completing an entire firearm transaction. Instead, they merely loosely connect prospective buyers with prospective sellers leaving the details of the actual transaction to the parties involved and, in so doing, offer no protection against fraud or lawlessness.

The present disclosure is generally directed to embodiments for facilitating online interrogations, analysis, and assessments of potential and existing firearm transactions and, in some embodiments, for providing centralized information corresponding to transactions, actors, sales, verifications, validations, identifications, standards, pricing, history, and legal regulations. Processes are established for verifying and completing the entirety of the firearms transactions, in many embodiments, as well as for providing safeguards to ensure that the firearms transactions will be in compliance with federal, state and local regulations.

One benefit that can be achieved through implementation of the present disclosure is the creation of a verification system for safe transactions where there is data on consumers, sellers, buyers, and dealers engaged in transactions that are found to be compliant and non-compliant with applicable federal, state, and local laws, per location, per actor, and/or the like.

Thousands of law variations per location, venue, actors, and/or the like can make transactions complex, overwhelming, and obscure. This can make it difficult to ensure transactions are in compliance with legal requirements. There is also a small percentage (but overall a worrisome total number) of private sellers who have little to no law compliance concerns. It's even conceivable that a buyer and/or a seller could inadvertently become consequentially entangled in such a transaction that could range from a loss of funds to criminal charges as an accessory to a felony. Even if most consumers and actors in the market want to follow the law, it can take only one mistake or oversight to put a firearm in hands of a potential misfit (e.g. a substantially mentally impaired person, a felon, and/or the like).

According to some embodiments, online interfaces are provided by one or more server system(s) for firearm sellers, buyers, and FFLs to facilitate the gathering and displaying of data that is useful for validating and verifying information provided by the buyers and sellers and for helping to ensure and facilitate legal compliance during the firearms transactions.

Some seller interfaces are used to gather information about the seller which can be used, for instance, to establish a seller account. Financial institution information can also be obtained for identifying where to withdraw money for fees, or where to deposit money from completed transactions. Some seller interfaces also gather information related to the specific firearm(s) that the seller is attempting to sell, such as the firearm's type, age, or condition. Some seller interfaces are also used for providing the seller with information that can be used to facilitate the identification, pricing, and transfer of the firearm.

Some buyer interfaces gather information about the buyer for establishing a buyer account. Some buyer interfaces gather information related to the firearm(s) that the buyer is attempting to purchase. Some buyer interfaces provide the buyer with information for identifying and acquiring the firearm(s). Financial institution information can also be obtained for defining the source(s) of money to be used for the transactional purchase and any account fees.

FFL interfaces are provided for receiving data related to third party content (e.g., FFL webpages), for obtaining data related to FFL Inventories, and for providing identification information used by the FFL to identify the firearm(s) being transacted, as well as other transaction data. Financial institution information can also be obtained for defining the source(s) of money to be used for fees as well as for defining deposit accounts for receiving payments of royalties or fees.

Geographic location information related to the buyers, sellers, and FFLs can also be obtained through the various interfaces to facilitate the identification of local FFLs for the corresponding buyers and sellers and to identify relevant local regulations that are applicable to the transaction for both buyers and sellers. Corresponding interfaces provide the relevant regulations or filter results to map where a particular firearm, a particular seller, a particular buyer, a particular FFL, constitutes a legal transaction, when, how, why, and/or the like, and other information based on the relevant regulations.

In various non-limiting embodiments, additional interfaces provided for any combination of the FFL, seller, or buyer systems facilitate background checks and shipping and handling processes. A seller can also receive a ticket, or other transaction data, corresponding to a particular transaction which can be brought to an FFL along with the corresponding firearm to be held and/or inspected by the FFL until it is transported to the buyer.

A centralized listing of private and FFL firearms for sale is maintained along with pricing standards corresponding to different types of firearms according to type and condition. The pricing standards are updated, as necessary, to reflect real-world conditions. The pricing standards correspond to firearms currently in inventory as well as firearms that are not currently in inventory so that buyers, as well as sellers, are provided additional tools for making more informed decisions about their firearms transactions.

In some embodiments of the disclosure, a server computing system comprising a processor and memory facilitates online transactions of firearms by executing instructions stored in memory that enable a seller to sell a firearm to a buyer with the use of at least one computerized interface generated by the server. Even more particularly, the server is able to facilitate the online transactions of firearms by providing one or more interfaces to the seller through which the seller provides seller account data that is received by the server and used to generate a seller account. The server also receives firearm data corresponding to a firearm to be sold by the seller through the one or more interfaces. The server thereafter determines whether the seller is legally permitted to sell the firearm based on current firearm regulations corresponding to a jurisdiction of the seller. If permitted, the server then advertises the firearm for sale on the one or more interfaces. However, the firearm is only advertised to one or more buyers if the seller is legally permitted to sell the firearm based on a determination that the one or more buyers are legally permitted to buy the firearm, as determined by firearm regulations corresponding to one or more legal jurisdictions of the one or more buyers.

The server can also provide one or more interfaces to the buyer through which the buyer provides buyer account data for generating a buyer account. The server can also receive firearm data from the buyer corresponding to a firearm to be purchased by the buyer. The server will transform a master list of all firearms available for sale, including the firearm being sold by the seller, into a filtered list of only the firearms that are available for purchase by the buyer, which omits some of the firearms from the master list, and which is based at least in part on firearm regulations associated with one or more legal jurisdictions associated with the location of the buyer, as determined by either the buyer account data or a current GPS location of the buyer. This list is displayed to the buyer for selection of the firearm(s) the buyer wishes to purchase.

In summary, it will be noted that the server is able to track, assess, and maintain seller and buyer accounts for online firearms transactions. The server is also able to determine whether each seller is permitted to sell certain firearms, to generate and update a master list of firearms available for sale, and to customize the display of the master list, as separate filtered lists that are modified for each prospective buyer to only include firearms for sale that can be legally purchased by each buyer based on the classifications of the parties and firearms involved and/or firearm restrictions of the legal jurisdictions corresponding to the addresses or current GPS locations associated with the buyer, the seller, and/or any FFL involved in the transaction.

Aspect Two (2) for monitoring, analyzing, and evaluating actual weapon and ammunition usage, say while in training, sport/competition, hunting, protection, combat, police work and/or the like.

Here, the present disclosure of the SWARMER system employs a variety of subsystems and associated methods to track weapon and ammunition usage. In various non-limiting embodiments, the SWARMER system would preferably track weapon usage in near realtime or realtime. In various non-limiting embodiments, the SWARMER system would preferably track a particular weapon's aiming location in near realtime or realtime. In various non-limiting embodiments, the SWARMER system would preferably employ a means for tracking the location and orientation of a particular weapon.

Here, for example, the SWARMER system could employ a sensor for tracking the orientation of the particular weapon. For instance, the SWARMER could employ a sensor such as a magnetometer. Since most weapons are constructed of conductive and ferrous metals, it can be a challenge to employ magnetometers. In various non-limiting embodiments, the SWARMER system would preferably employ and/or incorporate a DC magnetic-based apparatus and a means to detect—even in the presence of conductive and ferrous metals as well as stray electromagnetic fields—the three-dimensional location of metal instruments and weapons within an environment and use this information for training, guidance, targeting, aiming, and/or the like. In various non-limiting embodiments, the SWARMER system may also employ and/or incorporate an image-guiding procedure for, say, training locations, virtual gaming, sporting events, emergencies, combat, and/or the like.

3D Field Guidance

The medical industry has made several advancements in miniaturized sensors and methods to help reduce the effects of ferrous metals that are present in the environment. For example, U.S. Pat. No. 7,835,785 B2 to Scully et al. [Ascension Technology Corporation] which is hereby incorporated in its entirety by reference. Here, the Scully patented a so-called third generation system that employed a permeable shield that claims to help prevent metal objects from interfering with the fields generated above a patient in surgery. In addition to the ferrous metal issues, the third-generation DC magnetic tracking methods presented a new generation of non-fluxgate sensor technology. It helped to overcome critical issues, including: sensor noise induction from its transmitter, cable impedance, power-line induced noise interference, component mis-matching, and over-sensitivity to cable and cable conditioner bandwidth issues. In the prior art, these issues all produced critical error sources when magnetic technology was asked to operate with miniaturized sensors and unconventional cable geometries in hospital environments. The Scully patent also claims a low cost, disposable sensor ranging in size from 9 to 3 French equipped with sensors ranging in diameter from 1.8 mm down to 0.6 mm in width—while consistently providing accuracy of measurements in the sub millimeter/degree range.

For the purposes of categorization, AC magnetic technology and its many derivative implementations are defined as first-generation magnetic tracking. The technology first gained the interest of medical researchers because of its capability to track sensors without line-of sight restrictions, thus enabling trackable sensors to be inserted into the body without occlusion or data loss. Operationally, these systems read induced sensor voltages referenced to one or more magnetic fields and measure near-field magnetic field vectors. Typically one or more magnetic coils in a sensing assembly provide sufficient information to solve its position and two or three angular rotations relative to a dipole transmitter whose two or three coils are sequentially or simultaneously energized. Non-dipole transmitters can also be employed.

First-generation AC electromagnetic tracking is based on transmission and sensing of AC magnetic fields first patented in 1975 (Kuipers, U.S. Pat. Nos. 3,868,565 and 3,983,474) and 1977 (Raab, U.S. Pat. No. 4,054,881). The technology is acutely sensitive to measurement distortion from common metals, such as electrically conductive metals (e.g., 300-series stainless steel, copper, titanium, aluminum and carbon composites) as well as ferrous metals (e.g., iron, steel and certain nickel alloys). In the presence of these metals, AC field waveforms, which are constantly changing, produce circulatory (eddy) currents in nearby metals that generate secondary fields distorting field patterns. These spurious fields spawn additional sources of magnetic fields resulting in measurement errors in the sensor.

To address the restriction of tracking in regions free of conductive and ferromagnetic metals, a number of approaches have been patented to deal with the problem. Among these are: application of mapping and compensation techniques (Raab et al.), implementation of mathematically derived correction factors to measurements (Anderson, U.S. Pat. No. 6,774,624), compensation by measuring and adjusting phase shifts detection metal (Acker et al), shielding of distorters (Anderson—U.S. Pat. No. 6,636,757; Jascob, U.S. Pat. No. 6,636,757), signal processing of eddy current effects (Seiler, U.S. Pat. No. 6,836,745), sounding of warning signals when a distorter is detected (Kirsh, U.S. Pat. No. 6,553,326) etc. Despite the development of these and other AC distortion control strategies, AC systems still required, performing procedures within the confines of large sets of obtrusive coils, engaging in costly and tedious set-up/calibration procedures, and restricting the range and motion of physicians, instruments and equipment.

Representative AC magnetic patents applied to medical imaging include: U.S. Pat. No. 6,233,476 to Strommer et al. [Mediguide: "Medical Positioning System"]. It discloses a medical device employing an AC magnetic sensor for determining the position and orientation of a surgical probe relative to a reference frame in association with an imaging system. In the preferred embodiment, it claims to overcome the disturbing effects of metal objects by employing a system in which a plurality of electromagnetic fields are generated and sensed.

U.S. Pat. No. 6,690,963 ["System for Determining the Location and Orientation of an Invasive Medical Instrument"], issued to Ben-Haim of the Biosense Webster division of Johnson & Johnson is representative of many AC magnetic tracking variations and techniques to achieve 3D magnetic guidance of image-guided procedures.

U.S. Pat. No. 6,836,745 to Seiler [NDI "Method for Determining the Position of a Sensor Unit"] discloses a means of reducing metallic distortion from conductive metals in five degrees-of freedom AC magnetic tracking systems. It claims to correct these distortions by measuring the location of electrically conductive objects and entering this data into a computer program, which calculates the eddy currents and the resulting field distortions. These distortions are then defined in the coordinate system defined by the AC field transmitter and the interference field generated by the eddy currents is nulled. The patent claims that mathematical models are then used to form a correction to the error. In practice, a method that tries to calculate eddy currents as a "virtual source" will yield an overall improvement in reducing distortion but the error is unlikely to reach zero.

To address the metal sensitivity problem of AC magnetic trackers, second-generation technology, employing pulsed DC magnetic field generation and sensing, was first patented in 1989 (U.S. Pat. No. 4,849,692 to Blood) and 1990 (U.S. Pat. No. 4,945,305 to Blood). It provides six degrees-of-freedom tracking while overcoming critical conductive metal distortion deficiencies of first-generation AC magnetic technology. Using a fluxgate, it takes advantage of the steady state of pulsed DC waveforms to measure the field at an instant in time when eddy currents are not being generated in nearby metals. Accurate measurements may therefore be made in environments rich in conductive metals. DC is also capable of driving other conductive metal errors to zero by appropriate measurement rate reduction. In most AC based systems, the eddy current error can only be reduced slightly with decreased operating frequency.

Patented medical applications employing second-generation DC technology include:

Additional U.S. Pat. Nos. 6,626,832, 6,216,029 and 6,604,404 to Paltieli [UltraGuide] were reduced to practice in the UltraGuide 1000 image-guided system. It employed second-generation DC magnetic tracking technology to correlate the location of an ultrasound scanhead tracked with an 8-mm DC sensor and a long needle tracked at its proximal with a second 8-mm DC sensor. The combination allowed the physician to select a point and angle for needle insertion into the patient's body for visually-aided targeting purposes. Because the system was based on second-generation magnetic technology, miniaturized sensors were not available for insertion in the tip of the long needle. Instead a sensor was mounted on the proximal end, thus requiring a calibration procedure to calculate the tip of the needle referenced to the center of the sensor at its far end. Additionally, the system lacked a reliable means of determining whether flexure of the needle occurred during the procedure, since any misalignment of the tip of the needle versus its sensor location results in mis-targeting. Paltieli's U.S. Pat. No. 6,626,832 patent was developed as a means of detecting the bending of the metal instrument once inserted into the human body. At the time the system was introduced, only a single DC transmitter (not designed for imaging applications) was available. This made it difficult for early UltraGuide implementations, which mounted the transmitter in a standoff chassis, to overcome ferrous metal distortion and achieve high accuracy performance.

The application of third-generation magnetic technology will serve many purposes. Of primary interest is its capability of synchronizing an aiming location of a weapon and/or metal instrument with other factors, such as an environment, an actor/user (eg. the actor/user in possession of the weapon and/or metal instrument), other humans, animals, targets, buildings, terrain and/or the like; of providing 3D reference points superimposed on imaged parts; of mapping and locating mechanical and anatomical features; of aiming location and navigating tools to pre-identified locations, targets and/or the like; of providing instantaneous feedback; and of facilitating the delivery of alerts, remedies, and/or the like to a current situation, potential situation, historical event, and/or the like.

Exemplary but by no means inclusive procedures benefiting from third-generation tracking technology include: a persistent tracking of the aiming location of a weapon, Further, wherein the tracking can be relatively compared and assessed to historical data and statistics for the same actor/user, say with the weapon and/or instrument, say in a relative and/or a particular location assessment, circumstance assessment, time of day/night assessment, weather pattern assessment, health condition assessment, hydration assessment, resource availability assessment, human support availability assessment, resource limitation assessment, target proximity assessment, threat assessment, strength assessment, ammunition assessment, chemical threat assessment, nuclear threat assessment, drone support assessment, drone threat assessment, communication assessment, communication interception assessment, noise level assessment, interference noise assessment, body temperature assessment, hydration assessment, and/or the like.

Furthermore, wherein the tracking of the same actor/user with the weapon and/or instrument could include a relative comparison and/or assessment with other weapons, instruments, humans, situations, conditions, events, circumstances, times of day/night, weather patterns, health conditions, hydration assessment, resource assessments, human support assessments, resource limitation assessments, target proximity assessments, threat assessments, strength assessments, ammunition assessments, chemical threat assessments, nuclear threat assessments, drone support assessments, drone threat assessments, communication assessments, communication interception assessments, noise level assessments, interference noise assessments, body temperature assessments, hydration assessments, and/or the like.

The present disclosure improves upon the state of the art by providing a general-purpose means of accurately, reliably, effectively and robustly tracking the aiming location of weapon or instrument relative to other humans, animals, objects, terrain, targets and/or the like, within an environment. It accomplishes the purpose by merging recent advances in pulsed DC magnetic tracking technology with advanced imaging, computing technology and stealth communication techniques.

Image-guided and/or UI-guided weapon training, martial arts, gaming, sporting-events, law-enforcement, and/or combat can include trying to track a plurality of items, humans, weapons, instruments or equipment. Most weapons are made of metal which can severely distort and interfere electromagnetically with guidance measurements. Thus the application of multiple third-generation DC magnetic and other technologies to solve the problem. This includes the integration of multiple transmitters, sensors, and options, as well as the implementation of new electronics, algorithms and signal processing techniques.

The above Scully et al patent claims that multiple DC magnetic transmitters' options are provided in orthogonal, non-orthogonal and hybrid modes to maximize accuracy and unobtrusiveness as well as to minimize potential conductive metal and ferromagnetic distortion problems and for procedures requiring sub-millimeter accuracy over an extended range—a hybrid (DC magnetic/optical) transmitter is provided. In addition, Scully et al references electronics utilizing advanced digital technology and Kalman filtering to make available a range of performance, interface and data reporting options. Further, Scully et al. claims hardware that provides improved signal processing capabilities sufficiently powerful enough to overcome limitations of earlier generation DC magnetic tracking which required compensation for the Earth's magnetic field, significant filtering to reduce jitter in data, and the use of a large flux-gate magnetometer in each sensor assembly to sense transmitted field vectors. Furthermore, Scully et al, claims noise reduction software that provides a method to minimize potential jitter in data caused by the presence of stray magnetic fields, such as caused by power lines, motors, pumps, computer displays and power transformers. If the interfering noise source does not change its frequency, it can be automatically measured by the system, which adjusts its measurement rate to minimize noise effects.

A key aspect of image-guided and/or UI-Guided system, method and disclosure is the ability of the system to collect and register specific 3D points relative the aiming location of weapon in an environment. These images form a so-called "roadmap" of a path taking over time by the aiming location of the weapon, where in addition there are collected data points, such as events. These events can include pattern recognitions for such known, discerned, relatively perceived, and/or input items, events, circumstances, things and/or the like, as: standing, walking, running, jumping, sitting, crawling, rolling, tumbling, climbing, parachuting, flying, falling, leaning, sleeping, eating, drinking, coughing, cleaning, loading, unloading, dissembling, destroying, transporting, storing, flying, in-range of the enemy, in-view of the enemy, under enemy attack, taking-enemy-fire-nearby, taking-an-enemy-bullet, taking-an-enemy-blow/hit, engaged in a reconnaissance mission, stalking-an-enemy/target, viewing-an-enemy/target, taking-aim-in-general, taking-aim-at-enemy/target, firing-at-enemy/target, and/or the like.

The data collected over time generates pattern recognition and analysis per weapon, per actor/user of the weapon, per environment, per location, per circumstances and/or the like, where historical data and recognized patterns can be utilized to make training adjustments, improve safety, improve team efficiency, minimize injuries, help reduce causalities and/or the like. Further, data collected in realtime or near realtime can be transmitted for further analysis, including for realtime or near realtime guidance, aiming, collaboration, reconnaissance, enemy/target tracking/assessing/adjusting, and/or the like.

Here, the ability to relatively quickly and accurately track, not only each actor (e.g. soldier, police officer, and/or the like), is critical to relative safety and success, but the relative reliability of the data, say for the discerned aiming location of the weapon becomes critical and valuable.

Imaging software, such as, but not limited to, Cedara Software Corporation's Vivace (Mississauga, Canada; www.cedara.com)—a collection of 2D and 3D visualization software programs—is commercially available for use in image-guided systems for precise medical surgeries. It allows imaging-system developers to build a visual system in which structures can be viewed as volume renderings, segmented and clipped for identification of critical sites, re-formatted for multi-planar viewing, and isolated for detailed analysis.

Once this or similar software is integrated with the 3D field guidance device, an actor or third party, say a teacher, instructor, superior, commander, and/or the like, can use its outputs to identify the position and orientation of one or more reference points, often tagged as markers or the aiming location, on landmarks of, say a target, location, terrain, human, animal, building, vehicle, object, and/or the like. These markers coordinates are entered into an imaging database that may or may be made visible in the environment. For example, the markers could be registered, aligned, and/or made visible in or on a heads-up display in a vehicle, soldier helmet, head-mounted display/glasses, a display on the weapon, and/or the like. Further, the marker may be identified via laser projection, and/or imagery that is only visible with a particular descrambling or decoding scheme.

Registration in highly precise medical surgery environments is accomplished by a number of means, well known in the art. (See J. B. Antoine Maintz and Max A. Viergever, "A Survey of Medical Image Registration," Medical Image Analysis, (1998), Volume 2, Number 1, pp 1-37, Oxford University Press, Image Sciences Institute, Utrecht University Hospital, Utrecht; J. B. Antoine Maintz and Max A. Viergever, "An Overview of Medical Image Registration Methods," Imaging Science Department, Imaging Center Utrecht, 1996; J. West, J. Fitzpatrick, M. Wang, B. Dawant, C. Maurer, R. Kessler, and R. Maciunas, "Comparison and Evaluation of Retrospective Intermodality Image Registration Techniques," Proceedings of the SPIE Conference on Medical Imaging, Newport Beach, 1996; and C. R. Maurer, Jr. and J. M. Fitzpatrick, "A Review of Medical Image Registration," Interactive Image-Guided Neurosurgery, R. J. Maciunas, Ed., pp 17-44, American Association of Neurological Surgeons, Park Ridge, Ill. 1993.) Many registration algorithms, based on touching multiple fiducial points in image space (reference frame #1) and patient space (reference frame #2), are available for solving the registration problem, including the method described by C. Maurer, et al., "Registration of 3-D Images Using Weighted Geometrical Features," IEEE Transaction on Medical Imaging, Vol. 15, No. 6, December 1996, incorporated herein.

Some of the most effective techniques accomplish the purpose by directing the physician to place the tip of his/her instrument on "fiducials," i.e., anatomical landmarks or markers affixed to the patient. Herein, the disclosed system could request, require, and/or the like, that the actor/user of a particular weapon place the particular weapon in a particular location with a particular orientation to test and/or recalibrate the current coordinates, settings, and/or orientations. These data are then used in an algorithm, resident in the imaging software, to perform appropriate coordinate transformations and align image space to the actor/user's environment and/or weapon's space/direction, thus mapping the corresponding fiducials from one reference frame to another.

A properly constructed registration algorithm accounts for shifts, rotations and scaling of points form one frame to another. The algorithm provides for a tight registration between frames with minimal errors between scanned images and targets. From this point on, the weapon orientation is correlated to the image data, which may or may not include the actor/user of the weapon, other actors/users, the environment, the system known enemies/targets, system discerned enemies/targets, system relatively perceived enemies/targets, user-relatively perceived enemies/targets, and/or the like. The imaging software can now display the position of the weapon's aiming location relative to its corresponding position and orientation in the image and vice versa.

In training and in live combat, data, statistics, pattern assessments, analysis, and/or the like are tracked and provided on interactive displays, adjacent to the operational field or even displayed on a head-mounted display by actors in the field, say the actor with the particular weapon. Such displays allow the actors in the field to see collective effect and potential of a plurality of weapons, actors, and/or the like, in realtime or near realtime In this way, as a weapon's aiming location is moved, guided, oriented, adjusted and/or the like, toward a known, discerned or relatively perceived target, the actor/user (e.g. soldier, police person, hunter, sportsperson with the weapon) sees an image relative to the circumstances, say a night vision display, heat-map display, infrared display, a low-resolution display, a laser guide, an overlay, or even a high-resolution display, with full-color stereoscopic rendering of the environment and the trajectory to a target.

It is a first object of the present disclosure to provide a new and improved means and apparatus for 3D field guidance of weapons and instruments in image-guided training and targeting procedures.

The improvement comes from the use and integration of third-generation pulsed DC magnetic tracking technology that is highly adaptable and amenable to a wide range of training and targeting procedures. The disclosure provides for a general-purpose system that operates inside a weapon with significantly tracking improvements than prior art systems, all of which are compromised in one way or another by performance limitations of the technologies employed or by deficiencies caused by their limited tracking and implementation methods, especially when trying to track user and weapons in areas and during events, such as combat that may be partially or wholly hidden, blocked from views, by say, cameras, lasers, satellites, and/or the like.

Another object of the present disclosure is to provide a new and improved means and apparatus for collecting data for 3D field guidance of weapons and instruments, where prior art may compromise the location of the weapon, actor/user, and/or the like. The improvement comes from the ability to use and integrate the tracking technology that could store data locally in weapons (or nearby) in the field that can be tracked, collected, analyzed, and/or the like, without a persistent or tethered connection and/or a connection remotely located from the weapon. Where instead the data can be collected and stored inside a storage medium inside weapon or connected to the weapon. Further, where the data, statistics, and/or analysis can be transmitted when/as desired, say automatically, systematically, conditionally, wirelessly, and/or user-selectively, say, per a set of criteria or conditions that would preferably help maintain the near or wholly stealth condition of an operation. In addition, this locally collected and stored data could be partially and/or wholly employed locally by the actor/user of the weapon via an on-weapon processor with an alerting means, say with or without audio and/or without a visual display; and/or employed by other appropriate actors/users with approved access, permissions, roles, decoding schemes, suitable-proximity, role-clearance, and/or the like.

Another object is to provide a new means of reliably guiding weapons and/or instruments to targets within a training, hunting, sporting, city, building, combat zone/environment, and/or the like, without worrisome issues of requiring a persistence human observation for known weapon holding, positioning, loading, aiming, storing, and utilization concerns. Further, the ability for the disclosed system to relatively perceive and/or discern a situation that was previously unknown or unperceived as, say relatively alarming, concerning, dangerous, and/or the like, say per a particular location, event, timing, actor, weapon, and/or the like situation. Furthermore, where, say a particular method or combination of methods for holding, positioning, loading, aiming, storing, and/or utilizing a weapon or plurality of weapons/actors, is discovered to be relatively positive/negative, efficient/inefficient, effective/not, alarming/not, concerning/not, disconcerting/not, hazardous/not, dangerous/not, and/or the like, through persistent data collection, historical data, events, location data, pattern recognition assessment/analysis, and/or the like.

Another object of the present disclosure is to provide a new and improved means of tracking the distal, midsection or proximal weapon location and aiming locations of one or more weapons and/or instruments with one or more miniaturized sensors, the position and orientation of which is referenced to one or more transmitters emitting pulsed DC magnetic fields waveforms and preferably not affected by conductive or ferromagnetic metals in the weapon or environment. Such sensors would preferably be sufficiently small enough to be place on the outside and/or inserted into a cavity of the weapon or instrument. Further, where the mechanisms would preferably be hidden from view to avoid distractions, damage, and/or to avoid viewing from an outside observer.

Another object of the present disclosure is to use pulsed DC magnetic fields to instantly and precisely track the weapon location and aiming locations registered to one or more imaging modalities to provide an actor or instructor with data and images correctly aligned with the coordinate reference frame of the weapon, actor/user, environment, target, and/or the like.

Another object is to provide a weapon location, position, orientation, and aiming location determination system without placing artificial constraints on the relative position of the actor/user and/or the weapon.

Another object of the present disclosure is to track the collective location, orientation, status, and aiming location of a plurality of weapons, where, say a particular method or combination of methods for holding, positioning, loading, aiming, storing, and/or utilizing a weapon or plurality of weapons/actors, is discovered to be relatively positive/negative, efficient/inefficient, effective/not, alarming/not, concerning/not, disconcerting/not, hazardous/not, dangerous/not, and/or the like, through persistent data collection, historical data, events, location data, pattern recognition assessment/analysis, and/or the like.

For realtime or near realtime 3D field guidance implementation, it is also necessary to provide a system that is integrated with imaging software so that weapon/object, terrain/environment, buildings, and actor/user anatomical imagery can be referenced in the actor's/user's frame of reference and viewed in a clear and intuitive fashion and/or in an outside actor's/third-party's (e.g. the teacher, instructor, superior, commander, and/or the like) frame of reference and viewed in a clear and intuitive fashion.

It is yet another object of the present disclosure to help improve field data, safety, weapon training, and reduce issues of friendly-fire associated with the lack of known data, with tracking systems and 3D field guidance devices with miniaturized sensors capable of being inserted and interconnected in weapons.

Core Aspect Three (3) for monitoring, analyzing, evaluating, and scoring the reliability of data input/out.

In various non-limiting embodiments, the weapon's sensors, location, orientation, ammunition, target, health, and aiming location would be expressed in terms of the relative reliability of the data, data source, and/or verifications, where data that is assumed to be known with a high degree of certainty is "ascertained," while data that is unknown is referred to as "unknown." In various non-limiting embodiments, there would preferable be rules, logic, criteria, thresholds, and/or conditions where data input and/or output with the SWARMER system would become labeled more or less reliable along a continuum of data reliability labels from "unknown, relatively perceived, discerned, to ascertained." In various non-limiting embodiments, the data reliability labels could include actor and source input, where a second continuum has, say an "actor stated" value with the second continuum is reserved for actor and/or source labels. In various non-limiting embodiments, the data reliability labels could merge the actor and/or source inputs with the values the SWARMER values, where the actor and/or source labels/values may be discounted (e.g. see FIGS. 12*a-c*, 13) to generate a third continuum, say from "unknown, actor/user stated, relatively discerned/perceived, discerned, to ascertained." In various non-limiting embodiments, the data input/output with the SWARMER system would generate nodes with relationships between the data sources (e.g. nodes, sensors, weapons, targets, clients, actors, sources, environments, and/or the like) and any data associations, such as the source, time/data, data reliability label, data reliability label, factors, data reliability label, criteria, data reliability label sources/verifier/validators, and/or the like.

These and other aspects, objects and features of the present disclosure will become more fully apparent from the following description and appended claims, or may be learned by the practice of the disclosure as set forth hereinafter.

Various embodiments are described and illustrated in this specification to provide an overall understanding of the structure, function, operation, manufacture, and use of the disclosed compositions, systems, and methods. It is understood that the various embodiments described and illustrated in this specification are non-limiting and non-exhaustive. Thus, the present disclosure is not limited by the description of the various non-limiting and non-exhaustive embodiments disclosed in this specification. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. The various embodiments disclosed and described in this specification can comprise, consist of, or consist essentially of, or be characterized by the features and characteristics as variously described herein.

Any patent, publication, or other disclosure material identified herein is specifically incorporated herein by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "some embodiments" or the like, means that a particular feature or characteristic may be included "In an embodiment." Thus, use of the phrase "in various non-limiting embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. All such ranges are intended to be inherently described in this specification such that amending to expressly recite any such sub-ranges would comply with the applicable disclosure requirements.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Although an illustrative implementation of one or more embodiments is provided below, the disclosed systems and/or methods may be implemented using any number of techniques. This invention should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, generate means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

All U.S. Patents listed below and throughout are specifically incorporated herein by reference. Further, referenced throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "In an embodiment," "in another embodiment," and similar language throughout this specification may, but do not necessarily, refer to the same embodiment. Many modifications and variations will be apparent to the practitioner skilled in the art.

Referenced throughout this specification are the terms and/or phrases such as "for example," "for instance," "say," "the like," "etc.," or similar language which generally means that the language, description, and explanation utilized in association is merely to demonstrate an element, feature, item, list of items, purpose, way, means, method, and/or the like for what has been described in association, but depending on the usage and situation, it may not be meant to be exhaustive representation or demonstration, or meant to limit a particular invention to that particular precise formation. Referenced throughout this specification are also the terms and/or phrases such as "unit," "section," "part," "portion," "element," "component," "article," "delineation," "segment," or similar language which generally means that a described term and/or phrase in connection thereof constitutes a separate distinct "article," "feature," "structure," "characteristic," "trait," "delineation," "selection(s)," "composite(s)," "compilation," "segment," "partition," or similar of an embodiment of the present disclosure. In various non-limiting embodiments, terms such as "unit," "section," "part," "portion," "element," "component," "article," "delineation," "segment," "partition," or similar language may be interchangeable.

Referenced throughout this specification are also the terms and/or phrases such as "units," "sections," "portions," "elements," "components," "articles," "traits," "characteristics," "group(s)," "selection(s)," composite(s)," "compilation," "delineation," "segment," or similar language which generally means that a described term and/or phrase in connection and/or the combination thereof constitutes also a separate distinct "article," "feature," "structure," "characteristic," "trait," "delineation," "segment," or similar of an embodiment of the present disclosure.

According to Wikipedia (and others), data are values of qualitative or quantitative variables, belonging to a set of items. Data in computing (or data processing) are represented in a structure, often tabular (represented by rows and columns), a tree (a set of nodes with parent-children relationship) or a graph structure (a set of interconnected nodes). In various non-limiting embodiments, data are typically the results of measurements and can be visualized using graphs or images. In various non-limiting embodiments, data as an abstract concept can be viewed as the lowest level of abstraction from which information and then knowledge are derived.

In various non-limiting embodiments, data processing occurs by stages. In various non-limiting embodiments, a raw data (e.g. unprocessed data, refers to a collection of numbers, characters and/or the like, and is generally a relative term); where the raw data may be "processed" (and/or the like) in a data processing stage. In various non-limiting embodiments, the data processing stage, may process (and/or the like) the "raw data," in a first data stage into a "processed data." In various non-limiting embodiments, the "processed data" from the "first data stage" may be considered another "raw data" in a subsequent or a "second data stage." In various non-limiting embodiments, field data refers to raw data collected in an uncontrolled in situ environment.

In various non-limiting embodiments, an "experimental data" generally refers to data generated within the context of a scientific investigation by observation and recording. In various non-limiting embodiments, a perception or a relative perception describes an assessment, where the assessment may have been interrogated from a source, resource, actor, user, and/or the like. In various non-limiting embodiments, the perception or relative perception may be partially or wholly based upon experimental data. Reference throughout this specification to "interrogate," broadly refers to a process of evaluating data using analytical and logical reasoning to test and address a value, to determine whether or not it is correct. In various embodiments, a reference to "interrogate," may also refer to information or data extraction. For instance, an information extraction of website's content, data, database, data store, ontology, triple store, and/or the like.

In various non-limiting embodiments, the word data may refer to the plural of datum, neuter past participle of the Latin dare, "to give", hence "something given". In some discussions of problems in geometry, mathematics, engineering, and so on, the terms given and data are used interchangeably, in various non-limiting embodiments. In various non-limiting embodiments, data processing refers: data are numbers, words, images, etc., accepted as they stand.

In some publications, the terms data, information and knowledge are used for overlapping concepts. According to Akash Mitra (2011) article: "Classifying data for successful modeling," the main difference is in the level of abstraction being considered. According to Mitra and in various non-limiting embodiments, data is the lowest level of abstraction, information is the next level, and finally, knowledge is the highest level among all three. In various non-limiting embodiments, for data to become information, it must be interpreted and take on a meaning and/or value. An often cited example, states that the height of Mt. Everest is generally considered as "data", a book on Mt. Everest geological characteristics may be considered as "information", and a report containing practical information on the best way to reach Mt. Everest's peak may be considered as "knowledge".

According to P. Beynon-Davies (2002), in "Information Systems: An introduction to informatics in organisations" Basingstoke, UK: Palgrave Macmillan (ISBN 0-333-96390-3) describes information as a concept that bears a diversity of meanings, from everyday usage to technical settings.

Where the author states, "Generally speaking, the concept of information is closely related to notions of constraint, communication, control, data, form, instruction, knowledge, meaning, mental stimulus, pattern, perception, and representation." Beynon-Davies uses the concept of a sign to distinguish between data and information; data are symbols while information occurs when symbols are used to refer to something.

According to Sharon Daniel, in "The Database: An Aesthetics of Dignity," "It is people and computers who collect data and impose patterns on it. These patterns are seen as information which can be used to enhance knowledge. These patterns can be interpreted as truth, and are authorized as aesthetic and ethical criteria. Events that leave behind perceivable physical or virtual remains can be traced back through data. Marks are no longer considered data once the link between the mark and observation is broken."

Some aspects and embodiments of the present disclosure relate to systems and methods for automatically, systematically (e.g. via Artificial Intelligence Subsystem & Mgmt. (AIS 195) (195), conditionally, and/or via/per actor/user-prompt monitor, interrogate, parse, and/or analyze an at least one input/output, prompt, and/or collaboration unit (sometimes referred to collectively as the "PO/PC," the "IOPC" unit, or similar, or may occasionally be referred to simply as the "input," "output," "query," and/or "collaboration"). The SWARMER System and associated computer-implement methods may automatically, systematically (e.g. via AIS 195), conditionally, contingently, actor-prompted/selected, and/or user-prompted/selected, incorporate, employ, require, include, induce, invoke, and/or the like, a first prompt (sometimes a prompt), and/or a response (e.g. a reply, acceptance, suggestion, acknowledgement, reaction, score, input, output, query, correction, modification, deletion, selection, retort, rejection, challenge, counter, forwarding, avoidance, skip, a second prompt, and/or the like to the first prompt. In various non-limiting embodiments, the first prompt and a subsequent prompt/response are may be combined to generate a prompt pairing, and for example, may be referred to as a "prompt/response pairing," simply a "prompt/rejection," a "$1^{st}$ prompt/$2^{nd}$ prompt," and/or the like. In various non-limiting embodiments, the pairing is simply the "prompt."

Following, the prompt, the present disclosure may automatically, systematically (e.g. via AIS 195), conditionally, contingently, actor-selectively, and/or via/per actor/user-prompt interrogate, parse, and/or analyze each PO/PC unit, and/or the like to/for any ascertained, discerned, preferred, suited, relatively perceived, and/or the like, decoding deconstructing, deciphering, decoupling, delinking, detecting, decompiling, parsing, analyzing, decompressing, segmenting, separating, splitting, sorting, arranging, rearranging, assessing, interrogating, extracting, interpolating, calculating, structuring, ordering, sequencing, scoring, judging, ruling, ranking, and/or the like of the I/O/PC units. The parsing and analysis of the PO/PC would preferably incorporate steps for recognizing, determining, distinguishing, ascertaining, discerning, exposing, evaluating, assessing, determining, generating, establishing, challenging, interrogating, extracting, suggesting, predicting, valuing, scoring, measuring, assessing, incorporating, and/or the like, logical methods, links, relations, annotations, queries, calculations, labeling, interpretations, permutations, arrangements, aggregations, collections, combinations, compilations, segmentations, partition, delineations, and/or the like for an at least one structure, structural component, and/or structural relation, relationship, correlation, association, and/or the like.

In various non-limiting embodiments, the PO/PC parsing, analysis, interrogating, extracting, evaluating, assessing, determining, and/or the like, would preferably incorporate an artificial intelligent (e.g. via the AIS 195) data/value/statistical analysis, evaluation, assessment, and/or determination per I/O/PC per actor, per i/o and/or the like. In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt may temporally, partially, wholly, continuously, and/or the like, preform, implement, monitor, track, review, report, evaluate, assess, determine, and/or the like, an AI-SWOT analysis for strengths, weaknesses, opportunities, and threats. In various non-limiting embodiments, the AI-SWOT includes assessments and evaluations that generate an AI-SWOT result with additional PO/PC, data, analysis, relations, maps, graphs, scores and values, where the AI-SWOT result may be express via an AI-SWOT criteria, what is AI/AIS-Ascertainment, AI/AIS—Discernment, AI/AIS—Relative Perception, AI/AIS—Statement, AI/AIS—Prediction, AI/AIS—Assumption, AI/AIS—Goal, AI/AIS—Reliability, and/or the like.

In various non-limiting embodiments, the AI/AIS assessments and evaluations would incorporate what is ascertained, discerned, relatively perceived, predicted, and/or the like by the AI/AIS to be legal, illegal, potentially illegal, efficiency, proficiency, accountability, reliability, communications-skills, promptness, completeness, effectiveness, availability, reliability, competency, knowledge, experience, education, and/or the like.

In various non-limiting embodiments, the AI/AIS assessments and evaluations would incorporate what is ascertained, discerned, relatively perceived, predicted, and/or the like by the AI/AIS as partially and/or wholly active, passive, success, adequate, reasonable, suitable, measurable for/as./with: an actor, transaction, offer to sell, validation, verification, participation, contribution of content/validation/regulation, searches, research, development, and/or the like. In various non-limiting embodiments, the AI/AIS could partially and/or wholly perform each task, automatically, systematically, conditionally, continuously, actively, passively, per a criteria and/or per actor/user-prompt.

In various non-limiting embodiments, the AI/AIS could partially and/or wholly perform the task of an actor, participant, buyer, searcher, researcher, developer, reviewer, validator, verifier, and/or the like. In various non-limiting embodiments, the AI/AIS could partially and/or wholly perform the task of analyzing, assessing, and evaluating actor and participant data contributions, where the AI/AIS could interrogate, extract, parse, analyze, and/or evaluate available, suitable, and/or the like PO/PC for exiting AI/AIS-SWOT, searching for anomalies, data trends, patterns, crimes, criminal behaviors, potential issues, validation concerns, and/or participation/actor issues/concerns, circumvention, system gaming, challenges, and/or the like.

In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt continuously, preform, implement, monitor, track, review, report, evaluate, generate and provide profiles, elements, events, goals, sources, formats, translations, interpolations, transcriptions, conversations and/or the like. In various non-limiting embodiments, the AIS and its associated computer sub-systems and methods, could separate task and compare results automatically, systematically (e.g. via AIS 195), conditionally, contingently, via the actor-prompt, user-prompt and/or the like where scoring, ranking, displaying, sequencing, mapping, graphing, viewing, projecting, and/or the like, could also be generated. Further, where the MS evaluation and subsequent prompt/action, may include, incorporate a testing, qualifying, verifying, validation, interrogation, extraction, acknowledgement, challenge, prompt/reply, modification and/or the like, of a rule, logic, calculation, algorithm, formula/condition/identification, authentication, validation, verification, matrix, continuum, map, mapping, graph, rank, score, 3D object, node, 3D world, domain, semantic, ontology, etymology, dictionary, wild, content, data, bit, byte, source code, encryption key/code, security code, biometrics, bar code, 3D code, REID, identification, location-awareness/coordinates, element, attribute, format, style, stylesheet, set, matrix, segment, expression, formula, condition, rule, logic, operator, object, network, table, field, cell, range, hierarchy, tree, interval, label, node, edges, links, classification, partition, category, tag, metadata, relations, correlations, actor, profile, network, domain, AI (e.g. for/with AIS 195), and/or the like, of the I/O/PC.

In various non-limiting embodiments, the SWARMER System generates a list of firearms for sale on a centralized website. The SWARMER System incorporates the composition of the firearm and regulations per the firearm, to generate a map automatically, systematically (e.g. via Artificial Intelligence Subsystem & Mgmt. (AIS 195) (195), conditionally, and/or via/per actor/user-prompt, according to geography and legal regulations so that any actor, say the buyer can more easily identify regions where a particular firearm is legal and not legal to purchase and under what particular circumstances, rules, jurisdictions, regulations, terms, and/or the like.

In various non-limiting embodiments, the SWARMER System generates a list, graph, data statistics, metrics, map, and/or the like, regarding firearm transactions per trends, regulations, causalities, firearm wounds, firings, armed crimes, and/or like, per actor, seller, per FFL, per buyer, per actor profile, and/or the like. The actor profile may include and/or incorporate demographics, psychographics, behaviors, shopping history, usage history, participation history, violation history, criminal history, and/or the like. In various non-limiting embodiments, the SWARMER System also interrogates, parses, analyzes, assesses, and generates a list of data relations, correlations, links, graph, data statistics, metrics, map, and/or the like, regarding In various non-limiting embodiments, the disclosed system via the computer processor, associated subsystems (e.g. via AIS, ID-ACERS, Knowledge Base Mgmt., METER, TIMES, FINANCIALS, etc.) persistently monitor, analyze, interrogate, parse, analyze, evaluate, assess, determine, score, graph, map, link, process data, values, attributes, relations, links, and/or the like. In various non-limiting embodiments, the persistent monitoring, parsing, analysis, interrogating, extracting, evaluating, assessing, determining, scoring, graphing, mapping, linking, processing, and/or the like; generates values, scores, attributes, relations, links, and/or the like; where the values would preferably further ascertain and/or discern a known exception to, say a rule, event, condition, and/or the like. For example, the exception could be for a firearm purchase by a law enforcement officer, lab/test case, and/or the like, and/or where the SWARMER System generates a perceived trend, issue, prediction, exception, resolution, validation, pattern, assumption, presumption, prediction, assertion, test, request, suspicion, search, and/or the like, based in part, for what is "Ascertained, Discerned, or Relatively Perceived by the SWARMER System along with what is "Actor Stated" by a particular Actor, or "Predicted" (e.g. by the SWARMER System, AIS subsystem, a particular actor, a user, a third-party system and/or the like.

In various non-limiting embodiments, this collective parsing, analyzing, evaluating and/or persistent processing is sometimes abbreviated and referred to as "A/D/RP/AS/P." In various non-limiting embodiments, the SWARMER system (and/or it's subsystems, e.g. the ID-ACERS, a SWARMER Court System, the METER System) parse, analyze, and evaluate data, for example, to define data as to what is A/D/RP/AS/P is relatively likely to have caused what, what is A/D/RP/AS/P to constitute what, what is A/D/RP/AS/P to correlate to what, what is A/D/RP/AS/P to violate what, (e.g. and for not just what, but for each of the 5 W's, who, what, where, how, and why) and/or the like. In addition, to persistently test assumptions, sources, assertions, statements, and/or the like to attain an Ascertained (e.g. ascertained value for a weapon ID, weapon location, weapon-user-ID, weapon-user-target, weapon aiming location, and/or the like) when possible (e.g. when sufficiently verified, validated, authenticated and/or the like, by approved sources, entities, databases, and/or the like). The Ascertained Value, is followed by less reliable value, called a discerned value or a discernment, where additional data, testing, and/or the like is necessary. For example, where a particular discerned value for a weapon-user requires a validation to become/reach an Ascertainment Value, say by meeting or surpassing an Ascertainment Criteria/Threshold. However, even data items, sources, calculations, statistics, patterns, and/or the like assumed and/or presumed to be Ascertained, are still occasionally and/or periodically tested according to the Rules Module (128) and Timer Module, say when a correlated assumption, validation, source reliability, and/or the like is discovered to be flawed (e.g. a law or regulation change) and/or in error (e.g. faulty sensor reading).

In various non-limiting embodiments, the AIS and its associated computer processor-operated sub-systems, computer-implemented methods, functionality, capability, intelligence, and/or the like, may automatically, systematically, continuously, persistently, conditionally, and/or by/via actor-prompt/user prompt fulfill/review/support/judge/challenge/assume/predict a particular event, events, a particular role, roles, a particular entity or entities, a particular judge or judges, a particular juror or jurors.

In various non-limiting embodiments, the AIS and its associated functionality, capability, intelligence, and the like, may fulfill/review/support/judge/challenge/assume/predict a particular function, request, interrogation, extraction, assessment, evaluation, determination, and/or the like. In various non-limiting embodiments, the AIS and its associated functionality, capability, intelligence, and the like, may fulfill/review/support/judge/challenge/assume/predict a particular function, request, interrogation, extraction, assessment, evaluation, determination, and/or the like, say per actor, entity, role, project, time window, actor/user profile, source/resource/support, event, goal, competitor, challenger, decision, assessment, evaluation, determination, ascertainment, discernment, perception, assumptions, prediction, and/or the like.

In various non-limiting embodiments, the particular function and/or functions the AIS and its associated computer processor-operated sub-systems, computer-implemented methods provide, implement, perform, interrogate, parse, analyze, evaluate, assess, determine and/or the like, would preferably comprise a particular event or transaction manager, event, events, a particular role, roles, a particular entity or entities, a particular judge or judges, a particular juror or jurors.

In various non-limiting embodiments, the presented disclosure further analyzes, interrogates, evaluates, assesses, determines, generates, predicts, assumes, and/or the like, a list of ascertained, discerned, assessed, predicted, and/or relatively perceived values for the I/O/PC overall, a collection, segment, permutation, combination, aggregation of I/O/PC and/or I/O/PC components, each component independently, and/or the like, from a list comprising, accountability, reliability, communications-skills, completeness, effectiveness, availability, type-overs (re-typing an entry), hesitations/delays/promptness, efficiency, proficiency, judgment, competency, knowledge, experience, education, industry-respectability, peer-respectability, local-respectability, and/or the like.

A description of an I/O/PC is received, and an evaluation, assessment, determination, and/or prediction of the current value, future value and/or like is persistently monitors, tracked, parsed, analyzed, interrogated, scored, assessed, evaluated, and/or the like; including per actor, seller, buyer, FFL, reviser, reviewer, participant, buyer, owner, assignee, assignor, examiner, judge, juror, attorney, government employee, regulator, and/or the like. In various non-limiting embodiments, a parsed/segmented/analyzed evaluation/determination/assessment per data relation, touch point, potential participant, and/or the like, includes human participants who are employed and tracked to try and game the SWARMER System. In various non-limiting embodiments, the gaming of the SWARMER System, as in trying to buy a firearm illegally and/or the like, may also be attempted, performed, tracked, assessed, and/or the like by the AIS system.

In various non-limiting embodiments, the assessment of the relative ease/difficulty, and/or the like of the SWARMER System, as in trying to buy a firearm illegally and/or the like, may also include and incorporate data for a segment of actors, that includes and/or incorporates a FFL, sellers, buyers, society, experts, industry experts, NRA-members, attorneys, politicians, government employees, teachers, students, litigators, judges, jury members, and the like, where the SWARMER System would track and score each participant and segment of actors regarding his/her/its relative ability to game the SWARMER System, where, when, how, why, for what, and/or the like. In various non-limiting embodiments, the assessment of the relative ease/difficulty, and/or the like of the SWARMER System, as in trying to buy a firearm illegally could include and corporate data for a segment of known criminals, parolees, and/or the like, where the SWARMER System would track and score the relative successfulness per participant, but block any actual transactions. In various non-limiting embodiments, the assessment of the relative ease/difficulty, and/or the like of the SWARMER System, as in trying to buy a firearm illegally could include and corporate data for a non-human/actor/machine contribution, computers, software, time, resources, raw materials, money, credit, and/or other actor/user-specified data/statistics, and/or the like.

In various non-limiting embodiments, the assessment of the present disclosure would preferably include and/or incorporate an evaluation, determination, prediction, scoring, continuous assessments, and/or the like, per/for firearm sought, when, where, how, why, methods of communication, information provides, validations attempted with who, where, when, how, why, and where, when, successful according, to who, when, where, how, why, and/or the like. In various non-limiting embodiments, the assessment of the present disclosure would preferably include financial data, payment methods offered, accepted, validated, where, when, by who, how, why, and accepted, by who, where, when, why, how, and/or the like. In various non-limiting embodiments, the assessment of the present disclosure would preferably include and/or incorporate an evaluation, determination, prediction, scoring, continuous assessments, and/or the like, per/for firearm sought/posted, when, where, how, why, methods of communication, information provides, validations, the time from the initial offer for sale, to the initial offer to purchase, and each moment and event throughout the transaction(s), firearms approved, denied, not available (e.g. not in inventory), and/or the like.

In various non-limiting embodiments, the assessment of the present disclosure would preferably include and/or incorporate an evaluation, determination, prediction, scoring, continuous assessments, and/or the like, per/for firearm sought/posted for predictions, trends, and/or the like, in legal and illegal sales per actor, per regulation, per region of the country, per window of time, and/or the like. In various non-limiting embodiments, the assessment of the present disclosure would preferably include and/or incorporate an evaluation, determination, prediction, scoring, continuous assessments, and/or the like, per/for firearm sought/posted for monitoring inputs (including re-typing, delays, incorrect inputs, and/or the like), outputs, query, prompt, relations, and/or the like, as ascertained, discerned, relatively perceived, predicted, and/or the like, per present day, day over day, month over month, year over year, project over project, participant over participant, cost over cost, buyer over buyer, seller over seller, FFL over FFL, regulation over regulation, crime rate over crime rate, death rate over death rate, gunshot wound over gunshot wound, application over application, case over case, trial over trial, appeal over appeal, license over license, and/or the like, and/or some combination, collection, variation, permutation, segmentation, and/or the like of these. In various non-limiting embodiments, the assessment of the present disclosure would preferably include and/or incorporate an evaluation, determination, prediction, scoring, continuous assessments, and/or the like, per/for firearm sought/posted for monitoring inputs (including re-typing, delays, incorrect inputs, and/or the like), outputs, query, prompt, relations, and/or the like for ascertaining, discerning, relatively perceiving, predicting, and/or the like, a firearm approval versus disapproval rate relatively compared to the same list per present day per location, actor/participant, actor/participant segment, day over day, month over month, year over year, project over project, participant over participant, cost over cost, buyer over buyer, seller over seller, FFL over FFL, regulation over regulation, crime rate over crime rate, death rate over death rate, gunshot wound over gunshot wound, application over application, case over case, trial over trial, appeal over appeal, license over license, and/or the like, and/or some combination, collection, variation, permutation, segmentation, and/or the like of these.

In various non-limiting embodiments, the PO/PC assessment of the present disclosure would preferably include and/or incorporate an at least one item from the list comprising content, data, bit, byte, source code, encryption key/code, security code, biometrics, bar code, 3D code, RFID, identification, authentication, validation, verification, GPS location, location-awareness/coordinates, element, attribute, format, style, style-sheet, set, matrix, segment, expression, formula, condition, rule, logic, operator, object, network, table, field, cell, range, hierarchy, tree, interval, label, node, edges, links, classification, partition, and/or the like; wherein the I/O/PC assessment further prompts a generation of an ascertainment, discernment, relative perception, predictions, and/or the like, for/from a specific value, list, statistic, continuum, rank, score, graph, map, 3D object/node, 3D world/domain, and/or the like. Further, where in the specific value would preferably include, and/or incorporate generating a list, the data analysis/assessment/value list comprising federal firearm/gun regulations, state firearm/gun regulations, local firearm/gun regulations, each tracked change over time, incident involving a firearm/gun, who, where, why, when, how, and/or the like, according to who, when, where, why, how, and/or the like, where the SWARMER System may incorporate a bias per actor/participant, and/or the like. In various non-limiting embodiments, the I/O/PC assessment of the present disclosure would preferably include and/or incorporate an ability for data consumers to filter and display data per a list of segmentation rules weighted towards a particular bias and/or per a particular profile, say of the average gun owner in a particular region versus, say the average gun control lobbyist within the same region.

Referenced throughout this specification is the term "automatically," which generally shall mean "a system and/or process produced by a machine" (e.g. a computer via a processor) and generally implies as being "automatically preformed" by the SWARMER System. In various non-limiting embodiments, the term "automatically" can also apply to a sub-system of the SWARMER System, method, step, module, engine or the like associated, connected to, and/or controlled by the SWARMER System; in addition, "automatically" can apply to a particular sub-system, method, step, module, engine or the like associated, connected to, and/or controlled by the SWARMER System, and/or the like, unless part of an explanation, definition (e.g. here), stated otherwise, and/or the like. In various non-limiting embodiments, what is "automatic" may be performed and/or relative to a particular sub-system, a particular method, a particular step, a group of systems/methods, a list of steps, and/or the like, and/or some combination, aggregation, variation, permutation, segmentation, and/or the like of these. In various non-limiting embodiments, what is "automatic" may be relative and/or performed by a third-party system, sub-system, method, step, and/or the like.

Referenced throughout this specification is the term "systematically," which generally shall mean "a system/process carried out using step-by-step procedures (a method) and/or constituting a system" and generally implies as being "systematically preformed" by the disclosed system; continuing, an embodiment of a sub-system of the disclosed system, method, step, module, engine or the like associated, connected to, and/or controlled by the disclosed system; additionally, a particular sub-system, method, step, module, engine or the like associated, connected to, and/or controlled by the disclosed system, and/or the like, unless part of an explanation, definition (e.g. here), stated otherwise, and/or the like. In some embodiment, what is "systematic" may be performed and/or relative to a particular sub-system, a particular method, a particular step, a group of systems/methods, a list of steps, and/or the like, and/or some combination, aggregation, variation, permutation, segmentation, and/or the like of these.

Referenced throughout this specification is the term "conditionally," which generally shall mean "a system/process imposing, depending on, or including a condition for a step (a method), and/or a part of a system" and generally implies as being "conditionally preformed" by the disclosed system; continuing, an embodiment of a sub-system of the disclosed system, method, step, module, engine or the like associated, connected to, and/or controlled by the disclosed system; additionally, a particular sub-system, method, step, module, engine or the like associated, connected to, and/or controlled by the disclosed system, and/or the like, unless part of an explanation, definition (e.g. here), stated otherwise, and/or the like. In some embodiment, what is "conditional" may be performed and/or relative to a particular sub-system, a particular method, a particular step, a group of systems/methods, a list of steps, and/or the like, and/or some combination, aggregation, variation, permutation, segmentation, and/or the like of these.

Referenced throughout this specification is the phrase "user-prompted/selected," which generally shall mean "a system and/or process relating to and/or involving a selection, choice, and/or decision by a user." Referenced throughout this specification is the phrase "actor-prompted/selected," which generally shall mean "a system and/or process relating to and/or involving a selection, choice, and/or decision by an actor." Referenced throughout this specification is the phrase "actor/user-prompted/selected," which generally shall mean "a system and/or process relating to and/or involving a selection, choice, prompt, delay, skip, and/or decision by the actor and/or the user." In various non-limiting embodiments, what is "actor/user-prompted/selected" or "user-selectively" implemented may be relative and/or performed by a particular user, a particular segment of users, a particular group of users, a particular person, a particular group of people, a particular company, a particular entity, a particular organization, a particular government, a particular society, a segment of users, and/or the like.

Referenced throughout this specification is the phrase "Ontology," which generally shall mean a "formal model of classes of resources in a given domain the properties of those resources, and constrains on the relationships among them, allowing for structured information, machine inferencing, and rich user querying. For instance, the SWARMER system would preferably generate an Ontology for weapons, where there could a plurality and/or variety of subdomain Ontologies (e.g. sales/transactions, manufacturers/models, sport/competitions, training/accuracy, police-related, military-related, war/battle-related, injuries/deaths, crimes, etc.). In addition, the SWARMER system can extract from, compare, evaluate, merge, overlay, test, and/or the like, other Ontologies. For instance the Ontology for the US Department of Justice or Bureau of Alcohol, Tobacco, Firearms and Explosives. Generally speaking a Resource Description Framework (RDF) with an RDF Schema (RDFS) adds layers of expressivity to simple RDF that allows for the creation such ontologies. Web Ontology Language (OWL) adds further levels of detail that allow for additional data modeling, inferencing, and querying. A Simple Knowledge Organization System (SKOS) is a simpler subset of a Web Ontology Language (OWL) for encoding existing knowledge organization systems (controlled vocabularies) and their semantic relationships.

Referenced throughout this specification are embodiments, systems, methods, scenarios, incidents, examples, instances, and/or the like, with the term "known," as in the phrases: "known to be," "known for," "known as," "known to have," "known," and/or the like, where generally "known" shall mean "apprehended with certainty," and generally implies as "apprehended with certainty" by the SWARMER System; continuing, an embodiment of the SWARMER System sub-system, method, step, module, engine or the like associated, connected to, and/or controlled by the SWARMER System; additionally, a particular sub-system, method, step, module, engine or the like associated, connected to, and/or controlled by the SWARMER System, and/or the like, unless part of an explanation, definition (e.g. here), stated otherwise, and/or the like. In some embodiment, what is "known" may be relative to a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are embodiments, systems, methods, scenarios, incidents, examples, instances, and/or the like, with the term "ascertain," as in the phrases: "ascertained," "ascertainment," "ascertaining," "as ascertained," "ascertained as," and/or the like, where generally "ascertained" shall mean "to determine, establish, or make certain, exact, precise," and generally implies as "to find out or learn with certainty" by the SWARMER System; continuing, an embodiment of the SWARMER System sub-system, method, step, module, engine or the like associated, connected to, and/or controlled by the SWARMER System; additionally, a particular sub-system, method, step, module, engine or the like associated, connected to, and/or controlled by the SWARMER System, and/or the like, unless part of an explanation, definition (e.g. here), stated otherwise, and/or the like. In some embodiment, what is "ascertained" may be relative to a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are also embodiments, systems, methods, scenarios, incidents, examples, instances, and/or the like, with the term "discerned," as in the phrases: "discerned to be," "discerned for," "discerned as," "discerned to have," "discerned," and/or the like, where generally "discerned" shall mean "to detect, recognize, and/or identify," and generally implies "to detect, recognize, and/or identify" by the SWARMER System; continuing, an embodiment of a sub-system of the SWARMER System, method, step, module, engine or the like associated, connected to, and/or controlled by the SWARMER System; additionally, a particular sub-system, method, step, module, engine or the like associated, connected to, and/or controlled by the SWARMER System, and/or the like. In most embodiments, what is "discerned" may be relative to what is discerned by the SWARMER System, but In various non-limiting embodiments it could include or be discerned by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like of these.

Referenced throughout this specification are also embodiments, systems, methods, scenarios, incidents, examples, instances, and/or the like, with the term "perceived," as in the phrases: "relatively perceived," "relatively perceived to be," "relatively perceived for," "relatively perceived as," "relatively perceived to have," "perceived relative," "perceived relatively," "perceived as relative," "perceived to relatively," "perceived as relatively," and/or the like, where generally "perceived" shall mean "to attain awareness and/or understanding" and generally "relatively" shall mean "in relation, comparison, and/or proportion to something else," and generally implies "to attain an awareness and/or understanding to something in relation, comparison, and/or proportion to something else." Typically, these phrases (e.g. relatively perceived) reference a "relatively perceived result and/or data" by the SWARMER System; continuing, an embodiment of a sub-system of the SWARMER System, method, step, module, engine or the like associated, connected to, and/or controlled by the SWARMER System; additionally, a particular sub-system, method, step, module, engine or the like associated, connected to, and/or controlled by the SWARMER System, and/or the like. In various non-limiting embodiments, what is "relatively perceived" may be relative to the SWARMER System's perception and/or a particular method's perception(s), but In various non-limiting embodiments, "perceptions" may include or be as "relatively perceived" by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like, of these.

In various non-limiting embodiments, the disclosed system preferably attempts to apprehend, interrogate, obtain, receive, collect, track, monitor, meter, analyze, verify, validate, produce, generate, score, rank, display, distribute, and/or the like, data that are, say the most reliable. In various non-limiting embodiments, the disclosed system may attempt to ascertain whether a particular data, a particular data point and/or the like, are/is "known to be," "discerned to be" and/or "relatively perceived to be," say either accurate, reliable, current, appropriate, suitable/acceptable/proper structure/schema, suitable/acceptable/proper format, suitable/acceptable/proper programming language, suitable/acceptable/proper syntax, suitable/acceptable/proper classification, suitable/acceptable/proper indexing, suitable/acceptable/proper mapping, suitable/acceptable/proper perspective, suitable/acceptable/proper semantics, suitable/acceptable/proper triple/statement, suitable/acceptable/proper IP-Triple/Statement, suitable/acceptable/proper protocol, suitable/acceptable/proper header, suitable/acceptable/proper sequence, error-free, bug-free, virus-free, suitable/acceptable/proper secure, suitable/acceptable/proper private, suitable/acceptable/proper validation, suitable/acceptable/proper verification, within-a-particular fitness/criteria, within-a-particular threshold, within-a-particular range, of a particular value, within-a-particular-terms-of-use, within-a-particular-terms-of-participation, and/or the like. In various non-limiting embodiments, the disclosed system would preferably ascertain whether each particular data, data sets, data points, metadata and any relationship between or among these data, and/or the like, are/is "known to be," say, for example, accurate. For example, a person's date of birth (DOB) could be received as "known to be accurate" and/or ascertained by the SWARMER System to be "accurate," but perhaps also "known to be" not delivered in "proper syntax."

In various non-limiting embodiments, the disclosed system would preferably ascertain whether code, data, values, information, semantic relationships, RDF triple assignments, RDF statements, knowledge and/or the like assignments for each particular data, data set, data point, metadata, and any relationship between or among these data, and/or the like, are/is "known to be," say, for example, accurate. For example, a specific user's/actor's country of citizenship could be received as "known to be accurate" and/or ascertained by the SWARMER system to be "accurate," but perhaps also "known to create" questions in other existing data, relationships, and/or the like. For instance, the "ascertained" value for citizenship could be for the country of Canada, where there was an earlier assumption he/she was a US citizen, where additional analysis (and/or machine generated validations of sources, resources, and/or the like) could correct the error (e.g. in the RDF relationships triple store database), or reveal that the specific user/member actually has dual citizenship for both Canada and the US.

In various non-limiting embodiments, ascertaining what particular data points are "known to be," say reliable, would preferably include ascertaining what is "known" about the particular data in terms of, say a context, meaning, semantics, what is the subject, what its purpose, what is the semantic statement (e.g. per RDF triple rules), what is suitable/acceptable/proper classification, terminology, indexing, subject, verb tense, predicate, triple formation, triple statement, overall content purpose/statement, what is end the goal, what is the value/range of outcomes/output that are suitable/acceptable/proper, and/or the like for the content (e.g. obtain a patent, determine inventorship, determine inventorship overlap, and/or the like.)

In various non-limiting embodiments, ascertaining what particular data points are "known to be," say reliable, would preferably also include ascertaining what is "known" about the particular data in terms of, say the context, what is the subject, what its purpose, what is the semantic statement (e.g. per RDF triple rules), what is suitable/acceptable/proper form/format/syntax/semantics/triple/IP-triple/statement/mapping/classification/Indexing/protocol/language/function per input (e.g. string, numeric, integer, text, character, variable, operator, equation, table, pixel, jpeg, mpeg, way, algorithm, statistic, source code, path, and/or the like) what is the purpose/statement, what is end the goal, what is the value/range of outcomes/output that are suitable/acceptable/proper, and/or the like.

In various non-limiting embodiments, ascertaining what particular data points are "known" would preferably include ascertaining what is "known" about the particular data in terms of, say one or more attributes, strings, integers, code, rule, rule, flows, rule flow-groups, timers, calendars, Booleans, Operators, conditional elements, pattern elements, pattern bindings, paths, maps, atlas, graphic, constraints, unifications, expressions, lists, maps, abbreviated combined relation conditions, abbreviated combined relation conditions with patterns, compounds, precedencies, positional arguments, conditional elements, advanced conditional elements, collections, aggregations, permutations, collections, accumulations, multi-patterns, multi-function accumulates, forward/backward chaining, Rete algorithms (its predecessors, derivatives, extensions, and similar), Leap (its predecessors, derivatives, extensions, and similar), inline custom code, ontologies, libraries, syntax, schema, taxonomies, other rules (e.g. RIF/SWRL) queries (e.g. SPARQL), and the like; and where a rule's consequences may modify a rule and/or data. Further, where each rule, data point, and/or collection of data has the A/D/RP/S/P and/or the like ID-ACERS scoring from the ID-ACERS. In addition, where the ID-ACERS scoring is relative to a particular person, subject, domain, universe, segment, and/or the like. For example, the relative reliability or accuracy of a particular semantic statement is relative to the resource that provided it, say for, who, when, where, why, and how. Further, where there is a collection of resources and sources that relatively support the specific semantic statement (or value, assertion, data, stats, etc.). In addition, where there is a relative collection of resources and sources that challenge the specific semantic statement (or value, assertion, data, stats, etc.). (Also see depiction of SWARMER data evaluation verses Source/Actor data evaluations in FIG. 13, where the SWARMER can discount, say the accuracy, reliability of a validation, statement, value, and/or the like provided and/or supported by a particular source or collection of sources). In various non-limiting embodiments, ascertaining what particular data points are "known to be," say reliable, would preferably include ascertaining what is "known" about the particular data in terms of, say where the particular data came from, sourced produced, where was each element, data point, relationship, analysis, score, rank, validation, verification, location, database, company, country, entity, processor, processes, and/or the like, along the path from birth until now, and/or the like. In some embodiment, ascertaining what particular metadata, data, data sets, data points, metadata and any relationship between or among these data are "known to be," say reliable, would preferably include ascertaining what is "known" about the particular data in terms of, say how the particular data was generated, discovered, sourced, resourced, produced, performed, calculated, generated, discerned, validated, verified, what systems/methods/steps/conditions/rules/logic were/are associated, and/or the like.

In various non-limiting embodiments, ascertaining what particular data points are "known to be," say reliable, would preferably include ascertaining what is "known" about the particular data in terms of, say when the particular data was generated, discovered, sourced, resourced, produced, performed, calculated, when systems/methods/steps/conditions/rules/logic were/are associated, and/or the like. In some embodiment, ascertaining when the particular data was generated, discovered, sourced, resourced, produced, performed, calculated, when systems/methods/steps/conditions/rules/logic were/are associated, and/or the like, may include metadata, data, data sets, data points, metadata and any relationship between or among these data, as to when each correlation was made/attached, along with who produced, sent, analyzed, verified, apprehended, interrogated, obtained, received, collected, tracked, monitored, metered, analyzed, verified, validated, produced, generated, scored, ranked, displayed, distributed, and/or the like, including data relationships, associated, correlations, meta-data, and/or the like.

In various non-limiting embodiments, the disclosed system would preferably include any errors/failures "known" now, previously, anticipated, projected, predicted, disclosed, and/or the like; who is "known" to have caused the error/failure, when, how, why, attempted remedies/revisions Known to have also failed, remedies/revisions Known to suitably/acceptably/properly resolve/correct and/or the like, an error, and/or the like.

In various non-limiting embodiments, the "known" above could be similarly performed for "discerned" where appropriate and where the disclosed system discerns data, values, sets, points, steps, results, relationships, and/or the like from the available data, values, sets, points, steps, results, relationships, and/or the like In various non-limiting embodiments, the "known" data is preferred to "discerned" data. In various non-limiting embodiments, the "known" data is preferred, compared, associated, correlated, and/or the like, to the "discerned" data, where the "discerning" by the SWARMER System may include "known" data and/or not. In various non-limiting embodiments, the SWARMER System would preferably "discern" each metadata, data, value, set, point, step, result, relationship, and/or the like, for say, reliability, prior to attempting to discern, say the accuracy and/or the like, of the particular data or data point, and/or vice versa. In various non-limiting embodiments, there may be a "known" certainty, fact, statement, and/or the like, criteria/fitness, where the SWARMER System may not perform the discernment.

In various non-limiting embodiments, the "known" and "discerned" above could be similarly performed for "relatively perceived" where appropriate and where the disclosed system relatively perceives data, values, sets, points, steps, results, relationships, and/or the like, from the available metadata, data, values, sets, points, steps, results, relationships, and/or the like. In various non-limiting embodiments, the "known" data is preferred to "discerned" data, and the "discerned" data is preferred to the "relatively perceived" data. In various non-limiting embodiments, the "known" data is preferred, compared, associated, correlated, and/or the like, to the "discerned" data, where the "discerning" by the SWARMER System may include "known" data and/or not. In various non-limiting embodiments, the SWARMER System would preferably "discern" each metadata, data, value, set, point, step, result, relationship, and/or the like, for say, reliability, prior to attempting to discern, say the accuracy, and/or the like, of the particular data or data point, and/or vice versa. In various non-limiting embodiments, there may be a "known" certainty, fact, statement, and/or the like criteria/fitness, where the SWARMER System may not perform the discernment.

In various non-limiting embodiments, the input comprises a value, step, expression, variable, schema, component, number, string, element, data/content, source, and/or the like, for a particular system input, analysis, method, step, and/or the like. In embodiments, examples, and/or instances, where the disclosed system may not be able to interrogate, obtain, receive, collect, track, monitor, meter, analyze, produce, generate, score, rank, display, distribute, and/or the like, the disclosed system would preferably discern a particular metadata, data, data set, data point, value, input, relationship, and/or the like, based on a historical data relationship, correlation, association, and/or the like, where analysis would generate a degree of certainty along a continuum of, say zero certainty to say 99.9999% certainty. In various non-limiting embodiments, the degree of certainty along a continuum could be expressed and/or referred to as the relatively perceived metadata, data, data set, data point, value, input, a perception, and/or the like.

In various non-limiting embodiments, the degree of certainty along a continuum could be expressed and/or referred to as the relatively perceived metadata, data, data set, data point, value, input, a perception, and/or the like. In various non-limiting embodiments, the degree of certainty along a continuum (e.g. the relatively perceived data) would preferably be based upon a set of predetermined rules per a Terms of Use (TOU) and/or a particular Terms of Participation (TOP) (e.g. for purchasing a firearm in-general, in a particular location, and/or the like). In various non-limiting embodiments, the degree of certainty along the continuum could include a plurality of predetermined rules, rules per a Terms of Use (TOU), a particular Terms of Participation (TOP), conditions, contingencies, thresholds, Boolean Operators,] and/or the like.

In various non-limiting embodiments, the SWARMER System along with its MS, ID-ACERS, and/or the like, will perform multiple analysis operations to process sets of data from the SWARMER System storage to generate, modify, augment, supplement, compliment, link and/or the like, existing data, data links, data trees, data analysis, metadata, and/or the like, describing the related data and their relationships to other data points, relations, trends, and/or the like.

In various non-limiting embodiments, the SWARMER System along with its MS, ID-ACERS, and/or the like, consists of multiple independent agents that each uses a different algorithm/methodology to interrogate, verify, ascertain, discern, relatively perceive, extract, link, map, graph, subgraph, tag, classify, and/or the like the transaction data, government data, regulations, crime data, injury data, data relationships, related data, relationships/links/trends, and/or the like. In various non-limiting embodiments, the SWARMER System along with its MS, MS, ID-ACERS, and/or the like, will use analytic methods such as; Term clustering, latent semantic indexing, naïve Bayesian, decision trees, decision rules, regression modeling, perceptron method, Rocchio Method, neural networks, example-based methods, support vector machine, classifier committees, boosting, and/or the like In various non-limiting embodiments, the first user input may comprises and/or contains a plurality of inputs from the list of scored criteria/fitness/threshold relatively compared against the scored criteria/fitness/threshold list score comprising a relative metric/continuum, scale, subgraph, graph, map, 3D object, and/or the like, for what is quantifiable, qualifiable, hyperbolic, and/or the like. In various non-limiting embodiments, the inputs (e.g. the first and second input) may comprise and/or contain a plurality of inputs. In various non-limiting embodiments, the lack of a "known" or "know to be" metadata, data, data set, data point, value, and/or the like, the disclosed system generally attempts to discern a value, where a discerned value may include an associated criteria fitness (e.g. range, threshold, and/or the like).

Referenced throughout this specification are also embodiments, systems, methods, scenarios, incidents, examples, instances, and/or the like, with the term "actualized," where generally "actualized" shall mean "to make actual" and generally "actual" shall mean "existing in act and not merely potentially; existing in fact or reality, and/or not false or apparent." Typically the "actualized" term references an "actualized result and/or data" that is generally made/produced and sent to, provided to, interrogated, received at, and/or the like, the SWARMER System, an embodiment of a sub-system of the SWARMER System, method, step, module, engine or the like associated, connected to, and/or controlled by the SWARMER System; a particular sub-system, method, step, module, engine or the like associated, connected to, and/or controlled by the SWARMER System, and/or the like. In most embodiments, what is "actualized" may include what is "actualized" by a particular user, a particular segment of users, a particular group of users, a particular person, a particular group of people, a particular company, a particular entity, a particular organization, a particular government, a particular society, a third party system/method, a group of systems/methods, a list of steps, and/or the like, and/or some combination, aggregation, variation, permutation, segmentation, and/or the like, of these, but in some embodiments, "actualized" may include or be as "actualized" by the SWARMER System's production and/or method's processes.

Following a tragedy such as the Newtown (Conn.) school massacre (on Dec. 14, 2012), analysis generates a profile of the shooter to try and determine any patterns in behavior and/or the like that may lead to a motive, cause, and/or methods of prevention. In various non-limiting embodiments, the disclosed system via the computer processor, associated subsystems (e.g. via AIS, ID-ACERS, Knowledge Base Mgmt., METER, TIMES, FINANCIALS, etc.) persistently monitor, analyze, interrogate, parse, analyze, evaluate, assess, determine, score, graph, map, link, process data, values, attributes, relations, links, and/or the like, such tragedies to incorporate any data patterns. In various non-limiting embodiments, the persistent monitoring, parsing, analysis, interrogating, extracting, evaluating, assessing, determining, scoring, graphing, mapping, linking, processing, and/or the like; generates values, scores, attributes, relations, links, and/or the like; where the values would preferably further ascertain and/or discern a known exception to, say a rule, event, condition, and/or the like, for predicting, and helping prevent a future tragedies/events. For example, the SWARMER System could alert a gun seller that a particular potential online buyer displays patterns that have been ascertained, discerned, relatively perceived and/or the like as dishonest, discrepancies, erratic, contradictory (e.g. to earlier inputs, per his/her location, and/or the like), previously denied, previously denied elsewhere, and/or the like.

In various non-limiting embodiments, the SWARMER System could display what particular information/data generated the ascertained, discerned, and/or relatively perceived concern, issue, event, and/or the like. In various non-limiting embodiments, the SWARMER System could offer the seller a method to re-question/validate the information in questions, and/or the like; and continually monitor, analyze, interrogate, parse, analyze the information for other discrepancies, erratic patterns, contradictions, and/or the like, ascertained, discerned, and/or relatively perceived by the SWARMER System in real-time, near-real-time, over-time, and/or the like. For example, additional data or data analysis may reveal a situation that was not apparent previously and notify/alert the appropriate parties/actors/participants. Further, the additional data or data analysis may increase a discerned and/or relatively perceived value, score, evaluation, and/or the like and notify/alert the appropriate parties/actors/participants. The values, scores, evaluations, and/or the like could include and/or incorporate what is in particular changed regarding the A/D/RP/AS/P values, scores, evaluations, and what caused what, what is A/D/RP/AS/P to constitute what, what is A/D/RP/AS/P to violate what, (e.g. for each of the 5 W's, who, what, where, how, and why) and/or the like.

In various non-limiting embodiments, an actor would preferably log onto the SWARMER System 105 (e.g. via an application or Internet browser with a website and URL), register as a new user, agree to the terms of use (sometimes referred to as the "TOU") and the privacy policies. In various non-limiting embodiments, the actor selling a firearm selects the proper Terms Of Participation (or sometimes referred to as the "TOP Terms" or "TOP"), for his/her situation/location, and/or the like, which may require a plurality of conditions, qualifications, requirements, regulations, and/or the like. Further, he/she may also add additional requirements, verifications, validations, regulations, delays, and/or the like, as he/she feels necessary, to allow other actors to participant on his/her exchange list. The TOPs for each seller require other actors (e.g. buyers, other sellers, FFLs, and/or the like) to acknowledge and accept the TOP before a particular actor/participant 80 may participate on that particular portion of the overall exchange. For example, a firearm offered for sale by a particular seller may only allow participants from anywhere to view his/her inventory, but only participants from a particular region/area to make an offer to purchase, request a background check, and/or the like.

In various non-limiting embodiments, the TOP may include definitions and delineations for such terms as to what constitutes and what delineates and/or generates "an offer sell," "an offer to purchase," "an satisfactory background check," "an satisfactory waiting period," "confidential information," "private information," "public information," and/or the like. Depending on a particular person's participation, he/she may have a variety of different TOPs and/or different TOPs at different stages of a particular transaction, where each new or modified term in the TOP would generally require each relevant Participant's (80) acceptance.

Referenced throughout this specification are also embodiments, systems, methods, and/or the like, for artificial intelligence (AI) via the (AIS 195). Implementing, determining, and providing an artificial intelligent system (operational via a computer processor) and (computer-processor-based) method is described in U.S. Pat. No. 8,229,944, Latzina, et al, (which is hereby incorporated by reference in its entirety for all purposes) which can be implemented in the present disclosure.

Implementing, verifying, and facilitating an online transaction of a firearm, system (operational via a computer processor) and (computer-processor-based) method is described in U.S. Pat. No. 8,095,427 B1, Buxton (which is hereby incorporated by reference in its entirety for all purposes) which can be implemented in the present disclosure.

Implementing, and facilitating a computer and communication network for selling a firearm, system (operational via a computer processor) and (computer-processor-based) method is described in U.S. Pat. Application No. 20030130911 A1 Wong (which is hereby incorporated by reference in its entirety for all purposes) which can be implemented in the present disclosure.

Implementing, collecting, and managing a firearm transaction list and logs, system (operational via a computer processor) and (computer-processor-based) method is described in U.S. Pat. Application No. 200 Campaign/Mission 42060 A1 Boutin et al (which is hereby incorporated by reference in its entirety for all purposes) which can be implemented in the present disclosure.

Implementing, determining, and providing a source reliability/trust-level system (operational via a computer processor) and (computer-processor-based) method for data/content is described in U.S. Pat. No. 7,886,334 B1, Walsh, et al, (which is hereby specifically incorporated herein by reference in its entirety for all purposes) which can be implemented in the present disclosure.

Implementing, determining, and providing an assessment/evaluation system (operational via a computer processor) and (computer-processor-based) method is described in U.S.

Pat. No. 7,346,518 B1, Frank, et al (which is hereby specifically incorporated herein by reference in its entirety for all purposes) which can be implemented in the present disclosure.

Implementing and replicating data in non-relational databases (e.g. Federal Government, State Government, Local Municipalities, Sellers, FFLs, Buyers, actors, and/or the like) system (operational via a computer processor) and (computer-processor-based) method is described in U.S. Pat. Application No. 20070208719 A1, Tran, (which is reference in its entirety for all purposes) which can be implemented in the present disclosure.

Implementing, determining, and providing a scoring, scoring system, ranking, and/or the like, system (operational via a computer processor) and (computer-processor-based) method is described in U.S. Pat. No. 7,308,413 B1, Tota, et al, (which is hereby specifically incorporated herein by reference in its entirety for all purposes) which can be implemented in the present disclosure.

Implementing, determining, and providing an ownership, ownership relationship, value and/or the like, system (operational via a computer processor) and (computer-processor-based) method is described in U.S. Pat. No. 8,386,999 B2, Skriletz, (which is hereby specifically incorporated herein by reference in its entirety for all purposes) which can be implemented in the present disclosure.

Implementing, determining, and providing an electronic document/content/email parsing system (operational via a computer processor) and (computer-processor-based) method is described in U.S. Pat. No. 7,308,413 B1, Tota, et al, (which is hereby specifically incorporated herein by reference in its entirety for all purposes) which can be implemented in the present disclosure.

Implementing, determining, and providing an electronic document (and similar) online filing system (operational via a computer processor) and (computer-processor-based) method is described in U.S. Pat. No. 7,798,417 B2, Snyder, et al, (which is hereby specifically incorporated herein by reference in its entirety for all purposes) which can be implemented in the present disclosure.

Implementing, determining, and providing RFID data interpretation and tracking system (operational via a computer processor) and (computer-processor-based) method is described in U.S. Pat. No. 8,686,861 B2, Chung, et al, (which is hereby specifically incorporated herein by reference in its entirety for all purposes) which can be implemented in the present disclosure.

Implementing, determining, and providing a data/content/ information tagging and correlation system (operational via a computer processor) and (computer-processor-based) method is described in U.S. Pat. No. 7,798,417 B2, Snyder, et al, (which is hereby specifically incorporated herein by reference in its entirety for all purposes) which can be implemented in the present disclosure.

Implementing, determining, and providing an assessment/ evaluation of who, what where, when, and/or how (5 W's) system (operational via a computer processor) and (computer-processor-based) method is described in U.S. Pat. No. 8,095,529 B2, Diamond, et al, (which is hereby specifically incorporated herein by reference in its entirety for all purposes) which can be implemented in the present disclosure.

Implementing, determining, and providing data, source, resource, support, and/or the like authentication system (operational via a computer processor) and (computer-processor-based) method is described in U.S. Pat. No. 8,145, 639 B2, Williams, (which is hereby specifically incorporated herein by reference in its entirety for all purposes) which can be implemented in the present disclosure.

Implementing, determining, and providing a relative bias among parties, actors, users, and/or the like, system (operational via a computer processor) and (computer-processor-based) method is described in U.S. Pat. No. 8,145,639 B2, Williams, (which is hereby specifically incorporated herein by reference in its entirety for all purposes) which can be implemented in the present disclosure.

Implementing, determining, and providing a relative input (e.g. scale, slider, map, continuum, grid, value, and/or the like) system (operational via a computer processor) and (computer-processor-based) method is described in U.S. Pat. No. 8,145,639 B2, Williams, (which is hereby specifically incorporated herein by reference in its entirety for all purposes) which can be implemented in the present disclosure.

Implementing, determining, and providing an OWL-2 data exchange, parsing, analysis, semantics, and relational environment, system (operational via a computer processor) and (computer-processor-based) method is described in U.S. Pat. No. 7,606,785, Shirriff (which is hereby specifically incorporated herein by reference in its entirety for all purposes) which can be implemented in the present disclosure.

Implementing, determining, and providing a portal and doors for the semantic wed and grid system (operational via a computer processor) and (computer-processor-based) method is described in U.S. Pat. No. 7,792,836, Taswell (which is hereby specifically incorporated herein by reference in its entirety for all purposes) which can be implemented in the present disclosure.

Implementing, determining, providing, and interacting with selective accelerometer data and/or the like, system (operational via a computer processor) and (computer-processor-based) method is described in U.S. Pat. Application No. 2014/0035842 A1, Bakshi et al; (which is hereby specifically incorporated herein by reference in its entirety for all purposes) which can be implemented in the present disclosure.

Implementing, determining, and providing a natural language processing and converting to machine readable code (e.g. speech to text) are described in U.S. Pat. No. 7,143,036, Weise; U.S. Pat. No. 4,947,438 Paeseler; U.S. Pat. No. 6,029,123, Suda (which are hereby incorporated by reference, each its entirety for all purposes) which can be implemented in the present disclosure. Implementing, determining, and providing a natural language processing in a "noisy" environment and converting to machine readable code (e.g. speech to text) is described in U.S. Pat. No. 8,391,614, Yiftach, et al, (which is hereby specifically incorporated herein by reference in its entirety for all purposes) which can be implemented in the present disclosure.

Implementing, determining, and providing a set of environmental characteristics and boundaries is described in U.S. Pat. Application No. 2014/0089375, Poornachandran, et al., (which is hereby specifically incorporated herein by reference in its entirety for all purposes) which can be implemented in the present disclosure.

Implementing, determining, and providing a meta-tag system (operational via a computer processor) and (computer-processor-based) method (including relational links, annotations, mapping, evaluation, and/or the like) are described in U.S. Pat. No. 8,380,659 B2; U.S. Pat. No. 8,392,416 B2 Duffield; (which are hereby incorporated by reference, each its entirety for all purposes) which can be implemented in the present disclosure.

Implementing, determining, and providing a data/content I/O tracking and monitoring system (operational via a computer processor) and (computer-processor-based) method are described in U.S. Pat. No. 8,392,962 B2, Grason, et al; U.S. Pat. No. 8,265,976 Fitterer, et al; (which are hereby incorporated by reference, each its entirety for all purposes) which can be implemented in the present disclosure.

Implementing, determining, and providing an agent/bot/spider/web-crawler and/or the like, system (operational via a computer processor) and (computer-processor-based) method are described in U.S. Pat. No. 8,095,529 B2, Diamond, et al; U.S. Pat. No. 8,285,656 Chang, et al; (which are hereby incorporated by reference, each its entirety for all purposes) which can be implemented in the present disclosure.

Implementing, evaluating, assessing, determining, and providing a data/content exchange and collaboration platform and/or the like, system (operational via a computer processor) and (computer-processor-based) method are described in U.S. Pat. No. 7,798,417 B2, Snyder, et al; U.S. Pat. Application No. 2012/0265701 A1, Thomas; (which are hereby incorporated by reference, each its entirety for all purposes) which can be implemented in the present disclosure.

Implementing, providing, and securing a data/content encryption, proprietary/privacy protection, securing, and shielding are described in U.S. Pat. Application No. 2012/0265701 A1, Thomas; U.S. Pat. No. 7,798,417 B2 Snyder, et al; U.S. Pat. No. 8,386,999 B2, Skriletz (which are hereby incorporated by reference, each its entirety for all purposes) which can be implemented in the present disclosure.

Implementing and providing a system and methods for retrofitting and new weapons with biometric sensors for multiple users is described in U.S. Pat. Application No. 2011/0056108 A1, Cord, et al. (which is hereby specifically incorporated herein by reference in its entirety for all purposes) which can be implemented in the present disclosure.

Implementing and providing a content evaluation system (operational via a computer processor) and (computer-processor-based) method are described in U.S. Pat. No. 8,095,529 B2, Diamond, et al; U.S. Pat. No. 7,886,334 B1, Walsh, et al; (which are hereby specifically incorporated herein by reference in each its entirety for all purposes) which can be implemented in the present disclosure.

Implementing, determining, and providing a knowledge base management system (operational via a computer processor) and (computer-processor-based) method are described in U.S. Pat. No. 8,145,639 B2, Williams; U.S. Pat. No. 8,229,944 Latzina, et al; U.S. Pat. No. 7,886,334 B1, Walsh, et al; (which are hereby specifically incorporated herein by reference in each its entirety for all purposes) which can be implemented in the present disclosure.

Implementing, determining, and providing a social collaboration system (operational via a computer processor) and (computer-processor-based) method for interacting, collaborating, sharing, communicating, scoring, status-tracking, and/or are described in U.S. Pat. No. 8,392,962 B2, Grason, et al; U.S. Pat. No. 7,308,413 B1, Tota, et al; U.S. Pat. No. 7,886,334 B1, Walsh, et al; (which are hereby specifically incorporated herein by reference in each its entirety for all purposes) which can be implemented in the present disclosure.

Implementing, determining, and providing a collective value/result/score/view/opinion, (e.g. SWARMER/IDACERS A/D/RP/AS/P collective analysis/values/results, option list collective analysis/values/results), and/or the like from a variety of participants system (operational via a computer processor) and (computer-processor-based) method are described in U.S. Pat. No. 8,135,655 B2, Oaten, et al, U.S. Pat. No. 7,890,539 B2, U.S. Pat. No. 8,145,639 B2, Williams, (which are hereby specifically incorporated herein by reference in each its entirety for all purposes) which can be implemented in the present disclosure.

Implementing, assessing and evaluating, assessing, determining, data for semantics system (operational via a computer processor) and (computer-processor-based) method are described in U.S. Pat. Application No. 20120047149, Zhou, et al; U.S. Pat. No. 7,886,334 B1 Walsh, et al; U.S. Pat. Application No. 20070208719 A1, Tran; U.S. Pat. No. 8,095,529 B2, et al; U.S. Pat. Application No. 20090024385 A1, Hirsch; U.S. Pat. No. 8,392,416 B2 Duffield, et al; U.S. Pat. No. 8,145,639, Williams; U.S. Pat. No. 8,229,944 Latzina et al; (which are hereby specifically incorporated herein by reference in each its entirety for all purposes) which can be implemented in the present disclosure.

Implementing, parsing, analyzing, and evaluating, assessing, determining, data, content, queries, text, inputs, and/or the like, system (operational via a computer processor) and (computer-processor-based) method are described in U.S. Pat. No. 8,095,529 B2, Diamond, et al; U.S. Pat. Application No. 20070208719 A1, Tran; U.S. Pat. Application No. 20090024385 A1, Hirsch; U.S. Pat. No. 8,145,639 Williams; U.S. Pat. No. 20120047149, Zhou, et al; (which are hereby specifically incorporated herein by reference in each its entirety for all purposes) which can be implemented in the present disclosure.

Implementing, determining, and providing DC magnetic-based position and orientation monitoring system (operational via a computer processor) and (computer-processor-based) method are described in U.S. Pat. No. 7,835,785 B2, Scully, et al.; and U.S. Pat. Application No. 2014/0032155 A1, Broadband Discovery Systems, Inc. (which are hereby specifically incorporated herein by reference in each its entirety for all purposes) which can be implemented in the present disclosure.

Implementing, providing, and tracking, an interactive glove with sensors system (operational via a computer processor) and (computer-processor-based) method is described in U.S. Pat. Application No. 2012/0002698 A1, Merkle et al.; U.S. Pat. Application No. US20100231505 A1, Iwata; U.S. Pat. No. 6,622,575 B1, Nagata; (which are hereby specifically incorporated herein by reference in each its entirety for all purposes) which can be implemented in the present disclosure.

Implementing, providing, and tracking an electronic scoring system (operational via a computer processor) and (computer-processor-based) method for Weapon usage is described in U.S. Pat. No. 8,021,281 B2, Forsell et al.; and U.S. Pat. No. 6,257,893 B1, Trabut; (which are hereby specifically incorporated herein by reference in each its entirety for all purposes) which can be implemented in the present disclosure.

Implementing, providing, and tracking an interface between an object such as a Firearm and an Alarm or monitoring system (operational via a computer processor) and (computer-processor-based) method is described in U.S. Pat. No. 8,653,974 B2, Crook; and U.S. Reissue Pat. No. RE44,786 E, Hudson; (which are hereby specifically incorporated herein by reference in each its entirety for all purposes) which can be implemented in the present disclosure.

Implementing, providing, and tracking a target and/or object system (operational via a computer processor) and (computer-processor-based) method is described in U.S. Pat. No. 8,188,905 B2, Gallivan; U.S. Pat. Application No. 2014/0085055 A1, Petari USA, Inc.; U.S. Pat. No. 7,239,976

B2, Coleman, et al.; and U.S. Pat. Application No. 2013/0206896 A1, Dicander, (which are hereby specifically incorporated herein by reference in each its entirety for all purposes) which can be implemented in the present disclosure.

Implementing, determining, and providing a classifying orientation of body of a mammal (operational via a computer processor) and (computer-processor-based) method is described in U.S. Pat. Application No. 2014/0032124 A1, Umer, et al., (which is hereby specifically incorporated herein by reference in its entirety for all purposes) which can be implemented in the present disclosure.

Implementing, determining, and providing a behavior recognition system (operational via a computer processor) and (computer-processor-based) method is described in U.S. Pat. No. 8,407,625 B2, Cohen, et al., (which is hereby specifically incorporated herein by reference in its entirety for all purposes) which can be implemented in the present disclosure.

Implementing, determining, providing, and tracking a weapon health and maintenance system (operational via a computer processor) and (computer-processor-based) method is described in U.S. Pat. Application No. 292931828 A1, August, et al., (which is hereby specifically incorporated herein by reference in its entirety for all purposes) which can be implemented in the present disclosure.

FIGURES

Figure 3:
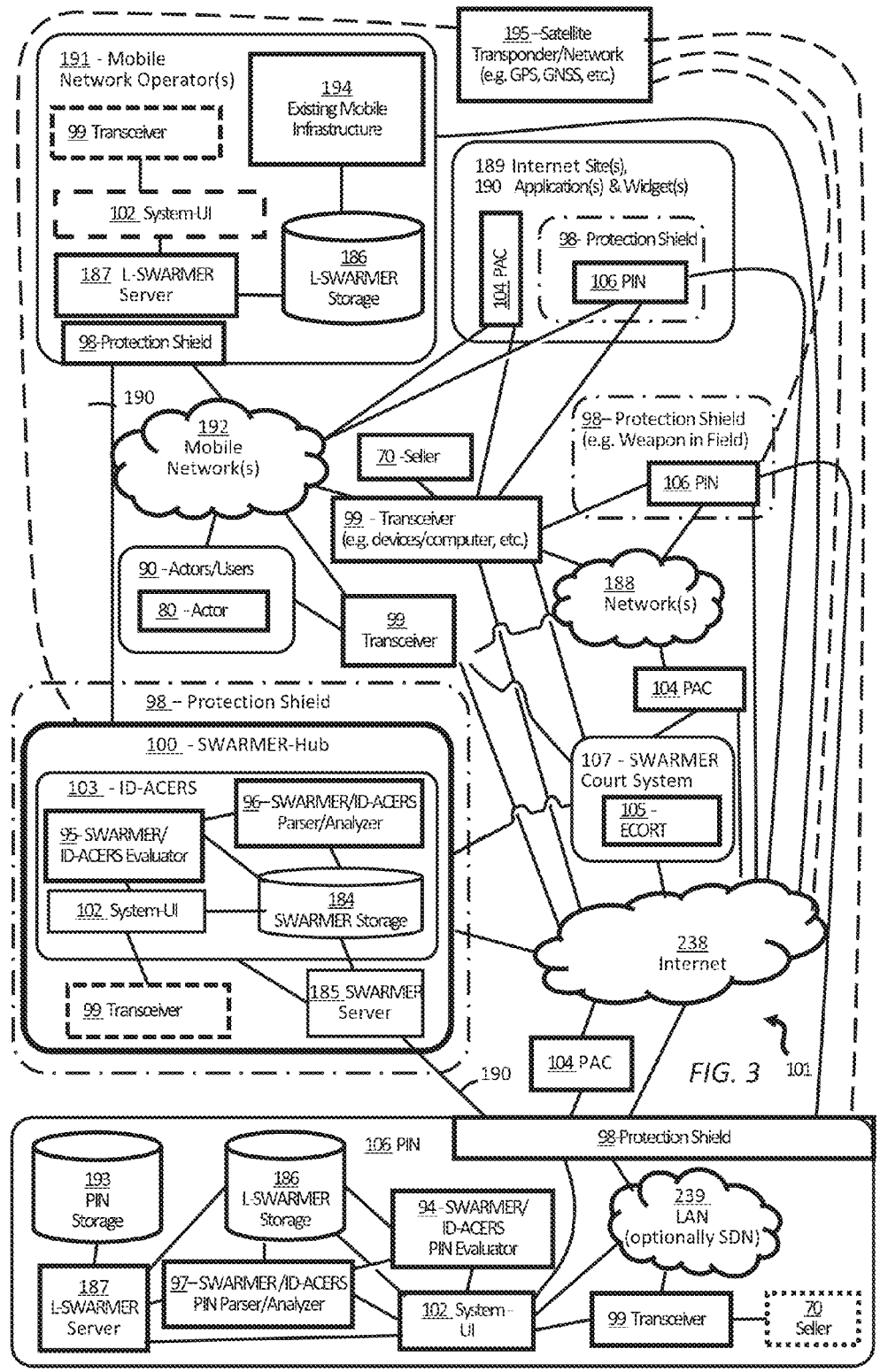
FIG. 3 is a block diagram depicting an embodiment of the groupings of sub-systems of the "System Operating Environment" 101 and the communications and/or dialogs among them.

With reference now to the Figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

The present disclosure is generally directed to embodiments for facilitating online transactions of firearms that involve any combination of buyers, sellers, or FFLs. Various online interfaces are provided for creating accounts for firearm sellers, buyers, and FFLs, and for gathering and displaying data related to firearms transactions.

To facilitate interpretation and understanding of the Specification and Claims, various terms will now be defined.

The term "online firearms transactions" should be broadly interpreted as any firearms transaction involving the use of the Internet or any other computer network in which a firearm is sold, purchased, or shipped for the corresponding sale or purchase. This can include, for example, using the Internet or other computer network for acquiring, transmitting, generating, and/or displaying data related to a firearm, the buyer, the seller, the FFL, or any other entity involved in the transaction, such as manufacturers, transporters, or government agencies.

The term "firearm" can include any combination and configuration of guns (such as, but not limited to pistols and rifles) or other types of weapons capable of firing projectiles. Firearms, as defined herein, is also defined in some instances as the actual ammunition or other projectiles that are fired from a gun or other weapon.

In some embodiments, other weapons besides firearms can also be purchased or sold through the same mechanisms described throughout this disclosure in specific reference to firearms. Accordingly, it will be appreciated that although the application is written with specific reference to transactions involving firearms, the present disclosure also extends to systems and methods for facilitating the sale and purchase of other weapons that are not typically considered firearms, such as but not limited to knives, swords, other bladed weaponry, archery equipment, spears, martial arts weapons, chemical sprays and other chemical weapons, fire generating weapons, acoustic weapons, as well as any other type of weapons. Therefore, all embodiments referring to firearms, as described herein, should also be interpreted as applying to other weapons, in addition to or excluding firearms. Even more particularly, the present disclosure also extends to embodiments in which the term firearm is replaced with the term weapon irrespective of instances in which the term weapon is interpreted as excluding the specific firearms that are identified above.

The term "firearm data" can include any combination of data related to a firearm, such as a condition of the firearm (e.g. an age, a quality, a usability, a size, a type, a color, or a history), a restriction related to the firearm (e.g. a legal restriction or a munitions capacity or use restriction), as well as firearm transaction data, such as but not limited to historical or standardized pricing information, offer for sale information, offer to purchase information, counter-offer information, or transaction ticket data.

The term "transaction ticket data" is used herein to reference transaction data that is related to a ticket, a receipt, a coupon, a certificate, or other document that is generated in response to an offer to sell a firearm or an offer to purchase a firearm, and that provides identification information specifically related to the firearm and the transaction. The transaction ticket data sometimes includes financial data corresponding to an amount due or an amount paid for the firearm or services related to the firearm. In some instances, the transaction ticket data can also include information identifying any combination of sellers, buyers, or FFLs.

The transaction ticket data can be transmitted, displayed, and/or reproduced in a single consolidated format (such as a physical or electronic ticket), or transmitted, displayed, and reproduced as separate and individual objects.

It will be appreciated that while the transaction parties, namely, the sellers, buyers, and FFLs, can include human operators, each of the sellers, buyers, and FFLs, as defined herein, can also include computing systems utilized by the human operators to complete the online transaction. In every claimed embodiment, a computing system is involved in performing at least some of the recited claim limitations that are critical to the functionality of the claimed disclosure. In some instances, the seller includes a computing system, in other instances the buyer includes a computing system, and in yet other instances, the FFL includes a computing system. In some embodiments, all or at least a plurality of the seller, buyer, and FFL include corresponding computing systems.

The term "computing system" should be interpreted as at least one computing device (e.g. a server, desktop computer, a laptop computer, a computer kiosk, a cell phone, a PDA (e.g. an IPhone), or any other computing device) that has a specialized hardware processor or hardware processing component configured to execute computer-executable instructions stored on one or more computer storage media. The term "storage media" should be interpreted as one or more storage media that are either integrated into the computing system or that are detachable from the computing system (such as a disk). Storage media can also include any combination of volatile and non-volatile memory comprising optical, magnetic, or other storage media located in one or more different locations local or remote to the computing system. Accordingly, it will be appreciated that the term computing system can also apply to an array of system devices, servers, or other computer networks in which various components are distributed throughout various systems or devices.

In most embodiments, each of the computing systems also include one or more input and output devices as well as suitable communication interfaces for communicating through a network, such as the Internet, with at least one other computing system. The input devices include, but are not limited to keyboards, touch pads, microphones, mouse devices, and any other input devices. The output devices include display screens, speakers, printers, and other output devices.

Turning To the Figures

FIG. 1a is an exemplary diagram of an Operating Environment 101 in which concepts consistent with the principles of the disclosed system and methods may be implemented. In various non-limiting embodiments, the Operating Environment 101 may include multiple clients 99a connected to a server 185a via a network 188. Network 188 may include a local area network (LAN), a wide area network (WAN), a telephone network, such as the Public Switched Telephone Network (PSTN), an intranet, the Internet, or a combination of networks. Three clients 99a and one server 185a have been illustrated as connected to network 188 for simplicity. In practice, there may be more clients and/or servers. Also, in some instances, a client may perform one or more functions of a server and a server may perform one or more functions of a client.

In various non-limiting embodiments, a client 99a may include a device such as a wireless telephone, a personal computer, a personal digital assistant (PDA), a laptop, or another type of computation or communication device, a thread or process running on one of these devices, and/or an object executable by one of these devices. Server 185a may include a server device that processes, searches, and/or maintains documents and images in a manner consistent with the principles of this disclosure. Clients 99a and server 185a may connect to network 188 via wired, wireless, or optical connections.

In various non-limiting embodiments, the Server 185a may include a search engine that receives search queries from clients 99a and returns links to results relevant to the search queries to clients 99a. Server 185a may also return campaigns, interrogations, advertisements and/or the like, with the search query results. For example, third parties may contract with the operator of server 185a to display their advertisements when their advertisements are relevant to a search query.

Exemplary Client/Server Architecture

Figure 1B:
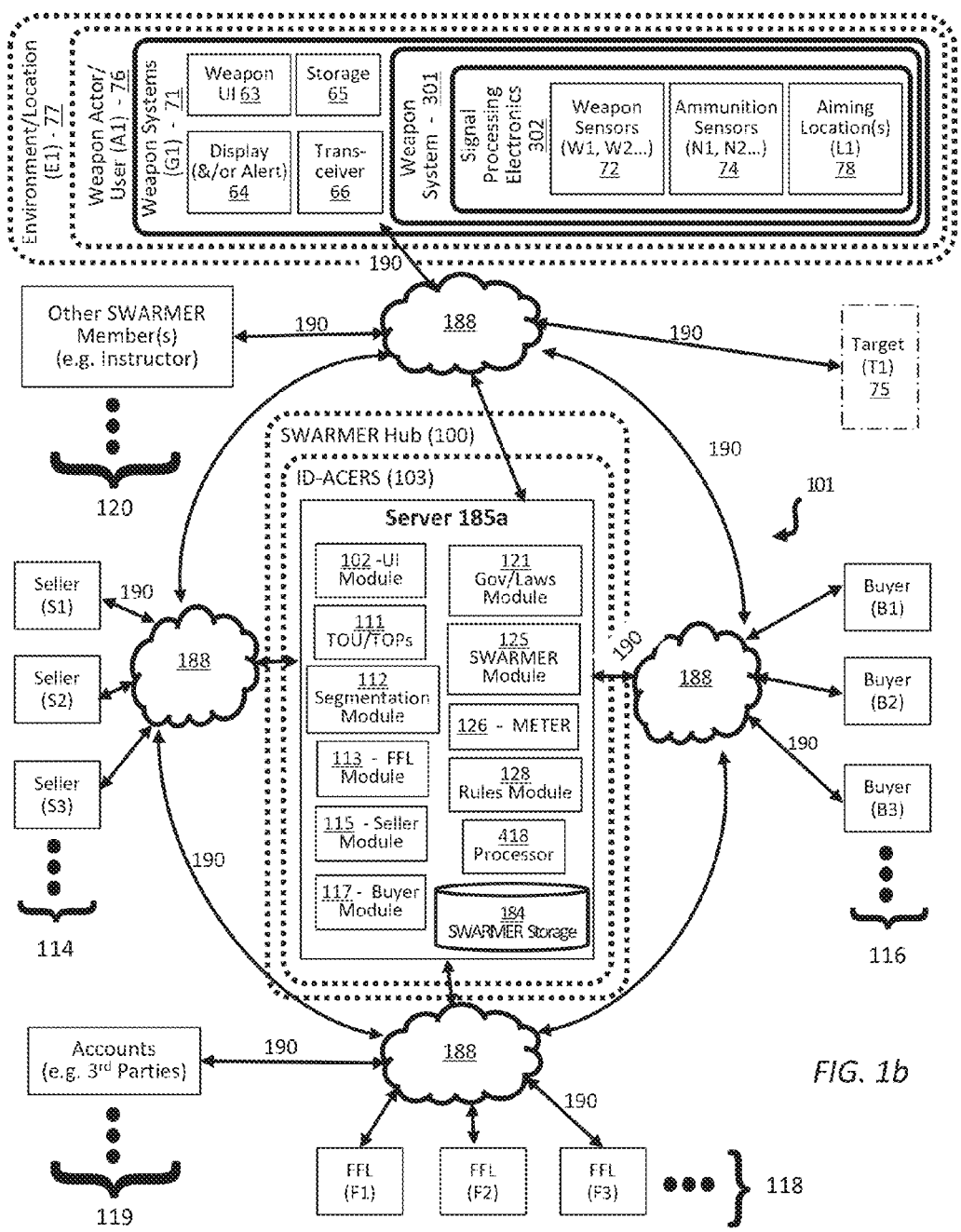
FIG. 1b representing a non-limiting example of one suitable configuration of a network 188 is provided that includes a server system 185a that is in communication with one or more seller system(s) 114, buyer system(s) 116, FFL system(s) 118, Weapon Systems 71, and one or more Accounts (e.g. third parties) 119 through one or more communication links 190.

Various computer network configurations can be used to implement the claimed disclosure, with FIG. 1b representing a non-limiting example of one suitable configuration. As shown in FIG. 1b, a network 188 is provided that includes a server system 185a that is in communication with one or more seller system(s) 114, buyer system(s) 116, FFL system(s) 118, Weapon Systems 71, and one or more Accounts (e.g. third parties) 119 through one or more communication links 190. The Accounts/third parties can comprise manufacturers, government agencies, wholesalers, validators, verifiers, supporters, experts, or other third parties, as well as correspondingly associated computing systems. The Accounts/third parties can also include one or more specialized computing system(s), such as a training instructor system and/or an encrypted government and/or military installation that are communicably connected to the server 185a, the appropriated/approved weapon system(s) 71, buyer system(s) 116, the seller system(s) 114, the FFL system(s) 118, a manufacturer, government agency, wholesaler, verifier, source/resource, support data, or another third party entity.

In various non-limiting embodiments, the server 185a would preferably be contained in a hub called a "Sensor, Weapon, Actor, and Registration Monitoring, Evaluating, and Relationships (SWARMER)-Hub" (or SWARMER-Hub) 100. In various non-limiting embodiments, the SWARMER Hub 100 would preferably contain an "Intelligent Dynamic-Analyzer/Criteria/Evaluator/Ranker" (or ID-ACERS system) 103. In various non-limiting embodiments, the server system 185 and the other transaction systems, namely, the one or more seller system(s) 114, buyer system(s) 116, FFL system(s) 118, Weapon Systems 71, and Account/third party system(s) 119 each include various computing modules that are operable to implement the various computerized aspects of the disclosure that are described throughout this disclosure, as recited in the claims. While only the server system 185a is presently shown to include any computer modules, it will be appreciated that each of the other transaction systems (the seller 114, buyer 116, FFL 118, weapon 71, and Account/third party system(s) 119) also include the necessary modules to interface with the server 185a and with each other, and to perform their correspondingly recited activities described throughout this disclosure and in the claims. It will also be appreciated that the term server, seller, buyer, FFL, weapon, and Account/third party are not mutually exclusive in all embodiments. In particular, it will be noted that in some embodiments, the seller system(s) 114, buyer system(s) 116, Account/third party system(s) 119, and/or server system 185a are also FFL system(s) 118. Similarly, seller systems(s) 114 can also comprise buyer system(s) 116.

T In various non-limiting embodiments, the computer modules currently embodied in the illustration of the server system 185a include an interface module 102, a TOU/TOPs module 111, a segmentation module 112, a FFL module 113, a Seller Module 115, a Buyer Module 117, a Government/Laws module 121, a SWARMER module 125, a METER module 126 (e.g. tracks laws/locations (e.g. via GPS, IP Address, and/or similar)) and a rules module 128. Each of these modules comprises computer-executable instructions that are stored within one or more physical computer storage media, such as storage 184, and are executable by a hardware processor, such as a processor 418, to implement aspects of the claimed disclosure. Each of the illustrated computing modules 102, 111, 113, 115, 117, 121, 125, 126 and 128 will be described in more detail, some here and more in FIGS. 2b, 5, 11-15 as well as the ID-ACERS 103 module.

In various non-limiting embodiments, the seller module 115 comprises computer-executable instructions for implementing the processes associated with the seller. In particular, the Seller Module 115 includes instructions for, among other things described herein, generating and displaying interfaces at one or more output devices that are associated with the seller system(s), for gathering seller information, such as seller account data or firearm data, and for accessing or providing FFL data and transaction data, as described in more detail below. This can include obtaining and displaying firearm data for firearms to be sold, identifying any FFLs to be involved in the transaction, and obtaining location information corresponding to a residence of the seller or the intended location of the transaction. It can also include displaying, to the seller, information related to pricing standards, existing offers for sale of related firearms, and currently available inventories.

In various non-limiting embodiments, the buyer module 117 comprises computer-executable instructions for implementing the processes associated with the buyer. In particular, the buyer module 117 includes instructions for, among other things described herein, generating and displaying interfaces at one or more output devices that are associated with the buyer system(s), gathering buyer information such as buyer account data or firearm data, and accessing or providing FFL data and transaction data including offer data as described in more detail below. This can also include such things as obtaining and displaying firearm data for firearms to be purchased, identifying any FFLs to be involved in the transaction, and obtaining background check information and location information corresponding to a residence of the buyer or the intended location of the transaction. It can also include displaying information related to pricing standards, existing offers for sale of related firearms, and currently available inventories.

In various non-limiting embodiments, the buyer module 117 also comprises computer-executable instructions for providing information for firearms that the buyer wants to buy but that do not currently exist in currently available inventories, and for searching other Account/third party databases for the firearms. When the firearms are located or become available in inventory, the Buyer Module 117 is able to notify the prospective buyer of the same.

In various non-limiting embodiments, the FFL module 113 comprises computer-executable instructions for implementing the processes associated with the FFL. In particular, the FFL module 113 includes instructions for, among other things described herein, generating and displaying interfaces at one or more output devices that are associated with the FFL system(s) 118, gathering FFL information such as FFL account data or firearm data, and accessing or providing firearm data and transaction data, including inventory data and verification data such as firearm condition data and seller data, as described in more detail below. This can also include obtaining Account/third party content to be linked to or listed on the server interfaces as a virtual store front, for example.

In various non-limiting embodiments, the Rules Module 128 employs a set of rules for automatically, systematically, conditionally, and/or actor/user-selectively requesting, searching, sourcing, interrogating, updating, verifying data, preferably attributable to a particular source and/or actor, relative such components as time, place, events, conditions, circumstances, health, stress, emergencies, resources, friendly-actors, unfriendly-actors, enemy-actors, unknown-actors, and/or the like. Further, where such data may include location tracking elements, coordinates, perimeters, statistics, patterns, and/or the like from Sensors, Satellites (e.g. GPS, GNNS, etc.), Public and Private databases, Governments, and/or the like, where each is also time-stamped. A METER module 121 comprises computer-executable instructions for identifying locations of buyers and sellers based on account data and residential or mailing addresses, as well as current and dynamically identified GPS locations. Location data is also obtained for FFLs to be involved in a transaction and for other specified locations where firearms transactions are intended to take place.

In various non-limiting embodiments, the Rules module and METER module 121 also identifies and stores the local, state and federal regulations related to the various jurisdictions where the buyers and sellers may be located, and updates these regulation records regularly. Updating can be done periodically on a daily basis, a weekly basis, or on any other basis. Updating can also be performed on demand, upon detecting a transaction in processes, or in response to receiving buyer, seller, or FFL data corresponding to a particular transaction or inquiry. When updating is performed on a periodic basis, the regulations corresponding to all firearms currently listed as available for sale are updated, thereby helping to preempt any potential violation of regulations involving the available inventories.

In various non-limiting embodiments, the rules and METER module 168 also includes adequate filters to automatically filter through existing inventories and the offers to purchase or sale firearms. These filters generate or modify lists of the firearms inventories and offerings that are available for buyers and sellers residing in or transacting in specific jurisdictions based on the relevant firearms regulations for those jurisdictions.

As suggested above, filters are also provided by the rules and METER module 168 to transform a master inventory and sales listings into one or more filtered lists that include only firearms that are available for prospective buyers and that can be sold by sellers based on classifications associated with the prospective buyers and sellers, such as, for example, based on whether the prospective buyer or seller is restricted from having weapons, whether the buyer or seller is a private citizen or a government agency, and so forth, and by cross-referencing jurisdictional regulations corresponding to the parties' locations.

In various non-limiting embodiments, the rules and METER module 168 also includes computer-executable instructions for identifying attempted illegal transactions involving restricted parties (e.g., based on classification, such as, for example, based on criminal records, or other legal classifications/restrictions) or restricted firearms (e.g., stolen or prohibited firearms), and for notifying appropriate government agencies of the same when required or when determined to be appropriate according to system policies.

In various non-limiting embodiments, the interface module 170 comprises computer-executable instructions for generating, transmitting, and displaying any of the interfaces described herein and for accessing and displaying firearms inventory data as well as firearms regulation data and offer information. The interface module 170 comprises computer-executable instructions for enabling communications between the server system 185a, the seller system(s) 114, the buyer system(s) 130, and the FFL system(s) 118, as well as other Account/third party sources 119, such as government agencies, wholesalers, manufacturers, and other third parties to identify Inventories and regulations, as well as for providing links to the websites of the Account/third party sources, such as an FFL's website, a government agency website, a manufacturer's website, a wholesaler's website, or another Account/third party website. In some instances, this enables a virtual storefront for an Account/third party website to be accessed and viewed through the interfaces of the server system 185a. This also allows prospective buyers and sellers to view government regulations in more detail when desired. This also allows, among other things, for the FFLs and server system 185a to provide necessary transaction data (such as background checks, identification of stolen merchandise, and certain sales or ownership data) to government agencies, as required for certain transactions.

In various non-limiting embodiments, the interface module 170 also comprises computer-executable instructions for interfacing with the other illustrated modules (115-168 and 172), the processor 176, the SWARMER System storage 184, as well as communications hardware (not illustrated) within the various systems to enable wired and/or wireless communications utilized by the appropriate communication link(s) 190. In some embodiments, the interface module 170 also comprises computer-executable instructions for performing translations between different languages and/or between text and voice. For example, in some embodiments, an FFL can call in a confirmation of receipt of a firearm, or a buyer or seller can enter data over the phone. The data can be converted from dial tone entry or verbal input into corresponding text and used to update the records stored by the server.

In various non-limiting embodiments, the interface module 170 also provides tools for facilitating instant messaging, blogs, chat interfaces, and other forms of real-time communication between sellers, buyers, and FFLs, as well as operators and other customer service personnel associated with any of the server system(s) 185a, seller system(s) 114, buyer system(s) 130, FFL system(s) 118, or third party systems 119.

In various non-limiting embodiments, the transaction module 172 comprises computer-executable instructions for identifying, generating, displaying, and/or transmitting transaction data related to specific transactions. In some instances, this includes gathering data about specific sellers, buyers, and/or FFLs, as well as transaction pricing and sales data. This can also include gathering information related to specific firearms, such as type and other condition information. This can also include the generation, displaying, and transmitting of transaction ticket data, as well as other transaction data that is usable to facilitate the transactions and verifications described herein.

In some instances, the transaction module 172 also comprises computer-executable instructions for tracking historical transaction data that is entered into one of the interfaces generated by the server system 185a and/or that is obtained through the use of a webcrawler or other tool that explores historical sales data on one or more Account/third party 119 websites or databases. This data can be used to obtain or calculate the pricing data described herein.

In various non-limiting embodiments, the transaction module 172 also comprises computer-executable instructions for calculating and/or adjusting pricing standards and historical records based on any newly obtained transaction and/or historical data. The transaction module 172 also comprises computer-executable instructions for managing firearms auctions made available through interfaces provided by the server system 185a which involve Inventories held by private sellers system 114, FFLs system 118, manufacturers, government agencies, or other third party systems 119.

In various non-limiting embodiments, the server storage 184, which stores the computer-executable instructions of the various computing modules, is shown as a single storage medium that is local to the server 185a. However, it will be appreciated that storage 184 can comprise any combination of local and remote storage media that are distributed among one or more different system devices or different systems. The remote storage can also comprise any combination of system memory as well as detachable physical storage media, such as magnetic or optical diskettes, flash drives, or other storage media.

In various non-limiting embodiments, the storage 184 of the server 185a also stores the various data used to compile master inventory lists of jurisdictional regulations, master lists of firearms Inventories, master lists of pricing standards, master lists of current sales and auction data, as well as historical transaction data, master lists of FFLs, sellers and buyers having established accounts and corresponding account information, and master lists of other firearms and transaction data. Storage 184 also stores filtered lists of the foregoing master lists, which have been generated through one or more transformation processes of the master lists by the server.

While the various modules and components of server 185a are shown to be separate elements, it will be appreciated that the various modules and components can also be combined into any desired quantity of consolidated and/or discrete elements, from one to many. It will also be appreciated that each of the illustrated seller system(s) 114, buyer system(s) 130, FFL system(s) 118, and Account/third party system(s) 119 can host any combination of the modules and components described above with respect to server 185a.

FIG. 2a is an exemplary diagram of a client 99a or server 185a. Client/server 99a/185a may include a bus 49, the processor 48, a main memory 45, a read only memory (ROM) 46, a storage device 47, an input device 42, an output device 43, and a communication interface 44. Bus 49 may include conductors that permit communication among the components of client/server 99a/185a.

In various non-limiting embodiments, the processor 48 may include conventional processors, microprocessors, or processing logic that interpret and execute instructions. Main memory 45 may include a random access memory (RAM) or another type of dynamic storage device that stores information and instructions for execution by processor 48. ROM 46 may include a conventional ROM device or another type of static storage device that stores static information and instructions for use by processor 48. Storage device 47 may include a magnetic and/or optical recording medium and its corresponding drive.

In various non-limiting embodiments, the input device 42 may include one or more conventional mechanisms that permit a user to input information to client/server 99a/185a, such as a keyboard, a mouse, a pen, voice recognition and/or biometric mechanisms, etc. Output device 43 may include one or more conventional mechanisms that output information to the user, including a display, a printer, a speaker, etc. Communication interface 44 may include any transceiver-like mechanism that enables client/server 99a/185a to communicate with other devices and/or systems. For example, communication interface 44 may include mechanisms for communicating with another device or system via a network, such as network 188.

Functions implemented by client/server 99a/185a may be stored as software instructions in a computer-readable medium, such as memory 45. A computer-readable medium may be defined as one or more physical or logical memory devices and/or carrier waves. The software instructions may be read into memory 45 from another computer-readable medium, such as data storage device 47, or from another device via communication interface 44. The software instructions contained in memory 45 may cause processor 48 to perform processes that will be described later. Alternatively, hardwired circuitry or other logic may be used in place of, or in combination with, software instructions to implement processes consistent with the disclosure. Thus, implementations consistent with the principles of the disclosure are not limited to any specific combination of hardware circuitry and software. Additionally, multiple computing devices may function together to implement the functionality of a single server 185a.

FIG. 2b depicts an embodiment of the "Client-server network" 220, here preferably as an "Operating Environment," 101 (sometimes referred as a "SWARMER Operating Environment" 101). The exemplary Operating Environment 101 in FIG. 1b illustrates an example of a suitable computing system environment 101 on which the present disclosure may be implemented. The computing system environment 101 is only one example of a suitable computing environment and is not intended to suggest any limitation as to the scope of use or functionality of the present disclosure. Neither should the computing environment 101 be interpreted as having any dependency or requirement relating to any one or combination of components illustrated in the exemplary operating environment 101.

The present disclosure is operational with numerous other general purpose or special purpose computing system environments or configurations. Examples of well-known computing systems, environments, and/or configurations that may be suitable for use with the present disclosure include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The present disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

In various non-limiting embodiments, the "SWARMER Operating Environment" 101 would preferably comprise of a "Restricted" 106 access (or sometimes referred to as a "Private Invitation Node" 106, "P.I.N." 106, or "PIN" 106), a "Public" 104 access (or sometimes referred to as a "Public Access Campaign" 104, a "P.A.C." 104 (or sometimes referred to as a "PAC" 104 or as Public Access 104), and a "SWARMER-hub" 100 ("SWARMER-hub" or "Hub" and in various non-limiting embodiments the SWARMER, the SWARMER System or disclosed system) 100. In various non-limiting embodiments, the PAC and PIN are collectively referred to as PIN/PAC 106/104, In various non-limiting embodiments, the SWARMER-hub 100 acts like and provides the "SWARMER Operating Environment" 101 with a central repository to interact, create, modify, collaborate, store, track, interrogate, analyze, assess, evaluate, and update all system data, inputs, collaborations, statistics, records, profiles, and data/content necessary to function. In various non-limiting embodiments, an Account 60 may be an individual user (90), such as a gun owner, soldier, or in various non-limiting embodiments, an entity such as a gun shop. In various non-limiting embodiments, all members (e.g. SWARMER members/actors) would preferably belong to at least one Account 60 and may be further classified in a variety of methods and defined roles. For example, a gun shop owner is a particular user who has registered with the SWARMER System and who has met an additional predefined description or definition, say, per the legal definition as currently employed by "BATE" Whereas an actor who is a participant, on the other hand, is someone who meets a different definition, one who is a SWARMER Member and who wishes to participate in a transaction, but who has not yet qualified as a buyer when employing these rules/definitions for a qualified buyer.

In various non-limiting embodiments, an Anonymous (e.g. Unknown) User (90) accesses the SWARMER-hub 100, say via the PAC 104 via his/her home, company's Account 60, and/or as an Anonymous User (90*a*). In various non-limiting embodiments, the Anonymous (e.g. Unknown) User (90) can accesses a PIN say via limited access as may or may not be allowed by the PIN. In various non-limiting embodiments, the PIN can establish its own access rules, say where only Ascertained Actor(s) for example, can have access.

In various non-limiting embodiments, the User (90) may review an opportunity to participant in, say a transaction (e.g. weapon transaction), say via a particular invitation, offer, a link in an email, a particular posting of a PIN/PAC (106/104) and/or the like. In various non-limiting embodiments, when the potential participant actually participants in a transaction, say via an accepted offer to purchase, a participation via an approved user status (e.g. to provide peer feedback), and/or the like, the potential participant (80*a*) becomes an actual participant (80).

In various non-limiting embodiments, an "Expert Status" (75) (sometimes referred to as "Experts" (75)) and a "Peer Status" (65) (sometimes referred to as "Peers" (65)) are SWARMER members in-general who seek or earn these role statuses in association with another particular member and/or Account (60) that awards the status to the member and/or points may be associated where the points may add up over the course of time to bolster status and reflect who awarded the points. In various non-limiting embodiments, the points may be based on such things as the point value associated with member or Account (60) granting the status/permission and, in some cases, could be based an algorithm that incorporates the exclusivity and/or prominence of the status being rewarded from, say a prominent member from such measurable success as targets hit per rounds fired, people/hostages rescued, mission accomplishments, and/or causalities avoided and/or minimized.

In various non-limiting embodiments, the expert seller role/status would preferably have more than one threshold to obtain that expert seller role/status, where the Participant (80) surpasses a first threshold of participation criteria and/or decisions (e.g. per current laws, the TOP, the rule committee, e.g. the Court System; and/or the like) to become a seller role/status; then a second threshold of participation criteria and/or decisions to become the expert seller role/status (e.g. per current laws, the TOP, the rule committee, e.g. the Court System; and/or the like). Further, where the expert seller role/status may be per a particular firearm, set of rules/regulations, locations, revenue/income, level of sales, level of participation and/or the like.

In various non-limiting embodiments, the Participant (80) may surpass a threshold of participation criteria and/or decisions (e.g. per current laws, the TOP, via a rule committee, e.g. a Court System (107) and/or the like) to become a buyer. In various non-limiting embodiments, the buyer is further delineated into a first-time buyer and a second-time-buyer, and so-on. In various non-limiting embodiments, the expert buyer role/status would preferably have more than one threshold to obtain that expert buyer role/status, where the Participant (80) surpasses a first threshold of participation criteria and/or decisions (e.g. per current laws, the TOP, the rule committee, e.g. the Court System; and/or the like) to become a buyer role/status; then a second threshold of participation criteria and/or decisions to become the expert buyer role/status (e.g. per current laws, the TOP, the rule committee, e.g. the Court System; and/or the like). Further, where the expert buyer role/status may be per a particular firearm, set of rules/regulations, locations, purchases, marksmanship, level of practice, level of participation and/or the like.

Similarly, in various non-limiting embodiments, the Industry expert roles/status, would preferably have more than one threshold of contribution criteria and/or decisions for obtaining each role/status, where the industry participant would need to surpass a first threshold of contribution criteria and/or decisions (e.g. per current laws, the TOP, criteria, the rule committee, e.g. the Court System, and/or the like) to become an industry recognized participant role/status (e.g. for a particular firearm, firearm classification, region of the country, and/or the like); then a second threshold of contribution criteria and/or decisions (e.g. per current laws, the TOP, criteria, the rule committee, e.g. the SWARMER Court System; and/or the like) to become the Industry expert (e.g. for a particular firearm, firearm classification, region of the country, and/or the like).

In various non-limiting embodiments, there would be additional threshold(s) and/or decisions for obtaining the marksman expert roles/status, where a participant would need to surpass a (first) marksman threshold of criteria and/or decisions (e.g. per current laws, the TOP, criteria, the rule committee, e.g. the Court System, and/or the like) to become the expert marksman role/status (e.g. for a particular firearm, weapon domain, ammunition, region, rifle range, event, time period, with a particular group/entity, and/or the like). In various non-limiting embodiments, there would be additional threshold(s) and/or decisions for obtaining the Gatekeeper role/status, where a participant would need to surpass a (second/Joint-Seller/Co-Seller) threshold of contribution criteria and/or decisions (e.g. per current laws, the TOP, criteria, the rule committee, e.g. the Court System, and/or the like) to become an overall gatekeeper/decision-rule-maker (e.g. for a particular account, project, event, club, organization, shop, retailer, aggregator, segment of participants, region, municipality, zone, and/or the like).

In various non-limiting embodiments, the Restricted (e.g. PIN) 106 access is a distinction where all users (90) must become a member under a specific set of PIN TOPs and enrollment rules for that particular Account 60, User 90, Potential Participant (80*a*) to participant; or for a Participant (80) to continue to participate and/or participate in a particular portion of, say an event or transaction. In various non-limiting embodiments, membership to the SWARMER-hub 100, in and of itself, would not necessarily grant access to a particular Restricted (e.g. PIN) 106 access environment. For instance, participation may be limited to those members located within the Restricted (e.g. PIN) 106 access environment and/or where those participants (80) would preferably have access to the network and/or to members who also meet other rules and conditions and who are allowed to connect and interact via a Communication Connection (CC). In various non-limiting embodiments, the CC would preferably be a specific secure communication connection.

In various non-limiting embodiments, the CC would preferably be via a Transmission Control Protocol/Internet Protocol Connection (TCP/IP), but all system connections inside the "SWARMER Operating Environment" 101 may be any type of appropriate network connection that provides, say the necessary bandwidth, privacy, and security, including wired and wireless connections and dialog. In various non-limiting embodiments, the CC and "SWARMER Operating Environment" 101 would preferably provide the necessary security, encryption, hardware, and software to safeguard the data, statistics, members, communications, and system, and prevent any breach of confidentiality/non-disclosure rights, harm, viruses, attacks, data-corruption, access, and/or visibility to any non-approved members, unwelcomed users, hackers, spiders, bots, or attackers. In various non-limiting embodiments, the CC and SWARMER Operating Environment" 101 would also monitor for potential conflicts, contract breaches, deadline issues, resource issues, ownership and rights issues (e.g. federal, state, local rules, regulations, statutes, laws, and/or the like) and/or the like.

In various non-limiting embodiments, the Public 104 (or PAC) access is comprised of users 90 who may participate anonymously (not members, but able to view offers, invitations, some data/content, provide feedback, create offers, and/or the like) and/or users 90 who may wish and/or be required to enroll (become members) to obtain certain data/content and/or become a specific Role with additional capabilities, visibility, ranking, permissions and/or privileges (e.g. per TOPs, e.g. reviewing, editing, collaborating, feedback, and/or the like). For instance, an enrollment may be required to participate in a particular event or transaction, view a particular offer, and/or contribute within a particular Restricted (e.g. PIN) 106 access environment.

In various non-limiting embodiments, the SWARMER-hub 100 connects to the Restricted (e.g. PIN) 106 access environment from outside the Restricted (e.g. PIN) 106 access environment via the CC, but the SWARMER-hub 100 could also be located within the Restricted (e.g. PIN) 106 access environment, but would preferably be a separate, stand-alone entity. In various non-limiting embodiments, there would preferably be a plurality of Public 104 and Restricted (e.g. PIN) 106 access environments where the participants (80) could access and utilized a SWARMER-User-Interface (SWARMER-UI) 102, and generally there is at least one interconnected SWARMER-hub 100 system, but there could be more. In various non-limiting embodiments, for instance, there would preferably be at least one separate SWARMER-hub 100 system in each separate country that employed the SWARMER System. In various non-limiting embodiments, each SWARMER-hub 100 system would preferably be interconnected and systematically synchronized to preferably allow broader participation and to maintain relatively more current records, data, collaboration, interactions, feedback, and/or the like.

In various non-limiting embodiments, the SWARMER-hub 100 is operatively connected to the Public 104 access environment via the CC, typically via the TCP/IP connection and connected to the World Wide Web, the Internet, where the connections are made via and/or through the Internet. In various non-limiting embodiments, the CC could also be a mobile network, wireless connection and/or similar with an ability to connect, display, browse, interact, collaborate, participate, edit, and/or the like. In various non-limiting embodiments, the SWARMER-hub 100 would preferably also be operatively connected to the Seller(s) 70 and the Participant(s) 80 via the CC, typically via the TCP/IP connection, say, at his/her home or office, but could also be a mobile network connection, wireless connection, or similar.

For instance, the Participant 80 may connect to the SWARMER-hub 100 system located within a particular Public 104 site, using his/her computer as a transceiver 99 (e.g. a communication client/device). In various non-limiting embodiments, the term transceiver is a combination transmitter/receiver in a single package, which generally applies to wireless communications devices such as cellular telephones, cordless telephone sets, handheld two-way radios, and mobile two-way radios, but here the definition is expanded to include any computing and/or communication device or client (e.g. desktop, laptop, notebook, and/or the like) that is connected to the SWARMER System via a hardwired connection, a wireless connection, and/or other two-way communication means.

Depending on the conditions and TOU set on the SWARMER-hub 100 system and/or the login and TOP requirements of a particular Restricted (e.g. PIN) 106 access environment, the user may have limited access to participate anonymously, say enough to learn the TOU (e.g. terms of membership and enroll), and/or participate (TOP) (sometimes jointly referred to as TOU/TOP 111) through a specific invitation received with, say a pre-assigned login which authorizes the user to become a member and utilize the SWARMER-hub 100 system and/or access the particular Restricted (e.g. PIN) 106 access environment.

FIG. 3 is a block diagram depicting an embodiment of the groupings of sub-systems of the "System Operating Environment" 101 and the communications and/or dialogs among them. In various non-limiting embodiments, the SWARMER-hub 100 is the central hub for users to utilize the SWARMER-UI 102, which is linked, network, connected and/or communicating with SWARMER Server 185. In various non-limiting embodiments, the SWARMER-UI 102 is the application that allows users via the Client/Transceiver 99 (such as a computer, mobile device, and/or the like) to view a display, select, input, request, create, modify, monitor, track, report, ad target, collaborate, challenge, comment, manage, transact, buy, validate, verify, and/or the like, such things as data/content, inputs, media, terms, campaigns, resources, and/or the like.

In various non-limiting embodiments, the SWARMER-hub 100 sub-systems comprises the following: a container I.D.-A.C.E.R. ("ID-ACER," which is an acronym for "Intelligent Dynamic—Analyzer/Criteria/Evaluator/Ranker") 103 that comprises an SWARMER/ID-ACER Evaluator 95, an SWARMER/ID-ACER Parser/Analyzer 96, the SWARMER-UI 102 (or sometimes referred to as the "system-UI"), and a SWARMER Storage 184; the Transceiver 99 and SWARMER Server (185) are located outside the container ID-ACER 103, while remaining directly connected to 103. In various non-limiting embodiments, the SWARMER system and associated databases, TRIPLE stores, data/content and correlated data/content (e.g. data mapping) employ the SWARMER system and sub-models (e.g. the ID-ACERS, more later) regarding semantic rules, indexing, classifications, RDFschema, triples, triple stores, and/or the like.

In various non-limiting embodiments, the SWARMER System and database data/content and correlated data/content comprise raw data, structured data, text, media, audio, images, video, Speech To Text, speech to text, graphics, stenographics, animation, avatars, charts, polls, communications/interactions (e.g. email, instant messages (IM), "Short Message Service (SMS), Multimedia Messaging Service (MMS), and/or the like), and may include advertising, promotional/campaign, and Public Relations (PR) materials, offers, invitations, terms of use (TOU), terms of participation (TOPs) (e.g. sometimes collectively (TOU/TOPs)) participation criteria, role/status criteria, threshold criteria, rules, conditional rules, alerts, notifications, testing structure and systems, assessments, challenges, comments, peer review, expert review, feedback, "Frequently Asked Questions" (FAQs), research/search results, rankings, processes, know-how, government rules, regulations, laws, and the like.

In various non-limiting embodiments, the participants (80) would preferably include users (90) (such as sellers, FFLs, buyers, experts, researchers, translator, instructors, recruiters, press, PR, advertiser, employees, contractors, peers, professors, students, prosecutors, licenser, analyzers litigators, former judges, former jury members, doctors, nurses, government employees, regulators, and the like), but may not be limited to humans and some embodiments could include machines, computers, software, time, materials, money, credit, and the like.

In various non-limiting embodiments, a container Protection Shield 98 comprises the Restricted (e.g. PIN) 106 access environment that could be connected to the Internet 238, which in turn would preferably allow for connections and dialogs to other Restricted (e.g. PIN) 106 access environments and Public 104 access environments. In various non-limiting embodiments, say where the Protection Shield 98 container comprised of the Restricted (e.g. PIN) 106 access environment is located in a competitive area or combat zone, the transmission of data would preferably employ high-levels of security, logic, rules, and/or encryption means, where for instance the transmitting and/or receiving of information could be limited by conditions, such as specific times, randomized intervals, events/non-events, environments, urgency status, circumstances, and/or the like. Further, where such conditions when to communicate, transmit data, and/or the like, could include a previous, on-going, persistent, regular, and/or the like validation, ascertainment, discernment, and/or the like from/with/by the SWARMER/ID-ACERS and/or a particular actor statement (e.g. "Actor Stated") and/or assessment. For instance, the actor statement may be regarding an assessment and/or condition that the transmission is, say A/D/AS: "safe" and/or "necessary" to communicate.

In various non-limiting embodiments, an "Internet Site(s), Application(s) and Widget(s)" 189, a "Network(s) 188, the seller 70, the buyer, and a Mobile Network Operator(s) 191 would preferably all interconnect and allow for interactions, collaborations, communications, and/or the like, as shown. In various non-limiting embodiments, the SWARMER-hub 100, which is linked, network, connected and/or communicating with a L-Server 187 and a L-SWARMER Storage 186, would preferably connect directly to the Mobile Network Operator(s) 191 and the Restricted (e.g. PIN) 106 access environment via a designated secure communication line/means other than the Internet 238.

In various non-limiting embodiments, the Restricted (e.g. PIN) 106 access environment is comprised of a Local SWARMER Storage 186 (L-SWARMER Storage) that typically is setup to synchronize with the SWARMER Storage 184 based on conditions and requirements instituted. In various non-limiting embodiments, all of the components within the Restricted (e.g. PIN) 106 access environment would preferably be interconnected, say via a L.A.N. 239 (or similar, e.g. SDN) and preferably via a secure protocol. In various non-limiting embodiments, the PIN Members Storage 193 would preferably be protected behind a firewall (not shown) and connected to a SWARMER Server 185, which, in various non-limiting embodiments, comprises the SWARMER-UI 102 system software and interface that is accessible to users with the Transceiver 99 (such as a computer). In various non-limiting embodiments, the Restricted (e.g. PIN) 106 access environment may connect with the L-SWARMER Storage 186 to allow interaction with existing SWARMER storage outside the Restricted (e.g. PIN) Members Storage 193*b*, but is not necessary. In various non-limiting embodiments, SWARMER/ID-ACER PIN Parser/Analyzer 97 and SWARMER/ID-ACER PIN Evaluator 94 connect with the SWARMER UI 102, where the SWARMER/ID-ACER PIN Evaluator 94 also connects with the L-SWARMER Storage 186.

In various non-limiting embodiments, a particular Campaign 236, such as a search for a particular buyer for a particular firearm, would preferably be pushed out to the Public 104 access environment located in such places such as the "Internet Site(s), Application(s) and Widget(s)" 189. In various non-limiting embodiments, the Campaigns 236 would preferably be maintained internally and not made available to the public using a particular Campaign 236 with restricted access. In various non-limiting embodiments, the Restricted (e.g. PIN) 106 access environment would preferably require a password, Pin code, and/or similar to secure and/or obtain the access to any data, statistics, project, members, campaign, offer, data/content, and/or the like.

In various non-limiting embodiments, the Mobile Network Operator(s) 191 comprises of an Existing Mobile Infrastructure 194 and similarly could create its own access environment with the L-SWARMER Storage 186 and SWARMER Server 185. In various non-limiting embodiments, the Mobile Network Operator 191 may also utilize the SWARMER-UI 102 system internally and/or utilize the SWARMER-UI 102 located in the SWARMER-hub 100 by connecting via the Internet 238. In various non-limiting embodiments, the Mobile Network Operator(s) 191 may send Campaigns 236 to subscribers who may be users 90, members, say Sellers 70 and Participants 80 who receive and view with his/her transceiver 99 display. In various non-limiting embodiments, the transceiver 99 may comprise a cellular phone, personal digital assistant (PDA), mobile device, or similar device, via the Mobile Network(s) 192, such as via traditional cellular transmissions and/or a wireless network utilizing, say GSM, CDMA, TDMA, CDPD, Edge, EVDO, LTE, 3G, 4G, and the like.

In various non-limiting embodiments of the SWARMER System, all mentioned data updates, exchanges, and analysis may be performed in real-time, near-real-time, and/or per a schedule batch process. The data and necessary logic could be based upon and/or shared on cloud based servers and/or reside within a caching systems (e.g. Mongrel Clusters), without having to continually interact with the data and logic within a particular database and/or any database.

In addition, users could interact with the SWARMER System, data and generated analysis, reports, and the like, in real-time, near-real-time, and/or per either a system established, user requested and/or scheduled update process, where, say some particular data elements are either updated or not and/or where other elements may be updated selectively. In various non-limiting embodiments, the SWARMER System allows users to interact with those who are coupled via a client computer that could be hardwired or a mobile computing device (e.g. a cellular phone, a mobile device, and/or the like) with a wireless connection, such as via a cellular telephone and connection on any coupled and/or available wireless technology, including, but not limited to: 2G/3G/4G, CDMA, GSM/Edge, Edge, Edge+, GPRS, CDMA 2000, CDMA EV-DO, TD-SCDMA, WCDMA/HSPA/HSPA+, TDMA, SDMA, 802.16, LTE, and/or a mobile device via a range of other wireless technologies, including, but not limited to IEEE 802.22, 802.20, 802.15, 802.11/Wi-Fi/WLAN, Wi-Max, Bluetooth, Ultra-Wideband Technology, NFC/Near-Field Communications, SRD/Short Range Devices, DECT/Digital Enhanced Cordless Telecommunications, Zigbee, Wireless USB, and the like.

In various non-limiting embodiments, the client computer could employ tracking and session cookies, and the mobile computing device could employ location tracking technologies, including, but limited to, RFIDs, GPS, cellular tower triangulation, infra-red. Mobile applications could be tracked per the user's location and incorporate demographic and behavioral data.

SWARMER data may be encrypted for security, and the SWARMER System would preferably employ an electronic payment system that may be stored as an electronic wallet in the cloud that interacts with other credit systems, such as banks, lenders, credit unions, credit checkers/validators (e.g. validate credit available and/or credentials, experience, and/or the like), credit providers, credit scorers, and/or the like. Once a member has established credit, the member may use his/her electronic wallet and associated credit (and Accounts (60)) to make transactions via enlisted mobile computing devices and/or computing clients. In various non-limiting embodiments, the SWARMER System would preferably also allow for trading and bartering where the SWARMER System may be coupled to interact with and interpolate an exchange rate with other bartering and trading systems, along with the associated credit system, rating/scoring system, and/or currency employed.

Figure 4A:
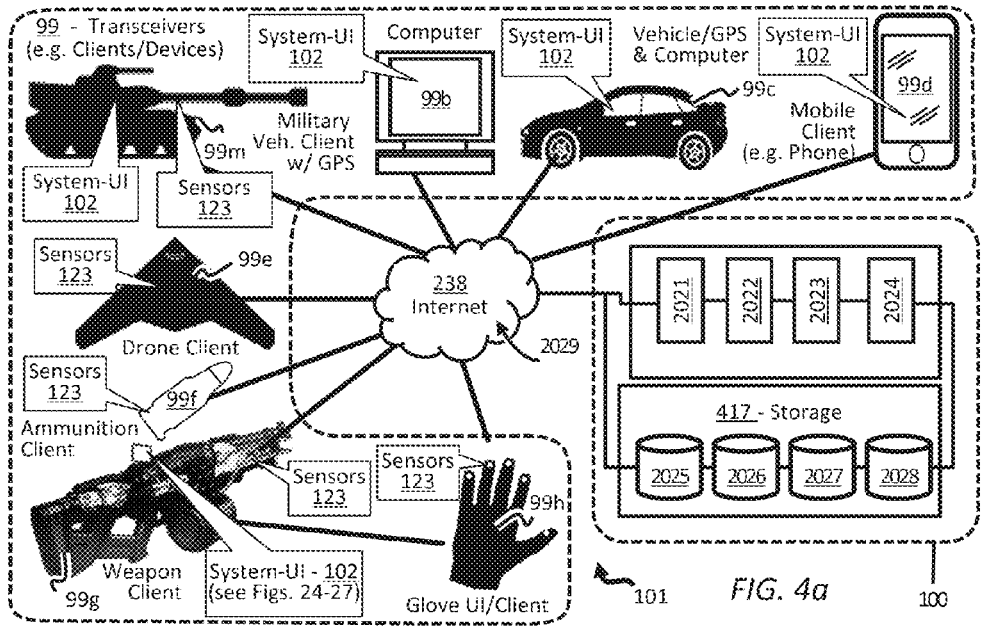
FIG. 4a of the accompanying drawings illustrates a general embodiment and overview of a "Client-server network" in which the SWARMER System and methods may be implemented, including a variety of components that communicate over a public network 2029, preferably the Internet 238.

FIG. 4a of the accompanying drawings illustrates a general embodiment and overview of a "Client-server network" in which the SWARMER System and methods may be implemented, including a variety of components that communicate over a public network 2029, preferably the Internet 238. The "Client-server network" 220 includes a client computer system 99b and the SWARMER-hub 100.

In various non-limiting embodiments, the client computer system 99b, using Uniform Resource Locators (URL), accesses web servers over a local area network (LAN), wireless area network (WAN), a voice over IP (VOIP) network, telephone network, an internet service provider (ISP) and/or the like. The client computer system 99b, in an embodiment, may include a desktop computer, a personal digital assistant (PDA) or mobile phone 99d, or, generally, any device (e.g. transceiver 99) that includes a graphical user interface (GUI) 102 and/or a voice response unit (VRU) and may access a network. In various non-limiting embodiments, the transceiver may include a Weapon Client (99g), an Ammunition Client (880, or generally, any weapon with the necessary sensors, processor, and/or transceiver that include may or may not include the (GUI) 102 and/or the voice response unit (VRU). In addition, some clients may or may not access a particular network, any network, and/or a particular network at a particular time, manner, method, and/or the like. For example, a particular weapon may only connect via a particular encryption scheme, method, means, and/or the like. Further, some clients, e.g. weapons may only share data via suitable, approved, and/or drives (e.g. removable SD, SSD, HDD, and/or the like) and/or only via a direct connection.

In various non-limiting embodiments, the client computer system 99b typically includes one or more processors, memories and input (e.g. device) 412 and output (devices) 413. Typically the client computer system 99b also includes a mouse, touch screen, keyboard, or other technological improvements therein to effectuate a selection or interaction by the user. In various non-limiting embodiments, the terms: device, computer (99b), client (99a), ammunition client (990, weapon (99g), Glove UI/Client 99h, Drone Client 99e, Military Vehicle Client (e.g. with GPS) 99m, mobile phone, cellular phone, computer-enabled vehicle (99c), GPS unit (not shown), TV/IPTV and/or the like, are interchangeable, with the transceiver 99.

In various non-limiting embodiments, the SWARMER 100 includes one or more SWARMER engines 2021 (e.g. SWARMER 2021, ID-ACERS 2022, AIS 2023), a computer 2024, including a processing system, one or more data/content servers 2023 and one or more profile servers 2024. Generally, servers may include a central processing unit (CPU) 418, a main memory 415, a read-only memory (ROM) 416, a storage device 417, including Storage Devices 2025, 2026, 2027 and 2028 (see FIG. 6, 320, 323-345), and a communication interface 414, all coupled together via a bus 419. In various non-limiting embodiments, the SWARMER engine 2021, including a program, processes interactions performed by a user, and communicates with the data/content server 2023 or the SWARMER server 2024 to create, modify, collaborate, retrieve, display, track, analyze, and store data/content; who created/input/modified the data/content/media/stats and when. The data/content server 2023 stores data/content associated with the SWARMER-hub 100, and the SWARMER servers 2024 store data/content generated by users, both acting as information providers for the "Client-server network" 220, preferably accessed by the computer 2022 when the user interacts with the SWARMER engine 2021.

Servers include databases, which may be implemented in a single storage device or in a plurality of storage devices located in a single location or distributed across multiple locations. In various non-limiting embodiments, the databases are accessible to the servers and clients, within the "Client-server network" 220. In various non-limiting embodiments, the information stored in the databases may be stored in one or more formats that are applicable to one or more software applications that are used by the clients and servers and/or could incorporate or rely on cloud computing and/or storage.

In various non-limiting embodiments, preferably the data/content is stored on solid state drive (SSD) or sometimes called a solid-state disk or electronic disk, which uses solid-state memory to store persistent data. SSD generally has relatively faster access times and less latency compared to electromechanical hard disk drives (HDDs). Some SSDs utilize NAND-based flash memory, which retains memory even without power. In some cases, a hybrid of HDDs and SSD may generate a smaller SSD cache to improve performance for frequently accessed files.

Figure 4B:
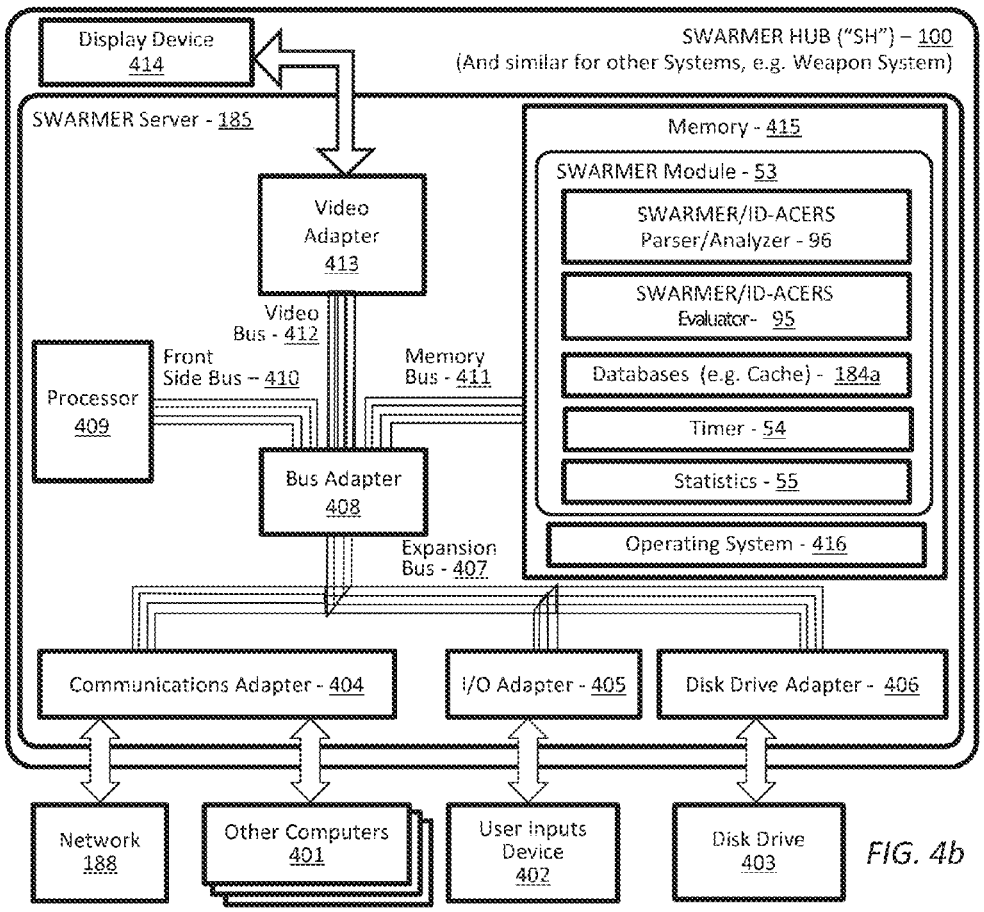
FIG. 4b depicts a block diagram of an embodiment of the SWARMER Hub ("SH")-100 for automated computing machinery comprising an exemplary network host or SWARMER Server 185 useful in collecting, tracking, parsing, analyzing, evaluating, interrogating and/or the like data of network traffic and clients for voice/time and/or data monitoring according to various non-limiting embodiments of the present disclosure.

FIG. 4b depicts a block diagram of an embodiment of the SWARMER Hub ("SH")-100 for automated computing machinery comprising an exemplary network host or SWARMER Server 185 useful in collecting, tracking, parsing, analyzing, evaluating, interrogating and/or the like data of network traffic and clients for voice/time and/or data monitoring (e.g. via the appropriate and suitable satellite link, SS7/signaling links, packet voice, packet data, and/or the likes), according to various non-limiting embodiments of the present disclosure. In various non-limiting embodiments, the SWARMER Server 185 of FIG. 3b includes at least one computer processor (409) or 'CPU' as well as a Memory (415) which are connected through a Memory Bus (411) and a Bus Adapter (408) to a processor (409) and to other components of the network host or SWARMER Server 185.

Electronically stored in the Memory (415) is the SWARMER Module (53), a module of computer program instructions for monitoring (e.g. via the appropriate and suitable Satellite link, SS7/signaling links, packet voice, packet data and/or the likes), manage, analyze, and provide data analysis and evaluations according to embodiments of the present disclosure that initialize, the SWARMER/ID-ACERS Parser/Analyzer (96) module with the SWARMER/ID-ACERS Evaluator (95), and Databases (e.g. Cache) (184a).

In various non-limiting embodiments, the SWARMER Module (53) and the SWARMER/ID-ACERS Parser/Analyzer (96) with SWARMER/ID-ACERS Evaluator (95), also starts a timer (54). In various non-limiting embodiments, the timer (54) may incorporate a set of conditions, where for example, a particular set of conditions could cause the timer (54) to remain on no longer than a predefined time interval. In various non-limiting embodiments, the SWARMER Module (53) also maintains, while the timer (54) is on/open, statistics (55) including the appropriate and suitable Satellite link, SS7/signaling links, packet voice, packet data and/or the like count by the SWARMER Module (53). For each appropriate and suitable input, (e.g. via the Satellite link, SS7/signaling links, packet voice, packet data and/or the like) received by the SWARMER Module (53), the SWARMER/ID-ACERS Parser/Analyzer (96) and SWARMER/ID-ACERS Evaluator (95) also determines, in dependence upon the statistics (55) and the timer (54) modules. Also electronically stored in Memory (415) is an operating system (416) (or OS).

Operating systems useful in network hosts (e.g. SWARMER Server 185) according to embodiments of the present disclosure include UNIX™, Linux™, Microsoft Windows® platforms, Google Android® platforms, and Apple iOS® platforms.AIX™, IBM's i5/OS™, and others as will occur to those of skill in the art. Operating system (416), the SWARMER Module (53), with the SWARMER/ID-ACERS Parser/Analyzer (96), SWARMER/ID-ACERS Parser/Analyzer (96) and SWARMER/ID-ACERS Evaluator (95), Databases (e.g. Cache) (184a),), timer (54), statistics (55), and voice/time and/or data communications via the appropriate and suitable Satellite link, SS7/signaling links, packet voice, packet data and/or the like per the SWARMER Module (53) in the example of FIG. 3b are shown in RAM Memory (415), but many components of such software typically are stored in non-volatile memory also, for example, on a disk drive (403).

In various non-limiting embodiments, the SWARMER Server 185 of FIG. 3b includes the bus adapter (408), a computer hardware component that comprises drive electronics for the high speed buses, a front side bus (410), a video bus (412), and the memory bus (411), as well as drive electronics for a slower expansion bus (407). In various non-limiting embodiments, examples of bus adapters for monitoring, parsing, analyzing, evaluating, interrogating, and/or the like, data the present disclosure include the Intel Northbridge, the Intel Memory Controller Hub, the Intel Southbridge, and the Intel I/O Controller Hub.

In various non-limiting embodiments, examples of expansion buses for the present disclosure include Industry Standard Architecture ('ISA') buses, Peripheral Component Interconnect (PCP) buses, and/or the like.

In various non-limiting embodiments, the SWARMER Server 185 of FIG. 3b includes a disk drive adapter (406) coupled through Expansion Bus (407) and bus adapter (408) to processor (409) and other components of the SWARMER Server 185, the disk drive adapter (406) connects non-volatile data storage to the SWARMER Server 185 in the form of the disk drive (403). Disk drive adapters useful in network hosts include Integrated Drive Electronics ('IDE') adapters, Small Computer System Interface ('SCSI') adapters, and others as will occur to those of skill in the art. In addition, non-volatile computer memory may be implemented for the network host as an optical disk drive, electrically erasable programmable read-only memory (so-called 'EEPROM' or 'Flash' memory), RAM drives, and so on, as will occur to those of skill in the art.

In various non-limiting embodiments, the example SWARMER Server 185 of FIG. 3*b* includes one or more input/output ('I/O') adapters (405). I/O adapters in network hosts implement user-oriented input/output through, for example, software drivers and computer hardware for controlling output to display devices such as computer display screens, as well as user input from user input devices (402) such as keyboards and mice. In various non-limiting embodiments, the user/actor input devices (402) can comprise interactive body wear with sensors, such as vests, gloves, glasses, watches, health rate monitors, shoes, shirts, pants, underwear, and/or the like.

In various non-limiting embodiments, the example SWARMER Server 185 of FIG. 3*b* includes a video adapter (413), which is an example of an I/O adapter specially designed for graphic output to a display device (414) such as a display screen or computer monitor. In various non-limiting embodiments, the Video adapter (414) is connected to processor (409) through a high speed video bus (412), bus adapter (408), and the front side bus (410), which is also a high speed bus.

The exemplary SWARMER Server 185 of FIG. 3*b* includes a communications adapter (404) for data communications with other computers (401), Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. In addition, the communications adapter (404) for data communications with other computers (401) could corporate and/or be extended for, say satellite links, SS7 signaling/links with voice and/or data communications and/or data communications network (188) (e.g. Wifi, Bluetooth, Near Field Radio, and/or the like).

Examples of communications adapters useful for the present disclosure include modems for wired dial-up communications, Ethernet (IEEE 802.3) adapters for wired data communications network communications, and 802.11 adapters for wireless data communications network communications, cellular, satellite, and/or the like The above FIG. 4*b* disclosure could can be utilized in whole and/or with the suitable components for other SWARMER systems and subsystems, say the Weapon System, and/or a stand-alone ID-ACERS.

Figure 5:
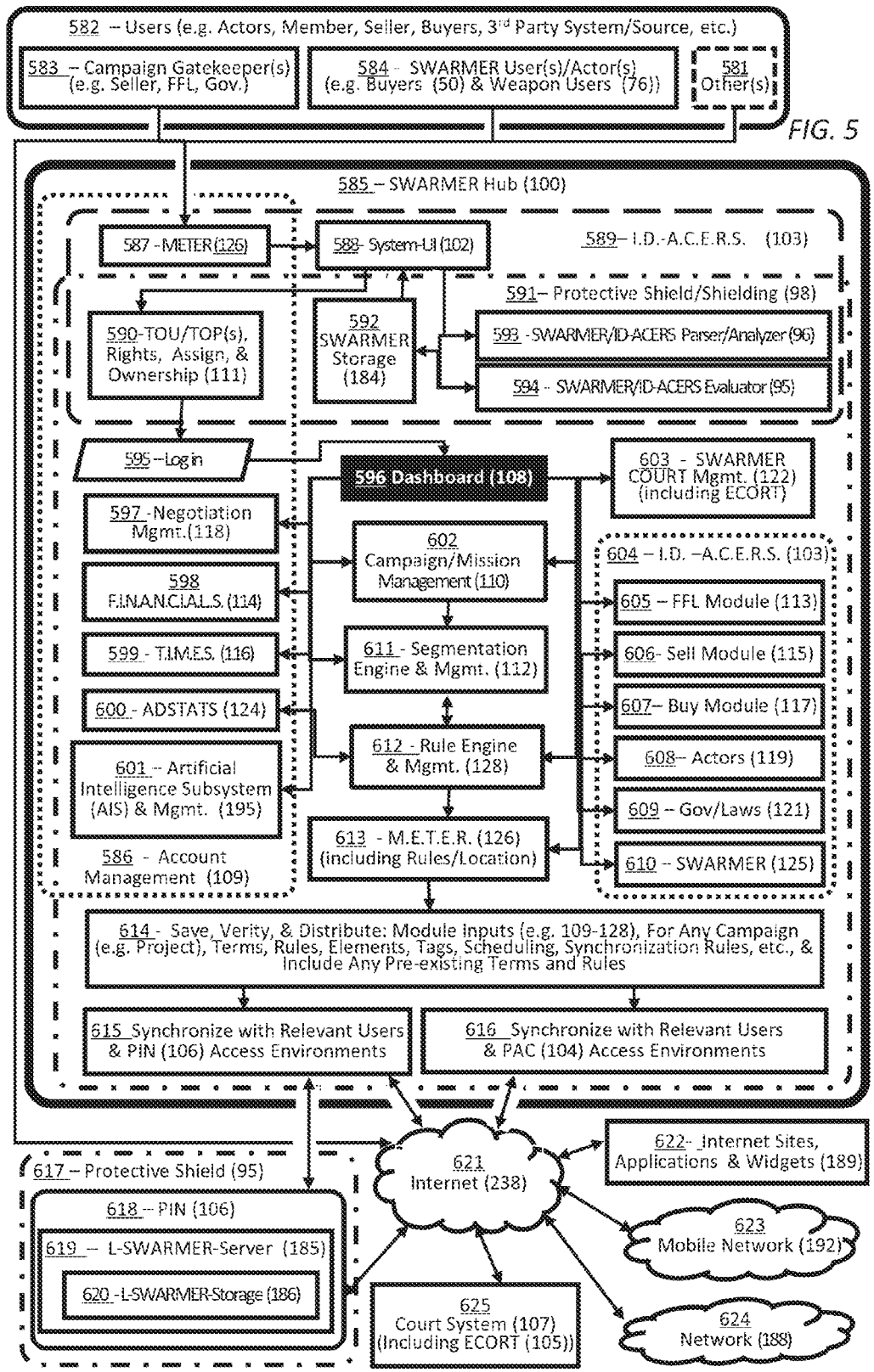
FIG. 5 is a flowchart that depicts an example of the SWARMER-hub 100, system and an associated computer-implemented method in more detail.

FIG. 5 is a flowchart that depicts an example of the SWARMER-hub 100, system and an associated computer-implemented method in more detail. In various non-limiting embodiments, a container 582 for "Users (e.g. Actors, Member, Seller, Participant, 3$^{rd}$ Party System/Source, etc.)" comprises a "Campaign Gatekeeper(s) (e.g. Seller, FFL, Gov.)" 583 block, a "SWARMER User(s)/Actor(s) (e.g. Buyers (50) & Weapon Users (76))" 584 block, and "Others" (including other 3$^{rd}$ Party AI systems) 614 block, where each Actor may connect to the SWARMER-hub 100 in container 585 via a pass through monitoring module 587 METER (126), where the user may access the SWARMER-UI 102, with limited 585 SWARMER-hub 100 functionality, and with access to the ID-ACERS functionality in an I.D.-A.C.E.R.S. (103) container.

In various non-limiting embodiments, the SWARMER UI (102) (e.g. Web Browser/UI, Mobile Application, etc.) conditionally allows the user to login in at a step 595, after accepting a set of current and active TOU/TOP(s) Rights, Assign, & Ownership (111) and conditionally passing a set of access requirements protected in a Protective Shield/Shielding (98) 591 container. Here in container 591, also are the "SWARMER/ID-ACERS Parser/Analyzer (96)" in a block 593 and the "SWARMER/ID-ACERS Evaluator (95)" in a block 594.

In various non-limiting embodiments, the SWARMER UI (102) and/or Module/Dashboard (108) allows the user to checks for an active Account (60) per the Account Management (109) module and container 586. If the user is an existing member, where the user is generally a SWARMER member then the Account Management Module would pull the appropriate/suitable TOU/TOP per the Member's ID, role, previously accepted TOU/TOPs, and/or the like.

In various non-limiting embodiments, the login processes advances the users to the appropriate/suitable dashboard functionality in the step 595 from an Overall Dashboard (108) 596, from which he/she has a list of options including an option 597 Negotiation Management (118) module, an option 598 "Financials and Interests, Negotiations, Accounting, Notices, Contracts, Insurance, Legal and Securities—Mgmt" (114) module ("F.I.N.A.N.C.I.A.L.S. Management" 114, "F.I.N.A.N.C.I.A.L.S. Mgmt." 114, or sometimes "FINANCIALS" 114), an option 599 "Timing Information Module for Events and Scheduling" (116) module ("T.I.M.E.S. Management 116," "T.I.M.E.S. Mgmt.," 116 or sometimes "TIMES" 116), an option 600 "Application Data and Segments Tied to Advertising Targeting System" (124) module (A.D.S.T.A.T.S. 124, or sometimes "ADSTATS 124) to create or manage Projects and/or Campaigns 236, an option 601 "Artificial Intelligence Subsystem (AIS 195) & Mgmt. (195) module, an option where the Member may create or manage an existing project in a option Campaign/Mission Campaign/Mission Management (110) module, an option 603 SWARMER Court System Management (including ECORT) (122) module, an option 604 "ID-ACERS" (103) module, and/or an option 592 SWARMER Storage (184) module that stores, among other things, the data pertaining to the modules listed in this embodiment. All modules explained in detail further ahead.

In various non-limiting embodiments, the option 604 ID-ACERS (103) module is comprised of a plurality of ID-ACERS module options, including an option 605 FFL (113) module for approving and approved FFLs; an option 606 Sell (115) module for approving and approved Sellers, where input, data/content, and/or materials may support, produce, and/or evolve into a firearm transaction; an option 607 "Buy" (117) module is for approving and approved buyers; an option 608 "Participants" (119) module for approved Participants; an option 609 "Government/Laws" (121) module for approved government employees, and an option 610 "SWARMER" (125) module for all SWARMER functionality, Events, and Transactions, and/or the like.

Again, depending on the Member's roles and permissions, he/she may utilize the functionality in an option 611\ "Segmentation Engine and Management" (112) module; any results of the Campaign/Project Management (110) utilization and associated functionality afforded by the option modules (109-128), data, statistics, input, and any rules may be stored in a step 612 Rule Engine & Mgmt. (128) module, and/or an option/step 613 "Monitoring Events, Tasks, Errors and Reports" (126) module ("M.E.T.E.R. Management 126," or sometimes M.E.T.E.R. Mgmt. 126, or sometimes "METER" 126), which includes a knowledge management and tracking system (e.g. including Rules, Sourcing, Interrogation Search, and Locator methods, data, information, and statistics).

Next is a step 614 where the SWARMER Member may "Save, Verity, and Distribute: Module Inputs (e.g. 109-128), For Any Campaign (e.g. Project), Terms, Rules, Elements, Tags, Scheduling, Synchronization Rules, etc., and Include Any Pre-existing Terms and Rules" is executed and the appropriate data, statistics, elements, and rules either get pushed to a step 615 "Synchronized with Relevant Users and Restricted (e.g. PIN) (106) Access Environments" and/or a Step 616 "Synchronize with Relevant Users and Public (104) Access Environments."

From step 615, the appropriate data, statistics, elements, and rules get pushed out to either a container 617 "Protective Shield" (98) that comprises the "Restricted (e.g. PIN)" (106) access environment in step 618 and/or the "Internet" 238 in a step 621. In either direction, the elements get directed via "L-SWARMER Server" (185) in a step 619 to systematically synchronize with the data, statistics, elements, and rules currently within the "L-SWARMER Storage" (186) in step 620. For example, one systematic synchronization may include a set of conditions where encrypted Actors are able to communication under certain conditions, say when within a particular range of each other, and when no other harms, issues, foes, and/or the like are ascertained, discerned, and/or actor stated, to a particular threshold to be within a particular range.

From step 616 the appropriate data, statistics, elements, and rules also get pushed out to the Internet 238 in a step 621. From the step 621, connections are made with a variety other steps including but not limited to a step 622 the "Mobile Network" (192), the Internet Site(s), Application(s) and Widget(s) (189) in a step 623 and to the Network (188) in a step 624, and, continuing from the step 621, the appropriate data, statistics, elements, and rules get propagated and systematically synchronized with the "Court System (including ECORT (105))" (107) in a step 625.

Figure 6:
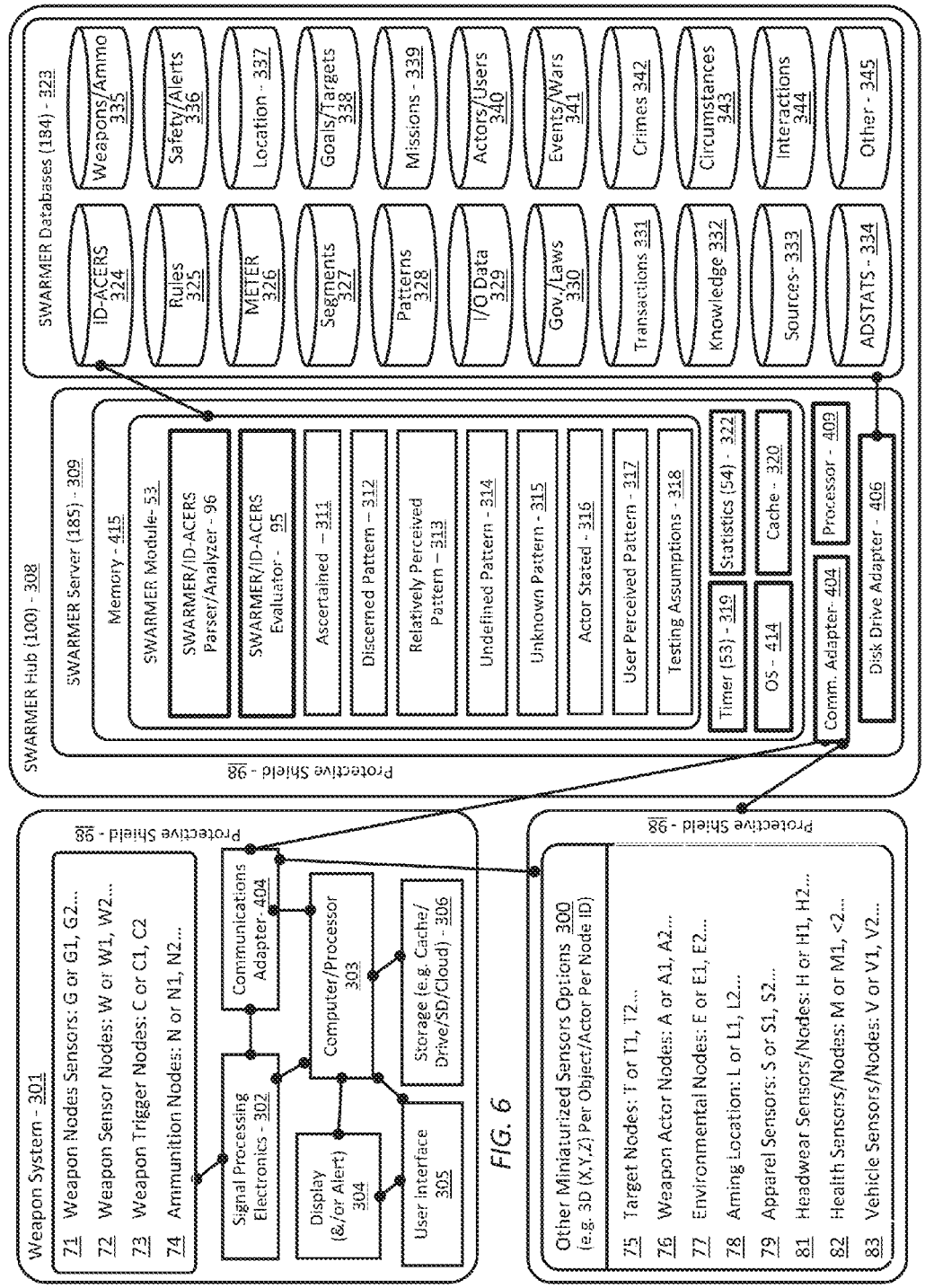
FIG. 6 depicts a schematic view of another embodiment of the SWARMER-Hub 100, wherein the SWARMER Hub 100 is communicatively coupled to a Weapon System 301.
Figure 7:
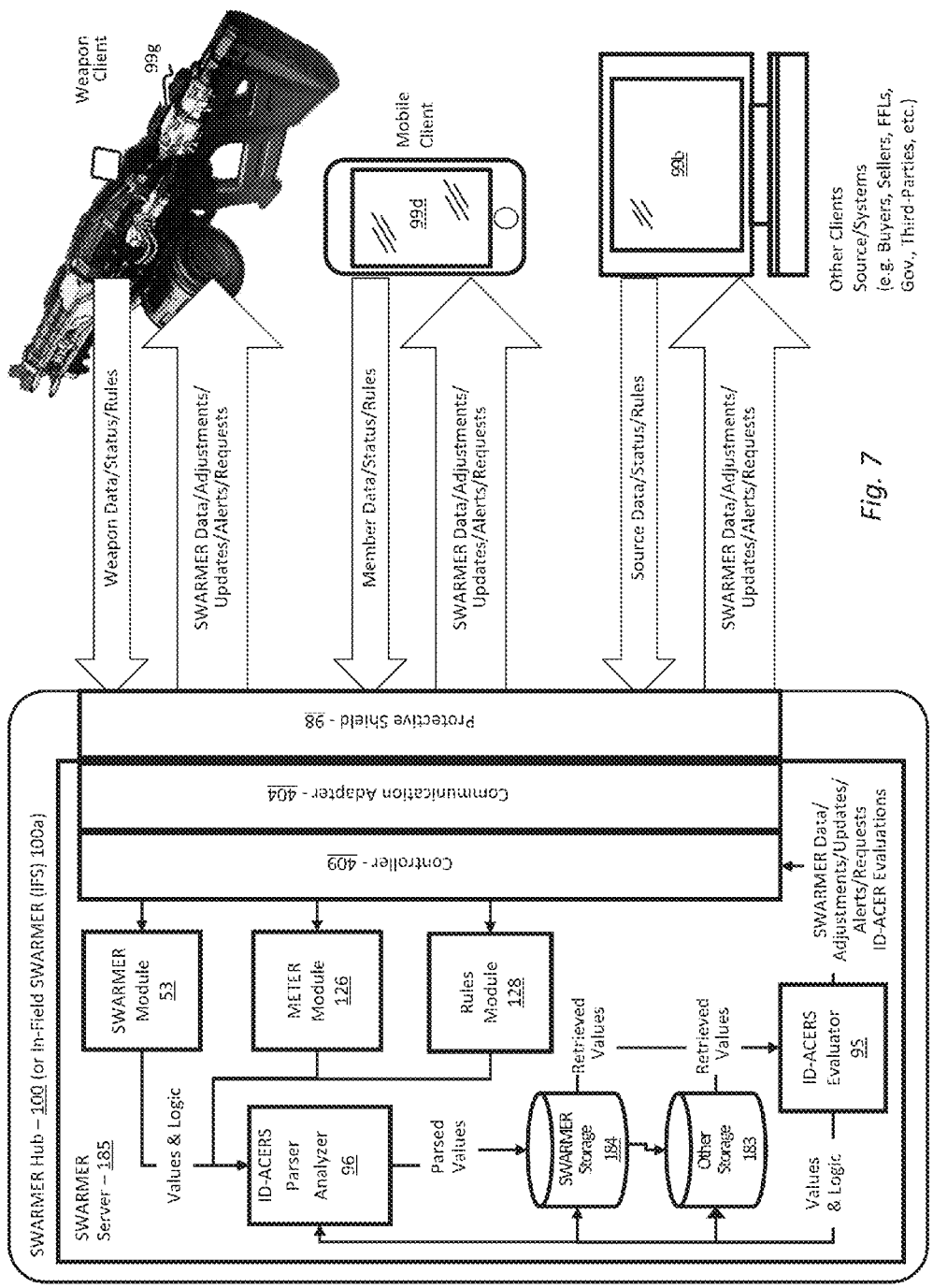
FIG. 7 depicts a schematic view of another embodiment of the SWARMER-Hub 100, wherein the SWARMER Hub 100 is communicatively coupled to a Weapon Client 99g, a Mobile Client 99a, and an Other Clients Source/Systems (e.g. Buyers, Sellers, FFLs, Governmental Agencies, Third-Parties, etc.) 99b."

FIG. 6 depicts a schematic view of another embodiment of the SWARMER-Hub 100, wherein the SWARMER Hub 100 is communicatively coupled to a Weapon System 301. Here, there is a list of Miniaturized Sensors/Nodes 71-79, 81-83, and a list of SWARMER Databases 323-345. FIG. 7 depicts a schematic view of another embodiment of the SWARMER-Hub 100, wherein the SWARMER Hub 100 is communicatively coupled to a Weapon Client 99g, a Mobile Client 99a, and an Other Clients Source/Systems (e.g. Buyers, Sellers, FFLs, Governmental Agencies, Third-Parties, etc.) 99b." In various non-limiting embodiments, the Weapon Client 99g, the Mobile Client 99a, and the Other Clients Source/Systems (e.g. Buyers, Sellers, FFLs, Governmental Agencies, Third-Parties, etc.) 99b can each both send and receive data via a Communication Adapter. Here, the SWARMER Hub-100 has the Protective Shield for communications 98. In various non-limiting embodiments, the Weapon Client 99g can send data to the SWARMER Hub 100, say as a "Weapon Data/Status/Rules" output, data push, response, download, synchronization, and/or the like.

Similarly, the Mobile Client 99a can send data to the SWARMER Hub 100, say as a "Member Data/Status/Rules" output, data push, response, download, synchronization, and/or the like. And similarly, the Other Clients Source/Systems (e.g. Buyers, Sellers, FFLs, Governmental Agencies, Third-Parties, etc.) 99b can send data to the SWARMER Hub 100, say as a "Source Data/Status/Rules" output, data push, response, download, synchronization, and/or the like. For example, in response to a data request from the SWARMER Hub 100, say as an interrogation, interaction, search, request, validation, verification, challenge, assertion, SWARMER court request/decision, and/or the like.

The sending and receiving of data can be done via any appropriate, suitable, and approved connection, such as the Network 188, and/or the Internet 136 (FIGS. 1-4), satellite, mobile/cellular networks, Wifi, Bluetooth, physical connections, and/or the like. In various non-limiting embodiments, there is an IF-SWARMER Hub 100a (not depicted) that can operate independently of the depicted SWARMER Hub 100, in connection with the SWARMER Hub 100, and/or in place of the SWARMER Hub 100 (e.g. thus assuming the functionality of the SWARMER Hub 100). The IF-SWARMER (IFS) 100a can be setup to operate in the field, say during a training mission, rescue mission, combat operations, and/or the like.

In various non-limiting embodiments, the SWARMER Hub-100 (and/or IFS 100a) would preferably be operationally coupled to a client (or a plurality of weapon clients/weapon systems) via a network, such as the networks listed above; however, only Weapon Client 99g is shown for purposes of explanation. In various non-limiting embodiments, the Mobile Client 99a, and the Other Clients Source/Systems (e.g. Buyers, Sellers, FFLs, Governmental Agencies, Third-Parties, etc.) 99b would typically comprise a computer system or mobile device. In various non-limiting embodiments, the Actor using the Weapon Client 99g can use the Weapon UI 175 attached to the Weapon Client 99g, and/or use other clients with the appropriate, suitable, and approved connection, say as approved by a government agency, or issued by the military. For example, a soldier could carry the weapon client 99g and interact with a UI via a glove, headset, googles, mobile client/smartphone, and/or the like.

Mobile Client 99a, and the Other Clients Source/Systems (e.g. Buyers, Sellers, FFLs, Governmental Agencies, Third-Parties, etc.) 99b would typically comprise a computer system or mobile device. In various non-limiting embodiments, the Other Clients Source/Systems (e.g. Buyers, Sellers, FFLs, Governmental Agencies, Third-Parties, etc.) 99b comprises a system (or a server, database, datastore, and/or the like) operated by a weapon Buyer, Seller, FFL, Government agency, and/or a supplier of source data/verifications.

In various non-limiting embodiments, the SWARMER Hub 100 is adapted to relay/transmit (e.g. send and/or receive) data, content, voice commands, interactions, alerts, responses, challenges, updates, and/or the like (e.g. via a data push, pull, talk, voice, audio, video, broadcast, stream, satellite, sensors, imagery, charts, maps, statistics, patterns, and/or the like) with multiple clients. To this end, the SWARMER Hub 100 comprises the Communication Adapter 404 which is operatively connected to the Controller 409 that controls the functionality of the SWARMER Hub 100. In various non-limiting embodiments, the SWARMER Hub 100 further comprises a "SWARMER Server" 185" a SWARMER Module" 53, a "METER Module" 126, a "Rules Module" 128, where each module contains the appropriate logic to route values and logic to an ID-ACERs Parser/Analyzer 96.

From the ID-ACERS Parser/Analyzer 96 the values are parsed and analyzed per the logic, incorporating stored logic, values, and/or updates from a SWARMER Storage 184, and an Other Storage 183, where a lookup routes the "Values and Logic" back to the "ID-ACERS Parser/Analyzer 96. Generated from the ID-ACERS 96 parsing and analysis are new and/or modified Parsed Values (including logic/rules) that are returned and stored at the SWARMER Storage 184, and if appropriate, the Other Storage 183, where then the "Retrieved Values" are routed/sent back to the "ID-ACERS Evaluator" 87. Here, the data, values, logic and/or rules generates a "SWARMER Data/Adjustments/Updates/Alerts/Requests," which are routed through the Controller 114 and onto the transceiver 99 to the appropriate client.

In various non-limiting embodiments, the SWARMER Hub 100 may have its data, rules, logic, table values, content, media and/or the like adjusted remotely, conditionally, searched, acquired, sorted, sequenced, ranked, purchased, bid on, and/or the like. In various non-limiting embodiments, the SWARMER Hub 100 may search, intelligently crawl, monitor, pull, push, score, interrogate, verify, validate, authenticate, and/or the like, data, content, media, IDs, actors, weapons, sales, buyers, environment, circumstances, issues, concerns, times, dates, health, moods, challenges, decisions, and/or the like, over the Network 188 to the clients and/or servers (e.g. sources/systems). In one embodiment, the SWARMER Hub 100 sends and/or receives data and content files according to the IFS out in the field and/or per a specific shielded PIN address/location, encryption scheme, serial number, or network address (e.g., to an IP address, an Electronic Serial Number, Access Network Identifier, Automatic Number Identification, Mobile Equipment Identifier, GSM Cell ID, satellite transponder address/id, and/or the like) of the appropriate recipient/transceiver/client (e.g. the Weapon Client 99g, Mobile Client 99d, and/or the Other Clients Source/Systems (e.g. Buyers, Sellers, FFLs, Governmental Agencies, Third-Parties, etc.) 99b).

Semantic Web (SW) Technologies

In contrast to web linked documents that can be queried by a text string matching and relevance ranking algorithms, a Semantic Web (SW) technologies such as RDF, RDFS, ontologies, and OWL organize, manage, and provide rich user access to complex information assets. The Library of Congress and other national libraries are transitioning from MARC into an RDF/SW bibliographic framework, and have published metadata elements and vocabularies in RDF/SKOS, including those of the Resource Description and Access (RDA) cataloging code. Semantic Web technologies index library bibliographic data. In various non-limiting embodiments, the SWARMER system and associated methods provides information exchange and collaboration platform based in part on relationships, where semantics helps provide the ability to classify and link enormous amounts of data.

Semantic Web Architecture in Layers

Figure 8:
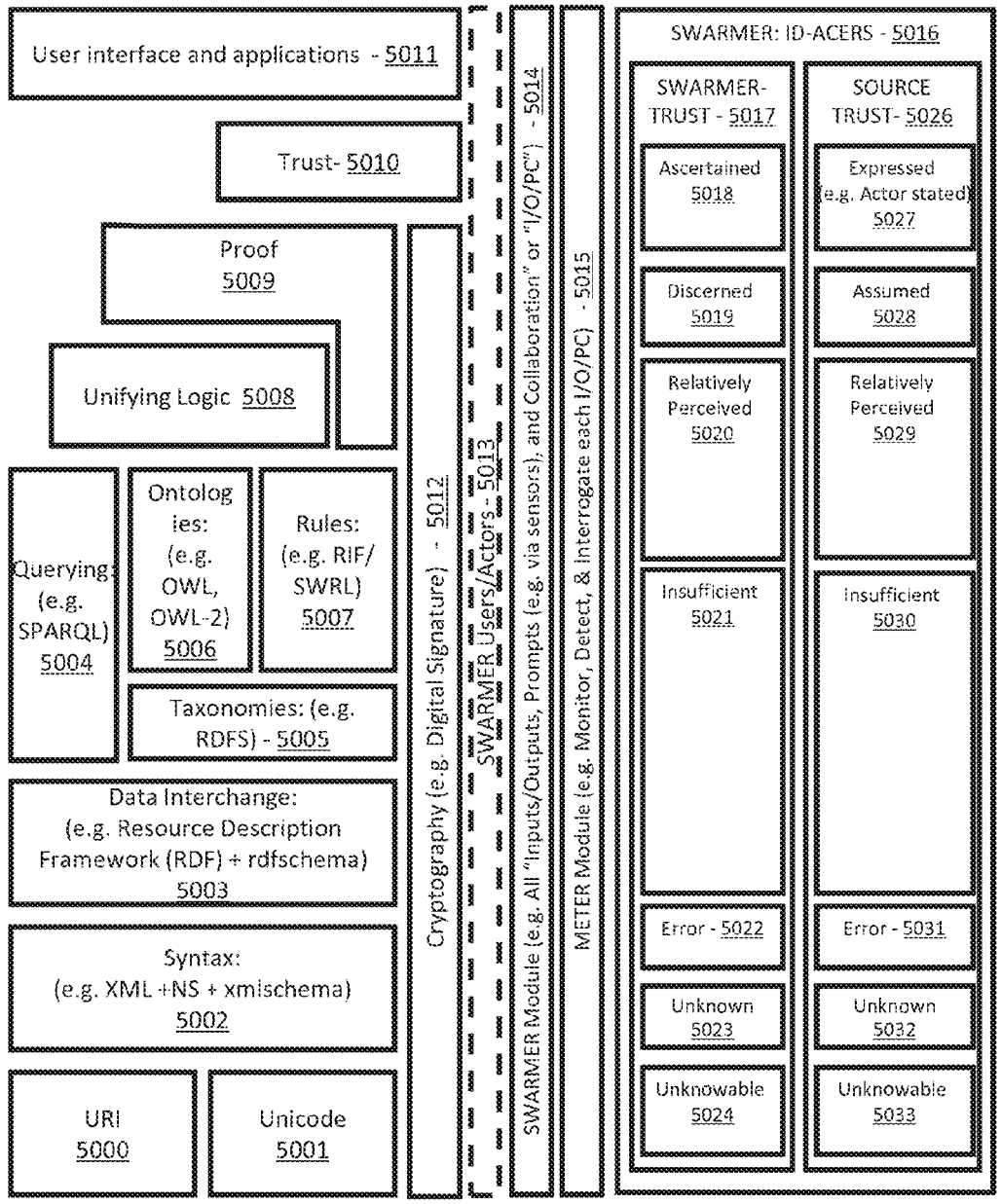
FIG. 8 is an illustrative embodiment of the SWARMER system employing a semantic web-like architecture.

FIG. 8 is an illustrative embodiment of the present disclosure alongside the state of the art for an architecture of the semantic web shown in blocks 5000-5009, as described on a webpage with a "Semantic Web Architecture," by Marek Obitko at: http://obitko.com/tutorials/ontologies-semantic-web/semantic-web-architecture.html. Broadly speaking, a first layer contains an Identifiers: (e.g. Uniform Resource Identifier (URI)) 5000 container and a Character set: (e.g. Unicode) 5001 container, which generally follow the features of the existing World Wide Web (WWW). Unicode 5001 is a standard of encoding international character sets and allows all human languages to be utilized by a machine/computer processor (written and read) on the web using a single standardized format. Uniform Resource Identifier (URI) 5000 is a string of a standardized format that allows to uniquely identifying resources (e.g., documents).

A subset of the URI 5000 is Uniform Resource Locator (URL), which contains access mechanism and a (network) location of a document—such as http://www.example.org/. Another subset of URI 5000 is URN that allows for the identification of a resource without implying its location and means of dereferencing it—an example is urn:isbn:0-123-45678-9. The usage of URI 5000 is important for a distributed internet system as it provides understandable identification of all resources. An international variant to URI is Internationalized Resource Identifier (IRI) that allows usage of Unicode characters in identifier and for which a mapping to URI 5000 is defined. Herein, any reference to URI 5000, IRI can be utilized as well, as a more general concept.

Continuing with FIG. 8, a second layer contains a Syntax 5002, wherein the Syntax 5002 could include Extensible Markup Language (XML) layer with XML namespace and XML schema definitions for establishing/confirming that there is a common syntax used in the semantic web. The XML, broadly speaking, is a general purpose markup language for documents containing structured information. A XML document contains elements that can be nested and that may have attributes and content. A XML namespaces allow for specifying different markup vocabularies in a single XML document. A XML schema serves for expressing schema of a particular set of XML documents.

Broadly speaking and according to Obitko, a core data representation format for semantic web is a Resource Description Framework (RDF). The RDF is a framework for representing information about resources in a graph form. It was primarily intended for representing metadata about WWW resources, such as the title, author, and modification date of a Web page, but it can be used for storing any other data. It is based on triples, wherein a triple includes a "subject-predicate-object" that form a graph of data. Here, all data in the semantic web uses RDF as the primary representation language. The normative syntax for serializing RDF is XML in the RDF/XML form. Formal semantics of RDF are utilized and defined as well.

Per Obitko, the RDF itself serves as a description of a graph formed by the triples, where broadly speaking, anyone can define a vocabulary of terms used for a detailed description. To allow standardized description of taxonomies and other ontological constructs, a RDF Schema (RDFS) was created together with its formal semantics within RDF. RDFS can be used to describe taxonomies of classes and properties and utilized to create lightweight ontologies.

Further, more detailed ontologies may be created with a "Web Ontology Language" (OWL). The OWL, broadly speaking, is a language derived from description logics, and offers more constructs capabilities over the RDFS. The OWL is syntactically embedded into the RDF, so similar to the RDFS, the OWL provides additional standardization of vocabulary. Generally speaking, the OWL comes in three species—OWL Lite for taxonomies and simple constrains, OWL DL for full description logic support, and OWL Full for maximum expressiveness and syntactic freedom of RDF. Since OWL is based on description logic, it includes a formal semantics that is defined for this OWL language.

The RDFS and the OWL have semantics defined and this semantics can be utilized for reasoning within ontologies and knowledge bases described utilizing these languages. To provide rules beyond the constructs available from these languages, some rule languages are being standardized for the semantic web as well. Here, two standards are emerging—a RIF and a SWRL.

When querying the RDF data, as well as RDFS and OWL ontologies with knowledge bases, a Simple Protocol and RDF Query Language (SPARQL) is available. The SPARQL is SQL-like language, but utilizes the RDF triples and resources for both a matching of part of a query and for a returning of results of the query. Since both the RDFS and the OWL are built on the RDF, SPARQL can be utilized for directly querying ontologies and knowledge bases, as well. In addition to being a query language, the SPARQL is also a protocol for accessing RDF data.

According to Obitko article cited above, it is expected that all the semantics and rules will be executed at the layers below Proof and the result will be used to prove deductions. Obitko continues that formal proof together with trusted inputs for the proof will mean that the results can be trusted (under UI & Applications).

The center and right side of FIG. 8 for blocks 5012-5033 is an illustrative example of the Semantic Web Architecture in Layers extended to include the SWARMER Member/User (as a potential ID-ACERS source), the SWARMER module, the METER module, and the ID-ACERS module 5016, for collecting, monitoring, and validating data per perspective, bottom to top, in a non-limiting embodiment. For reliable inputs, cryptography means, such as digital signatures for verification of the origin of the sources where on top of these layers, application with user interface can be built.

The levels of Proof and Trust mentioned by Obitko has limitations. For instance, limitations in expressing a perspective, scope, statement perspective, goal, agenda, purpose, value, party-specific meaning and relevance, say according to a particular perspective. Challenges arise determining the relationship of facts vs. assumptions, especially relative a perspective (e.g. an inventor), group of perspectives (e.g. a list of named infringers/defendants), or a segment of perspectives (e.g. USPTO examiners per an art unit).

Herein the present disclosure, the SWARMER system with its sub-modules (ID-ACERS, METER, SWARMER, AIS) improves the relative reliability (PROOF and TRUST) of data and associate a scope, statement, goal, perspective, agenda, purpose, party-specific meaning (e.g. plaintiff vs. defendant), and relevance, wherein the ID-ACERS is employed to persistently evaluate data, relationships, values, and perspectives relative to a particular user, group of users, segment of users, some combination of these (with intelligent dynamic weighting conditions), some permutation of theses (with intelligent dynamic weighting conditions), and/ or the like.

In various non-limiting embodiments the SWARMER semantic engines are operationally connected to networks beyond the WWW, wherein some networks are PINs and may or may not be shielded from outsiders (e.g. non-approved users), and/or offer limited interactions, on a case-by-case basis. In addition, these limited interactions may involve current data, ontologies, vocabularies, taxonomies, logic, proof scores, trust scores, perspectives, and/or the like.

The SWARMER system allows for the "state-of-knowledge" to be encapsulated relative to a particular moment/ window-in-time, &/or frozen at a moment in time (e.g. historically), here in this instance: Dec. 12, 2002. Further, where information can be retrieved, submitted, merged, evaluated, and/or the like to isolated data sources, support, novelty (relative to time) and anomalies. Where a regression analysis over iterative intervals of time (working regressively) would not only display a visual representation of an evolution of a particular patent claim, product, technology, domain, expertise, and/or the like, in reverse visually, but could isolate the pioneers. Further, it could visually isolate and display relative advances per source in the progress of new technology. Clustering statistical analysis and heat maps could reveal patterns and trends relative to earlier discoveries, shared knowledge, collaborations, and/or the like. Where additional analysis and evaluation would preferably generate a scoring system per patent claim, per product, per technology, per domain, and/or the like relative to those the sources of earlier contributions. Where the earlier contributions would comprise, articles, inventions, research, budgets, brainstorming sessions, communications/ interactions, events, and/or the like.

In FIG. 8, the subset of the URI 5000 is Uniform Resource Locator (URL), which contains access mechanism and a (network) location of a document—includes: http://www.USPTO.gov. The SWARMER system and databases may employ triple stores, and other metadata schemes, and many other types of information organization applications, say librarian-based, catalog-based, metadata-based, taxonomy-based, ontology-based, and/or the like. FIG. 8 is also an illustrative example of the Semantic Web Architecture in Layers, where the SWARMER: ID-ACERS is expanded to depict a degree of Trust range (not necessarily relative to Semantic Web Layers, but relative to the evolution from an Unknowable 5024 I/O/PC up to the an Ascertained 5018 trust level under the SWARMER Trust vs. Perspective of the Source's Trust 5026 (more details in FIGS. 12*a*-12*m*).

In various non-limiting embodiments, the Ontology Management utilizes the SWARMER Hub and UI are where there is an exchange of Concerns, Realizations, Responsibilities, Metadata, Perspectives, and/or the like, incorporated TRIPLEs, a SWARMER Enhanced IP-TRIPLEs, and a SWARMER Enhanced IP-TRIPLE statements.

According to the web link: http://www.w3.org/2004/12/ rules-ws/paper/98/, the TRIPLE was designed as a practical rule language for data manipulation applications. The concept of the Semantic Web has a variety of purposes, functions, utilities, and benefits. For example, the Semantic Web for AI-style (e.g. the SWARMER subsystem AIS) semantic knowledge representation, which leads to knowledge representation languages like OWL.

Another benefit of the Semantic Web is overcoming the syntax of data so that users and developers can concentrate on the semantics of information. For example, the languages and tools for the Semantic Web where it leads to easier and cheaper publishing, understanding, utilization, and reusing of data and services on the Web in an interoperable, collaborative, and scalable way. Generally, languages that help define how different data sets and vocabularies relate to each other are necessary; as languages help provide the glue between (distributed) information systems and data sets. However, designing rule languages for the Semantic Web can present challenges.

A task often cited to achieve on the Semantic Web is to provide tools that drive down the cost of establishing interoperability between different data providers. A rule language can help here: writing rules is generally speaking, relatively faster and cheaper than writing program code, since a rule language has more declarative features and is usually not burdened with the details of a general programming language. Rules typically provide benefits over a software (&/or application, platform, etc.) product's life cycle.

Standardizing such a rule language can several benefits, such as allowing for rule sharing or "knowledge" about how to achieve interoperability. Here, the rule language for the Semantic Web may be seen as a data transformation and glue language—in contrast to a knowledge representation language, which captures knowledge about a certain domain (e.g. Intellectual Property). Broadly speaking, a specific rule language needs a defined semantics (as a basis for implementation) and efficient evaluation mechanisms.

Figure 9:
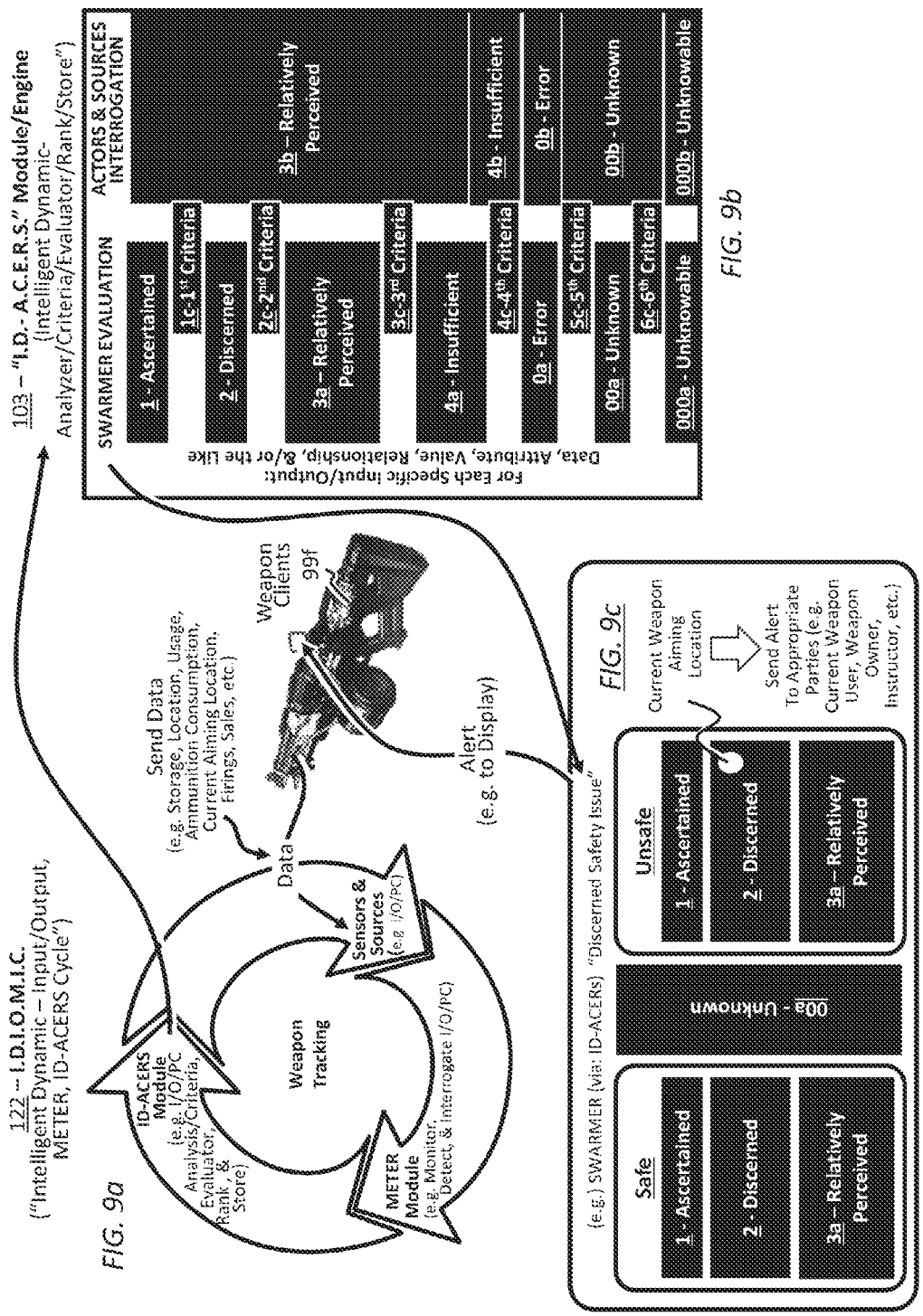
FIG. 9a is a depiction of an illustrative example of an Intelligent Dynamic—Input/Out, METER, ID-ACERS Cycle (I.D.I.O.M.I.C.) in an embodiment.
FIG. 9b, is an example depiction of the SWARMER evaluation results generated by the ID-ACERS parsing, analysis, and/or the like to delineate into different levels of criteria (e.g. 1c—$1^{st}$ Criteria, 2C—$2^{nd}$ Criteria, and so on) for discerned values verses perceived values.
FIG. 9c is an example depiction of the SWARMER Evaluation which produced a "Discerned Safety Issue," in an embodiment.

FIG. 9a is a depiction of an illustrative example of an Intelligent Dynamic—Input/Out, METER, ID-ACERS Cycle (I.D.I.O.M.I.C.) in an embodiment. Here, in FIG. 9a there is a cycle for Weapon Tracking, where data (e.g. PO/PC) from Clients (e.g. the Weapon Client 99g) comes in, say via "Sensors and Sources," then becomes monitored via the "METER module (e.g. Monitor, Detect, & Interrogate I/O/PC)," then advances to the "ID-ACERS Module (e.g. I/O/PC Analysis/Criteria, Evaluator, Rank & Store)".

In various non-limiting embodiments, the data from the clients (e.g. Weapon Clients 99g) are persistently, systematically, conditionally, and/or actor/user-selectively, continually monitored, cycled, and/or the like, for any new, modified data, requested, and/or the like (e.g. I/O/PC via sensor and sources to/through the METER module), data, interrogation results, views, notifications, acknowledgements, modifications, (e.g. changes to any I/O/PC data, data, meta data, relationships, correlations, goals, missions, targets, environments, buyers, sellers, FFLs, the overlap, the fitness criteria, thresholds, conditions, rules, values, variables, formulas, statistics, comparison pools, segments, users, members, roles, actors, status, challenges, employment status, entity status, TOU/TOP, validations, verifications, predictions, analysis, evaluations, criteria, perceptions, circumstances, and/or the like.

The results in FIG. 9a from the ID-ACERS parsing, analysis, and/or the like is delineated into a SWARMER Evaluation, as depicted in an illustrative example in FIG. 9b, where different levels of criteria (e.g. 1c—1$^{st}$ Criteria, 2C—2$^{nd}$ Criteria, and so on) must be met for data to become, say from "Relatively Perceived" 3a to become "Discerned" 2 under the SWARMER Evaluation (verses the evaluation on right, by/from the Actors & Sources Interrogation").

Next, the SWARMER Evaluation may produce a "Discerned Safety Issue," as is depicted in FIG. 9c. Here, for example, the SWARMER (Via the ID-ACERS) has discerned that a particular weapon client, which currently has an aiming location discerned to be "Unsafe," say do to potential harm if the trigger went off. The Discerned Safety Issue from the Current Weapon Aiming Location can trigger/prompt the SWARMER system 100 (or IFS 100a) to "Send [an] Alert To Appropriate Parties (e.g. Current Weapon User, Weapon Owner, Instructor, and/or the like."

Figure 10:
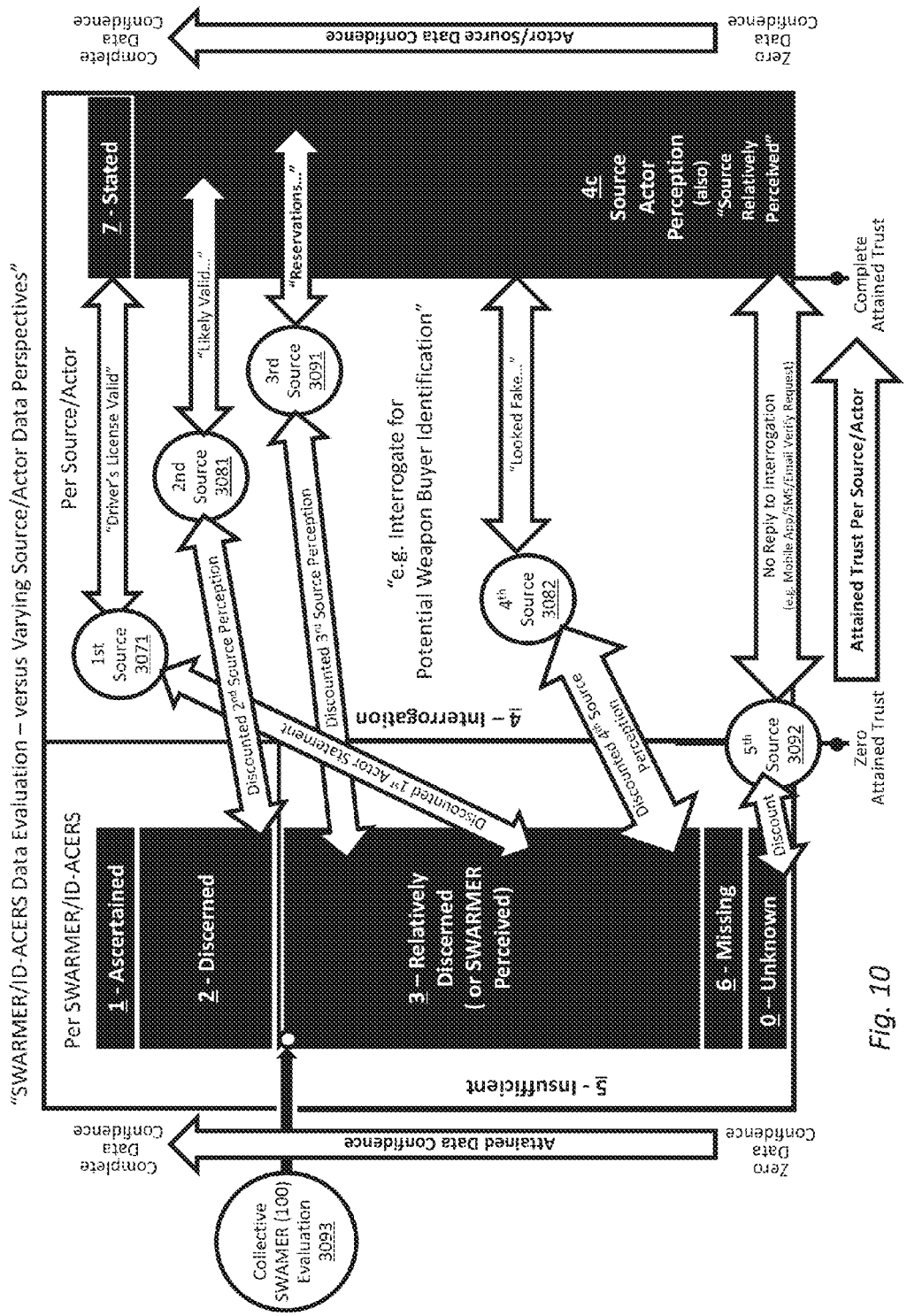
FIG. 10 (similar to FIG. 9b) depicts a graph example and non-limiting embodiment of the "SWARMER/ID-ACERS Data Evaluation—verses "Actors/Source Interrogations" depicted in FIG. 9b.

FIG. 10 (similar to FIG. 9b) depicts a graph example and non-limiting embodiment of the "SWARMER/ID-ACERS Data Evaluation—verses "Actors/Source Interrogations" depicted in FIG. 9b. Here, a plurality of sources have provided a data input, wherein the data input is generally from the perspective of the source, where the data input may be an assertion of fact, a state of knowledge, visualization, experience, skill, education, circumstances, success, accomplishment, progress, validation, verification, authentication, and/or just about any kind of data input possible. In various non-limiting embodiment, the ID-ACERS of the SWARMER system, evaluates the input from source based on a regression analysis of previous inputs from the same source, similar sources, similar queries, and/or just about any correlation that can be drawn to determine relatively reliability of the source. In various non-limiting embodiment, the ID-ACERS would preferably discount a particular source and/or his/her/its assertion/data-input, relative the regression analysis. For example, a 1$^{st}$ source 3071 (here a 1$^{st}$ Source/Actor) has made a "stated" assertion that his driver's license ID is valid, but where ID-ACERS has relatively heavily discounted the statement down into the range as illustrated of a "relatively discerned" (sometimes referred to as "relatively perceived"). In various non-limiting embodiments, "relatively discerned," is interchangeable with "relatively perceived," but typically "relatively discerned," would be reserved for the SWARMER's perspective, whereas "relatively perceived" would represent a perspective of a source or actor (e.g. user/SWARMER member), to help differentiate the two perspectives.

Referring to the FIG. 10, the first source may be relative new to the SWARMER system where there is relatively little data available to "discern" or "ascertain" the statement provided by the first actor. Further, the TOP, a government/company/entity policy/rule and/or the like, may include conditions and rules, where certain statements are relatively heavily discounted until a number of conditions are met, say validation from a particular backup source, and/or validation from at least two sources, with at least some condition/threshold of reliability, such as the claim of a valid driver's license. Whereas, some actor statements may be subjective, such as the "good citizen," "safe neighborhood," may include/require a condition of peer review. Whereas, some actor statements may be for purchasing a firearm, such as "Have you ever been convicted in any court of a felony, or any other crime, for which the judge could have imprisoned you for more than one year, even if you received a shorter sentence including probation?," which will require a background check.

When a second source 3081 was queried for his/her/its perception of the validity of the first actor's driver's license, he/she/it stated with a relatively high level of confidence (see illustration) that he/she/it believes that the driver's license was valid. Whereas, a third source 3091, stated that he/she/it had some reservations due to the format of the driver's license for that particular state and no credit history at that address," where the system could allow the sources to provide support for such allegations, assertions, beliefs, and/or the like, say via, charts, statistics, tables, maps, images, dates, receipts, photos, video, audio, emails, and/or the like.

Further, where the sources could update his/her/its stated belief with, say a new/updated statement, based upon new/updated proof, say presenting a relatively higher or lower confidence setting from his/her/its past degree of confidence. Depending on the TOP/TOUs, he/she/it could also remove or request to remove previous proof, witness, and/or support or challenge other sources assertions. In addition, the sequence of event could also play a role in how discounted a particular source was or was not, where over time the source would become relatively more or less creditable based upon data inputs, removals/additions, requests to remove/add, other sources, events, circumstances, patterns, and/or the like.

Further, the system could incorporate the ramifications and/or liability, of a particular statement, where for example, if the driver's license found to be invalid by the first actor, he/she would potentially, and/or definitely jeopardize his/his status and future creditability. A forth source 3082 stated that driver's license looked fake, but with a relatively low degree of confidence, thus a relatively low reading over on the SWARMER ID-ACERS evaluation side of the Actor's input.

Further, a 5$^{th}$ source 3092 has provided "no reply." Here the SWARMER, may attempt to reconnect with the source, say via email and/or another channel. Until such interaction, the 5$^{th}$ source is discounted to a zero or "unknown" value, since he/she/it hasn't replied. Depending on the conditions of the TOP and the source being queried/interrogated, for lack of a response, may also harm one's own creditability, status within the system, reliability score, and/or the like. For instance, if the 5$^{th}$ source is a person with firsthand knowledge of the first actor's current address (e.g. an employer) with an employee requesting the input or validation specifically from him/her, such a lack of response may cost the 5$^{th}$ source reliability points.

However, if the 5$^{th}$ source has a previous reputation for being relatively reliable, and relatively accurate when compared to, say the other sources, and/or the like, a hesitation to reply, or no reply could be factored into the reliability of the other sources, including his/her employee, and/or the first actor, say as a perceived avoidance.

The present disclosure has advanced an ID-ACERS module which supports various methods, which include, but are not limited to, the following methods, which can themselves include various methods. In various non-limiting embodiment, the SWARMER system and associated computer-implemented methods would preferably track a variety of user behaviors, devices, clients, inputs, consumption, usage patterns and/or the like. In various non-limiting embodiment, the SWARMER system would preferably monitor and classify a first usage pattern from a plurality of inputs from an at least one node/sensor (e.g. a weapon client/sensor, computer, mobile device, etc.); wherein the first usage pattern is stored as a first stored usage pattern; monitoring the plurality of inputs of the at least one node; determining, if a second usage pattern of the at least one node meets a stored relationship policy in relationship with the first stored usage pattern; and generating and transmitting an event in accordance with the determination of the stored relationship policy. Further, wherein the first usage pattern from the plurality of inputs from the at least one node (e.g. a computer, mobile device, etc.) would preferably be persistently monitored, crawl, extract, index, classify, track, interrogated and/or the like by the system.

In various non-limiting embodiment, the classifications of the first usage pattern from the plurality of inputs from the at least one node/sensor (e.g. a weapon client/sensor, computer, mobile device, etc.) would preferably generate a plurality of semantic triples to store in a triple store. Further, wherein the triple store would preferably by evaluated to A/D/RP/S/P the relatively likelihood that a particular element from the option list is satisfied (e.g. creditability-related data/triples, reliability-related data/triples, accuracy-related data/triples, strength-related-data/triples, health-related-data/triples, circumstance-related data/triples, pressure-situation-skills-related data/triples, demographic-related data/triples, psychographic-related data/triples, behavior-related data/triples, instructor-related data/triples, influencer-related data/triples, abandonment-related data/triples, event sequence-related data/triples, paid-related data/triples, terms-related data/triples, quantity-related data/triples, consumption-related data/triples, and other data/stats-related data/triples. For instance, the relative perception or discernment of a user characteristic, consumption, behavior, pattern, and/or the like.

In various non-limiting embodiment, the behavior-related data/triples would comprise data, usage, patterns and relationships for weapon usage, shopping history (e.g. ammunition, weapons, credit card data, online, etc.), web browsing, mobile device usage, and/or the like. In various non-limiting embodiment, the stored relationship policy in relationship with the first stored usage pattern could incorporate a predefined sequence, where a particular input would trigger the event. Further, the stored relationship policy in relationship with the first stored usage pattern could incorporate a predefined input within the predefined sequence, where a particular input would trigger the event. In various non-limiting embodiment, the generated and transmitted event in accordance with the determination of the stored relationship policy would be store the values and employ the ID-ACERS to validate any data.

In various non-limiting embodiment, the stored relationship policy in relationship with the first stored usage pattern is affected by an input from the group comprising the plurality of inputs from the at least one node, a plurality of inputs from a plurality of nodes, a plurality of inputs from a predefined group of nodes, a plurality of inputs from a predefined segmentation of nodes (e.g. via RDF triples), some combinations of these inputs, or some permutation of these inputs. In various non-limiting embodiment, all relationships could be parsed into triples and evaluated by the ID-ACERS.

Figure 11:
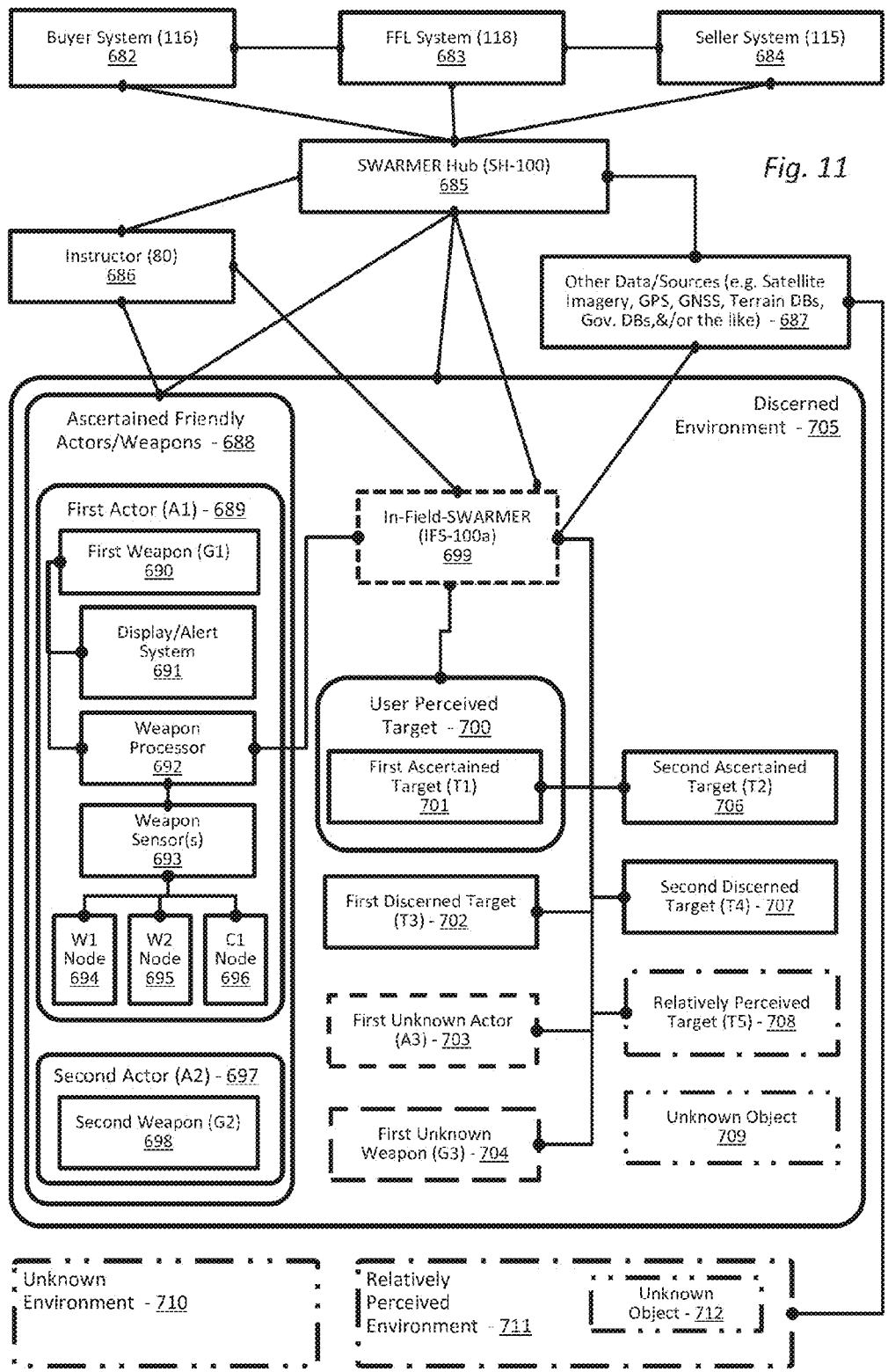
FIG. 11 is a functional block diagram depicting the relationships between a variety of SWARMER actors and environments.

FIG. 11 is a functional block diagram depicting the relationships between a variety of SWARMER actors and environments.

Figure 12:
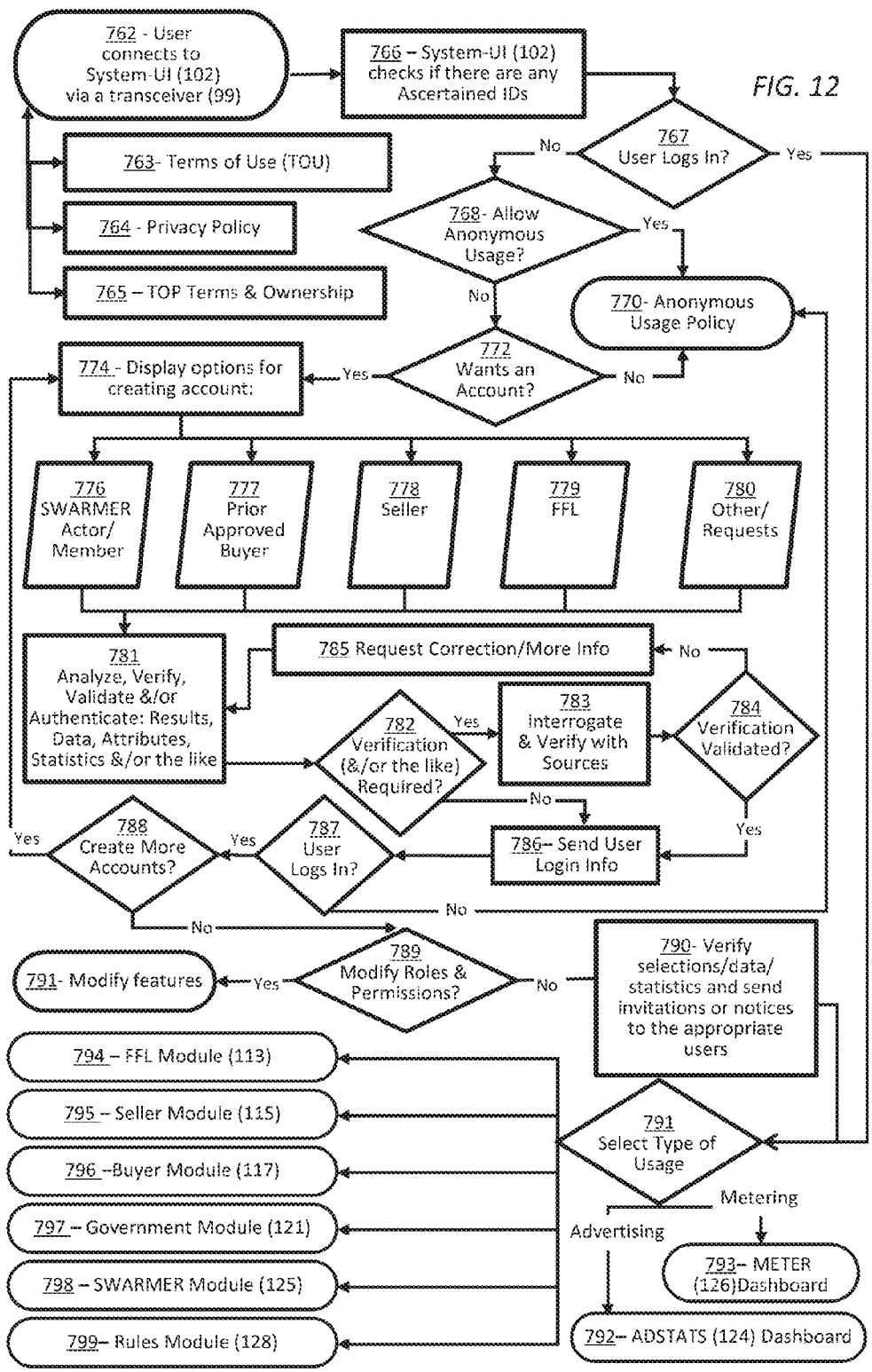
FIG. 12 is a flowchart depicting an embodiment and example of the user creating an Account (60) using the SWARMER-UI 102.

FIG. 12 is a flowchart depicting an embodiment and example of the user creating an Account (60) using the SWARMER-UI 102. Starting with a step 762 where a "User connects to SWARMER-UI (102) via a transceiver 99," he/she may view a Terms of Use (TOU) in a step 763," which is generally referred to as the terms set by the SWARMER in general, but may be conditionally modified and/or added to by a particular PAC/PIN, entity, campaign/project and/or the like. A step 764 for a "Privacy Policy" and/or the "TOP Terms and Ownership (including Assignments)" in a step 765.

In a step 766, "SWARMER-UI (102) check if there are any ascertained IDs" for the user. When the user first employs the SWARMER-UI 102, a unique session ID is generated and stored until the user creates an Account (60) and/or logins. This allows for anonymous usage while still retaining essential data/statistics for the user and allowing for relative efficient functionality. In various non-limiting embodiments, the SWARMER may maintain tracking cookies per communication device and/or per user depending on what is known, what may be retained, and the permissions and roles of the user, but for most creative work that requires security and tracking, a login is required.

A query 767 asks if the "User Logs in?" If the answer is "yes" to query 767, the user jumps to a step 794, "Select Type of Usage?" If the answer to query 767 is instead "no," a query 768 asks if the SWARMER-UI (102) is setup to "Allow Anonymous Usage?" If the answer to query 768 is "yes," the user receives a 770 terminator with an "Anonymous Usage Policy." If the answer to query 768 is "No," then the user is sent to a query 772, which asks the user if he/she "Wants an Account?"

If the user decides the answer to query 772 is "no," then the user receives the 770 terminator with the "Anonymous Usage Policy," which, in this instance, the SWARMER System may discern the user's UI path and the policy may read differently than the policy viewed/read coming from query 768. If the answer to query 772 is instead "yes," where the user wants an Account (60), the user is passed to a step 774 that "Displays options for creating (an) Account (60)."

Now the user in this embodiment may identify him or her according to a set of predefined high-level Membership types (other Membership types and role delineations described in detail ahead). In this condensed list of membership choices example, there is a list of options including a "SWARMER Actor/Member" 776 option, a "Prior Approved Buyer" 777 member option, a "Seller" 778 member option, a "FFL" 779 member option, and an "Other/Requests" 780 is a catchall membership option for all other acceptable options and/or requests. This Other/Request 780 helps the SWARMER identify demand for other types of membership options.

After the options are selected, an "Analyze, Verify, Validate &/or Authenticate: Results, Data, Attributes, Statistics &/or the like" in a step 781. Next a query 782 asks if a "Verification (&/or the like) Required?" for the membership role. If the answer to query 782 is "no," then the SWARMER Operating Environment generates the appropriate SWARMER membership ID and role and a step 786 will "Send User Login Info" generally in an email, where he/she may login.

If the answer to query 782 is instead "yes," then a subsequent query 783 asks if an "Interrogate & Verify with Sources?" where the SWARMER Operating Environment compares the interrogation and verifies the sources submitted by the user against the appropriate databases (e.g. PTO, SWARMER-hub, PIN, State Bar Associations, and the like). If the answer to query 784 is "yes," where the validation data/statistics was verified, the SWARMER and/or PIN generates the appropriate SWARMER membership ID and role. In various non-limiting embodiments, the subsequent step 786 the will "Send User Login Info" generally in an email, where he/she may login. If the answer to query 784 is instead "no," where some or all of the validation data/statistics submitted by the user could not be properly verified, then a step 785 will send a "Request Corrections/More Information" to the user either while he/she is in standby in step 782 and/or in an email where the user may check for errors in the supplied validation data/statistics and/or comment any perceived issues and/or potential verification delays/issues.

If there are errors in the Validation Data/Statistics, the user may make the appropriate corrections and resubmit the updated validation data/statistics for verification. If the user fails to get verified as a registered Patent Attorney (44), for example, he/she could continue to utilize the SWARMER under the TOU/TOP of the Basic SWARMER Member. The user receives the login information in step 786, and if he/she does not log in at a query 787 that asks if a "User Logs In?" then he/she may be forwarded to the terminator 770 for Anonymous Usage Policy.

If the answer to query 787 is instead "yes," then the SWARMER System executes the settings, rules, and conditions, along with any default setting associated with the type of Account 60, SWARMER TOU, and TOP settings. And he/she is forwarded to a query 788, which asks whether the new Member wants to "Create More Accounts?' for other people, such as those co-workers, co-sellers, co-buyers, manufacturers, partners, government agencies, researchers, subordinates, employees, contractors, associates, past associates and the like, where the SWARMER Operating Environment may forward them any appropriate information and requests for validation data/statistics not supplied and the SWARMER membership qualifications, definition standards, including any added TOU/TOP rules.

If the answer to query 788 is "yes," the SWARMER member is routed back to the step 774. If the answer to query 788 is instead "no," then the SWARMER Member is passed to a query 789 that asks if the SWARMER Member wants to "Modify Roles and Permissions?" If the answer to query 789 is "yes," the SWARMER Member is passed to a terminator 775 "Modify Features," which explained more in the next Fig, with the functionality of setting up roles and permissions.

If the answer to query 789 is instead "no," then the SWARMER Member is passed to a step 790 that "Verifies selections and send invitations or notices to the appropriate users." In various non-limiting embodiments, the SWARMER Operating Environment then tracks which invitations get accepted and when. Next, the process proceeds to a query 791 to, for example, allow for the selection of the type of system usage sought.

If the answer to query 791 is that the member wants to view and/or work on an advertising or PR campaigns/projects, then the member is passed to a 792 terminator, which is the "ADSTATS (124) Dashboard," with the functionality appropriate to the member's role and permission settings. ADSTATS and associated functionally may track who, when, where, what and how advertisements were created and implemented to credit who was perceived to be first to create a specific campaign, advertisement data/content, element, targeting rules, and/or targeting rule.

If the answer to query 791 is instead that the member wants to view, review, manage, monitor, and/or the like, data inputs/outputs and/or METER rules, then the member is passed to a 793 terminator which is the "METER (126) Dashboard," with the functionality appropriate to the member's role and permission settings. METER and associated functionally may track and analyze (e.g. meter) who, when, where, what and how specific inputs or/and correlations effect data reliability, accuracy, urgency, content, rights, transaction, correlation, causation, success, and/or the like (e.g. who, what, where, when and how was an input and/or correlation effecting/ed a request, verification, modifications, and/or the like, known, stated, discerned, and/or relatively perceived to be relatively a reliable, accurate, timely, and/or the like; and metering rule.

If the answer to query 791 is instead that the member wants to view, review, manage, monitor, and/or the like, data inputs/outputs and/or FFL rules, then the member is passed to a 794 terminator which is the "FFL Module (113) Dashboard," with the functionality appropriate to the member's role and permission settings. If the answer to query 791 is instead that the member wants to view, review, manage, monitor, and/or the like, data inputs/outputs and/or Seller rules, then the member is passed to a 795 terminator which is the "Seller Module (115) Dashboard," with the functionality appropriate to the member's role and permission settings. If the answer to query 791 is instead that the member wants to view, review, manage, monitor, and/or the like, data inputs/outputs and/or Buyer rules, then the member is passed to a 796 terminator which is the "Buyer Module (117) Dashboard," with the functionality appropriate to the member's role and permission settings.

If the answer to query 791 is instead that the member wants to view, review, manage, monitor, and/or the like, data inputs/outputs and/or Government rules, then the member is passed to a 797 terminator which is the "Government Module (121) Dashboard," with the functionality appropriate to the member's role and permission settings. If the answer to query 791 is instead that the member wants to view, review, manage, monitor, and/or the like, data inputs/outputs and/or Transaction rules, then the member is passed to a 798 terminator which is the "SWARMER Module (125) Dashboard," with the functionality appropriate to the member's role and permission settings. If the answer to query 791 is instead that the member wants to view, review, manage, monitor, and/or the like, data inputs/outputs and/or SWAMER rules, then the member is passed to a 799 terminator which is the "Rules Module (128) Dashboard," with the functionality appropriate to the member's role and permission settings.

Figure 13:
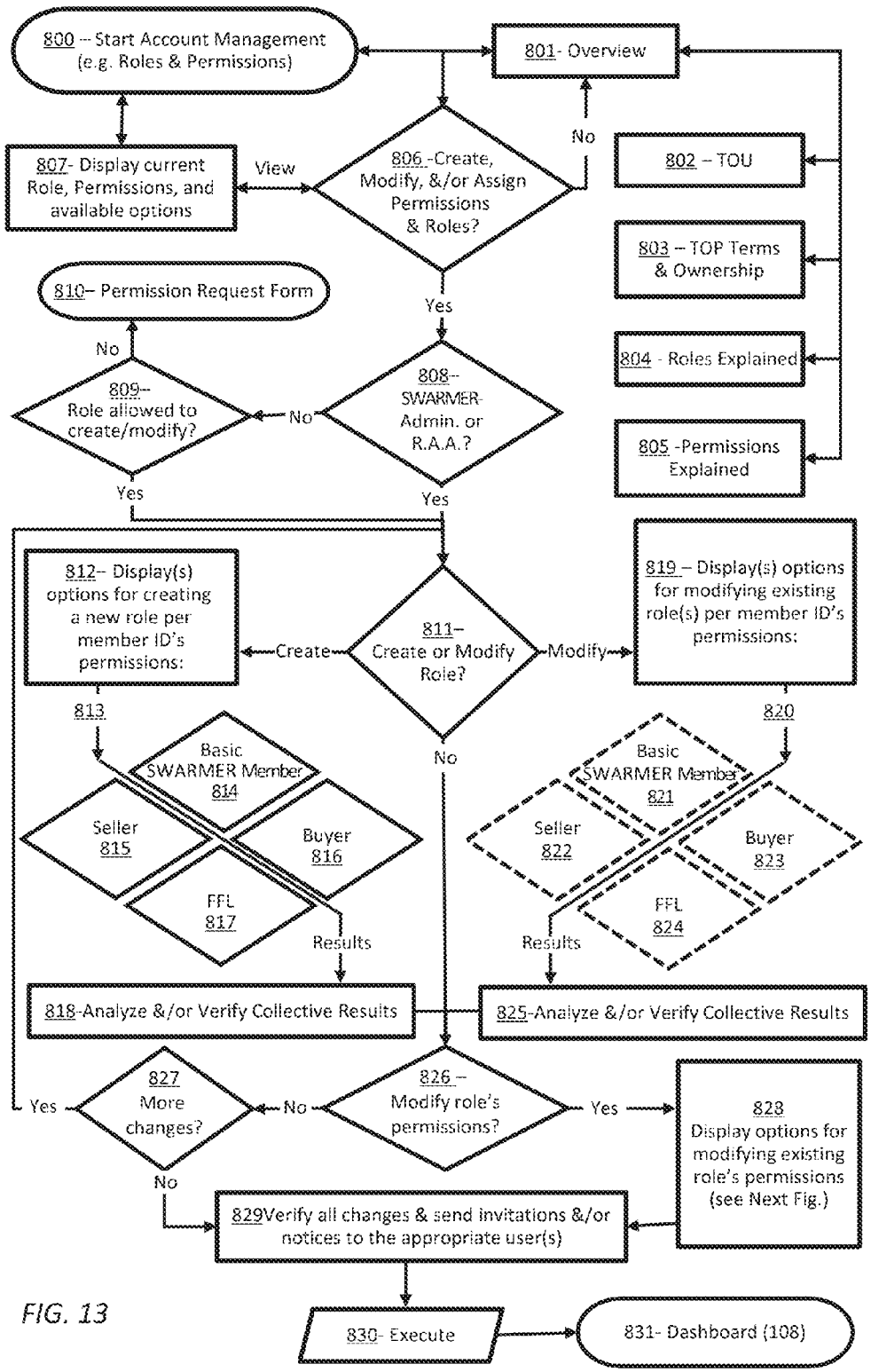
FIG. 13 is a flowchart depicting the member creating and modifying members' roles and permissions.

FIG. 13 is a flowchart depicting the member creating and modifying members' roles and permissions. In various non-limiting embodiments, the SWARMER 100 system includes, but not limited to, the following Participants (80), members, roles, and/or users who enroll or are pre-assigned to utilize SWARMER-UI 102 system: a "Restricted Account Administrator" (48) ("R.A.A." or "RAA" or sometimes referred to as a P.A.A. for PIN Account Administrator) 48. In various non-limiting embodiments, the RAA (48) Role classification is a specific Account 60 role with administrative permissions that allows him/her to manage the Account 60. In various non-limiting embodiments, the RAA (48) Role classification may also have other roles. For instance, the RAA (48) could also possess the permissions of the Seller 70 role and/or all other roles' permissions available.

Starting with a step 800 "Start Account Management (e.g. Roles and Permissions)," where the user is already a member and connected to SWARMER-UI (102) via a transceiver (99) via the FFL Dashboard (113), he/she may "Display current Role, Permissions, and available options" in a step 807. The member may also go to a step 801 "Overview," which provides more detailed information in a step 802 for the "TOU" (Terms Of Use), a step 803 for the "TOP Terms and Ownership," a step 804 "Roles Explained," and a step 805 "Permissions Explained." A query 806 asks whether the member wants to "Create, Modify, and/or Assign Permissions and Roles?" If the answer to query 806 is "no," then the member is routed back to step 801 "Overview." If the answer to query 806 is instead "yes," then the SWARMER System determines in a query 808 whether the member is a "SWARMER Admin. or R.A.A.?" will broad privileges.

If the answer to query 808 is "yes," then the member who is either a SWARMER-Admin. or R.A.A. and is passed to a step 811 "Create or Modify Role?" If the answer to query 808 is instead "no," then the member, who is neither the SWARMER-Admin nor the R.A.A., is passed to a query 809 which asks if the "Role (is) allowed to create/modify?" If the answer to query 809 is "yes," then the member is also passed to the query 811. If the answer to query 809 is instead "no," the member is passed to a terminator 810, which is a "Permission Request Form," where the member may request the ability to change his/her role, and/or request for someone else with the proper permissions to change his/her role. This request would be passed to the appropriate role or roles for determination(s), generally the Account 60 manager and/or RAA (48), but could also be another Seller the member would like to contribute to or co-sell with.

For those members with the proper roles and permissions back at the query 811 asking whether he/she has a "Create or Modify Role?" where, if the answer is "create" a new role, then he/she gets passed to a step 812 which "Display(s) options for creating a new role based on member ID's permissions." His or her permissions allow them to create a new role in a section of options 813, with the choices of a "Basic SWARMER Member" 814, a "Seller" 815, a Buyer 816, and/or a "FFL" 817.

In various non-limiting embodiments, the SWARMER Operating Environment may in turn validate that each is the requested role, where the results of step 813 get passed to a step 818, which "Analyze &/or Verify Collective Results." From there the member gets passed to a query 826, which asks if the member wants to "Modify role's permissions?"

Back at query 811, the member also has the option to "modify" an existing role, and similar to step 812, he/she then gets passed to a step 819, which "Display(s) options for modifying existing role(s) per member ID's permissions." In various non-limiting embodiments, then with his or her proper permissions to modify an existing role, he/she proceeds to a section of appropriate options 820 (similar to 826, but based upon the member's current role and permissions), with the choices of a "Basic SWARMER Member 821, a "Seller" 822, a "Buyer" 823, and/or a "FFL" 824. The results of step 820 get passed to a step 825, which again "Analyze &/or Verify Collective Results" the same as the step 818. From there the member gets passed to the query 826, which asks if the member wants to "Modify role's permissions?"

If the answer to query 826 is "no," the member gets passed to a query 827 that asks if the member has "More Changes?" to make. If the answer to query 827 is "yes," then the member is passed back to the query 811 to the "Create or Modify Roles?" If the answer to query 827 is instead "no," then the member gets passed to a step 829, which "Verifies all changes and sends invitations and/or notices to the appropriate member(s)."

If the answer back at query 826 is "yes" to "Modify role's permissions?" then the member would be passed to a step 828, which "Displays options for modifying (an) existing role's permissions." From step 828, the member gets passed to the step 829, which "Verifies all changes and sends invitations and/or notices to the appropriate user(s)," which may verify the selections with the user and permissions with the SWARMER System. In various non-limiting embodiments, the method may also send out the appropriate information to the appropriate parties and/or systems to validate data/statistics, such as the background of a potential buyer, for a particular firearm in a particular location, when appropriate. From step 829, the user is passed to an execution 830 to "execute" before passing on to a terminator 831, which goes back to the Dashboard (108).

Figure 14:
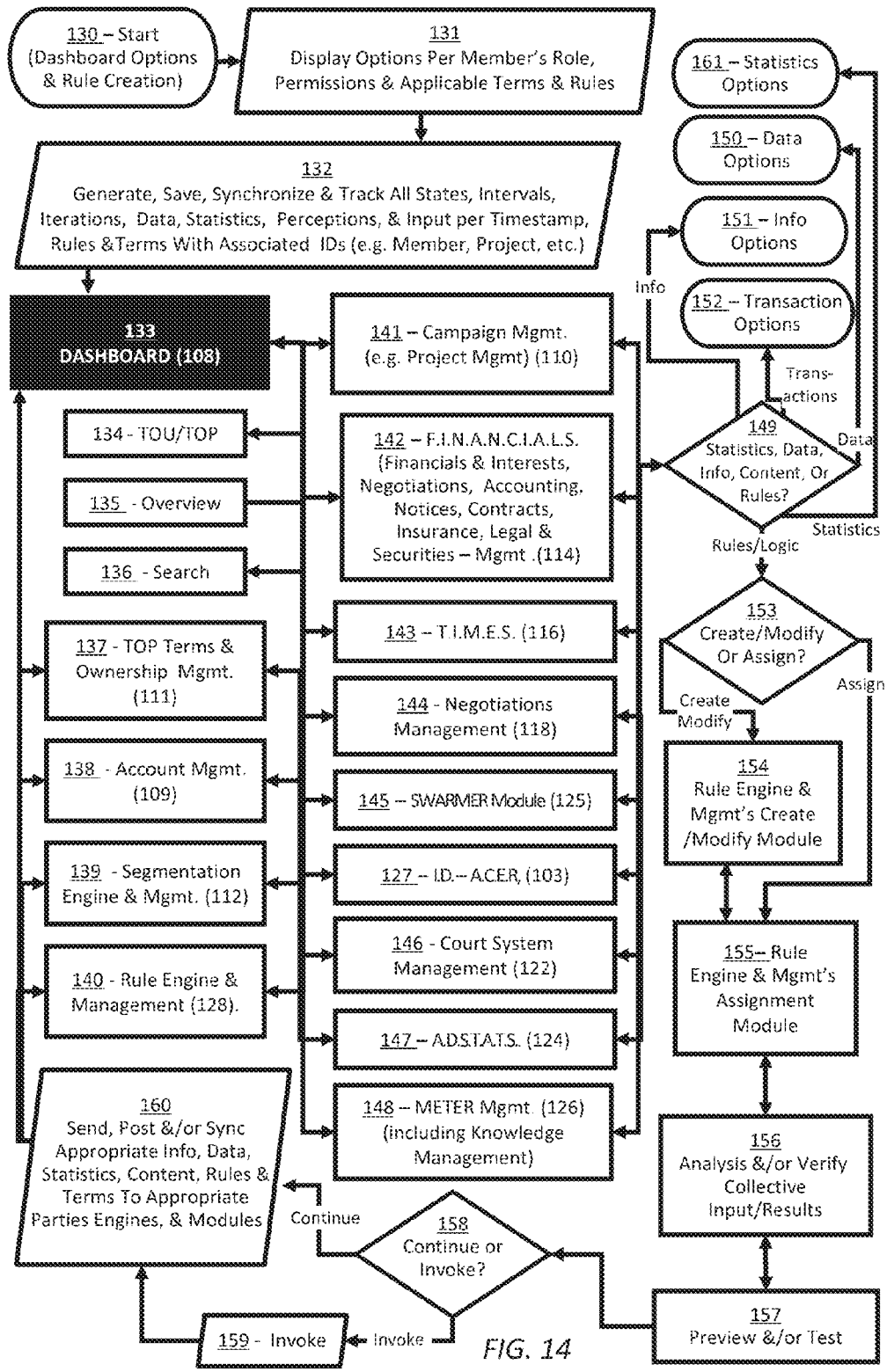
FIG. 14 is a flowchart that depicts the Dashboard Options from the SWARMER-UI 102 and the functionality basics for the user to create and assign a rule in an embodiment.

FIG. 14 is a flowchart that depicts the Dashboard Options from the SWARMER-UI 102 and the functionality basics for the user to create and assign a rule in an embodiment. In various non-limiting embodiments, there are several methods to create and deploy rules. In one embodiment, the SWARMER Operating Environment 101 could employ Process Engines, which allow the user to describe/define some or all the steps in a process, where those steps also involve decision points, which are themselves a relatively simple rule.

In another embodiment, the SWARMER Operating Environment 101 employs a rule engine, where generally the data is in the domain objects and logic is in the rules. This allows for breaking the object oriented ("00") coupling of data and logic, so that the logic is laid out in rules. Instead of the logic being spread across many domain objects or controllers, the logic in this embodiment may generally all be organized in one or more very distinct rule files. Even if the logic itself is relatively simple, this decoupling provides for more agility for relatively frequently changing and testing rules.

By employing rules, the SWARMER Operating Environment generates a repository of knowledge (a knowledge base/state), which is executable. Rule systems may effectively log the decisions made by the rule engine, along with why the decisions were made to provide an explanation and feedback, as well as an ability to relatively predict outcomes. A rule may be relatively simple or complex with multiple stages that incorporate detailed business logic, with such things, but not limited to attributes, strings, integers, rule flow, rule flow-groups, timers, calendars, Booleans, Operators, conditional elements, pattern elements, pattern binding, constraints, unification, expressions, lists, maps, abbreviated combined relation conditions, abbreviated combined relation conditions with patterns, compounds, precedencies, positional arguments, conditional elements, advanced conditional elements, collections, accumulations, multi-patterns, multi-function accumulates, forward/backward chaining, Rete algorithms (its predecessors, derivatives, extensions, and similar), Leap (its predecessors, derivatives, extensions, and similar), inline custom code, and the like; and where a rule's consequences may modify a rule and/or data.

Further, the creation of rules builds a knowledge management system, where the SWARMER Operating Environment 101 allows non-technical SWARMER members to express knowledge that may be implemented and possibly automated using natural language sentences and/or prebuilt suggestions. Each rule creation iteration generates a specific rule creation iteration ID per iteration and each utilization of a rule generates a specific rule utilization ID that is stored and tracked for its perceived relative successfulness; and by such factors as to all of the SWARMER's perceived rule creator(s) and Contributor(s) (50), what specifically was perceived to be accomplished, improved, created and/or contributed when, what was perceived to be a relatively new creation or modification by who, when, where, why and the like when compared to existing rules and data.

In various non-limiting embodiments, the SWARMER-UI 102 comprises of a number of modules for creating rules from the SWARMER Dashboard (108). From a start 130 with the "Dashboard Options and Rule Creation," the SWARMER-UI proceeds to a step 131 where the SWARMER "Displays Options Per the Member's Role, Permissions, and Applicable Terms and Rules." From step 131, the SWARMER-UI 102 passes to a step 132, where a "Generate, Save, Synchronize and Track All States, Intervals, Iterations, Data, Statistics, Perceptions, and Input per Timestamp, Rules and Terms With Associated IDs (e.g. Member, Project, etc.)" is invoked (if not already).

From the step 132, the user may utilize the functionality afforded by the SWARMER Dashboard (108) in a step 133, where the Dashboard (108) generally represents all of the Module/Dashboard variations (e.g. FFL (113), Seller (115), Buyer (117), ADSTATS, and the like). In various non-limiting embodiments, the Dashboard functionality comprises of a "TOU/TOP" 134 (with the SWARMER's "Terms of Use" and current "Terms of Participation") function, an "Overview" 135 function for learning about the functionality, a "Search" 136 for searching for information, data, statistics, instructions, and the like. In various non-limiting embodiments, there is an option 137 for utilizing the "TOP Terms and Ownership Management" (111) module, an option 138 for the "Account Management" (109) module, an option 139 for the "Segmentation Engine and Management" (112) module, and an option 140 for a "Rule Engine and Management" (128) module, an option 141 for the "Campaign Management (110) (e.g. Project Management)" (110) module, an option 142 for the "F.I.N.A.N.C.I.A.L.S. (Financials and Interests, Negotiations, Accounting, Notices, Contracts, Insurance, Legal and Securities—Mgmt)" (114) module, an option 143 for a "T.I.M.E.S." (116) module, an option 144 for a "Negotiations Management" (118) module, an option 145 for the "SWARMER (125)" module, an option 127 for an "I.D.-ACERS" (103) module, an option 146 for an "SWARMER Court Management" (122) module, an option 147 for an "ADSTATS" (124) module, and an option 148 for a "METER Management" (126) (including Knowledge Management, location tracking, law monitoring, and/or the like) module.

From the above modules, directly or through the Campaign/Project Management Module 110, the user (e.g. a SWARMER member) may do a variety of things, such as create, modify, and/or review data, statistics, information, and/or data/content; and/or create, modify, review, or assign rules. A query 149 asks the user to delineate between "Info, Data, Statistics, Data/content, Or Rules?" If the answer to query 149 is "data," then there is a terminator 150 that is for "Data Options." If the answer to query 149 is "Statistics," then there is a terminator 161 that is for "Statistics Options." For example, the user could review statistics generated from, say pattern recognition logic, correlations, causations and/or the like, and review, challenge, modify, and/or the like the raw data, input data, sources, logic, rules, correlations, causation data, and assumptions and/or the like per the user's current role and permissions, If the answer to query 149 is "info," then there is a terminator 151 that is for "Info Options." If the answer to query 149 is "transactions," then there is a terminator 152 that is for "Transaction Options".

If the answer to query 149 is instead "rules," then a query 153 asks whether to "create/modify or assign (a rule)? If the answer to query 153 is "create/modify," then a step 154 provides the user a "Rule Engine and Management's Create/Modify Module," with the functionality to create/modify rules. Once the rule creation/modification is complete and/or ready for assigning to other objects or components, the user may advance to a step 155 that provides the user a "Rule Engine and Management's Assignment Module" with the functionality to assign rules. If the answer back in query 153 was instead "assign" then the user would have advanced to the same "Rule Engine and Management's Assignment Module" module in step 155.

In various non-limiting embodiments, the "Rule Engine and Management's Assignment Module" allows the user to assign rules to a variety of objects through segments and IDs. For example, each created rule iteration generates a unique ID, that unique rule iteration ID may be assigned to a defined segment of SWARMER Users/Members, a defined segment of Campaigns/Projects (including Offers), and/or to a specific ID or ID(s) for a specific SWARMER User/Member, Campaign/Project (including Offers). For example, a rule for monitoring the progress of a particular campaign may have a particular METER rule assigned (more under METER 126), where specific responsibilities are assigned to a particular SWARMER Member via the "Rule Engine and Management's Assignment Module" via the Account Management's (109) database per his/her SWARMER unique Member ID, and/or via his/her Account (60) role ID as the project's designated Project Manager (43).

In addition, a particular project could have a particular TOP rule that limits participation to Buyer from a particular region who has passed a background check and has made a prior approved purchase within a particular period of time, where these types of delineations may be generated, analyzed, and assigned via the "Rule Engine and Management's Assignment Module" via the Segmentation Engine and Management (112) module's database.

In various non-limiting embodiments, the results of the Rule Assignment Management usage and the associated functionality afforded by the option modules appear in a step 156 "Analysis &/or Verify Collective Input/Results." Next, a step 157 is where the SWARMER Member may "Preview &/or Test" rule(s). Next, a query 158 asks if the SWARMER member would like to either "Continue or Invoke" the rule? If the answer to query 158 is "continue" as in continue utilizing the Dashboard functionality without invoking the rule, then a next step 160 with a "Send, Post and/or Synchronize Appropriate Info, Data, Statistics, Data/content, Rules and Terms To Appropriate Parties, Engines, and Modules" is performed, where the SWARMER user may continue utilizing the modules/Dashboard. If the answer to query 158 is instead "invoke" as in invoke a particular rule, then the next step 160 with a "Send, Post and/or Synchronize Appropriate Info, Data, Statistics, Data/content, Rules and Terms To Appropriate Parties, Engines, and Modules" is performed, where the SWARMER user may also then continue utilizing the Dashboard.

METER Management (126) Module.

Figure 15:
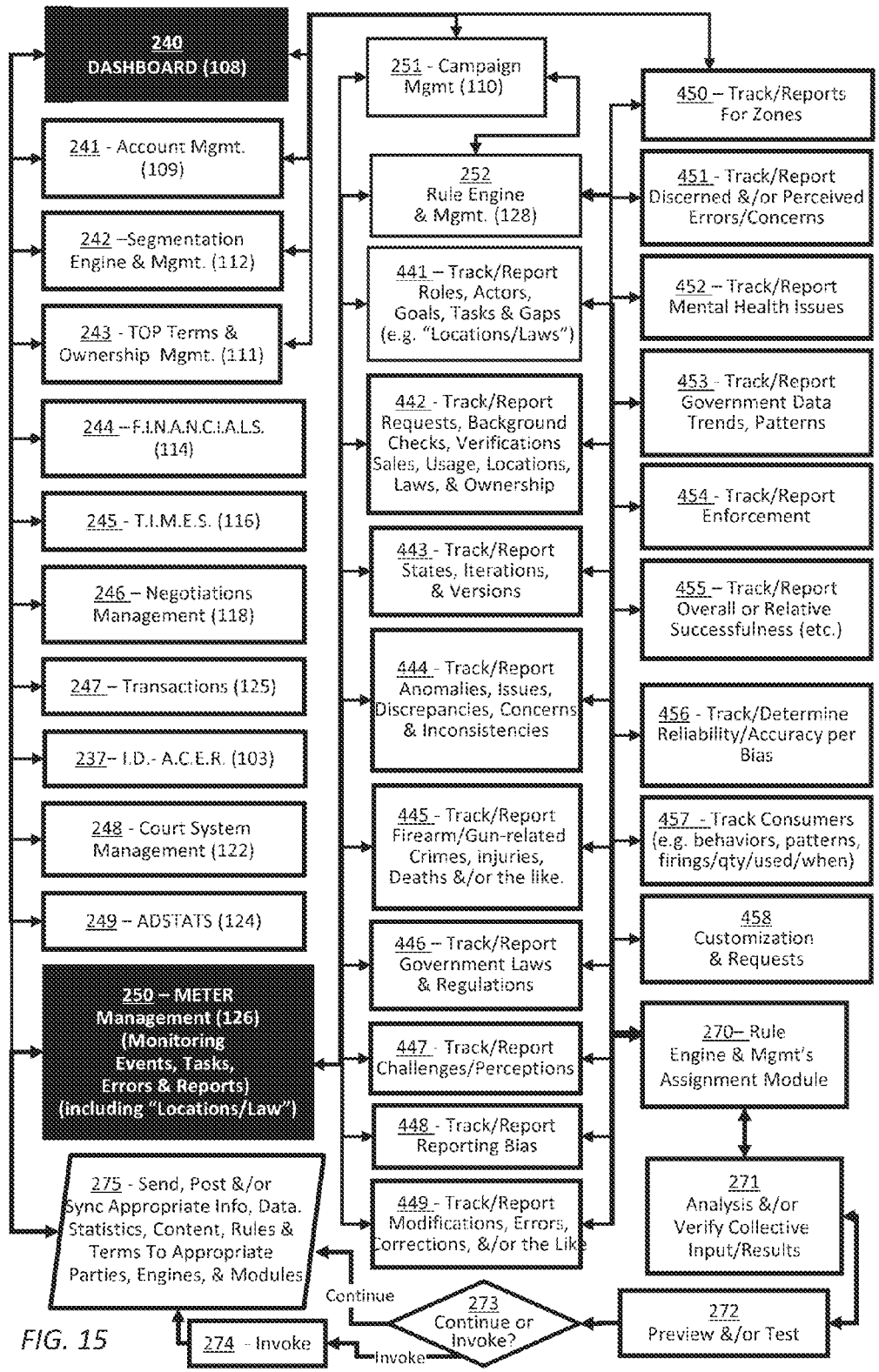
FIG. 15 is a block diagram with some flow charting steps depicting an embodiment of the SWARMER member's functionality from the METER Management (126) module, which is a block 250.

FIG. 15 is a block diagram with some flow charting steps depicting an embodiment of the SWARMER member's functionality from the METER Management (126) module, which is a block 250. Starting with the Dashboard (108) in the block 240, where the SWARMER system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, mission Environment/Event, mission Lead, Target, Weapon, etc.)."

In various non-limiting embodiments, the user of METER Management (126) module would preferably have to possess a role, and/or at least equivalent to the same permissions required to be a Negotiations Mgr. In various non-limiting embodiments, the Negotiations Mgr. utilizes the Negotiations Management (118) module to view, review, create and/or modify criteria requirements or rules generally related to negotiations and/or similar element (e.g. accepting, rejecting, countering, appealing) for a particular mission or mission element to be used in, say a particular P.A.C. (104) and/or a particular P.I.N. (106).

In various non-limiting embodiments, the Dashboard functionality in this "METER Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "SWARMER Module" (120) module in a block 247, the "ID-ACERS" (103) module in a block 237, the "SWARMER Court Management" (122) module in a block 248, the "ADSTATS" (124) module in a block 249, the "METER Management" (126) (including Knowledge Management) module in a block 250, the "Campaign Management" (e.g. mission Management) (110) module in a block 251, and the "Rule Engine and Management" (128) module in a block 440.

"Track/Report Roles, Users/Actors, Goals, Tasks and Gaps" Module in a Block 441 Goal and Resource Analysis In various non-limiting embodiments, preferably the system would preferably analyze the data and data/content in a mission and/or document, say for/from a training exercise, and calculate the anticipated resource requirements (e.g. weapons, actors, ammunition) and display a list of requirements dependent on a range of factors. For example, the requirements to engaged a hostage situation for a police force in a particular environment, with a particular deadline to respond, based upon perceived or discerned number of hostages, combatants, and/or the like; and where the system may automatically analyze perceived and likely critical dependencies, and/or perceived relatively critical requirements, data/content gaps, and/or the like; to display a list of options, resources, and/or the like, along with the associated missioned outcomes and success likelihoods per a variety of actors, weapons and/or the like. The user may improve and/or correct relative perceptions by linking relatively better data, statistics, modifying requirements, perceptions, assignments, TOU/TOPs, criteria, inputting items that are historically similar/relevant, more current, or not completed, and/or the like.

In a combat situation, transportation costs may be incorporated per anticipated country. The results could list short and long term cost-benefit analysis, where, depending on the whether the goals are weighted on, say a set of relatively shorter/minimal goal, so quick as possible compared to, say a relatively larger/longer, where the user may specifically input and/or adjust the criteria, conditions, weighing and/or the like for each factor (e.g. goal factor, mission anticipated needs, timelines, score, and/or the like).

In addition, the calculations and analysis may incorporate perceived and/or discerned rates, conditions, factors, and/or the like, such as global, economic, geographical, seasonality, demographics, behaviors, psychographic, industry-related, mission related, actor-related, and/or the like data that may be automatically, systematically, continuously, persistently, conditionally, and/or via/per actor/user-prompt incorporated. In various non-limiting embodiments, the current and/or historic data for financial, budget, war, emergency response, drug trafficking, and/or economic conditions may comprises data from the company and hospital, capitalization, balance sheet, investments, assets (e.g. intangible and tangible), current ratio (e.g. current assets divided by current liabilities), number of employees, cash on hand, working capital, cash flow, bad-debt percentage, receivables, payables, short-term debt, long-term debt, debt to equity, debt to capital ratio, valuation, stock price, dividends, earnings per share, tax rate, profitability, gross margin, operating margin, EBITDA, relative growth rate, (and the like from competitors, industry sectors, etc.), government data for, say unemployment, interest rates, and/or the like.

Further, the system, methods, and/or user-selections may automatically, conditionally, and/or specifically employ a particular actor, mission, budget, goal, timeline, and/or a segment of the data elements in the calculations and analysis for displaying the prioritized perceived target results, where the results may include relative targets (e.g. Assets, locations, humans, hostages, animals, building, resources, and/or the like), goals (e.g. milestones, timelines, safety, political concerns, promptness, effectiveness, relative scoring and/or the like), and/or the like, scores.

Tracking Progress/Updates

In various non-limiting embodiments, the system and the computer-implemented tracking and analysis methods would preferably identify a designated actor (e.g. a mission lead) with the proper role and permissions, where he/she may be automatically, systematically, continuously, persistently, conditionally, and/or via/per actor/user-prompt provided a progress update. For instance, the progress update method may include receiving data, statistics, relative progress, and/or the like, for a particular actor (e.g. a soldier), group of actors (e.g. soldiers, policemen, hunters, competitors,), segment of actors (e.g. actors who are in the army or marines), during a particular time window and/or event (e.g. during a training exercise/preparation stage), and/or the like. For example, the progress update method could be setup to employ a time interval (e.g. every hour, every day, Mondays at 5 pm, etc.), where the system would preferably send a message (e.g. an email, sms, mms, vm, and/or the like) to the mission lead with designated information (e.g. the latest preparedness scoring actors and resources since the last update, the number of modifications made since the last update, and/or the like), and/or the like.

In various non-limiting embodiments, the progress update may be generated, while a monitored actor continues to train or work. In various non-limiting embodiments, preferably the designated actor (e.g. a mission lead) with the proper role and permissions to receive the progress updates may acknowledge, challenge, comment, modify terms, decide, suggest, and/or the like, for any data in the progress update, where the appropriate members, users, parties, systems, and/or the like, would be updated and notified accordingly. For example, a particular mission lead is the designated actor for the progress updates, and he/she may challenge the assertion by a particular actor that a particular mission, portion of a mission, and/or a mission component is fully, and/or relatively prepared for and/or completed according to the terms, and/or the like. This mission lead challenge may be returned to the particular actor would assert his/her completion, where the system would track and score each assertion according to the perceived terms, assertions, resolutions, and/or the like.

In addition, the system may automatically, systematically, continuously, persistently, conditionally, and/or via/per actor/user-prompt contact other members, users, parties, systems, and/or the like. For example, the TOU/TOPs may call for the mission Lead to be notified and/or intervene on any such matter, and/or the employment of the SWARMER court, and/or the like. Further, the TOU/TOPs may allow certain roles, obligations, challenges, assertions, decisions, suggestions, and/or the like, to be delegated, assigned, done collaboratively, moderated, arbitrated, and/or the like.

In another example, the mission lead may return a counter offer to motivate the particular actor to complete a particular task, in a particular manner, by a particular time, for a particular exchange, and/or the like; where the system would track and score each offer according to the perceived terms, benefits, harms, success, accomplishments, resolutions, and/or the like. For example, data over time may reflect that while a particular counter offer relatively proved to help complete a particular task on time by a particular actor, the tracked data suggests that the particular actor appears to hold out for the same and/or similar counter offers from the same mission lead, when relatively compared to say other missions leads, where the particular actor has a relatively similar workload, availability, personal distractions, and/or the like.

Saved Input History and Time Gaps

In various non-limiting embodiments, the system and associated computer-implemented methods tracks who, where, when, how, and/or the like, a particular SWARMER member/user purchases ammunition, a weapon, using a weapon, stores a weapon, carries a weapon, fires weapon, cleans a weapon, and/or the like. In addition, the system may also track the number of times a particular weapon, and/or the like, has been loaded, cleaned, fired, target hit, targets missed, kill shots, stored, transported, and/or the like, along with any calculated time gaps between each, all the inputs, cleanings, loadings, unloading, firings, storage, transporting, offers to sell, along with damage assessment per firing, protection provided, and/or the like.

In various non-limiting embodiments, the user could also search the data with search parameters (e.g. keywords, categories, content formats, segmentation and/or the like); say as a particular segment or segment range for weapon type or weapon data based upon demographics, psychographics, behaviors, and/or historical data and patterns. For instance, the search perimeters could designate and/or exclude data relatively perceived, discerned, and/or ascertained to have been for a particular war, battle, city, training event, and/or the like. If the search is to "include," then the results could evaluate and incorporate this data into the results, where the system would preferably automatically prioritize all data and/or statistics known or discerned to have been relevant, say to a particular battle data (where the system would preferably prioritize the most successful mission, weapons, actors, days, times, and/or the like for the battle, then prioritize all data and statistics, determined to be relatively less or least successful.

In various non-limiting embodiments, the system analysis, indexing, scoring, ranking, and search perimeters could designate and/or exclude data/content (e.g. data regarding weapons, actors, events, environments) relatively perceived, discerned, and/or known to have been associated with say a particular location or gender, or age range, say the most popular weapon purchased by males over the age of 21 within a twenty mile radius of the zip code 90405. In various non-limiting embodiments, the system analysis, indexing, scoring, ranking, and search perimeters could designate and/or exclude data/content relatively perceived, discerned, and/or known to have been created for a particular individual or segment; produced for a particular individual or segment, targeted for a particular individual or audience segment.

In various non-limiting embodiments, the system analysis, indexing, scoring, ranking, and search perimeters could designate and/or exclude data/content relatively perceived, discerned, and/or known to have been "delivered to" a particular individual or segment, where "delivered to" could come from the list comprising: shipped, purchased, in-store, internet, mail delivery, and/or the like, In various non-limiting embodiments, the system analysis, indexing, scoring, ranking, and search perimeters could designate and/or exclude data/content relatively perceived, discerned, and/or known to have been "acquired/interrogated/received," "purchased by," and/or "payment method" from a particular individual or segment, where "acquired/interrogated/received" could come from the list comprising: a gun show, gun store, online, unsecured acquisition, secured acquisition, purchased on credit, bartered, trade, trialed, borrowed, stolen, lifted, and/or the like; and/or may be conditional, such as with sufficient credit, per shipping terms (e.g. COD), temporary (e.g. escrow), secured (e.g. with collateral), and/or the like. In addition, where "purchased by" comprises: a user's name, address, and any other appropriated user/buyer/seller data and/or the like.

In various non-limiting embodiments, the system analysis, indexing, scoring, ranking, and search perimeters could designate and/or exclude data/content relatively perceived, discerned, and/or known to have been "exchanged" and/or "payment method," by an individual or segment, where "exchanged" and/or "payment method" could come from the list comprising: money, cash, credit, equity, debt, barter, wire, feedback, polling-data/statistics, status, points, and/or the like. In addition, "exchanged" could also include elevated and/or reduced points, demerits, and/or status regarding the list comprising: expertise, experience, education, skills, proficient, honesty, promptness, and/or the like. Further, these exchange parameters could also be bonuses, rewards, points, status, and/or demerits on top of a pre-agreed exchange.

In various non-limiting embodiments, the system analysis, indexing, scoring, ranking, and search perimeters could designate and/or exclude data/content relatively perceived, discerned, and/or known to have been "previously targeted segment" and/or where the system analysis, indexing, scoring, ranking, and search perimeters are based upon a particular perceived or known outcome evaluated against a list comprising: a target or mission goal, and/or the like.

In various non-limiting embodiments, the system analysis, indexing, scoring, ranking, and search perimeters could designate and/or exclude data/content relatively perceived, discerned, and/or known to "currently have," "have had," "had at particular window of time" and/or the like: a particular weapon type/model, and/or a specific ammunition with a specific composition, and/or the like. For example, the search perimeters could indicate the weapon "semi-assault weapon," where the system would search for all weapons data containing the "semi-assault weapon" categorization or tagging. In another example, the search perimeters could include a specific ammunition characteristic, say for a "soft point bullet", where the system would search for all data for relevant results.

In various non-limiting embodiments, the system analysis and search would preferably include such evaluations as to whether the data is currently protected or was ever protected in a particular manner. For instance, by a particular encryption method, encryption version, behind a particular hardware firewall (e.g. model, version, and/or the like), behind a particular software firewall (e.g. model, version, and/or the like), and/or the like. In addition, if the data was ever checked for viruses or not, when, by what version, how current that virus check version was relative to the current version, and/or the like. For instance, only search for data that have been specifically cleared for public consumption by a particular branch of the government. A search may include such evaluations as to whether the data was relatively recently, if ever, considered confidential, including when, by who, by what means, functionality, relatively how recently when compared to other data, say by the same branch of government, within the same time span, relative to a mission, weapon, actors, and/or the like. For instance, only search for data that have not been cleared for public consumption in the past 30 days that are meta-tagged with the weapon name, say "AK-47."

In various non-limiting embodiments, the system analysis and search would preferably include such evaluations as to whether the data is currently the result of a translation or was ever translated into or out of a particular language. For instance, by a particular encryption method and/or version, by a particular authentication/verification method and/or version, behind a particular hardware firewall (e.g. model, version, and/or the like), behind a particular software firewall (e.g. model, version, and/or the like), password protected; PIN protected, shielded/protective shielding; print protected, edit/modification limited, comment/feedback limited, layers flattened, fonts suppressed, seller/buyer/FFL suppressed, and/or the like. In addition, if the data is an output result of another data such as an Adobe PDF file from, say an excel spreadsheet data and/or the like; with any associated parameters, attributes and/or traits.

In various non-limiting embodiments, the system analysis and search would preferably include such evaluations as to whether the data is currently the result of a conversion or compression; or was ever converted or compress into or out of a particular format and/or compression scheme and/or rate. For instance, by a particular conversion format could include any conversions, say from a SWARMER Sensor. For instance, by a particular weapon, actor, event, and/or the like, where the results may be masked, require prior approval for viewing, include and/or incorporate the level of A/D/RP/AS/P data values and/or the like.

In various non-limiting embodiments, the system analysis and search would preferably include such evaluations as to whether the data was ever transmitted from, to, and/or via a particular client, server, hard drive, VPN, TCP/IP, bus, router, hub, pathway, gateway, mode, protocol, IP address, satellite network, cellular network (including device, protocol, and/or location-awareness), wireless LAN (including device, protocol, and/or location-awareness), link, and/or the like. For example, via a particular SMTP server, such as Gmail or the like. Another example could be a LAN transmission between hard drives on different file servers.

In various non-limiting embodiments, the system analysis and search would preferably include such evaluations as to whether the data is currently, was ever, or never stored in a particular location or device, such as a particular weapon hard drive, Flash Drive, cache, SD, SSD, and/or transmitted via a particular client, server, hard drive, pathway, gateway, mode, protocol and/or the like. In addition, the search could include what OS was used by the weapon and/or the SWARMER Hub, PIN, PAC, and/or the like (e.g. platform, clients/devices supported, version, and/or the like), computer components, peripherals, programming language for the source code, and any resources of the computer where the data was created. For instance, the data was pulled from a particular AK47 with an Intel i3 processor with 1 gb of DDR3 memory, a 1 SDD, and running Android.

Further, the search could include a priority to the components and/or peripherals. For instance, a particular data could also have been modified by a number of other parties, where the search evaluation and prioritized results could be listed in associated with computer components and peripherals could expand, and/or the search could be evaluated and prioritized (and/or limited) to those computer components and peripherals that were used relatively the most in association with the data, weapon, ammunition, event, environment, target, competition, crime, war, battle, training, and/or the like.

In various non-limiting embodiments, the system analysis and search would preferably include such evaluations as to whether the data was ever challenged, modified, verified, authenticated and/or the like, by whom, when and the relationship between the data and other related data modifier, challenger, verifier, authenticator, and/or the like.

Another example could be for a particular data that resides within a particular weapon location and has been pulled a relative few number of times, say when relatively compared with most police, soldiers, and/or the like, with the same or similar weapons, training, environments, usage, age, experience, goals and/or the like. In various non-limiting embodiments, the system would preferably evaluate the data within the particular weapon/location indicated and display a list prioritized by the number of times each data has been known to be pulled or relatively perceived to have been pulled by the SWARMER, mission lead, instructor, weapon user, and/or the like.

In various non-limiting embodiments, the perception evaluation as to whether a particular data was relatively likely to have been pulled for the mission lead could include a at least one behavioral indicator, such as the time of day where the mission lead is known to relatively more likely request a data be pulled. For instance, one particular behavior indicator of the mission lead could be when he schedules data downloads to the SWARMER hub and/or the like, with a particular weapon client(s) (where SWAMER system can recommend making the routine data downloads/pull automatic, systematic, and/or via an actor prompting. On the other hand, the routine data dumps may reveal a concern where the data may be improperly or possibly pulled and/or breached by outsiders.

In various non-limiting embodiments, the system analysis of data/content would preferably generate a list with prioritized items, say displayed as a table. Further, the system may generate a visual representation of the data/content, such as a rectangle for a document, where the visual representations may be displayed in a variety of display manners and/or priority manners. For example, a first display manner may be to tile the visual representations within an Excel spreadsheet (or similar application, or similar appearing grid manner), where a first priority manner may be from top to bottom and based upon a variety of factors, conditions, user-inputs, and/or the like. For instance, the first priority manner may be relative to when each data was last opened, and where currently opened data may be conditionally and/or via/per actor/user-prompt removed from the results, displayed manner, priority manner, tiling function, and/or the like.

Relational Mapping and File Similarities

In various non-limiting embodiments, the system and associated method for saving and tracking files would also generate a file map and a relational file mapping, where the relational mapping shows files that are and/or were relatively similarly, say file named, saved date, created date, modified date, actors, weapons, missions, mission leads, folders, subfolders, context, and the like. For example, the data/content in this data is a data/content overlap score of X compared to a particular list of data, missions, weapons, and/or the like. This comparison could include behaviors and patterns as well, where say, a particular time of day tends to produce the most wounded soldiers, in a particular environment/region, and/or the like.

In various non-limiting embodiments, there is the Track/Report Requests, Background Checks, Verifications Sales, Usage, Locations, Laws, & Ownership" module in a block 442; and the "Track/Report States, Iterations and Versions" module in a block 443.

Computer-Implemented Data Searching

In various non-limiting embodiments, the current state of the art typically tracks when a data was created date and/or modified date, but in some environments and applications, it may also be beneficial to track exactly which user searched, sold, purchased, used, stored, transported, loaded, aimed, fired, and/or the like, what weapon when, fired how many rounds, for how long, and where.

Track Who Did What when

In various non-limiting embodiments, the system and computer implemented method for saving and tracking data/content that would track exactly which a particular user fired a particular weapon when, what was hit when, outcome from hit, how many rounds, and where was the user at the time (e.g. by IP address, GPS, Cellular triangulation, Wi-Fi hot-spot, Magnetometer data, environmental imagery/plotting, and/or the like); with what mission, what team, what leaders, what other weapons, devices and/or the like, via what type of terrain, weather, how long, why, when, and where; what was accomplished, when, where, and how; hostages, prisoner, injuries, causalities; and/or the like.

In various non-limiting embodiments, the system would allow a first user to retrieve recent weapon data and search for relative comparison for analysis, predictions, concerns, suggestions, and/or the like. After opening the file, the system would preferably annotate where the first user or a second user or a plurality of associated users, actors, targets, and/or the like, fired their weapons, got shot, wounded, killed, captured, and the like. The system would preferably allow the first user display relation maps relative to a particular user or data point, and/or view a frame-by-frame playback of how the event/mission data (or similar) was viewed and/or interacted with over a timeline, such as chronologically, where the first user may pause, and select specific moments of time and/or events based upon, say a histogram which displays relative usage, dwell times over the course of time per the first user, the second user and/or a plurality of users relative to key events.

In addition, a particular user could request a specific number of weapon data events, say the last 10 wounded soldier events, where the user may specify, say the last 10 wounded soldier events overall, associated to a particular battle, mission, weapon, day, location, or say irrespective of when the data were created or modified, but specify the last 10 who survived their wounds, say for/from a particular mission. This functionality may help users locate critical survival data.

Relatively Similarity Determination

In various non-limiting embodiments, the system and associated computer-implemented methods track and analyze data/content score, data/content and data/content correlations to generate a relatively similarity determination, score, ranking, and/or the like. The system generated relatively similarity determination would preferably include a predefined set of conditions, methods, data/content locations, and/or the like, where the predefined set of conditions could filter, limit, weight, and/or the like, the system analysis for the relatively similarity determination(s) to a particular window of time; a particular group and/or segment of: companies, computer types, physical location, IP addresses, databases, events, mission, goals, circumstances, weather, weapons, data, environments, targets, buildings, terrain, actors, and/or the like.

Real-Time Alert

Each incident may automatically, systematically, continuously, persistently, conditionally, and/or via/per actor/user-prompt prompt an alert, say in real-time, near-real-time, in a generated list of alerts, and/or the like, to the user. Further, the prompt to send the alert may include a plurality of interactions and/or actions/responses, comprising: the alert notification, an acknowledgment, a challenge, a suggestion, target adjustment, a data verification, a counter offer, a concern, a poll, a vote, a decision, a complaint, a workaround, a medical treatment, a government policy, a modification, and/or the like. The plurality of interactions and/or actions may comprise the user, a specific originator of correlated data/content, another particular actor/collaborator, the mission manager, a group and/or segment of members/users/actors, and/or the like.

Further, the alert may incorporate the requests for input. In addition, the alerts, alert interactions, actions/responses, and/or the like, may be sent/interrogated/received, and/or the like, via any means sufficient, suitable, and/or the like, to convey the necessary information and interrogate/receive the necessary action/response, including a method involving an alert function within the host application of the Weapon Client (say via a separate device like a smartphone), a separate application, mobile applications, SMS, MMS, IM, email, attachments, images, video, audio, wireless, landline, VoIP, voicemail, satellite transmission, ping, glove sensor (e.g. a via particular finger sensor/indicator), interactive glasses, night vision googles, and/or the like.

Each incident, alert, alert notification, interaction action/response, and/or the like, may include a set of conditions, say where the user may be limited, restricted, and/or the like from certain data/content, statistics, applications, input devices, networks, databases, features, functions, and/or the like, until a specific and/or particular action/response is satisfied. For example, the user may be alerted, notified, prevented, and/or the like, from firing at a specific target within a training exercise until the specific and/or particular action/response is satisfied.

Analyzing and Labeling Submitted Data/Content for a Legal Proceeding

In various non-limiting embodiments, the system would preferably provide a computer implemented method for the submitting and analyzing data/content for a legal proceeding, the SWARMER court, and/or the like, such as when the SWARMER court needs to review text from a speech to text translation. In various non-limiting embodiments, the system would preferably generate a list of labeling options automatically, where an SWARMER judge, expert, witness, plaintiff, defendant, and/or the like, may submit the original audio clip, the original speech to text transcript, a modified audio clip, a modified speech to text from the modified audio clip, a modified speech to text manually created, and/or the like, where each modification is annotated along with the 5 W's. For example, who is perceived, discerned, or known to be firing, where discerned implies that is currently not under any challenge, who was firing, along with when, where, how, and why for each.

In various non-limiting embodiments, the system may also be employed to analyze the likelihood of, say a translation error, recording error, auto correction error, and/or the like for perceived relatively likelihood regarding a challenge, any correction, witness veracity, and/or the like. Further, an analysis for relative veracity of each assertion, actor, likelihood of bias, likelihood of firsthand knowledge and/or hearsay, the benefit of hindsight, the benefit of others, other materials, and/or the like.

The "why" and "how" data related to search/find results, for example, may include "why" weapons, actors, events, goals, environments, strategies, tactics, were changed/modified as a result of a particular suggestion presented by a particular actor (e.g. a particular mission leader, reviewer, a group of peers, a segment of experts, a particular instructor, and/or like). The "how" data/statistics, for example, could be where the user accepted a particular modification suggestion by, say a particular actor (e.g. an instructor) and implement as suggested, and/or also made other modifications. In another example, the "how" could be express as or by an implementation suggested and/or conditionally performed by the system. For instance, the system would preferably suggest changing a particular firing stance or weapon, and where the system tracks the relative progress. The suggest modification could be presented in a list where the user could be presented with rationale as to why the system perceived each change as logical, say because based upon regression analysis for similar actors with similar issues, utilizing a similar weapon, or situation.

In various non-limiting embodiments, the system search and/or the like (e.g. data find function) may automatically, systematically, continuously, persistently, conditionally, and/or via/per actor/user-prompt incorporate an actor-stated, ascertained, discerned, relatively perceived, and/or predicted set of goals, terms, data/content and/or historical data/statistics, where the system may analyze, say data, statistics, data/content, patterns, behaviors, and/or the like; and where the system analysis and/or results may include behaviors considered relatively the same or relatively similar, along with a list of any data employed, assumptions calculations, algorithms and/or the like, per score, per ranking, per element, per issue, and/or the like. Further, the system analysis may include a relative overlap, pattern, correlation, causation, and/or similarity recognition score, rank and/or the like, for, say, safety, reliability, accuracy, and/or the like.

In addition, the system analysis may include any publications (e.g. patents, inventions, claims, figures, written descriptions, blogs, websites, white papers, speeches, recorded events, and/or the like, worldwide with translations, if necessary), figures, images, charts, sketches, and/or the like (e.g. including an analysis of each part, step, element, component, and any flow, connection, interaction, methods, systems, compositions, mannerisms, behaviors, calculations, options, suggestions, teaching, motivations, rules, logic, conditions, thresholds, Boolean Operators, formulas, algorithms, results, and/or the like), 3D objects, animations, and/or the like (e.g. with object, imagine, cell, and/or frame-by-frame with analysis and comparisons for both audio and images, and not necessarily sequentially compared), audio, video, and/or the like (e.g. with speech to text conversions, and image, facial, scene, and/or the like), and/or the like.

In addition, the system analysis may include data/content and/or data from sources (e.g. data, scripts, notes, comments, tags, emails, images, figures, elements, specifications, formulas, tables, assumptions, searches, emails, transcripts, declarations, and/or the like) from a particular government entity and/or the like (e.g. the Pentagon, Health and Human Services, Department of Defense, Army, Navy, Marines, Police Departments, and/or the like), and/or the some combination of entities, permutation, and/or the like). In various non-limiting embodiments, the system analysis may include filters for any of the above and/or for data/content from a particular weapon, ammunition, location, actor, and/or the like. Further, the system analysis may include data/content and/or data from a negotiation weapon purchase, training exercise, crime event/report, emergency event/report, medical event/report, crime event/report, court case, settlement, and/or the like.

In various non-limiting embodiments, the system provides the "Track/Report Anomalies, Issues, Discrepancies, Concerns& Inconsistencies" module in a block 444, the "Track/Report Firearm/Gun-related Crimes, injuries, Deaths &/or the like." module in a block 445, and the "Track/Report Government Laws & Regulations" module in a block 446.

In various non-limited embodiments, there are module options for a "Track/Report Challenges/Perceptions" module in a block 447, a "Track/Report Reporting Bias" module in a block 448, a "Track/Report Modifications, Errors, Corrections and/or the like", module in a block 449, a "Track/Report for Zones (locations)" module in a block 450.

In various non-limiting embodiments, the system provides the "Track/Report Discerned and/or Perceived Errors/

Concerns" 451, the "Track/Report Mental Health Issues" module in a block 452, and the "Track/Report Overall or Relative Successfulness (etc.)" module in a block 455.

Overall and/or Relative Successfulness

In various non-limiting embodiments, the system would preferably also analyze the data and generate reports as to who, what, how, when, why and the like, certain mission elements, Users/Actors, and/or other factors and/or the like) may each, in isolation and/or collectively, measurably contribute to a mission's overall or relative successfulness in terms of, say no juries, no causalities, ground acquired, people rescued, hostages recovered, cost savings, time efficiency, quality, and/or the like.

"Track Consumers (e.g. Behaviors, Patterns, Firings/Qty/Used/when Etc.)" Module in a Block 457

In various non-limiting embodiments, the system and the associated computer-implemented method for tracking consumer consumption may include a methodology of tracking consumption, where the system continually tracks and analyses the data, statistics, and inputs to display a continually updated consumption list, which would preferably include a prioritization and relative confidence factor regarding the data/content, data, statistics, and/or the like.

Figure 16:
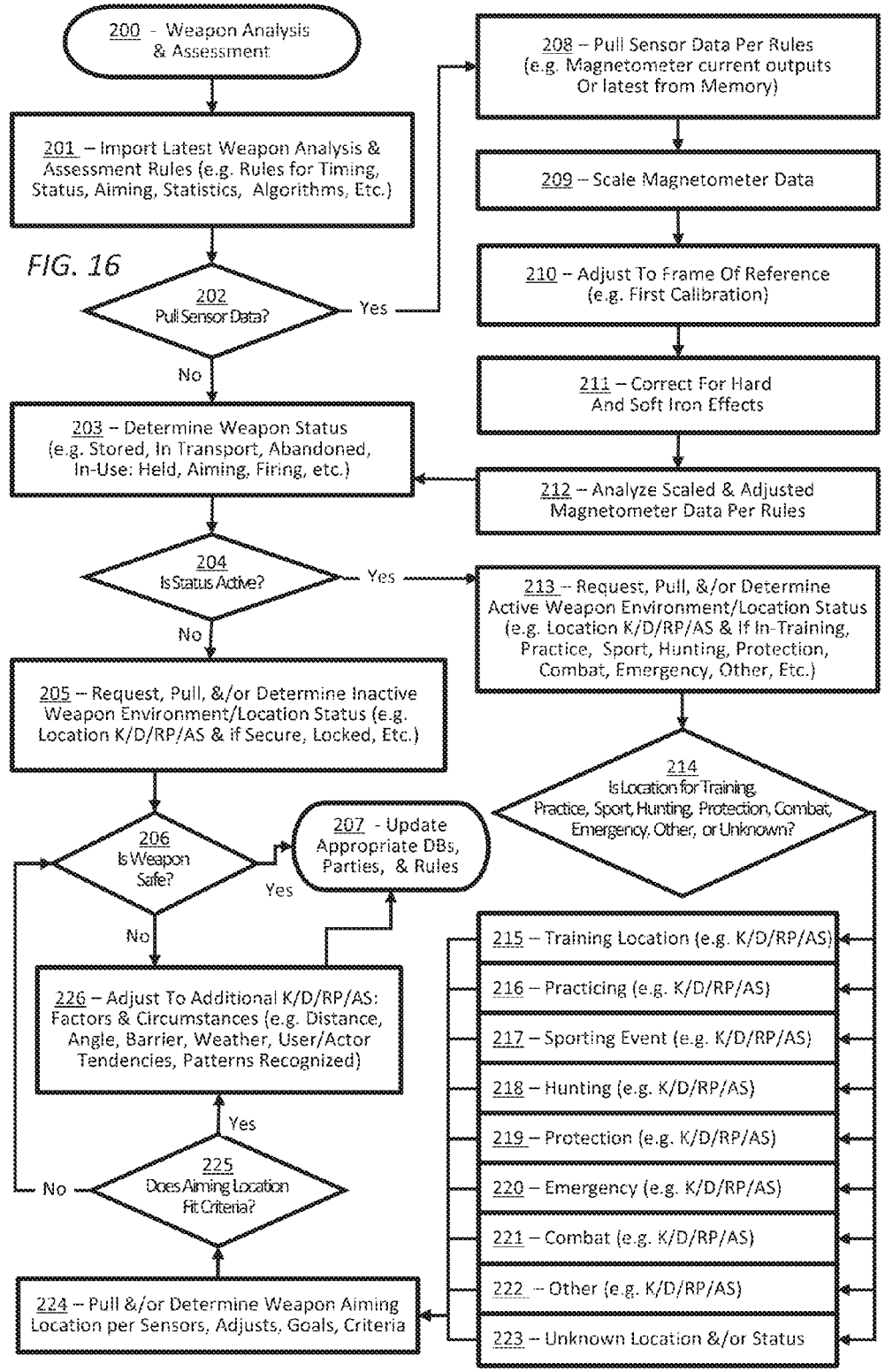
FIG. 16 is a flowchart depicting an embodiment and example of a Weapon Analysis and Assessment.

FIG. 16 is a flowchart depicting an embodiment and example of a Weapon Analysis and Assessment.

Figure 17:
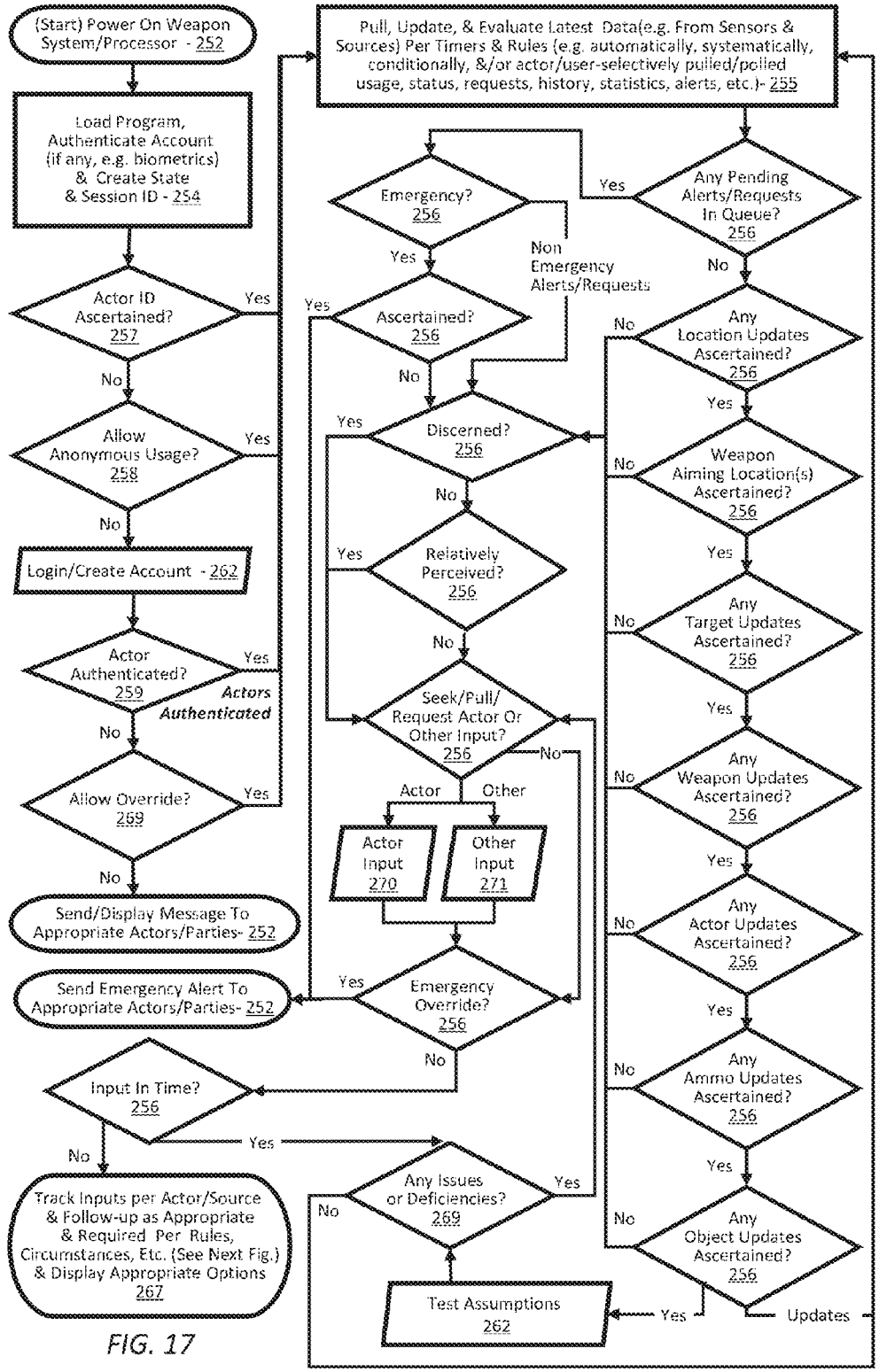

FIG. 17 is a flowchart depicting an embodiment and example of the initial powering of a Weapon System on a Weapon Client or similar.

Figure 18:
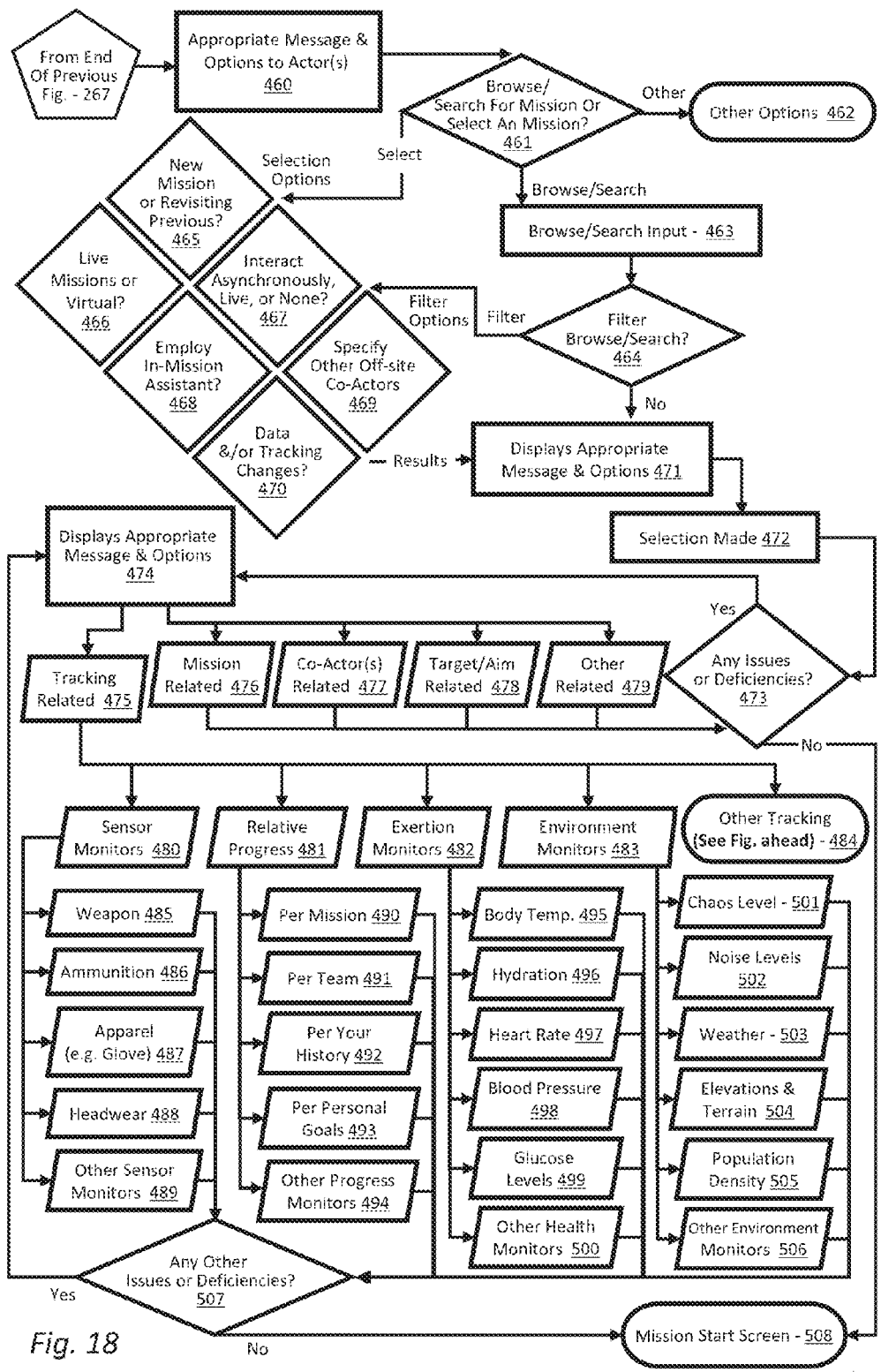
FIG. 18 is a flowchart depicting an embodiment and example of the options for an actor utilizing the Weapon and SWARMER System after initialization
Figure 19:
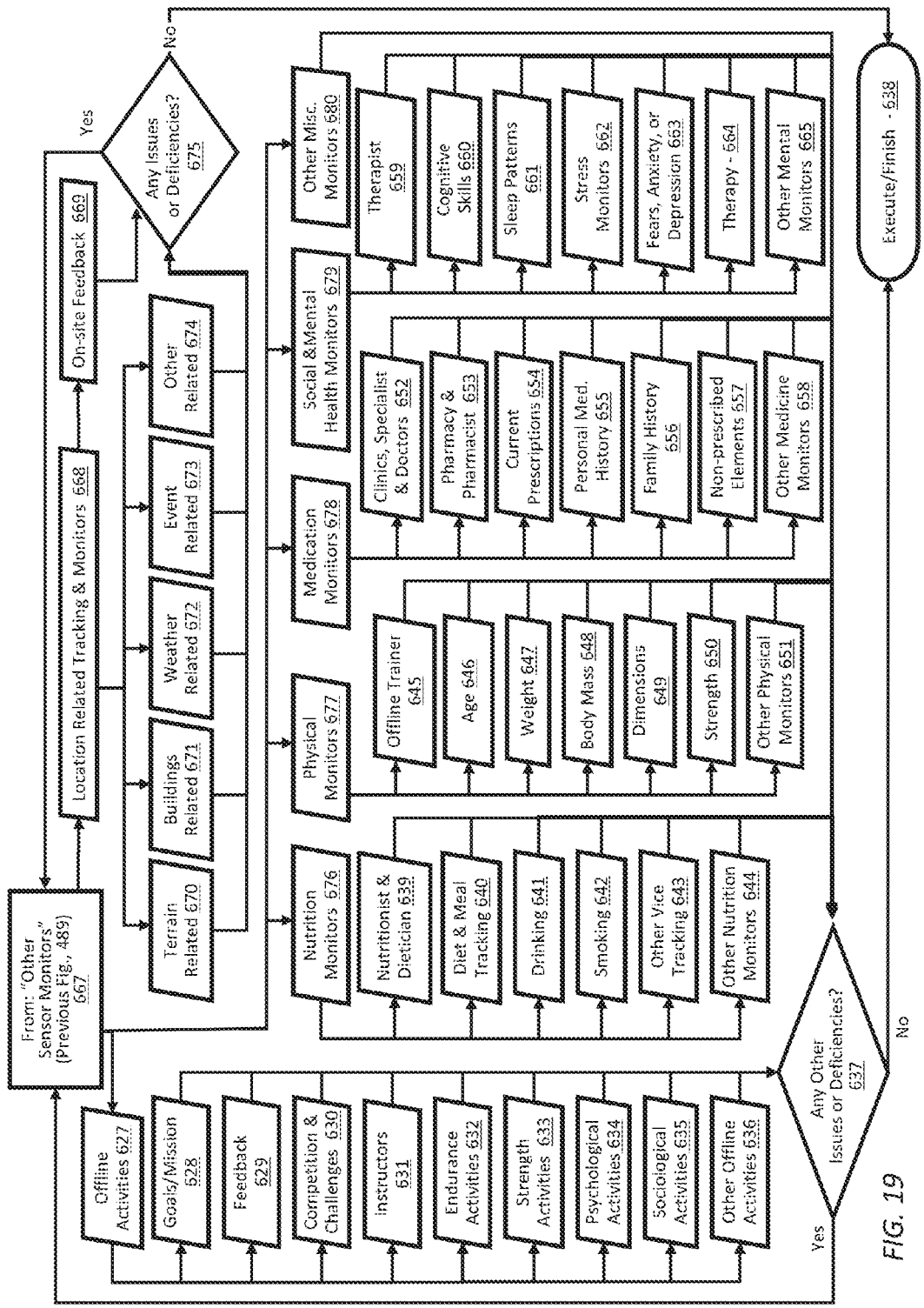
FIG. 19 is a flowchart depicting an embodiment and example of the additional "Other Sensor Monitor" options to an actor utilizing the SWARMER System for tracking.

FIG. 18 is a flowchart depicting an embodiment and example of the options for an actor utilizing the Weapon and SWARMER System after initialization FIG. 19 is a flowchart depicting an embodiment and example of the additional "Other Sensor Monitor" options to an actor utilizing the SWARMER System for tracking.

Figure 20:
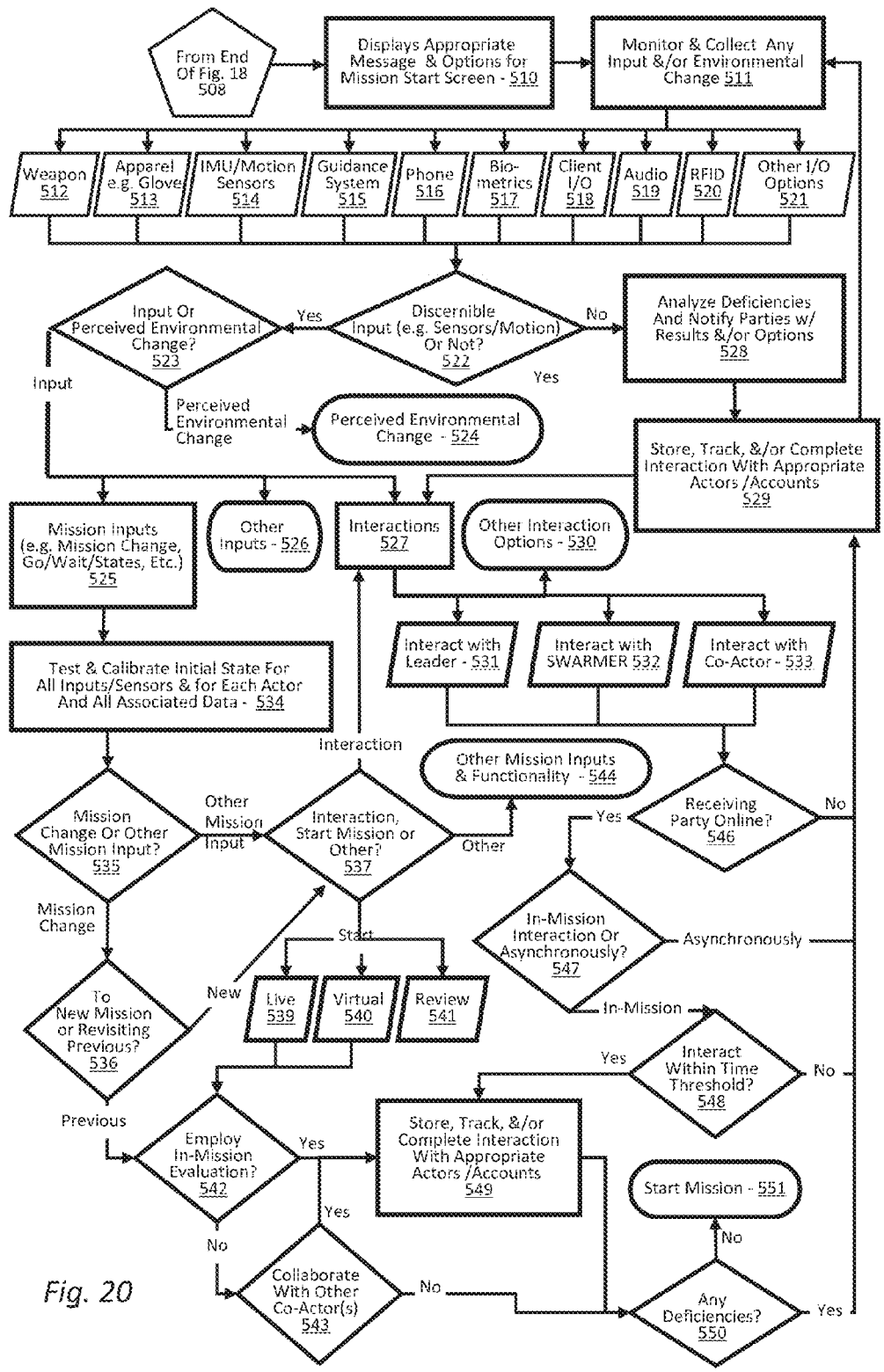
FIG. 20 is a flowchart depicting an embodiment and example of the range of setup options, including a variety of Input/Output options for interacting and tracking clients, sensors, and/or the like with the SWARMER system, as well as modes for setting up live missions, virtual missions, and/or reviewing previous missions/data.

FIG. 20 is a flowchart depicting an embodiment and example of the range of setup options, including a variety of Input/Output options for interacting and tracking clients, sensors, and/or the like with the SWARMER system, as well as modes for setting up live missions, virtual missions, and/or reviewing previous missions/data.

FIGS. 21a-21d are illustrative examples of sensor placements and encasements in/on a weapon, here with two sensors and the ability to track and guidance in 3D space, in an embodiment.

FIGS. 22a-22e are illustrative examples of sensor placements and encasements in/on a weapon, here with three sensors, a third for the trigger, and the ability to track and guidance in 3D space, in an embodiment.

FIGS. 23a-23c are another set of illustrative examples of sensor placements and encasements in/on a weapon and here with two sensors on the ammunition for additional tracking and guidance in 3D space, in an embodiment.

FIGS. 24a-24d are illustrative examples of database schema/table for collecting, parsing, indexing, and analyzing data retrieved from specific sensors, in an embodiment.

FIGS. 25a-25c are additional illustrative examples of database schema/table for collecting, parsing, indexing, and analyzing data retrieved from specific sensors, in an embodiment.

Figure 26:
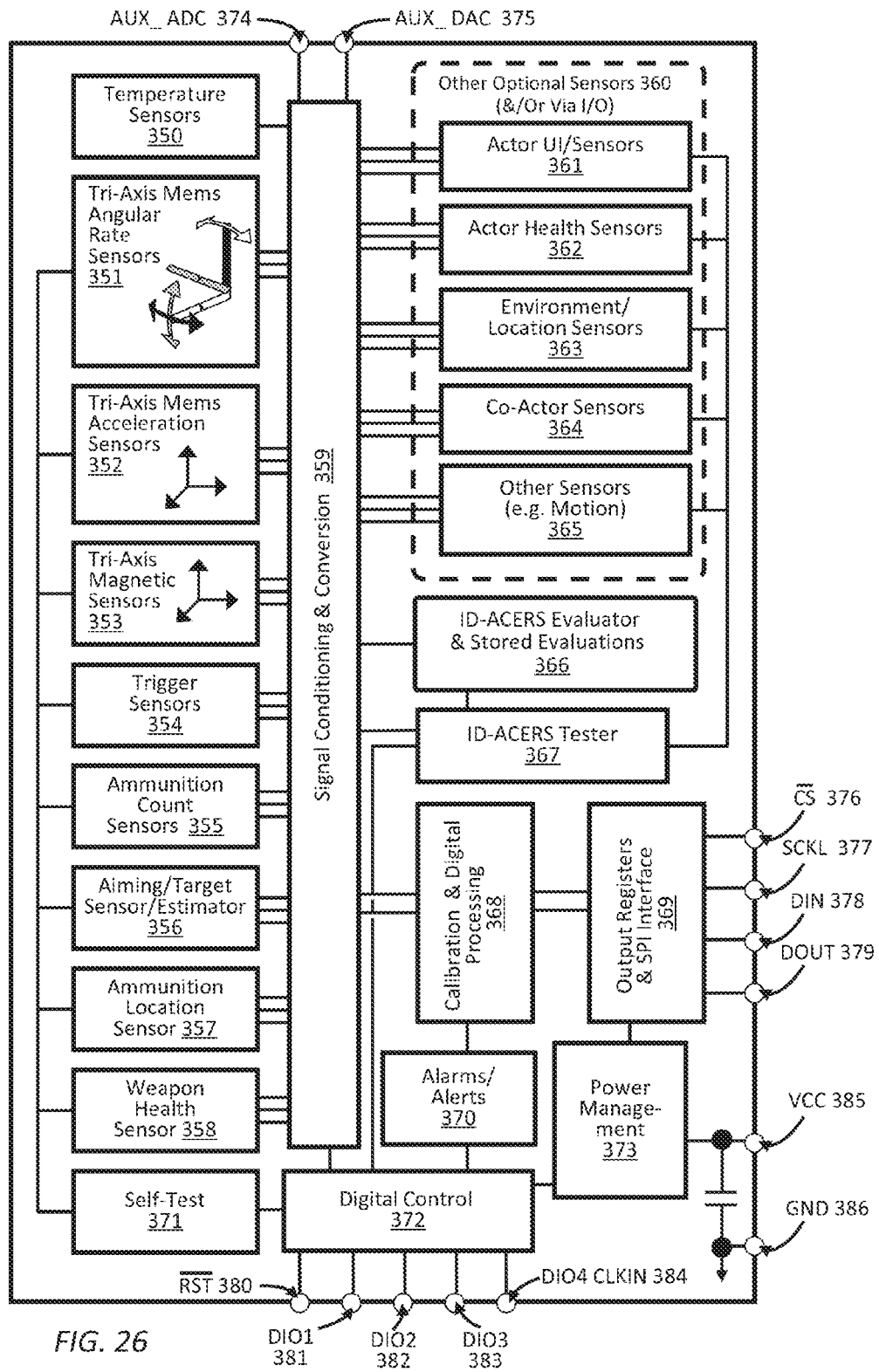
FIG. 26 is a block diagram depiction of the weapon system components for collecting data from the magnetometer sensors, in an embodiment.

FIG. 26 is a block diagram depiction of the weapon system components for collecting data from the magnetometer sensors, in an embodiment.

Figures 27A, 27B:
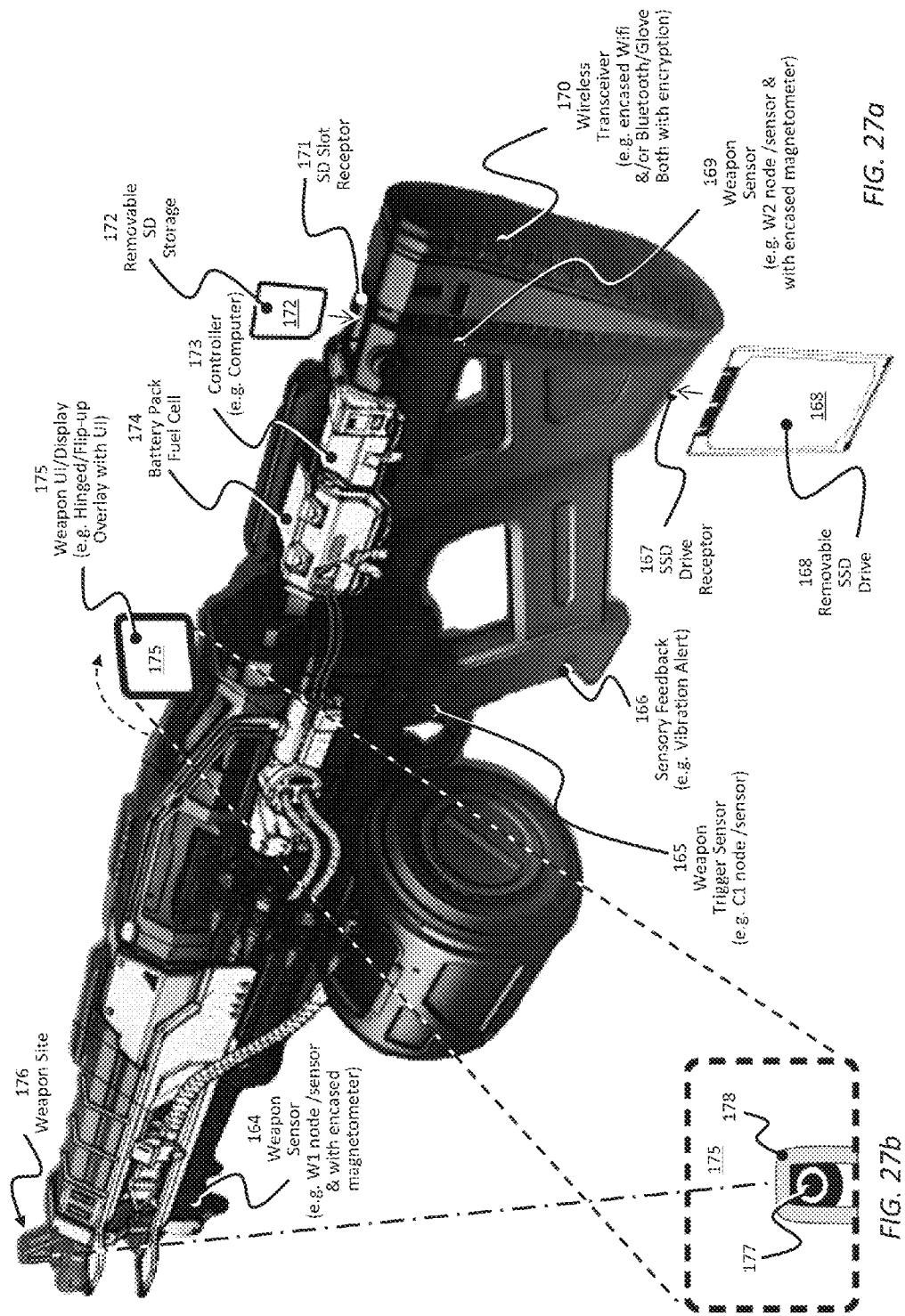
FIG. 27a is a perspective rendering of a weapon client/system depicting the placement of components, sensors, storage, power, controller, (optional) display, and/or the like, in an embodiment.
FIG. 27b is a breakaway isolated illustration of the weapon UI/Display 175 depicting the weapon site with a target 177.
Figure 29A:
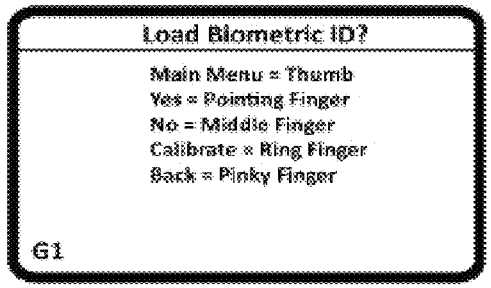
FIGS. 29a-29h and 30a-30h are a series of breakaway isolated illustration of the weapon UI/Display 175 during usage, in an embodiment.
Figure 29B:
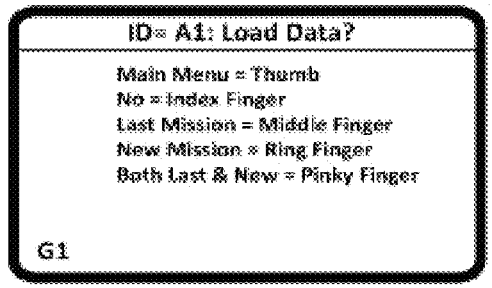
Figure 29C:
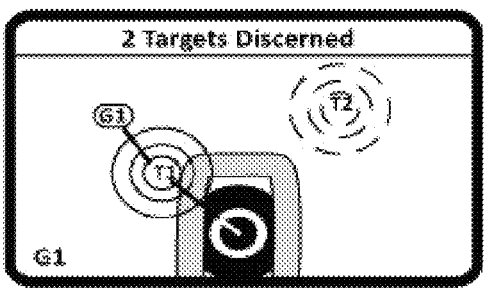
Figure 29D:
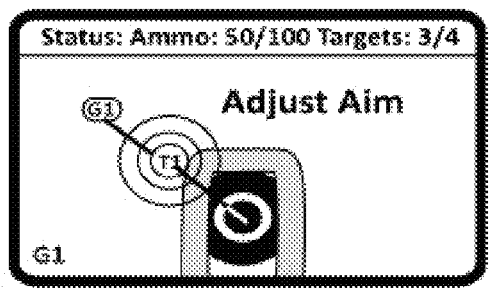
Figure 29E:
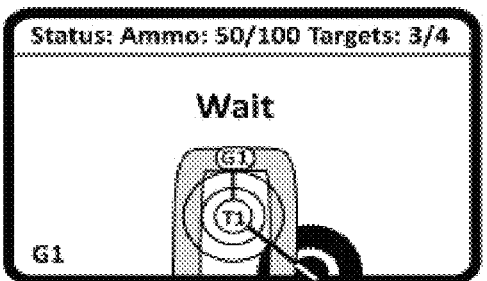
Figure 29F:
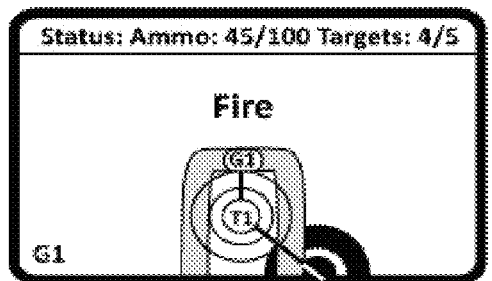
Figure 29G:
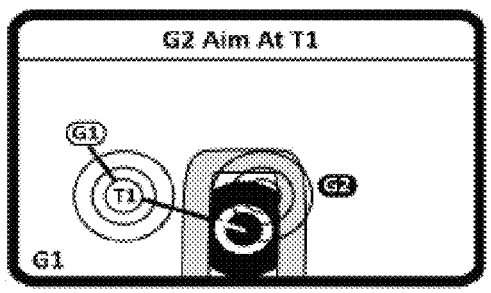
Figure 29H:
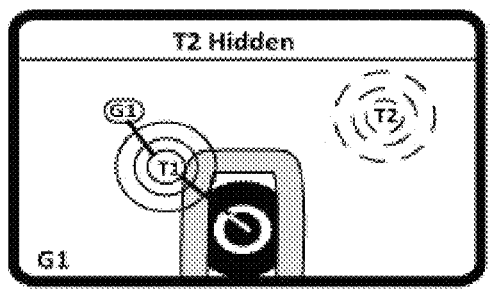
Figure 30A:
Figure 30B:
Figure 30C:
Figure 30D:
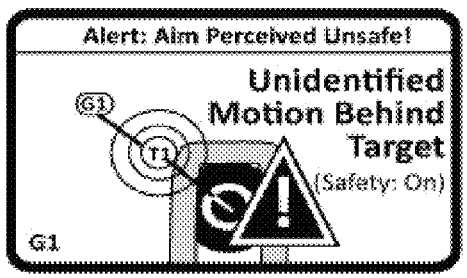
Figure 30E:
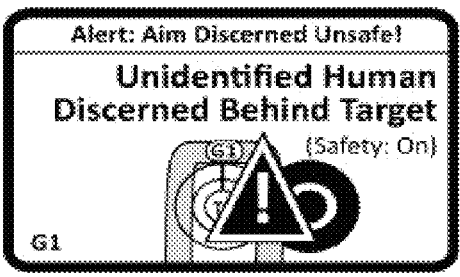
Figure 30F:
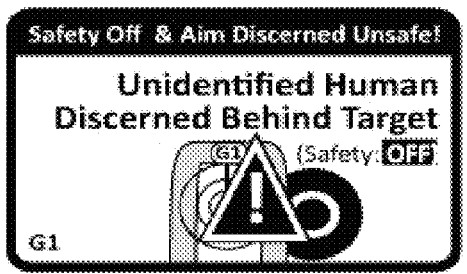
Figure 30G:
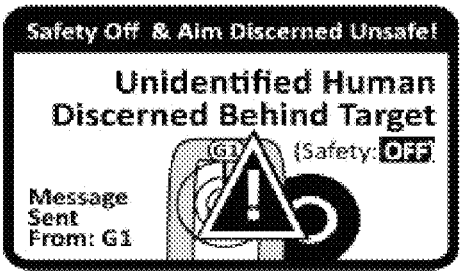
Figure 30H:
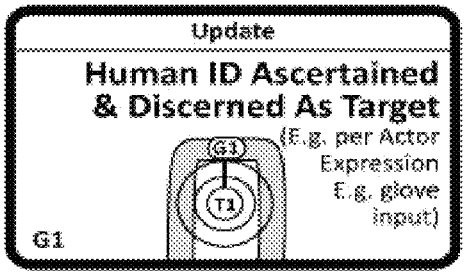

FIG. 27a is a perspective rendering of a weapon client/system depicting the placement of components, sensors, storage, power, controller, (optional) display, and/or the like, in an embodiment.

FIG. 27b is a breakaway isolated illustration of the weapon UI/Display 175 depicting the weapon site with a target 177.

FIG. 28a depicts the range of motion trackable by the magnetometer sensors in three dimensional (3D) space for the Weapon client in FIG. 28b, in an embodiment.

FIG. 28c depicts a smartphone with UI which may be synchronized with the Weapon System to operate/interact independently, in parallel, made interchangeable, replaceable, swappable, and/or mountable on the weapon itself, in an embodiment. FIG. 28d is an illustrative depiction of a Glove-UI that may also be synchronized with the Weapon System to operate/interact independently, in parallel, and/or the like, in an embodiment.

FIGS. 28e-28g is a series of breakaway isolated illustration of the weapon UI/Display 175 during a user/actor calibration sequence, in an embodiment.

FIGS. 29a-29h and 30a-30h are a series of breakaway isolated illustration of the weapon UI/Display 175 during usage, in an embodiment.

Figure 31:
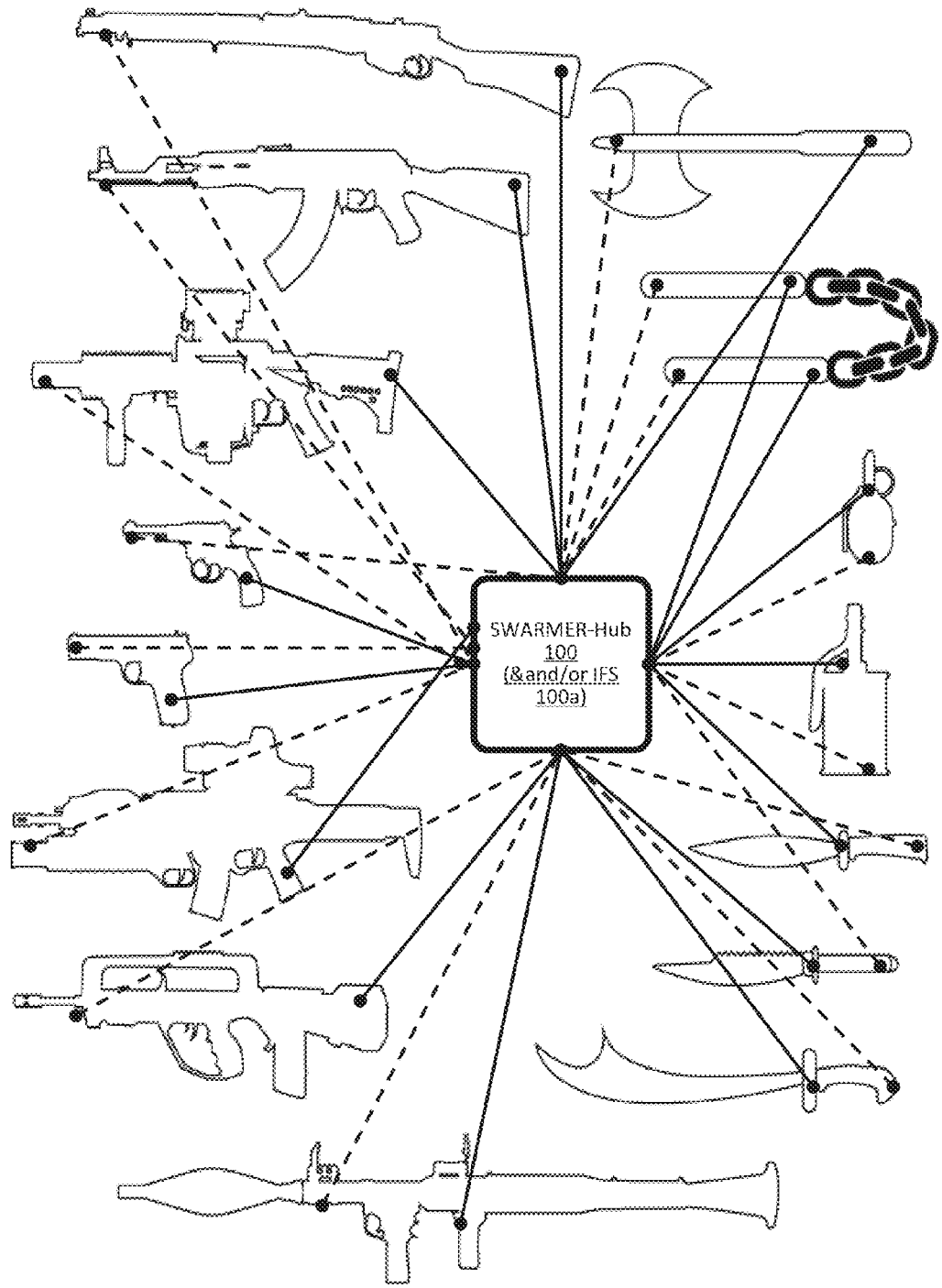
FIG. 31 is an illustrative example of the weapon tracking and sensor placement options for a variety of weapons utilizing the SWARMER System for tracking and assessing usage, performance, aiming, progress, safety, and/or the like, in an embodiment
Figure 32:
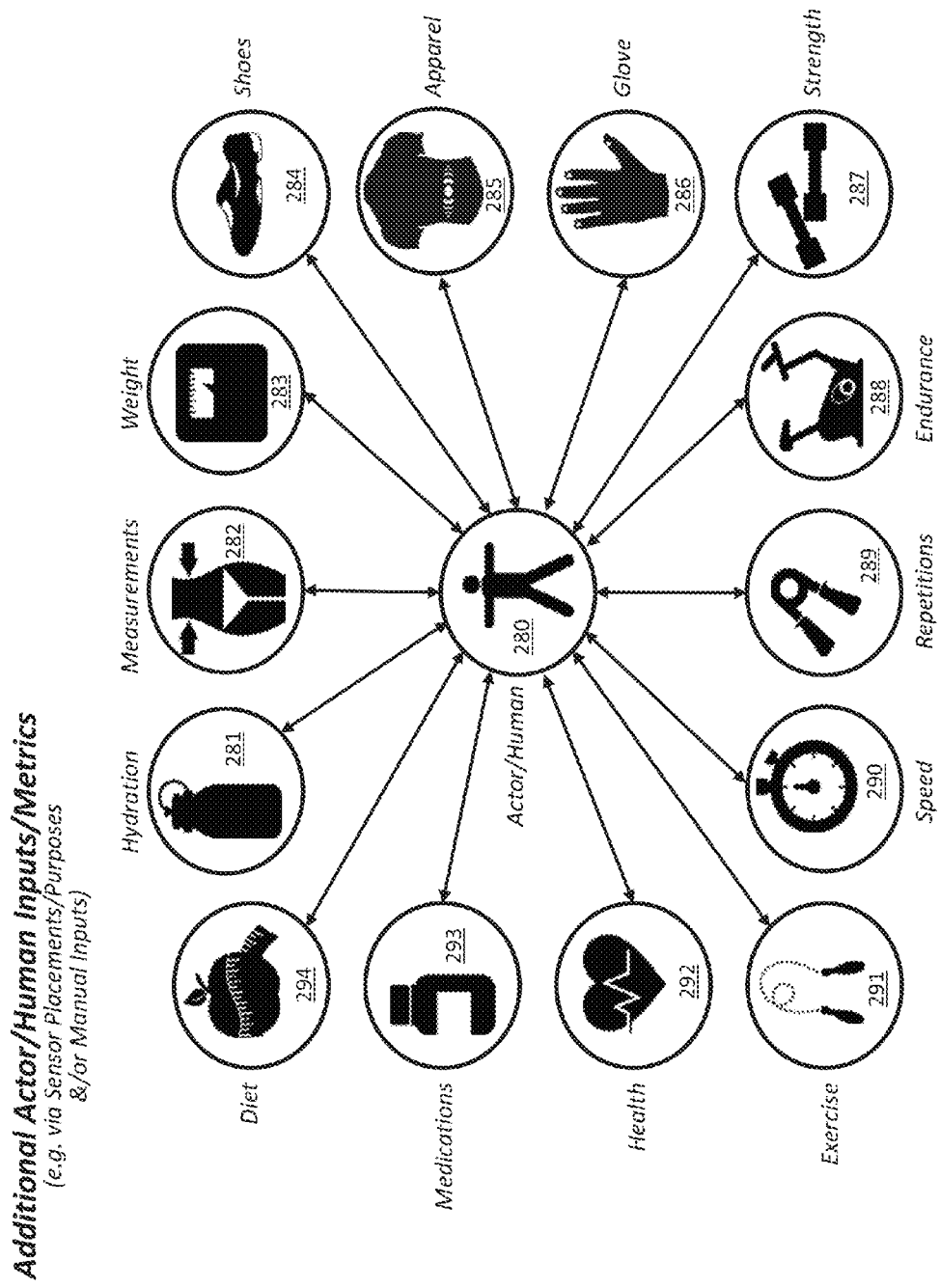
FIG. 32 is an illustrative example of the monitoring options for an actor utilizing the SWARMER System for tracking the Actor's fitness, health, and/or the like, in an embodiment
Figure 33:
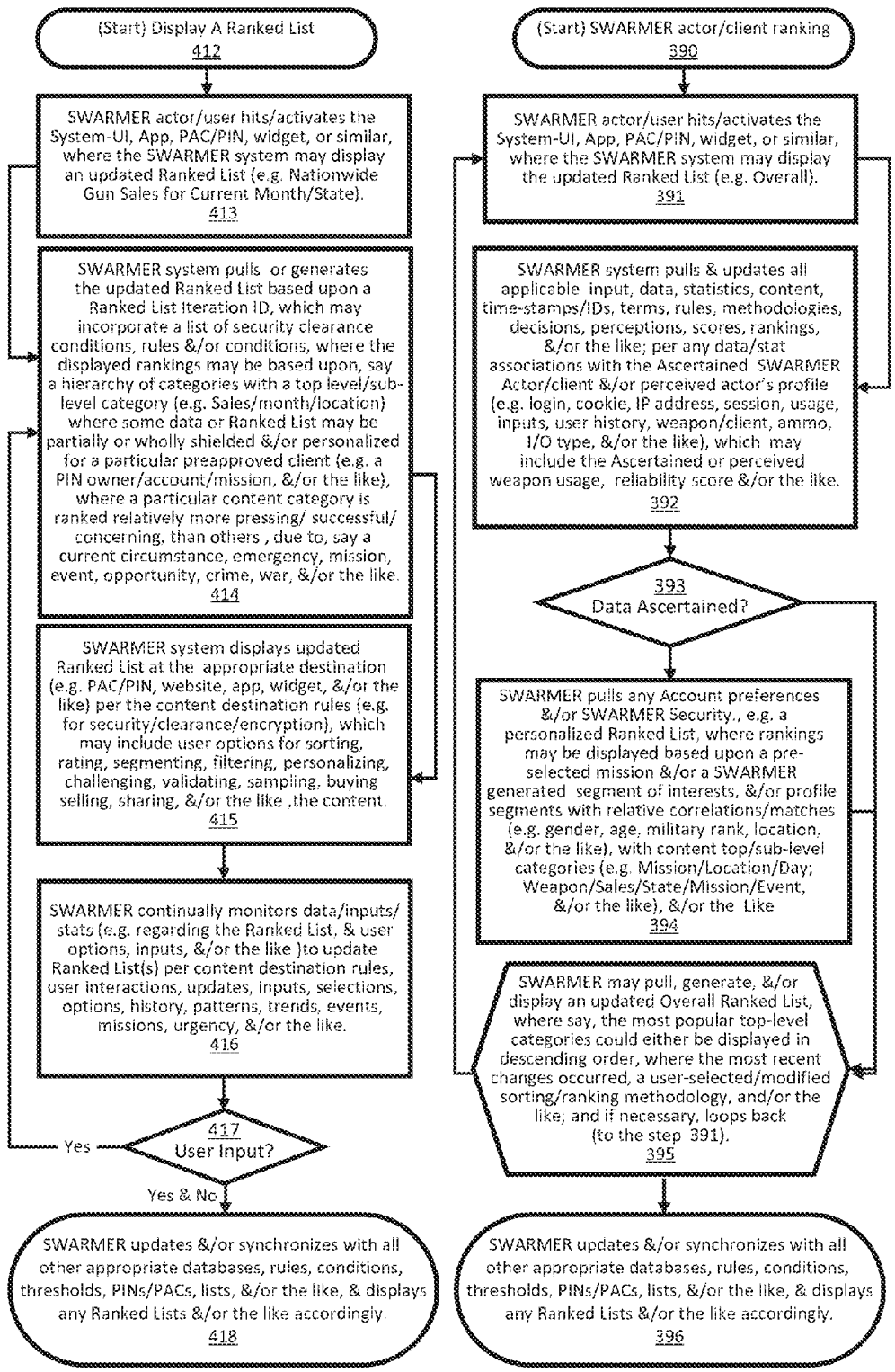
FIG. 33a is a flowchart depicting an embodiment and example of the process of displaying a ranked list of SWARMER data, such as for a prioritized list of weapon sales per a time period, per a location.
FIG. 33b is a flowchart depicting an embodiment and example of the process of displaying a ranked list of SWARMER actors, such as for a prioritized list of actors in terms of mission performance for a particular mission per a location per a time window.

FIG. 31 is an illustrative example of the weapon tracking and sensor placement options for a variety of weapons utilizing the SWARMER System for tracking and assessing usage, performance, aiming, progress, safety, and/or the like, in an embodiment FIG. 32 is an illustrative example of the monitoring options for an actor utilizing the SWARMER System for tracking the Actor's fitness, health, and/or the like, in an embodiment FIG. 33a is a flowchart depicting an embodiment and example of the process of displaying a ranked list of SWARMER data, such as for a prioritized list of weapon sales per a time period, per a location.

FIG. 33b is a flowchart depicting an embodiment and example of the process of displaying a ranked list of SWARMER actors, such as for a prioritized list of actors in terms of mission performance for a particular mission per a location per a time window.

SWARMER Court Management (122) Module

Figure 34:
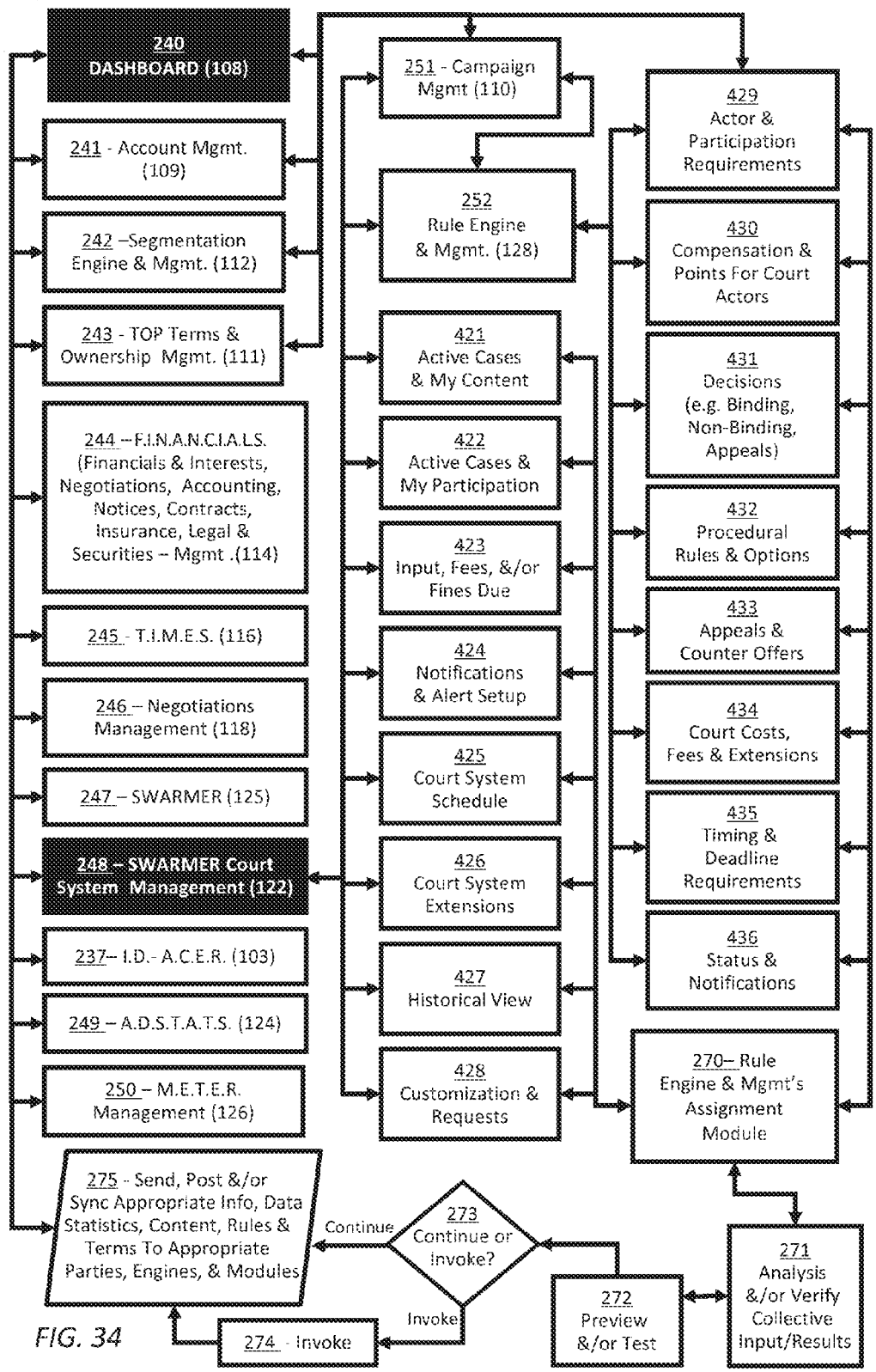
FIG. 34 is a block diagram with some flow charting steps depicting an embodiment of the SWARMER User/Actor/Member's functionality from the SWARMER Court Management (122) module.

FIG. 34 is a block diagram with some flow charting steps depicting an embodiment of the SWARMER User/Actor/Member's functionality from the SWARMER Court Management (122) module. Starting with the Dashboard (108) in the block 240, where the SWARMER system "Displays Options Per the User/Actor/Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. User/Actor/Member, Mission, etc.)."

In various non-limiting embodiments, the user of the SWARMER Court Management (122) module would preferably have a role, and/or at least equivalent to the same permissions required to be a SWARMER Court Mgr., where the SWARMER Court Mgr. utilizes the SWARMER Court Management (122) module to view, review, create and/or modify criteria requirements or rules generally related to negotiations and/or similar element (e.g. accepting, rejecting, countering, appealing) for a particular Mission or Mission element to be used in, say a particular P.A.C. (104) and/or a particular P.I.N. (106).

In various non-limiting embodiments, the Dashboard functionality in this "SWARMER Court Management" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "SWARMER." (120) module in a block 247, the "ID-ACERS" (103) module in a block 237, the "SWARMER Court Management" (122) module in a block 248, the "ADSTATS" (124) module in a block 249, the "METER Management" (126) (including Knowledge Management) module in a block 250, the "Campaign Management" (e.g. Mission Management) (110) module in a block 251, and the "Rule Engine and Management" (128) module in a block 252.

Further, where a list of options comprise an "Active Cases and My Data/content" module in a block 421, an "Active Cases and My Participation" module in a block 422, a "Input, Fees and/or Fines Due" module in a block 423, a "Notifications and Alert Setup" module in a block 424, an "SWARMER Court Schedule" module in a block 425, an "SWARMER Court Extensions" module in a block 426, a "Historical View" module in a block 427, a "Customization and Requests" module in a block 428, a "Participant and Participation Requirements" module in a block 429, a "Compensation and Points for Court Participants" module in a block 430, a "Decisions (e.g. Binding, Non-Binding, Appeals)" module in a block 431, a "Procedural Rules and Options" module in a block 432, an "Appeals and Counter Offers" module in a block 433, a "Court Costs, Fees and Extensions" module in a block 434, a "Timing and Deadline Requirements" module in a block 435, and a "Status and Notifications" module in a block 436; where the collective result similar to other step 271 examples, provides the "Verify Collective Input/Results" functionality/step along with the "Preview and/or Test" functionality/step 272, Next, a query 273 asks if the SWARMER User/Actor/Member would like to either "Continue or Invoke?" the rule? If the answer to query 273 is "Continue," as in continue utilizing the Dashboard functionality without invoking the rule, then a next step 275 with a "Send, Post and/or Sync Appropriate Info, Data, Statistics, Data/content, Rules and Terms to Appropriate Parties, Engines and Modules" is performed, where the SWARMER user may continue utilizing the Dashboard. If the answer to query 273 is instead "Invoke," then a step 274 is invoked for the particular rule, then the next step 275 with a "Send, Post and/or Sync Appropriate Info, Data, Statistics, Data/content, Rules and Terms to Appropriate Parties, Engines and Modules" is performed, where the SWARMER user may also then continue utilizing the dashboard.

<<

Figure 35:
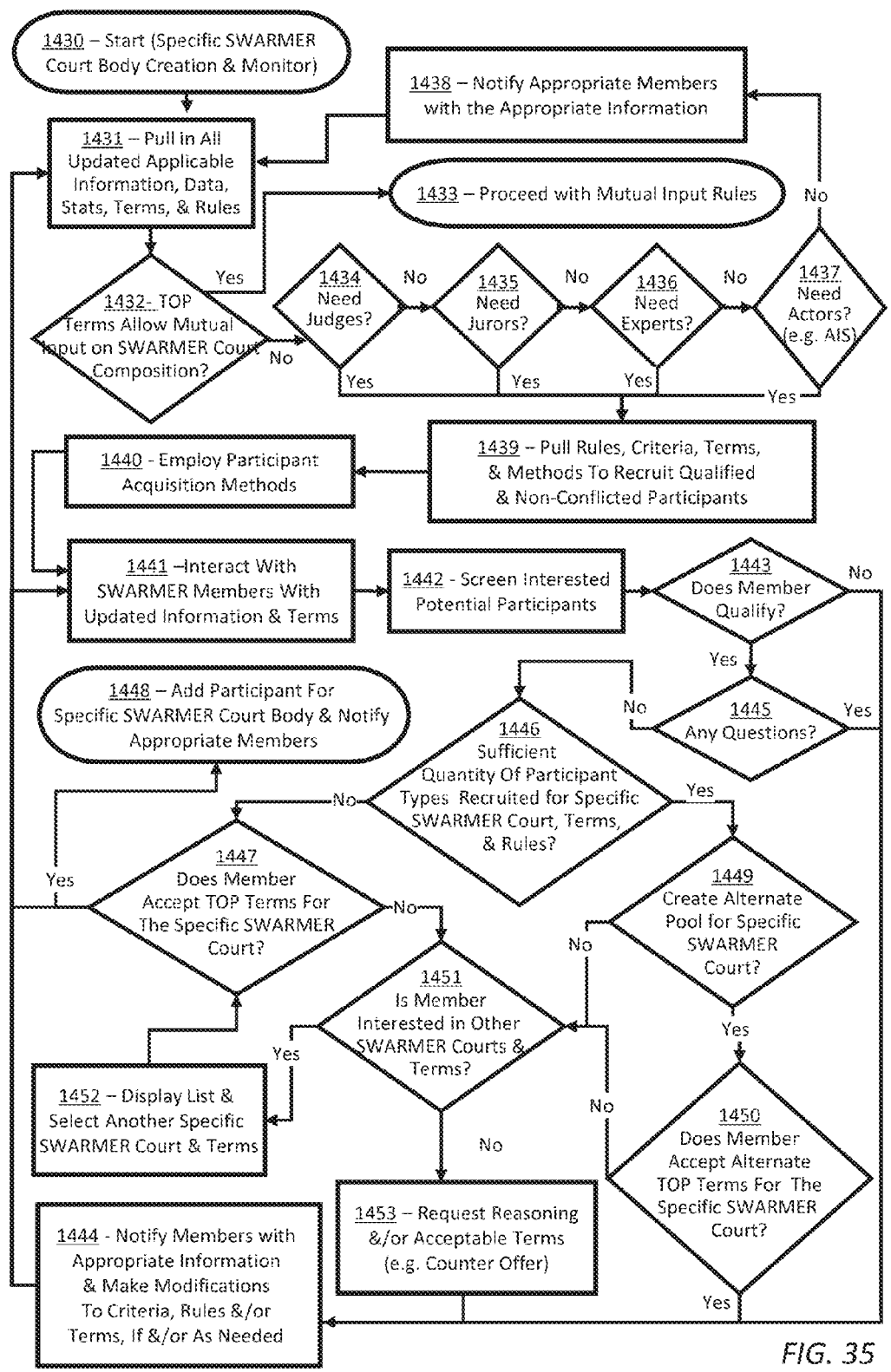
FIG. 35 is a flowchart that depicts a non-limiting embodiment and example of the SWARMER system, and associated computer-implemented method regarding a specific SWARMER Court Body Creation and Monitoring.

FIG. 35 is a flowchart that depicts an embodiment and example of the SWARMER system, and associated computer-implemented method regarding a specific SWARMER Court Body Creation and Monitoring. Starting with a terminal 1430 where a "Start (specific SWARMER Court Body Creation and Monitoring)" function appears, followed by a step 1431 with a "Pull in All Updated Applicable Information, Data, Statistics, Terms, and Rules." Next, a query 1432 asks "TOP Terms Allow Mutual Input on SWARMER Court Composition?" If the answer to query 1432 is "Yes," then the method continues to terminator 1433 "Proceed with Mutual Input Rules." If the answer to query 1434 is instead "No," then a query 1434 "Need judges?" is asked. If the answer to query 1434 is "No," then a query 1435 asks "Need Jurors?" If the answer to query 1435 is "No," then a query 1436 asks "Need Experts?" If the answer to query 1436 is "No," then a query 1437 asks "Need Actors? (e.g. AIS 195)," where the actor could be a particular actor, person, user, member, witness, source, resource, support, the AIS, a collection of these, a segment of these, and/or the like.

In various non-limiting embodiments, the judges, jurors, experts, and/or actors, could each, collective, individually, automatically, systematically, and/or via/by/or actor/user-prompt, be called upon to assess, interrogate, review, evaluate, authenticate, verify, validate, produce, witness, recall, establish, testify, justify, provide, could interrogated, could produce, could interpolate, rule, decide, partially decide, recuse themselves, participant, test-knowledge, skills, comprehension, and/or the like. In various non-limiting embodiments, each participant, participation, PO/PC per judges, jurors, experts, actors, attorney, agent, representative, entity, plaintiff, defendant, witness, could be partially, temporality, temporarily, absolutely, relatively, automatically, systematically, conditionally, continually, and/or via/by/or actor/user-prompt, be assessed, interrogated, reviewed, evaluated, authenticated, verified, validated, knowledge-tested, skill-tested, comprehension-tested, and/or the like. In various non-limiting embodiments, the judges, jurors, experts, actors, and/or the like testing and evaluating could be implemented, conducted, evaluated, and/or the like, by the MS.

Referring back to Fig, if the answer to query 1437 is "No," then the method proceeds to a step 1438 "Notify Appropriate Members/users with the Appropriate Information" and then loops back to the step 1431. If the answers to queries 1434-1437 were "Yes," the method continues to a step 1439 "Pull Rules, Criteria, Terms and Methods to Recruit Qualified and Non-Conflicted Participants." Next, is a step 1440 "Employ Participant Acquisition Methods," followed by a step 1441 "Interact with SWARMER Members with Updated Information and Terms." Next, step a 1442 acts to "Screen Interested Potential Participants," which leads to a query 1443, which asks "Does Member Qualify?" If the answer to query 1443 is "No," then the method continues to a step 1444 "Notify Members with Appropriate Information and Make Modifications to Criteria, Rules and/or Terms, If and/or As Needed," and then returns to step 1432.

If the answer to query 1443 is instead "Yes," then a query 1445 asks "Any Questions?" If the answer to query 1445 is "No," then query a 1446 asks if there is "Sufficient Quantity of Participant Types Recruited for Specific SWARMER Court, Terms and Rules?" If the answer to query 1446 is "No," then query a 1447 asks "Does Member Accept TOP Terms For the Specific SWARMER Court?" If the answer to query 1447 is "Yes," then a Terminator 1448 acts to "Add Participant for Specific SWARMER Court Body and Notify Appropriate Members."

If the answer to query 1446 is instead "Yes," then query a 1449 asks "Create Alternate Pool for Specific SWARMER Court?" If the answer to query 1449 is "Yes," then query a 1450 asks "Does Member Accept Alternate TOP Terms for the Specific SWARMER Court?" If the answer to query 1450 is "No," then query a 1451 asks "Is Member Interested in Other SWARMER Courts and Terms?" If the answer to query 1451 is "Yes," then step a 1452 proceeds to "Display List and Select Another Specific SWARMER Court and Terms." If the answer to query 1451 is instead "No," then a step 1453 "Request Reasoning and/or Acceptable Terms (e.g. Counter Offer)," and then returns to step 1444. Returning to query 1449, if the answer is instead "No," then query 1449 asks "Is Member Interested in Other SWARMER Courts and Terms?" Returning to query 1450, if the answer is instead "Yes," then embodiment returns to step 1444.

Figure 36:
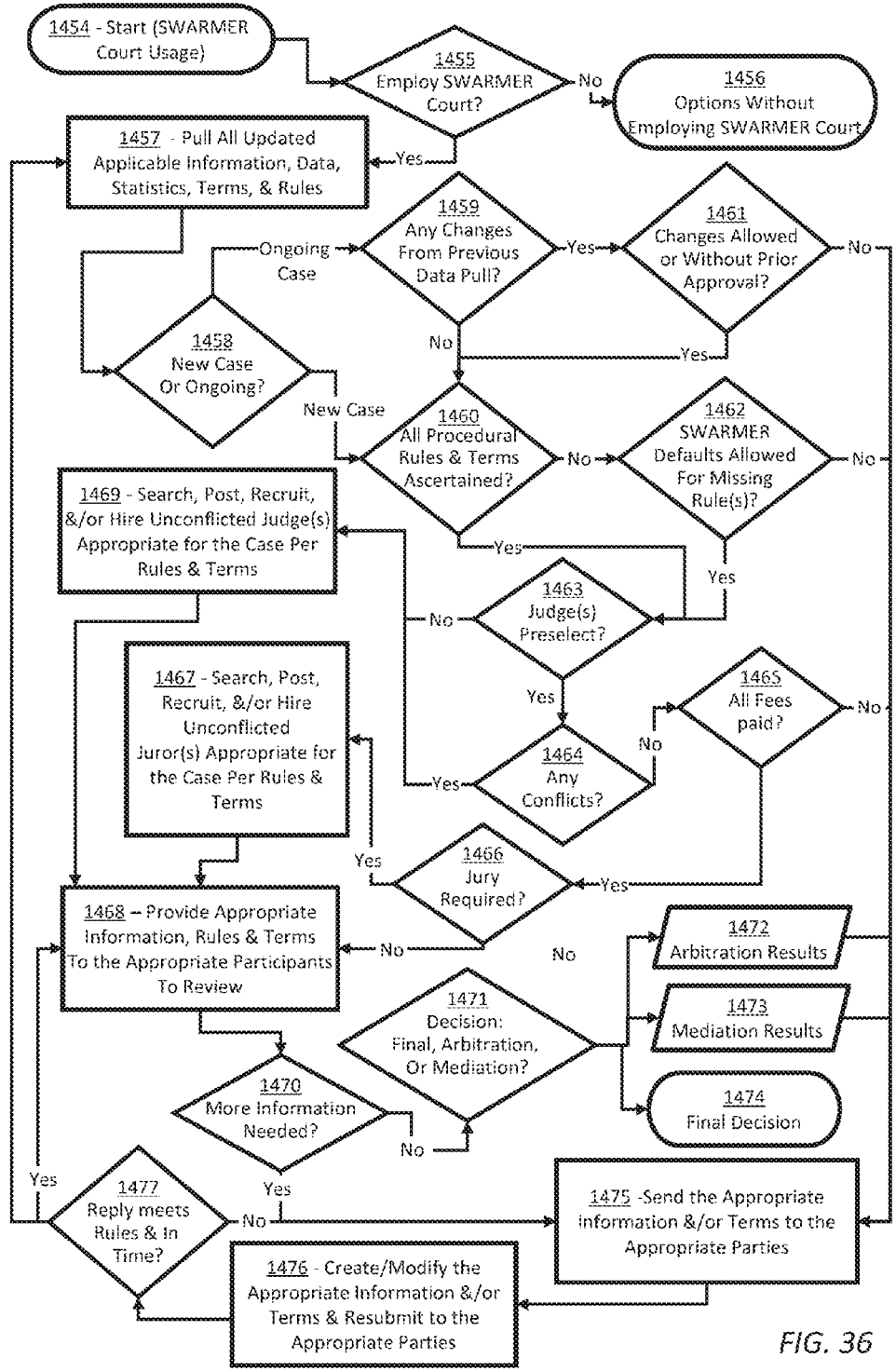
FIG. 36 is a flowchart that depicts a non-limiting embodiment and example of the SWARMER system, and associated computer-implemented method regarding SWARMER Court Usage.

FIG. 36 is a flowchart that depicts an embodiment and example of the SWARMER system, and associated computer-implemented method regarding SWARMER Court Usage. Starting with a terminal 1454 where a "Start (SWARMER Court Usage)" function appears, followed by a query 1455, which asks whether it's to "Employ SWARMER Court?" or not. If the answer to query 1455 is "No," then them method continues to a terminator 1456 "Options Without Employing SWARMER Court." If the answer to query 1455 is instead "Yes," then the method continues to a step 1457 Pull All Updates Applicable Information, Data, Statistics, Terms and Rules," which leads to a query 1458 that asks "New Case or Ongoing?" If the answer to query 1458 is "Ongoing Case," then a query 1459 asks "Any Changes From Previous Data Pull?" If the answer to query 1459 is instead "Yes," then a query 1461 asks "Changes Allowed or Without Prior Approval?" (A step 1475 (explained later))

If the answer to query 1459 is "No," then a query 1460 asks if "All Procedural Rules and Terms Ascertained?" If the answer to query 1460 is instead "No," then a query 1462 asks if "SWARMER Defaults Allowed for Missing Rule(s)?" If the answer to query 1462 is "Yes," then a query 1463 asks "Judge(s) Preselect?" If the answer to query 1463 is "Yes," then a query 1464 asks if there are "Any conflicts?" If the answer to query 1464 is "No," then a query 1465 asks if "All fees paid?" If the answer to query 1464 is instead "Yes," then the method continues to a Step 1469 "Search, Post, Recruit and/or Hire Unconflicted Juror(s) Appropriate for the Case Per Rules and Terms," which continues to a step 1468 (described later).

If the answer to query 1465 is "Yes," then a query 1466 asks if a "Jury Required?" If the answer to query 1466 is "Yes," then the method continues to a step 1467 "Search, Post, Recruit and/or Hire Unconflicted Juror(s) Appropriate for the Case Per Rules and Terms." Next, is a step 1468 "Provide Appropriate Information, Rules and Terms to the Appropriate Participants to Review." Next, a query 1470 asks if there is "More information Needed?" If the answer to query 1470 is "No," then leads to a query 1471 asking "Decision: Final, Arbitration or Mediation?" which the method and/or user may select from the following options: an option 1472 "Arbitration Rules," an option 1473 Mediation Rules, and a terminator 1474 "Final Decision."

If the answer to queries 1461, 1462, 1465, 1472, 1473 or 1477 is "No," then the method continues to a step 1475 where the method proceeds to "Send the appropriate Information and/or Terms to the Appropriate Parties." Next a step 1476 proceeds to "Create/Modify the Appropriate Information and/or Terms and Resubmit to the Appropriate Parties," which leads to a query 1477, which asks if the "Reply Meets Rules and In time?" if the answer to query 1477 is "Yes," then returns to step 1457.

Figure 37:
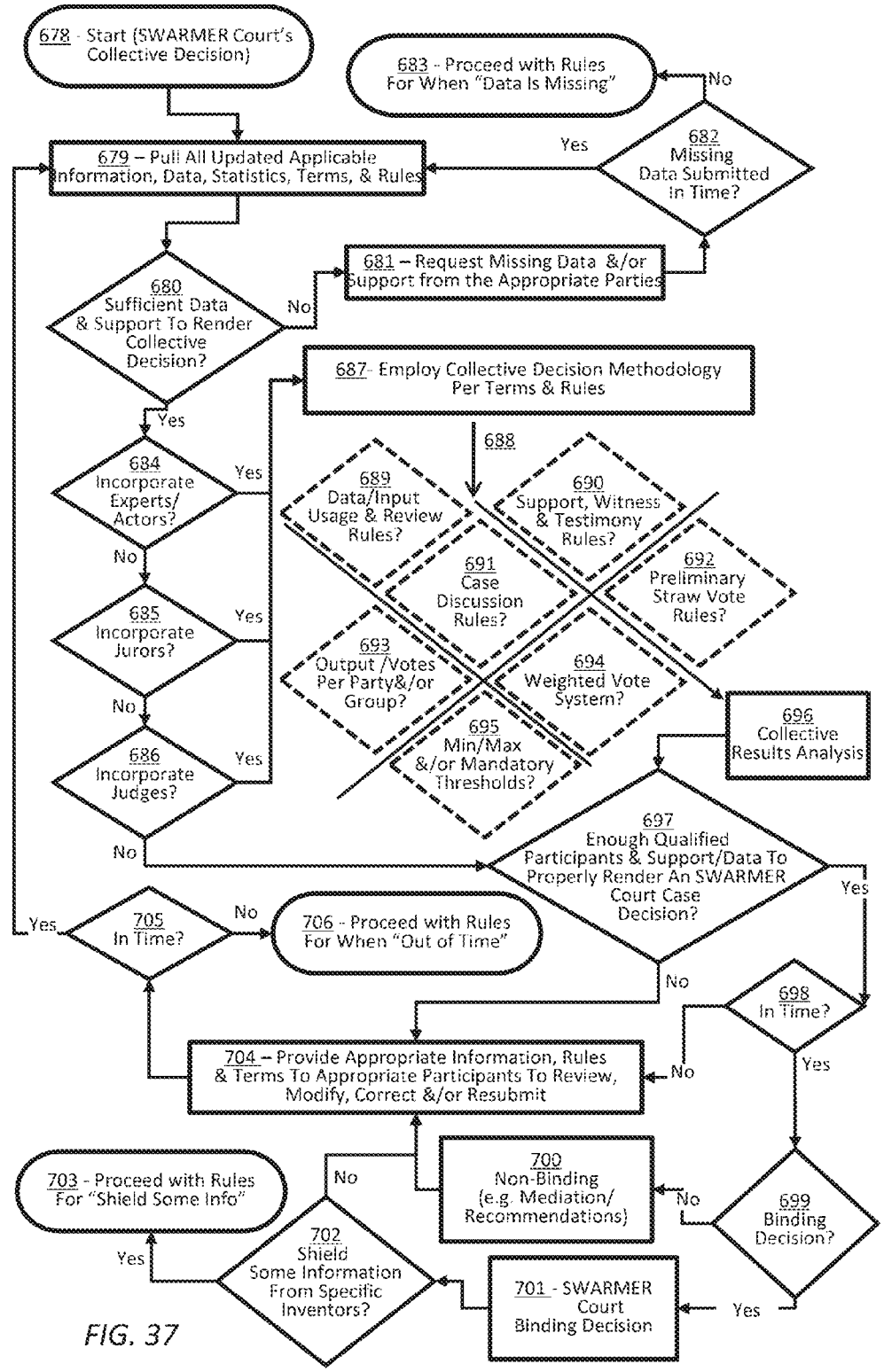
FIG. 37 is a flowchart that depicts a non-limiting embodiment and example of the SWARMER system, and associated computer-implemented method regarding SWARMER Court's Collective Decision.

FIG. 37 is a flowchart that depicts an embodiment and example of the SWARMER system, and associated computer-implemented method regarding SWARMER Court's Collective Decision. Starting with a terminal 678 where a "Start (SWARMER Court's Collective Decision)" function appears, followed by a step 679 with a "Pull in All Updated Applicable Information, Data, Statistics, Terms, and Rules." Next, a query 680 asks if there is "Sufficient Data and Support to Render Collective Decision?" If the answer to 680 is "No," then the method proceeds to a step 681 to "Request Missing Data and/or Support from the Appropriate Parties." Next is a query 682, which asks if the "Missing Data/Statistics Submitted in Time?" If the answer to query 682 is "No," then a terminator 683 prepares to "Proceed with Rules for When "Data is Missing." If the answer to query 682 is instead "Yes," then it returns to step 679.

If the answer to query 680 is instead "Yes," then a query 684 asks "Incorporate Experts (75)?" If the answer to query 684 is "No," then a query 685 asks "Incorporate Jurors?" If the answer to query 685 is "No," then a query 686 asks "Incorporate Judges?" If the answer to queries 684, 685 or 686 is "Yes," then a step 687 proceeds to "Employ Collective Decision Methodology Per Terms and Rules." In an option 688, the method and/or user may set, edit and/or modify the following: an option 689 "Data/Input Usage and Review Rules?" an option 690 "Support, Witness and Testimony Rules?" an option 691 "Case Discussion Rules?" an option 692 "Preliminary Straw Vote Rules?" an option 693 "Output/Votes Per Party and/or Group?" an option 694 "Weighted Vote System?" and/or an option 695 "Min/Max and/or Mandatory Thresholds?" where a Step 696 aggregates the "Collective Results Analysis."

With the "Collective Results Analysis" in place, a query 697 asks if there is "Enough Qualified Participants and Support/Data to Properly Render and SWARMER Court Case Decision?" If the answer to the query 697 is "Yes," then a query 698 asks "In Time?" If the answer to the query 698 is "No" when asking "In Time?" then the process proceeds to the step 704. If the answer to the query 698 is "Yes," then the method proceeds to a query 699 that asks if it is a "Binding Decision?" If the answer to the query 699 is "Yes," then a Step 701 presents that a "SWARMER Court Binding Decision" has been rendered. Based on the SWARMER Court Binding Decision in the step 701, a query 702 asks "Shield Some Information From Specific Inventors?" If the answer to the query 702 is "Yes," then the process proceeds to a terminator 703 "Proceed with Rules for 'Shield Some Info.'" If the answer to the query 702 is instead "No," then the process proceeds to a step 704 (explained later).

If the answer to the query 699 is "No," then the process proceeds to a Step 700 that presents "Non-Binding (e.g. Mediation/Recommendations). Next, the process proceeds to a step 704 "Provide Appropriate Information, Rules and Terms to Appropriate Participants to Review, Modify, Correct and/or Resubmit," followed by a query 705 asking "In Time?" If the answer to the query 705 is "No," then the process proceeds to a terminator 706 "Proceed with Rules For When 'Out of Time.'" If the answer to the query 705 is instead "Yes," then the process returns to the step 679.

With the "Collective Results" in place, a query 697 asks if there is "Enough Qualified Participants and Support/Data to Properly Render and SWARMER Court Case Decision?" and if the answer to the query 697 is instead "No," then the process proceeds to the step 704.

SWARMER/SWARMER Court/ECORT

In an embodiment of the SWARMER COURT, system and associated computer implemented method, there are court divisions and/or sub-courts. In various non-limiting embodiments, there is a particular court division (e.g. or sub-court), system and associated computer implemented methods for interrogating and/or providing a consumer with a relatively prompt and/or timely result from at least one of a group comprising an online resolution court, an online resolution trial, an online complaint resolution, an online resolution recommendation, an online resolution non-binding decision, and/or an online resolution binding decision;

collectively referred to as an "Expedited Civilian Online Resolutions and Trials" System (hereinafter the ECORT or the ECORT system).

In various non-limiting embodiments, the SWARMER system would preferably collect (e.g. pull, retrieve, download, sniff, crawl, monitor, track, bot, and/or the like) data, data correlations, data/content and/or the like to analyze any discerned and/or perceived issues, problems, efforts, anomalies, leader issues, bottlenecks, temporal conditions, health conditions, along with any correlated morale issues, legal issues, support issues, resource issues, attempts to resolve, remedy, and duration overall. In addition, any correlating actors, weapons, buyers, sellers, FFLs, governmental agencies, issues, resolutions, and/or the like; and attempting to resolve from each party, where efforts are tracked and scored. For instance, a particular user's efforts to remove a derogatory statement from his/her account, where, say something incorrectly appears as a criminal background or mental health issue (e.g. due to an unauthorized revolving charge to no longer valid credit card).

Where, for example, the civilian can conditionally request a resolution to a dispute with the ECORT system. In one embodiment example, a civilian could file an online complaint with the ECORT system, where the civilian could either utilize a web browser to navigate to a website to obtain an ECORT functionality from an ECORT User Interface (hereinafter the "ECORT-UI" or sometimes generically referred to as the "ECORT system") on a computer terminal, mobile device, and/or similar, or utilize a dedicated ECORT application on a computer connected to a communication system network connected to the ECORT system, or utilize the dedicated ECORT application on a mobile device and/or similar.

Figure 38:
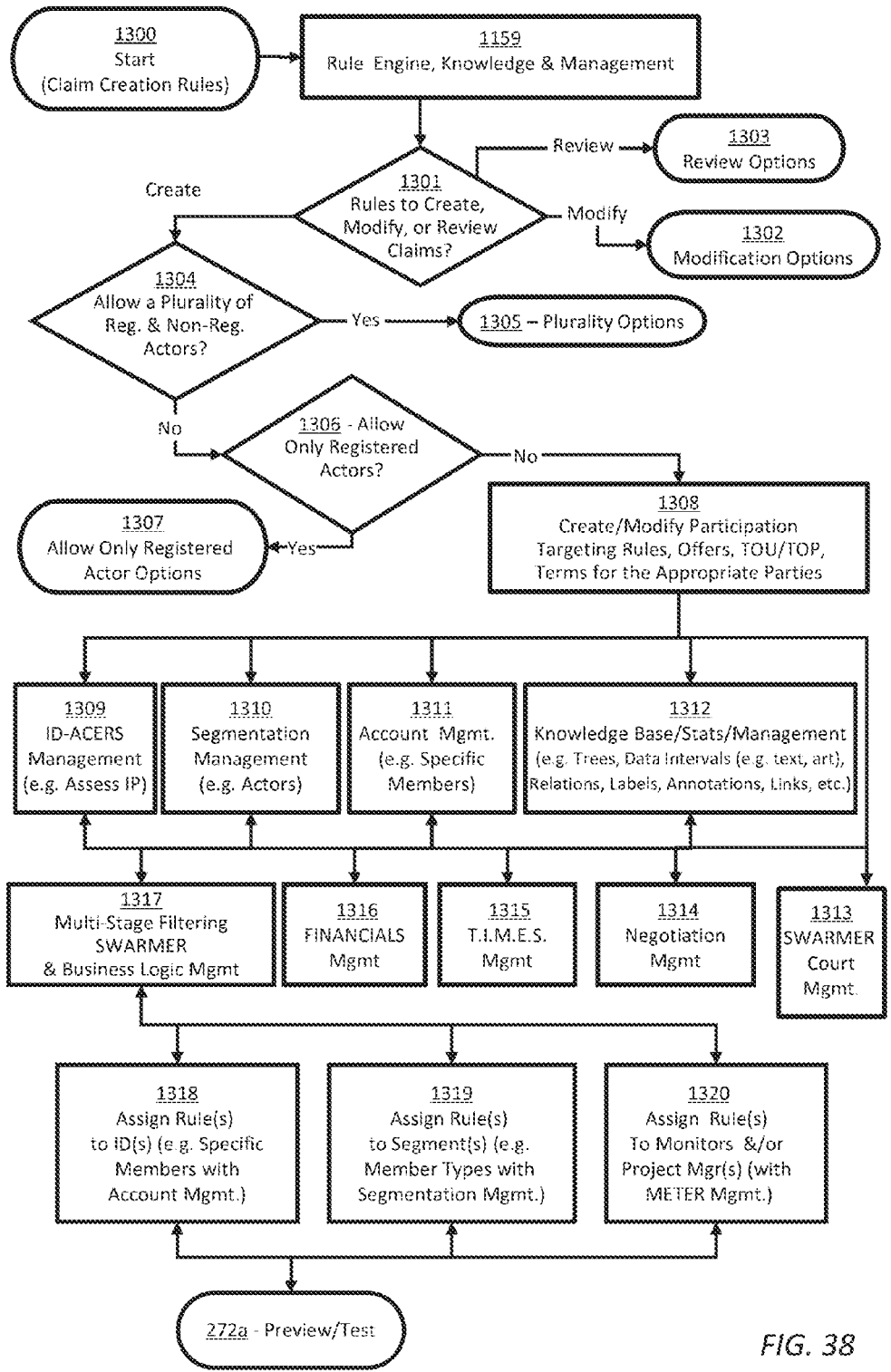

FIG. 38 is a flowchart that depicts a non-limiting embodiment and example of the SWARMER system, and associated computer-implemented method for Computer-Processor-based analysis, interrogation, extraction, evaluation and/or the like of I/O/PC, data/content with/for any mission components, elements, links, relations, concerns, collaboration, issues, conflicts, legal ramifications, overlap, scoring, verifications, prompts, and/or the like. Starting with a terminal 1300 where a "Start (Claim Collaborative Mission)" function appears, followed by a step 1159 "Rule Engine, Knowledge & Management," which is then followed by a query 1301, which asks whether it's a "Rule to Create, Modify, or Review Mission?"

If the answer to query 1301 is "Modify," then the method proceeds to a terminator 1302 "Modification Options." If the answer to query 1301 is "Review," then the method proceeds to a terminator 1303 "Review Options." If the answer to query 1301 is "Create," then the method proceeds to a query 1304 asks "Allow only Ascertained Targets?" If the answer to query 1304 is "No," then the method proceeds to a terminator 1305 "Options/Rules (e.g. For Discerned Targets)." If the answer to query 1304 is instead "Yes," the method proceeds to a query 1306 asks, "Allow Collateral Damage?"

If the answer to query 1306 is "Yes," then the method proceeds to a terminator 1307 "Allow Collateral Damage Options/Rules." If the answer to query 1306 is "No," then the method proceeds to a step 1308 "Create/Modify Participation Targeting Rules, Offers and Terms (TOP) for the Appropriate Parties," with modules for a "ID-ACERS Management (e.g. Assess Mission, Participants, Goals, Targets, Environment, Leadership, Timeline, Likely Causalities, Concerns, Legal Issues, and/or the like)" 1309 module, a "Segmentation Management (e.g. Participants)" 1310 module, an "Account Mgmt. (e.g. Specific Members)" 1311 module, a "Knowledge Base/Stats/Management (e.g. Ontologies, Libraries, taxonomies, Data Intervals/Segments (e.g. targets), Relations, Trees, Triples, Labels, Annotations, Links, etc.)" 1312 module, a "SWARMER Court Mgmt." 1313 module, a "Negotiation Mgmt." 1314 module, a "T.I.M.E.S. Mgmt." 1315 module, an "F.I.N.A.N.C.I.A.L.S. Mgmt." 1316 module, and a "Multi-Stage Filtering System and Business Logic Management" 1317 module.

In various non-limiting embodiments, the collective usage of the modules would preferably provide functionality to assign rules with an "Assign Rule(s) to ID(s) (e.g. Specific Members with Account Mgmt.)" 1318 module, an "Assign Rule(s) to Segmentation(s) (e.g. Member Types with Segmentation Mgmt.)" 1319 module, and/or an "Assign Rule(s) to Monitors and/or Project Mgr.(s) (with METER Mgmt.)" 1320 module, where the results may be previewed and/or tested in a terminator 272a "Preview/Test."

Figure 39:
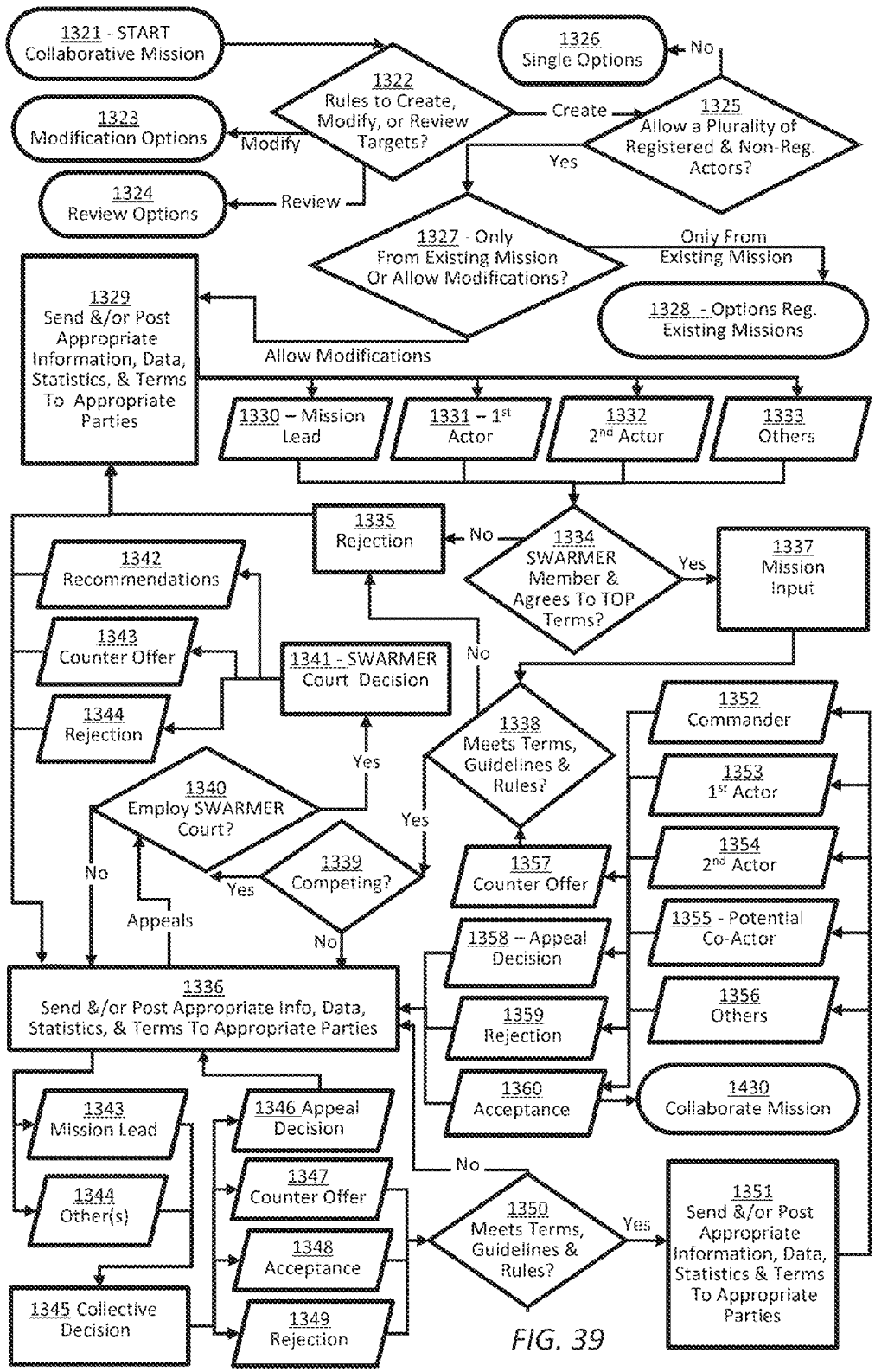
FIG. 39 is a flowchart that depicts a non-limiting embodiment and example of the SWARMER system, and associated computer-implemented method for determination of a mission lead, collaboration team/actors, goals, targets, components, and/or the like, say in advance of the mission, and/or in realtime of a mission, including a method to incorporate laws, regulations, commanders, and/or actor buy-in from the mission/team participants, leaders, instructors, and/or the like, per decision.

FIG. 39 is a flowchart that depicts a non-limiting embodiment and example of the SWARMER system, and associated computer-implemented method for determination of a mission lead, collaboration team/actors, goals, targets, components, and/or the like, say in advance of the mission, and/or in realtime of a mission, including a method to incorporate laws, regulations, commanders, and/or actor buy-in from the mission/team participants, leaders, instructors, and/or the like, per decision. Starting with a terminal 1321 where a "Start (Collaborative Mission)" function appears, followed by a query 1322, which asks whether it's a "Rules to Create, Modify, or Review Targets?"

If the answer to query 1322 is "Modify," then the method automatically, conditionally, and/or user selectively proceeds to terminator 1323 "Modification Options." If the answer to query 1322 is "Review," then the method automatically, conditionally, and/or user selectively proceeds to terminator 1324 "Review Options." If the answer to query 1322 is "Create," then the method proceeds a Query 1325 "Allow a Plurality of Registered and Non-Reg. Participants?"

If the answer to query 1325 is "No," then the method proceeds to Terminator 1326 "Single Options." If the answer to query 1325 is "Yes," the method proceeds to a query 1327 with "Only From Existing Materials Or Allow Additions?" If the answer to query 1327 is instead "Allow Additions," then the method proceeds to a Terminator 1328 with an "Allow Additions (See Next Fig.)."

If the answer to query 1327 is "Only From Existing Materials," then the method proceeds to a step 1329 with a "Send and/or Post Appropriate Information, Data, Statistics, and Terms to Appropriate Parties," where the method automatically, conditionally, and/or user selectively proceeds to a list of options with a "Mission Lead" (44) 1330 option; a "First Actor" (45) 1331 option, a "Second Actor" 1332 option, or an "Other(s)" (50) 1333 option.

In various non-limiting embodiments, the selection/results of the list of options 1330-1333 proceed to a query 1334, with a "SWARMER Member and Agrees to TOP Terms?" If the answer to query 1334 is "No," then the method proceeds to a 1335 "Rejection," where the method may proceed to both/or a step 1336 with a "Send and/or Post Appropriate Information, Data, Statistics, and Terms To Appropriate Parties" and the same in the step 1329 (e.g. depending on who is the appropriate party). If the answer to query 1334 is instead "Yes," then the method proceeds to a step 1337 for "Mission input," where the method proceeds to a Query 1338, which asks if the material submission "Meets Terms, Guidelines and Rules?"

If the answer to query 1338 is "No," then the method proceeds to the "Rejection" 1335. If the answer to query 1338 is instead "Yes," then the method proceeds a Query 1339, which asks "Competing?" where the material submitted may be competing with other submissions. If the answer to query 1339 is "Yes," then the method proceeds to a Query 1340, which asks whether to "Employ SWARMER Court?" If the answer to query 1340 is "Yes," then the method proceeds to a step 1341 for a "SWARMER Court Decision."

In various non-limiting embodiments, the SWARMER Court Decision in 1341 would preferably produce the decision, which may incorporate one of more from a list of options 1342-1344, which include a "Recommendations" 1342, a "Counter Offer" 1343, and/or a "Rejection" 1344, where, depending on the number of items involved in the case, there may be a plurality of decisions. In various non-limiting embodiments, the SWARMER Court Decision in 1341 would preferably produce a final decision (not shown), which may include recommendations, counter offers, acceptance, rejections, and/or the like, that may or may not be final.

In various non-limiting embodiments, the SWARMER Court Decision and method would proceed to both the step 1336, with a "Send and/or Post Appropriate Information, Data, Statistics, and Terms To Appropriate Parties" and to the same in the step 1329 (e.g. depending on who is the appropriate party).

If the answer to query 1340 is "No," then the method automatically, conditionally, and/or user selectively proceeds to step 1336. Proceeding from step 1336, there are a list of two options to the "Send and/or Post Appropriate Information, Data, Statistics, and Terms To Appropriate Parties," where the method automatically, conditionally, and/or user selectively proceeds to a list of options that include a "Mission Lead" (40) 1343 option and an "Other(s)" 1344 option. The method proceeds to step 1345 "Collective Decision," where the method automatically, conditionally, and/or user selectively proceeds to a list of options with an "Appeal Decision," 1346 option, a "Counter Offer" 1347 option, an "Acceptance" 1348 option, or a "Rejection" 1349 option. Then the method automatically, conditionally, and/or user selectively proceeds query 1350 "Meets Terms, Guidelines and Rules?" If the answer to query 1350 is "No," then the method automatically, conditionally, and/or user selectively proceeds to 1336. If the answer to query 1350 is instead "Yes," the method automatically, conditionally, and/or user selectively proceeds step 1351 "Send and/or Post Appropriate Information, Data, Statistics, and Terms To Appropriate Parties," where the method automatically, conditionally, and/or user selectively proceeds to a list of options that include a Commander 1352 option, the "First Actor" 1353 option, the "Second Actor" 1354 option, a "Potential Co-Actor" 1355 option, an "Others" 1356 option, a "Counter Offer" 1357 option, an "Appeal Decision" 1358 option, a "Rejection" 1359 or an "Acceptance" 1360 option. The method automatically, conditionally, and/or user selectively proceeds to step 1336.

Figure 40:
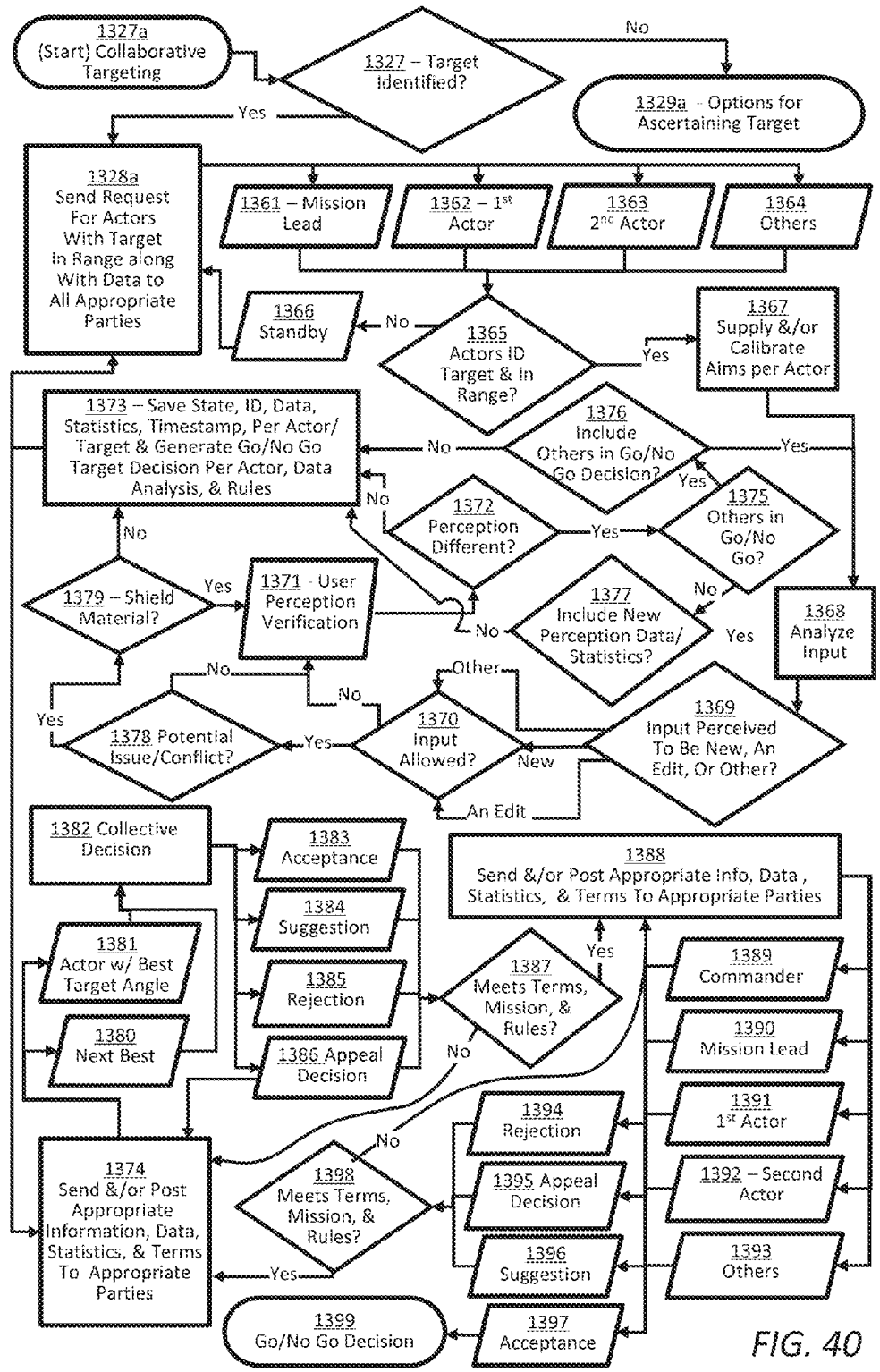

FIG. 40 is a flowchart that depicts a non-limiting embodiment and example of the SWARMER system, and associated computer-implemented method for determination of a Go/No Go Decision for a particular Mission and/or Target with collaborative Actors and determining which Actor(s) have the best target knowledge, angle, perspective, data, capacity, rank, authority, support, creditability, and/or the like. Starting with a terminal 1327a "(Collaborative Targeting)" function, followed by a query 1327, which asks if "Target Identified?"

If the answer to query 1327 is "No," the method proceeds to terminator 1329a "Options for Ascertaining Target(s)." If the answer to query 1327 is "Yes," the method proceeds step 1328a Send Request For Actors With Target In Range along with Data to All Appropriate Parties. From 1328a, the method and/or user may select automatically, conditionally, and/or user selectively proceeds to a list of options that include a "Mission Lead" 1361 option, a "First Actor" 1362 option, a "Second Actor" 1363 option or an "Others" 1364 option.

The method then proceeds to a query 1365 that asks if "Actor [has] Identified Target and [if Target is] in Range?" If the answer to query 1365 is "No," then the method proceeds to 1366 "Standby" status, then the method returns to step 1328a. If the answer to query 1365 is instead "Yes," then the step 1367 "Supply &/or Calibrate Aims per Actor", where the actor and/or a plurality of actor can aim at the (same) target to individually and/or collective calibrate, orient, register, and confirm the collaborative actors aim and target. From here, the method proceeds to step 1368 "Analyze Input." The method proceeds to query 1369 where it asks if "Input Perceived to be New Material, An Edit or Other? If the answer to query 1369 is "Other," "New," or "An Edit," then the method proceeds query 1370 where it asks if an "Input Allowed?" If the answer to query 1370 is "No," then the method proceeds to step 1371 "User Perception Verification." Next, the method proceeds query 1372 "Perception Different?" If the answer to query 1372 is "no," then the method proceeds step 1373 "Generate and Save State Data, Statistics, Timestamp, Per Member, With Restrictions and Comments Per Synchronization and Rules." Next, the method proceeds to step 1374 "Send and/or Post Appropriate Information, Data, Statistics, and Terms To Appropriate Parties."

If the answer to query 1372 is instead "Yes," the method proceeds to a query 1375 "Others in Go/NO Go [Decision]?" (e.g. employ SWARMER Court?) If the answer to query 1375 is "Yes," then the method proceeds to query 1376 "Include Others in Go/No Go Decision?" (e.g. the SWARMER Court Decision/process). If the answer to query 1375 is instead "No," then the method proceeds to query 1377 "Include New Perception Data/Statistics?" If the answer to query 1376 is "No," the method returns to step 1373. If, back a query 1370, the answer is "Yes," then the method proceeds to query 1378 "Potential Inventorship?"

If the answer to query 1378 is "No," the method returns to step 1371. If the answer is instead 'Yes," then the method proceeds to query 1379 "Shield Material?" If the answer to query 1379 is "Yes," then the method returns to step 1371. If the answer to query 1379 is instead 'No," then the method returns to step 1373.

Proceeding from step 1374, there are a list of two options to the "Send and/or Post Appropriate Information, Data, Statistics, and Terms To Appropriate Parties," where the method automatically, conditionally, and/or user selectively proceeds to a list of options that include an "Actor with Best Target Angle (e.g. via Actor input, ID-ACERS, SWARMER Court, and SWARMER analysis)(40) 1381 option and a "Next Best [Actor/Angle, etc.]" 1380 option. The method proceeds to step 1382 "Collective Decision," where the method automatically, conditionally, and/or user selectively proceeds to a list of options with an "Appeal Decision," 1386 option, a "Counter Offer" 1384 option, an "Acceptance" 1383 option, or a "Rejection" 1385 option.

Next, the method proceeds to query 1387 "Meets Terms, Guidelines and Rules?" If the answer to query 1387 is "No," then the method proceeds return to step 1374. If the answer is instead "Yes," the method proceeds step 1388 "Send and/or Post Appropriate Information, Data, Statistics, and Terms to Appropriate Parties," where the method automatically, conditionally, and/or user selectively proceeds to a list of options that include a "Commander" 1389 option, a "Mission Lead" 1390 option, a "First Actor" 1391 option, a "Second Actor" 1392 option, an "Others" 1393 option, a "Rejection" 1394, an "Appeal Decision" 1395 option, a "Suggestion (or Counter Offer)" 1396 option, or an "Acceptance" 1397 option.

Joint-Inventor/Co-Inventor Next, the method proceeds to query 1398 "Meets Terms, [Mission, Laws] Guidelines and Rules?" If the answer to query 1398 is "Yes," the method returns to step 1374. If the answer is instead 'no," then the method returns to step 1388. From option 1397, the method proceeds to a terminator 1399 "Collaborated Claim(s)."

ADSTATS Management (124) Module.

Figure 41:
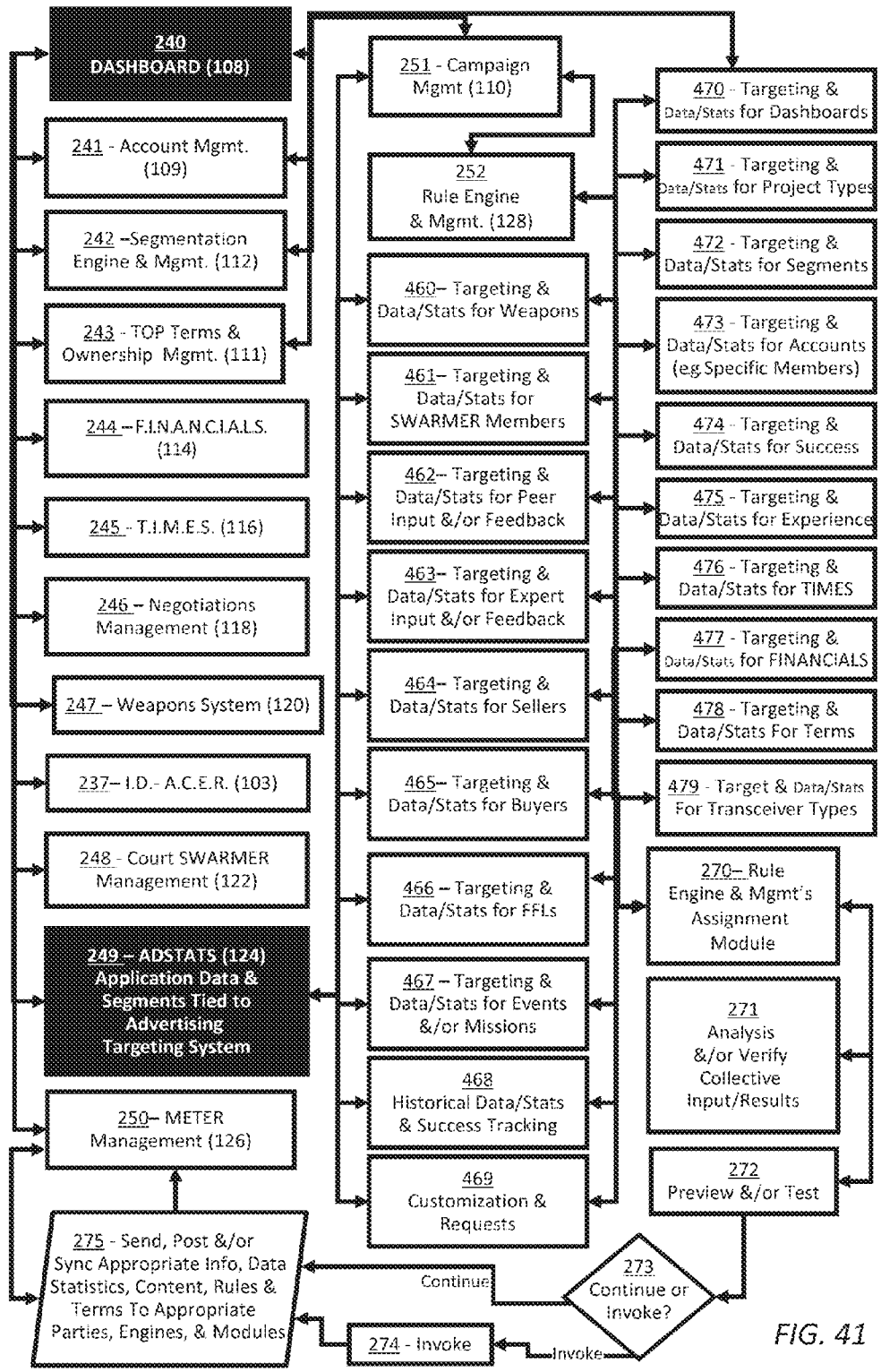
FIG. 41 is a block diagram with some flow charting steps depicting an embodiment of the SWARMER User/Actor/Member's functionality from the SWARMER ADSTATS (124) module.

FIG. 41 is a block diagram with some flow charting steps depicting an embodiment of the SWARMER member's functionality from the ADSTATS Management (124) module. Starting with the Dashboard (108) in the block 240, where the SWARMER system "Displays Options Per the Member's Role, Permissions, and Applicable Terms and Rules" and will also invoke (if not already) "Generate, Save, Synchronize and Track All States, Intervals, Iterations, Data, Statistics, Perceptions, and Input per Timestamp, Rules and Terms With Associated IDs (e.g. Member, Mission, etc.)."

In various non-limiting embodiments, the user of ADSTATS (124) (Application Data and Segments Tied to Advertising Targeting System) module would preferably require the role, and/or at least equivalent to the same permissions required to be a ADSTATS Mgr. In various non-limiting embodiments, the ADSTATS Mgr. utilizes the ADSTATS Management (124) module to view, review, create and/or modify criteria requirements or rules generally related to negotiations and/or similar element (e.g. accepting, rejecting, countering, appealing) for a particular Mission or Mission element to be used in, say a particular P.A.C. (104) and/or a particular P.I.N. (106).

In various non-limiting embodiments, the Dashboard functionality in this "ADSTATS" focused embodiment comprises of the "Account Management" (109) module in a block 241, the "Segmentation Engine and Management" (112) module in a block 242, the "TOP Terms and Ownership Management" (111) module in a block 243, the "F.I.N.A.N.C.I.A.L.S. (Financial and Interests, Negotiations, Accounting, Notices, Contracts, Insurance, Legal and Securities—Mgmt.)" (114) module in a block 244, the T.I.M.E.S." (116) module in a block 245, the "Negotiations Management" (118) module in a block 246, the "Weapons Systems" (120) module in a block 247, the "ID-ACERS" (103) module in a block 237, the "SWARMER Court Management" (122) module in a block 248, the "ADSTATS" (124) module in a block 249, the "METER Management" (126) (including Knowledge Management) module in a block 250, the "Campaign Management" (e.g. Mission Management) (110) module in a block 251, and the "Rule Engine and Management" (128) module in a block 252.

In various non-limiting embodiments, the Dashboard functionality in this "ADSTATS" focused embodiment further comprises a "Targeting and Data/Statistics for Weapons" module in a block 460, a "Targeting and Data/Statistics for SWARMER Court and Participants" module in a block 461, a "Targeting and Data/Statistics for Peer Input and/or Feedback" module in a block 462, a "Targeting and Data/Statistics for Expert Input and/or Feedback" module in a block 463, a "Targeting and Data/Statistics for Sellers" module in a block 464, a "Targeting and Data/Statistics for Buyers" module in a block 465, a "Targeting and Data/ Statistics for FFLs" module in a block 466, a "Targeting and Data/Statistics for Events [&/or Missions]" module in a block 467, a "Historical Data/Statistics and Success Tracking" module in a block 468, and a "Customization and Requests" module in a block 469.

In various non-limiting embodiments, the Dashboard functionality in this "ADSTATS" focused embodiment further comprises a "Targeting and Data/Statistics for Dashboards" module in a block 470, a "Targeting and Data/ Statistics for Mission Types" module in a block 471, "Targeting and Data/Statistics for Segments" module in a block 472, "Targeting and Data/Statistics for Accounts (60) (e.g. Specific Members)" module in a block 473, "Targeting and Data/Statistics for Success" module in a block 474, a "Targeting and Data/Statistics for Experience" module in a block 475, a "Targeting and Data/Statistics for T.I.M.E.S." module in a block 476, a "Targeting and Data/Statistics for F.I.N.A.N.C.I.A.L.S." module in a block 477, a "Targeting and Data/Statistics for Terms" module in a block 478, a "Targeting and Data/Statistics for Transceiver Types" module in a block 479, the "Rule Engine & Mgmt's Assignment Module" in the block 270, the "Analysis &/or Verify Collective Input/Results" and the "Preview &/or Test."

In various non-limiting embodiments, a system and computer-implement method compromising, receiving a first user input, analyzing the first user input, generating a relative reliability score, where the first user input is relatively compared with a second input, monitoring/analyzing the input reliability score against a relative reliability criteria/fitness, wherein violating the relative reliability criteria/ fitness generates a prompt, sending the prompt to an entity, and receiving a decision from the entity. The SWARMER System and computer-implement method above, wherein the prompt may be a threshold adjustment, an alert, an acknowledgement, a correction, a suggestion, a decision, a counter-proposal, a fee-adjustment, a billing-adjustment, a score-adjustment, a competition, litigation, and/or the like. The SWARMER System and computer-implement method above, wherein the decision may be a final, partial absolute, temporary, contingent, conditional, circumstantial, finite, counter, acceptance, suspension, throttle, variation, termination, suggestion, rejection, licensing, litigation, arbitration, mediation, and/or the like, decision.

The SWARMER System and computer-implement method above, wherein the relative reliability criteria/fitness is relative to the first user. The SWARMER System and computer-implement method above, wherein the relative reliability criteria/fitness may be relative to a second user, a plurality of users, a panel of judges, an algorithm, a qualified expert, some variation/combination/permutation of these, and/or the like.

The SWARMER System and computer-implement method above, wherein the relative reliability criteria/fitness may be relative to an overlap, non-overlap, union, non-union, Boolean operation, algorithm, usage criteria, style criteria, temporal criteria, segment criteria/filter, project criteria/filter, application, Operating System, device, location criteria/filter, domain, industry, art-unit, success criteria/ threshold, investment criteria/threshold, participation criteria/threshold, participant criteria/threshold, budget criteria/ threshold, point-system criteria/threshold, income criteria/ threshold, profit criteria/filter/threshold, and/or the like.

In various non-limiting embodiments, the disclosed system and associated computer-implement methods compromising, receiving a first user input, analyzing the first user input, generating a list of scored criteria/fitness/threshold comprising an absolute and/or a relative score for a weapon, weapon target, weapon environment, weapon user, weapon user-friend, weapon-user foe, weapon-user-unknown-actor, and/or the like, along with a second user input for the scored criteria/fitness/threshold comprising an absolute and/or relative score for an event, input, output, and/or accuracy, say in terms of successfulness, reliability, creditability, popularity, temporal, demographic, psychological, behavioral, legibility, legality, offensiveness, complaints, insults, deception, fraud, credit-worthiness, predictability, impulsivity, commercial-viability, actor/user/participant health, industry health, patent office health, attractiveness, suitability, sustainability, marketability, success-likelihood, mission-success-likelihood, practicality, efficiency, efficacy, desirability, enemies/foes, potential enemies/foes, likely enemies/foes, and/or the like; where the first user input is relatively compared with the second input, monitoring/analyzing the inputs from the list of scored criteria/fitness/threshold against a relative from the scored criteria/fitness/threshold list score, wherein violating the absolute and/or relative from the scored criteria/fitness/threshold list score generates a prompt, sending the prompt to an entity, and receiving a decision/response from the entity.

Systems that delineate tasks, resources, incentives, roles, skills, experience, offers, and tracks progress and successfulness may greatly improve efficiencies, accountability, accuracy, safety, and/or the like. This SWARMER system provides Sellers (70), Buyers, Government Officials, Military Instructors, Police Academies, Firing Range Instructors, consumers/users, weapon users, predictors, judges, industry/society/work/military peers, experts, and/or the like; an ability to not only train in a confidential network of people with a wide range of expertise, but discovery trends, skills, decencies, and/or the like, say following a training or real life event. And eventually help make individual better, safety, and/or the like; and/or for improving collaborative hunting, sporting, police response, military action, and/or like alert/corrections/adjustments in near realtime, if not, realtime.

It may help the Campaign Gatekeeper (42) (e.g. a military instructor) who is, for instance, is tasked with preparing a team for a navy seal operation and/or reconnaissance mission. Ultimately improving weapon skills, saving lives and potentially aiding towards military superiority.

The disclosure presents a method performed by a computer having a memory and a processor for data interchange, the method compromising a receiving a second input to a processor; analyzing the second input with the processor; generating a relative data reliability score, where the second input is relatively compared with a first input; analyzing the relative data reliability score with a relative reliability criteria, wherein an input violating the relative reliability criteria generates a prompt; sending the prompt to an entity; and receiving a decision from the entity.

The disclosure presents a method performed by a computer having a memory and a processor for data interchange, the method compromising: a receiving a first input to a processor; analyzing the first input utilizing the processor; generating a relative reliability score, where the first input is relatively compared with a second input; analyzing the relative reliability score against a relative reliability criteria for a particular source, wherein a violation of the relative reliability criteria; generates a prompt; sending the prompt to an entity; and receiving a decision from the entity.

Further, wherein the prompt is a request. Further, wherein the prompt is an adjustment. Further, wherein the prompt is a counter. Further, wherein the prompt is a second decision. Further, wherein the prompt is an acknowledgement. Further, wherein the decision is a final. Further, wherein the decision is contingent. Further, wherein the decision is a partial. Further, wherein the decision is a collection.

Further, wherein the relative reliability criteria are relative to the first input. Further, wherein the relative reliability criteria are relative to a second input. Further, wherein the relative reliability criteria are relative to a plurality of inputs. Further, wherein the relative reliability criteria are relative to a panel of judges. Further, wherein the relative reliability criteria are relative to an algorithm. Further, wherein the relative reliability criteria are relative to a qualified expert. Further, wherein the relative reliability criteria are relative to an overlap. Further, wherein the relative reliability criteria are relative to a usage criteria.

The disclosure presents a method performed by a computer having a memory and a processor for data interchange, the method compromising. a receiving a first user input; analyzing the first user input; generating a relative accuracy score, where the first user input is relatively compared with a second input; analyzing the relative accuracy score against a relative accuracy criteria, wherein a violation of the relative accuracy criteria generates a prompt; sending the prompt to an entity; and receiving a decision from the entity.

The foregoing description of the present disclosure has been provided for purposes of illustration and description. It is not intended to be exhaustive or to limit any invention to the precise forms disclosed. Many modifications and variations will be apparent to the practitioner skilled in the art. Embodiments were chosen and described in order to best explain the principles of any particular invention and its practical application, thereby enabling others skilled in the art to understand any particular invention, the various embodiments and with various modifications that are suited to the particular use contemplated. It is intended that the scope of a particular invention be defined by the following claims and their equivalents.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed:

1. A method, comprising:
   electronically determining a first spatial location of a first handheld weapon in three axes based upon input obtained from a first and a second tracking sensor affixed to the first handheld weapon;
   electronically determining a first target;
   electronically tracking aiming of the first handheld weapon relative to a first target based upon the spatial location of the first handheld weapon; and
   electronically tracking a first projectile fired from the first handheld weapon and whether it hits the first target.

2. The method of claim 1, wherein the first target is electronically determined based upon input obtained from a first environmental sensor.

3. The method of claim 2, wherein the first environmental sensor is affixed to the first handheld weapon.

4. The method of claim 2, wherein the first environmental sensor communicates with the first handheld weapon.

5. The method of claim 1, wherein the electronic tracking of the first projectile fired from the first handheld weapon and whether it hits the first target includes a measurable success factor.

6. The method of claim 5, further comprising:
   electronically tracking a second projectile fired from the first handheld weapon and whether it hits the first target; and
   electronically storing the results of whether the first projectile and the second projectile hit the first target.

7. The method of claim 1, further comprising:
   if the first projectile does not hit the first target, electronically determining a first measure by which the first projectile missed the first target.

8. The method of claim 7, further comprising:
   electronically creating a first aiming adjustment for firing a second projectile from the first handheld weapon toward the first target through use of the first measure by which the first projectile missed the first target.

9. The method of claim 8, further comprising:
   electronically storing whether the second projectile hit the first target or a second measure by which the second projectile missed the first target.

10. The method of claim 9, further comprising:
    electronically creating a second aiming adjustment for firing a third projectile from the handheld weapon toward the first target through use of the second measure by which the second projectile missed the first target.

11. The method of claim 1, further comprising:
    electronically determining a first trigger status of the first handheld weapon based upon input of a first trigger sensor affixed to the first handheld weapon.

12. The method of claim 1, further comprising:
    electronically detecting a relative safety zone for firing the first projectile towards the first target.

13. The method of claim 2, further comprising:
    electronically predicting a likelihood of whether a first projectile fired from the first handheld weapon will hit the first target based upon the spatial location of the first handheld weapon.

14. The method of claim 13, wherein the likelihood is electronically predicted through use of a first predictive input received from the first environmental sensor.

15. The method of claim 14, wherein the likelihood is electronically predicted through use of a second predictive input received from a storage medium based upon results of at least one earlier filed projectile fired from the first handheld weapon.

16. The method of claim 15, wherein the likelihood is electronically predicted through use of the second predictive input that is personalized to a first user.

17. The method of claim 1, further comprising:
electronically determining a second spatial location of a second handheld weapon in three axes based upon input obtained from a third and a fourth tracking sensor affixed to the second handheld weapon; and
electronically tracking aiming of the second handheld weapon relative to the first target based upon the second spatial location of the second handheld weapon.

18. The method of claim 17, further comprising:
electronically determining a second target; and
electronically assigning either the first target or the second target as a first assigned target which is assigned to the first handheld weapon and choosing the remaining of the first target or the second target as a second assigned target which is assigned to the second handheld weapon.

19. The method of claim 18, wherein the first assigned target and the second assigned target are assigned based upon an algorithm which seeks to obtain the highest likelihood of success of both a first projectile from the first handheld weapon hitting the first assigned target and a second projectile from the second handheld weapon hitting the second assigned target.

20. A method, comprising:
electronically determining a first spatial location of a first handheld weapon in three axes based upon input obtained from a first and a second tracking sensor affixed to the first handheld weapon and a second spatial location of a second handheld weapon in three axes based upon input obtained from a third and a fourth tracking sensor affixed to the second handheld weapon;
electronically determining a plurality of targets for the first and the second handheld weapons based upon input obtained from a first environmental sensor; and
electronically assigning a first assigned target to the first handheld weapon and a second assigned target to the second handheld weapon based at least in part upon the first spatial location of the first handheld weapon and the second spatial location of the second handheld weapon.

* * * * *